United States Patent [19]

Avery

[11] 3,810,101

[45] May 7, 1974

[54] DATA COLLECTION SYSTEM

[75] Inventor: William L. Avery, Greensboro, N.C.

[73] Assignee: Burlington Industries, Inc., Greensboro, N.C.

[22] Filed: Dec. 29, 1971

[21] Appl. No.: 213,508

[52] U.S. Cl. .............................................. 340/172.5

[51] Int. Cl. ....... G06f 15/46, G06f 3/00, G06f 3/04

[58] Field of Search ...... 340/172.5, 163; 235/151.1, 235/151.11

[56] References Cited

UNITED STATES PATENTS

| | | | |
|---|---|---|---|
| 3,403,382 | 9/1968 | Frielinghaus et al. | 340/172.5 |
| 3,350,687 | 10/1967 | Gabrielson et al. | 340/163 |
| 3,388,380 | 6/1968 | Coffin et al. | 340/147 |
| 3,492,648 | 1/1970 | Olsen et al. | 340/147 |
| 3,522,588 | 8/1970 | Clarke, Jr. et al. | 340/147 |
| 3,541,513 | 11/1970 | Paterson | 340/151 |
| 3,559,177 | 1/1971 | Benson | 340/163 |
| 3,568,164 | 3/1971 | Schiller | 340/172.5 |
| 3,569,940 | 3/1971 | McFadden et al. | 340/172.5 |
| 3,579,197 | 5/1971 | Stapleford | 340/172.5 |
| 3,629,859 | 12/1971 | Copland et al. | 340/172.5 |
| 3,665,406 | 5/1972 | Gallagher et al. | 340/172.5 |

*Primary Examiner*—Paul J. Henon
*Assistant Examiner*—James D. Thomas
*Attorney, Agent, or Firm*—Cushman, Darby & Cushman

[57] ABSTRACT

A system for transferring information from a plurality of data stations to a central station such as a computer. A novel data controller couples the computer to a plurality of master stations, some of which may in turn be coupled to a set of slave stations, for communicating with the master stations. The data controller operates in three phases — a load phase in which a station address and instructions are loaded into the controller either from the computer or an internal memory within the data controller, an execute phase in which the data controller communicates with the addressed stations and a transfer phase in which the received information is transferred by the data controller to the computer or, if it is malfunctioning, to auxiliary storage devices. Any of a number of unique master stations can be used in the system. A slave multiplexer operates to interrogate a number of associated slave stations of varying types and convey the information thus derived to the data controller when queried. An interactive keyboard permits manual entry of information which is then conveyed to the data controller.

114 Claims, 73 Drawing Figures

INVENTOR
WILLIAM L. AVERY

BY Cushman, Darby & Cushman
ATTORNEYS

ATTORNEY

DATA COLLECTION SYSTEM

BRIEF DESCRIPTION OF THE PRIOR ART AND SUMMARY OF THE INVENTION

The invention relates to a data communication system.

The flow of information in this the age of the computer is at least as important, if not more important, than the flow of tangible goods, energy and people. Information can be rapidly gathered from far flung points to a central station, analyzed and complex machines controlled in accordance therewith, all in an instant relative to human perception. Systems gathering data from and controlling all kinds of human and machine activities in chemical plants, product assembly lines, credit check systems and textile operations have been and are being developed.

The present invention, as described in detail below, relates to such a system in which information is systematically gathered from remote points for analysis and control information transmitted back to those points as desired. The system includes a number of different types of elements — each performing a different system function — so that in any given application a specific system configured to match that application can be quickly, simply and inexpensively assembled. Further, the system includes a number of important innovations which lend the system reliability and give it a number of important capabilities in dealing with incoming and outgoing data.

Broadly, the system includes a data controller, a plurality of master stations and a plurality of slave stations. The slave stations are coupled to some of the master stations, the master stations are coupled to the data controller and the data controller may be coupled to a computer. The data controller operates in three phases — a load phase in which a station address and instructions are loaded into the controller either from the computer or an internal memory within the data controller, an execute phase in which the data controller communicates with the addressed stations and a transfer phase in which the received information is transferred by the data controller to the computer or, if it is malfunctioning, to auxiliary storage devices.

The data controller itself incorporates a number of important innovations which are discussed in detail below. A unique format for communication between controller and master stations is set forth. The incoming data stream from the master station is synchronized with the timing signals in the data controller automatically, irrespective of the distance from the addressed station to the controller. The data controller also possesses many other important capabilities.

The master station too incorporates a number of important innovations likewise discussed in detail below. In fact any of a number of different types of master stations can be used in a system. A slave multiplexer operates to interrogate a number of associated slave stations and convey the information thus derived to the data controller when queried. An interactive keyboard permits manual entry of information which is then conveyed to the data controller. Other unique capabilities and other types of master stations are discussed in detail below.

The novel system of this invention was designed particularly for textile applications, but it obviously can be employed in many other similar applications when data transfer is required. Many other objects and purposes of the invention will become clear from the following detailed description of the invention.

BRIEF DESCRIPTION OF THE DRAWINGS

FIG. 5, comprising

FIG. 7, comprising

FIG. 8, comprising

FIG. 9, comprising

FIG. 10, comprising

FIG. 11, comprising

FIG. 22, comprising

FIG. 23, comprising

FIG. 29, comprising

DETAILED DESCRIPTION OF THE INVENTION

GENERAL SYSTEM DESCRIPTION

The following is a detailed description of one embodiment of an information and control data system concept which provides a means for implementing computer monitoring and control systems. While this embodiment was specifically designed for use in textile applications, the concept embodied in this example obviously can be used advantageously in many types of information gathering and control systems. The system consists of a number of general purpose components which can be simply interconnected into a suitable configuration to provide a means both for acquiring manually entered or automatically sensed data for input to a digital computer or the like and for outputting computer or other generated data for information and control purposes. The system hardware and operation is described herein in general terms with particular emphasis on those aspects of the system which are of particular significance and dominant system features.

The system elements comprise a high speed data communication network for interconnecting a digital computer with people and machinery at locations remote to the computer. The system has a bi-directional transmission capability which allows both for the collection of data and for the outputting of computer data for information or control purposes.

Figure 1:
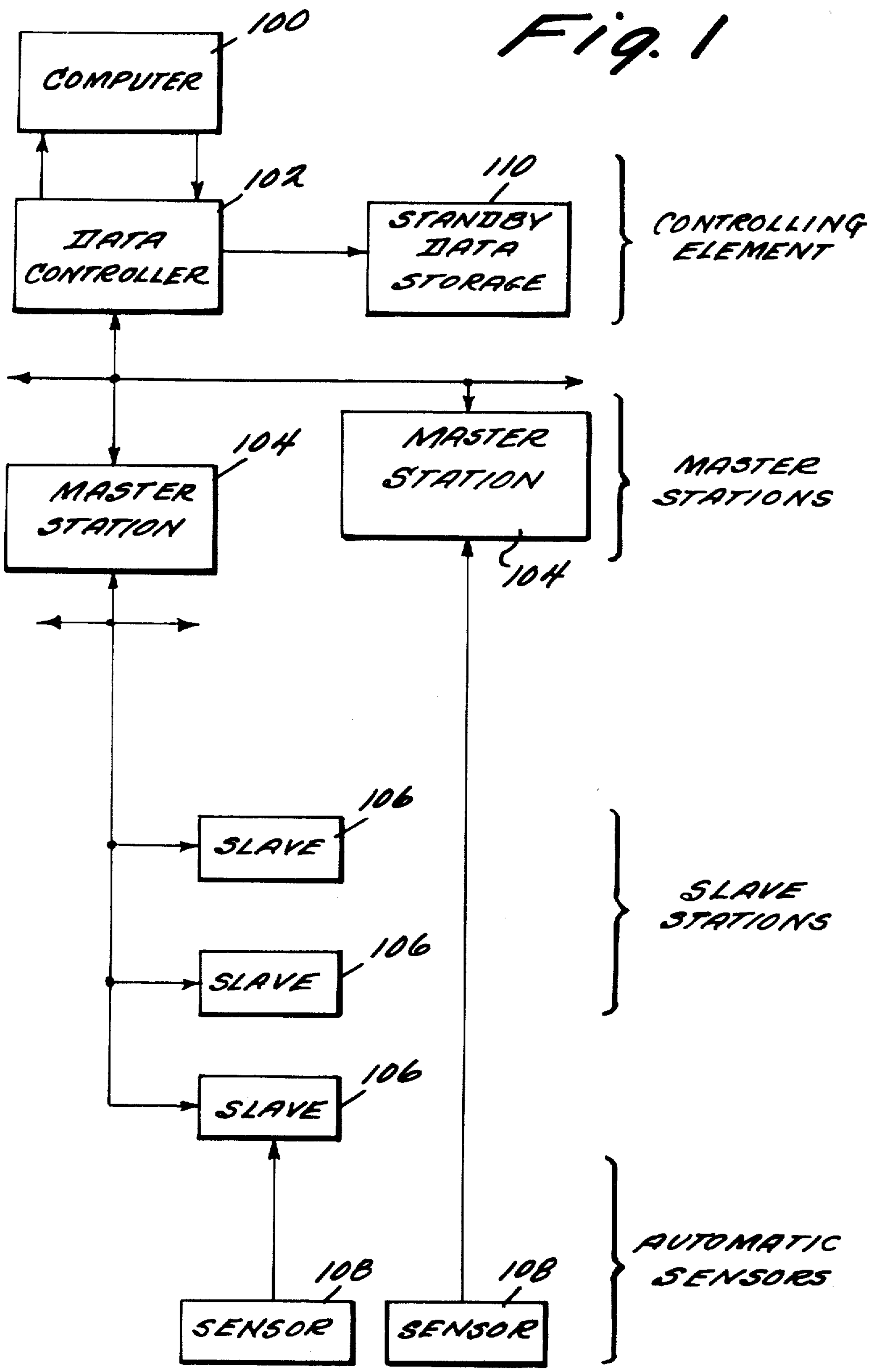
FIG. 1 shows a block diagram of the novel communication system of this invention.

Referring to FIG. 1 the system elements can be catagorized into four basic types in addition to computer 100: a data controller 102, a number of master-stations 104, a number of slave stations 106 and a number of automatic sensors 108.

Not all of these types are necessarily required in any given application. In fact, the flexibility which these various types give to configuring a system to deal with problems and circumstances unique to an application without costly modifications is one of the most important advantages to this invention. A standby data storage device 110 can also be used as discussed in detail below.

The first three categories of devices form a communication hierarchy with each master station 104 communicating directly with the single data controller 102 on a common communication link, and with slave stations 106 communicating only with their assigned master station 104 on another common communication link. Thus, a slave element 106 can communicate with the data controller only through its assigned master station and the data controller 102 alone communicates with computer 100.

The data controller is the controlling element of the system and its function is to coordinate all data transfers within the system. This is accomplished by allowing only one of the master stations to utilize the common cable at any instant in time. The data controller also makes error checks on all data transmitted or received from the master stations and reports any data errors to the computer so that the transfer can be reinitialized. In addition the data controller buffers all data transferred between itself and the computer so that the computer is engaged for only 10's of microseconds for any given data transfer, thus freeing the computer for other work except during brief transfer intervals. The data controller normally scans the stations for information independent of the system computer.

The master station elements include all system elements which are directly controlled by the data controller. A portion of the circuitry of these devices can be made identical for all the master stations. However, additional circuits are added to this common portion to determine what specific functions the master station performs. Three examples of master stations as discussed in more detail below are a keyboard-display unit (interactive keyboard), a slave multiplexer, and a teletype interface. Some automatic sensors can be interfaced directly with the master station; however, this depends both on the particular master station unit and its specific application.

The slave station category includes all system elements which communicate directly with only a master station element. The slave elements are controlled by their master station in a manner similar to the way in which the data controller controls the master stations. However, a different data transfer technique is used to allow much simpler circuitry than that used between the data controller and master stations. The most prevalent slave element in a textile monitoring system, for example, would be the machine monitoring station, a device which accepts both manually entered inputs and automatically sensed inputs for transmission to the data controller and also responds to data from computer via the master station.

The automatic sensor elements include all signal transducers and their associated signal conditioning circuits necessary to convert the transducer output to a reliable digital input. Typical signal transducers include switch contacts, relays, transformers, photosensitive devices, and hall-effect devices.

At any given instant in time the system is capable of operating in any one of four modes as dictated by the data controller. Three of these modes involve interaction between the data controller and computer and are defined as primary modes of system operation. The fourth mode involves operation without the computer and is defined as a secondary mode of operation.

The system functions predominately as a computer input/output device by operating in one of three primary modes. In the first of these the data controller continually checks each master station in the system for two reasons, first, to verify the operational status of the master station (operative or inoperative) and second, to determine whether the master station is ready to transfer data to the data controller. The master station is so designed that a change in one of its slave station's automatic sensors or manual entry input will cause a data transfer request to be triggered. It is important to note that for a change in a slave element's inputs a block of data for only the slave in which the change occurs is transferred through the master station to the data controller. The master station check of the slave stations occurs continuously while the master station is operating so that each slave is typically checked hundreds of times a second for sensor status changes. If the master station indicates a data transfer is required, then the data controller will accept the data from the master station and upon receiving the complete data transfer from the master station it will interrupt the computer and transfer the received data to the computer. If the data controller determines a master station operational status has changed, then this is reported to the computer regardless of whether a data transfer occurs.

However, if the data controller does not receive a data transfer request it checks the next master station for status and data transfer request. This mode of system operation continues until the data controller determines one of the other modes of operation should be entered.

The second primary mode is entered by the data controller at the request of the computer and places the data controller under computer control for a limited interval of time. This mode allows the computer to scan stations for data without being interfered with by interrupt data generated by sensor status changes. This mode allows the computer to obtain current sensor status information for data file initialization in the minimum time possible. Any changes of sensor status which occur while the data controller is in the scan mode, but still within the time interval after the sensor's station has been scanned, are reported as interrupt generated data when the data controller shifts to the interrupt operation mode (the shift to interrupt mode being automatic upon termination of the scan mode).

The third primary mode is also entered at the computer's request and allows the computer to output data along with appropriate transfer instructions to the data controller. The data controller then transfers this data to the station designated in the transfer instruction. Upon completion of the data transfer the data controller automatically shifts to the interrupt operation mode (first primary mode).

The data controller enters the secondary mode automatically when the data controller determines the computer is off-line or malfunctioning. This decision is based on a failure of the computer either to respond to a data controller initiated data transfer request or its failure to terminate an output or scan operation within a preset time interval of approximately 5 seconds. Upon entry into this mode the system receives data in the same manner that it receives data during the interrupt operation mode. The data is stored on the standby storage media (e.g. high speed paper tape or magnetic tape) in a format similar to the format in which data is transferred to the computer from the data controller. In addition, the time is preferably inserted on the tape with hours and minutes being inserted at the beginning of each minute and the seconds are entered on the tape immediately following data acquired by the data controller. This provides sufficient data to allow the computer to update data files for the interval that the computer was down once it is returned to operation. Once the data controller has entered the data logging mode it can only be manually shifted to one of the primary modes of operation.

The data controller is preferably installed in the immediate vicinity of the computer and is operated by the computer in a manner similar to the way in which a computer peripheral is operated. The data controller is capable of controlling up to 256 master stations with 128 master stations assigned to each of two two-pair cables. As described in detail below, the data controller of this embodiment includes a 16 word (16 bits/word) read-write memory for data buffering, instruction registers, a read-only memory for instruction reference when operating in the interrupt or data logging modes, data multiplexing and demultiplexing circuits, data and address error detection circuits, a control section, master station operational status storage, and computer interface circuits. In addition, the data controller contains an auxiliary storage controller and a digital clock for secondary mode operation. The controller is preferably constructed in a modular manner so that those functions not needed in a specific application can be left out. The data controller is designed for interfacing with any digital computer having input/output capability. As a specific interface the Data General Nova Computer was found successful, but other computer interfaces can undoubtedly be successfully employed.

The auxiliary storage device is either a high speed paper tape punch or incremental magnetic tape recorder and is used by the data controller to store data received from the master stations. In addition, time is preferably recorded on the tape to allow the computer to reconstruct events which occurred while the computer was off-line. A computer high speed paper tape peripheral can be utilized for this job. Upon the data controller's entry into the secondary mode of operation it automatically transfers the paper tape punch control lines from the computer to the data controller for data storage. The speed of the paper tape punch limits the amount of data which can be stored during secondary mode operation and accordingly an incremental magnetic tape recorder control circuit for the data controller to handle peak data loads without danger of losing data in large system installations may be desirable.

The interactive keyboard consists of a twenty-eight key manual entry keyboard and a sixteen legend computer controlled display. The keyboard contains 10 numerical keys, 15 function keys, and three editing keys. The function keys are named to classify the variables entered on the numeric keys — for instance in the fabric grading frame application the function keys are named LOOM, DEFECT, DATE, END OF CUT, etc. The 16 computer controlled legend displays are titled to correspond to the particular application. In the grading frame application the legends are used to request the entry of information, give the fabric grade, request data reentry, etc. The interactive keyboard is a free format device so that the operator does not have to give special attention to the order in which the data is entered. The editing keys allow the operator to correct data entry errors without having to rekey the complete entry. In addition, an audio tone generator is incorporated in the unit to generate a unique tone for each key to help the operator catch data errors such as transposed numbers. The unit is capable of handling special inputs, such as the automatic yardage pickup which can be incorporated into the unit as, for example, a grading frame application. Other possible devices which can be added include a numeric display or an expanded message display.

The slave multiplexer controls up to 64 machine monitoring and/or control stations (see below). The machine stations are connected to the slave Multiplexer by eight conductor cables (including machine station power distribution) with 16 monitoring or control stations on a common cable. The primary functions of the slave multiplexer are: (1) to connect to the data controller only those stations requiring input data transfer; (2) to continually check the operational status of all stations and report any changes to the data controller; (3) to bring on-line the particular station the data controller designates it wants to communicate with; and (4) to supply operating power to the stations.

The teletype controller connects a standard teletype into the data system so that it can be utilized for computer input/output at a location remote to the computer without the installation cost of special cabling directly from the computer to the teletype.

Each slave station can be installed adjacent to the machine to be monitored and preferably contains some or all of the following functions:

1. manual stop classification by depressing one of a group of stop classification push-buttons,
2. automatic stop classification by sensors mounted on the machine and connected to the station,
3. numeric manual entry,
4. automatic counting of units of production,
5. automatic sensing of the occurrence of machine functions.

There can be several modes of this station to allow for economy in application. For example, to handle block doff and creel time prediction in spinning and to monitor frame down time classification, a station utilizing features 1, 4, and a single run-stop sensor 5 would be used. The station can be expanded to handle 244 binary bits for flexability in application.

Another type of slave station is similar to the machine monitoring station and can incorporate some or all of the features outlined for the monitoring system. In addition, this station has a digital output capability which is expandable to 240 bits. However, in most applications it is anticipated a range of 10 to 30 bits will be sufficient. This particular station can be utilized to implement both direct and supervisory control depending on the specific process involved.

Yet a further kind of slave station can be utilized for monitoring a large number of point sensors distributed over a limited area. The auto point monitor continually scans all its assigned points and checks their status against the status it determined on the last scan. If there is a difference in status, the unit reports the point number and its new status to the data controller. In general each point is checked up to several times a second and the status stored after the comparison and reporting, if any, is completed. When the data controller requests a scan of the point statuses the autopoint monitor initializes itself in such a manner so as to force reporting of all points in a predetermined state to the computer. Any points which change status during the memory transfer will be reported to the data controller as interrupt data immediately following the initialization. If should be noted that this approach to such textile applications as spindle monitoring is mandatory if data accuracy is to be maintained while the computer is off-line by storing data for later computer processing.

The slave station digital keyboard is a simple, low cost decimal keyboard with limited punctuation and it is utilized for numeric data entry. This unit is preferably connected to the slave multiplexer in lieu of one of the machine monitoring or control station and is used to augment the data base offered by the machine station. Its uses include manual spindle end down monitoring and temporary data collection situations such as frequency checks.

Another type of master station element is utilized to connect analog sensors into the information and control system. It contains analog multiplexing circuits, an analog-to-digital converter and a data buffer. The unit continuously scans the analog inputs, converts them to digital values and stores them in the buffer. This buffer storage technique allows the analog-to-digital converter to operate at a rate lower than that of the data system so that a low speed, low cost A-D conversion technique can be used. However, the data can still be acquired at the normal data system operating speed. In addition, it is practical to perform a digital data comparison in the analog data multiplexer so that input signals are reported to the computer only when they change by a predetermined amount. This gives the analog signal inputs a service characteristic similar to that utilized for the digital data.

Another master station is similar to the teletype controller in design but is utilized to interface a commercially available display unit into the data system.

A test master station is a system maintenance aid used to check circuit modules utilized in the master and slave stations. The circuit module is inserted into this unit and its identification number entered. The computer then makes a logic check of the module and indicates whether the module is good or bad. With this aid the circuit module check is as involved as the field maintenance personnel should have to become in the circuit maintenance. One of the basic design concepts of this system is that all system field repairs consist of circuit module replacements and the return of defective modules to the manufacturer for repair.

The basic system communication rate between the data controller and master stations is 50,000 bits per second. The time required to check a master station for status and determine whether service is required is 320 microseconds. Total master station service time to transfer 64 data bits from a slave to the data controller is 2.1 milliseconds. The time required to scan 2,000 machine monitoring stations with 64 data bits per station is 4.2 seconds. The typical interrupt service time for one of 2,000 machine monitoring stations is 12.5 milliseconds.

The system is capable of operating at the above speeds with all master stations located within a 8,000 foot radius of the data controller. This radius can be extended by several thousand feet with approximately a 5 percent increase in the service times.

All data is transferred between the data controller and master stations in serial pulse code format utilizing a balanced transmission line. This technique gives excellent electrical noise rejection with relatively low cost and allows simple system installation. No buffer amplifiers are utilized at any point between the data controller and master stations for increased reliability. Data transmission between master stations and slave stations is accomplished with high logic levels on unbalanced lines. This technique is very low in cost yet provides good electrical noise immunity over the transmission ranges involved (less than 500 feet).

Parity is transmitted with the master station address by the data controller and checked by the receiving master station. If an addressing error is detected the station will not respond and must be readdressed by the data controller. Parity on all data transfers (incoming or outgoing) is originated by the transmitting station and verified by the data controller. Data parity is generated over each eight data bits to give a high probability of error detection. Any data errors detected are reported to the computer so that the data transfer can be reinitiated.

The system is designed to be operated with all the system components located within a 8,000 foot radius of the data controller. The data controller interface for the Data General Nova computer is designed for the data controller to be located within a few feet of the computer. For those situations where remote computer data processing is desired there are two approaches which may be used.

The first approach involves locating a minimum small computer configuration at the data controller and utilizing this small computer for control and out of limit reporting. A communications interface and data phone is added to this minimum computer configuration to allow data transmission to a remote computer. The communication interface is a standard option with the majority of small computers and is readily available at a very reasonable price.

The second approach includes developing a data phone interface for the data controller which is used to replace the computer interface. This allows the data controller to interact with a remote computer while operating in a primary mode. However, it should be noted that this approach requires a conditioned telephone line dedicated to this single task and a high speed data phone. The first approach can allow data transmission for short intervals once a shift thus allowing the telephone line to be utilized for communication purposes the remainder of the shift. In addition, the first approach can utilize a lower speed data phone since the data transfer is relatively independent of the information and control system operation.

The data controller controls all communications between the data controller and the master stations connected to the data controller. The data controller effects this control by being able to initiate and terminate all communications with any master station. A communication between the data controller and the master station is called a message. The message consists of a start of message signal, and some integral number of message characters. Each message character contains at least a one bit transfer to the data controller from the master station being communicated with. There are two basic types of messages handled in the system: an outgoing data transfer by which data is transferred from the data controller to a master station, and an incoming data transfer in which data is acquired from a master station by the data controller.

The general data communication message format is as follows:

1. Start-of-message signal
2. Address character
3. Instruction Character
4. Data character 0
5. Data character 1
6. Data character 2, and succeeding data characters up to data character 31

The function of each of these message elements is as follows:

The start-of-message signal is transmitted by the data controller to synchronize all master stations so that they will accept the next message character transmitted as the message address character.

The address character contains a seven bit binary master station address and the odd parity bit for this address. This eight bit group is transmitted by the data controller at the beginning of the address character and is transmitted to all master stations on one of the two data cables in the data controller.

If the master station whose address is transmitted is on the data line and if that master station receives its address and parity bit correctly, then it will respond to the data controller with two information bits. The first of these two bits is a response to the data controller to inform the data controller that the address was received; the second of these bits is transmitted if the master station addressed requests an interrupt data service.

The instruction character consists of an eight bit binary code transmitted by the data controller to the master station just addressed to inform the master station as to what function it is to execute for the data controller. The master station receives this binary code and buffers it in its instruction register where it is retained for the duration of the message to control the master station's operation. The master station then responds to the data controller with an odd parity bit it has constructed from the data controller's transmission during the instruction character.

For incoming messages to the data controller, the master station transmits eight binary bits (a byte) of data and a non-data bit to the data controller and follows this with an odd parity bit computed on the nine binary bits just transmitted. This byte of data, the non-data bit and its attendant parity bit form one incoming data character. All succeeding incoming data characters are of this same format.

For outgoing messages from the data controller to the master station a data character consists of: (1) eight data bits, (2) a non-data bit transmitted by the data controller to the master station, and (3) a parity bit transmitted from the master station to the data controller. This parity bit is odd parity on the data bits received and is transmitted at the end of each data character received by the master station. This data character operation is repeated until the message is terminated by the data controller.

When the data controller is performing interrupt service checks on the master stations, it uses an abbreviated message which consists of a start-of-message signal and an address character. The data controller transmits the start-of-message signal and the address of the master station which it wants to check for interrupt service requests. The master station then reponds during the address character with: (1) a bit informing the data controller that it received its address and (2) with a bit indicating the status of its service request register. When the address character is completed, the data controller examines the service request received from the master station and if it determines that no interrupt service is required it then terminates the message. However, if the master station requested interrupt service, then the data controller follows the address character with the instruction character which causes the master station to output its interrupt data to the data controller. A sufficient number of data characters are then executed to transmit the data from the master station to the data controller. Thus, when the data controller is performing interrupt service checks, a message may consist of only the start-of-message signal and the address character rather than the full message sequence.

Message transmission between the data controller and master stations is via a signal pair and a clock pair. Either the data controller or the master station can drive the data pair, but only the data controller can drive the clock pair. The transmission format used on the cable pairs is return-to-zero. The pairs are normally at logical zero levels and are driven to logical one levels when a bit of data is transmitted. The start-of-message signal consists of a data controller driving the data pair with four or more logical one pulses while maintaining the clock pair at logical zero.

Each character — address, instruction or data — consists of 10 clock periods called bit periods. These are numbered zero through nine. All 10 bit periods of the address character are used for information transfer, but on all other characters only nine of the 10 bit periods are used. In the latter characters, eight bit periods are used for data and one bit period is used for parity check.

There are two timing data timing formats in the data system. The data controller can accept either format, but master stations are designed to utilize either the A format only or the B format only. The instruction character is of the B format. In the A data format, data is transmitted on bit periods zero through three inclusive and bit periods five through eight inclusive; the parity is transmitted on bit period nine. In the B data format the data is transmitted during bit periods zero through seven inclusive and parity is transmitted during bit period nine. It should be understood that the data controller transmits 10 bit period clock pulses during each character and that the data controller or master station can transmit during all nine bit periods excluding the parity period if desired. However, data is only received and buffered during the eight bit periods specified in the two data formats. The A data format allows data to be handled in the master station in a four bit format whereas the B data format allows the master station to handle data easily in an eight bit format. Table I shows each of the character formats and lists the functions for the various bit periods.

Data transmission between the data controller and master station is via a two pair cable. One pair is used for differential clock transmission and the other pair for differential data transmission. The basic clock frequency is 50 kilohertz; however, the average clock frequency is a few percent less than this due to both data controller-computer service times and the cable and receiver signal propagation delays. The data controller receiver operates delayed time from the time in which the data controller transmitter operates. The skew or delay between the data controller transmitter and receiver timing is equal to twice the cable signal propagation delay from the data controller to the master station being serviced plus twice the receiver delay for the line receiver circuit utilized in the system. The approximate line receiver delay is three microseconds and the cable propagation velocity is approximately 200 meters per microsecond. Thus, for example, a station operating 200 meters from the data controller would involve a total delay of 8 microseconds. This delay is added to each character so that for the example situation, each character in the message would require 208 microseconds, thus giving an effective clock rate of less than 50 kilohertz.

TABLE I: Message Character Structure

Address Character

| Bit Period | Transmitted By | Function |
|---|---|---|
| 0–6 | D.C. | Master Station Address (0 is MSB |
| 7 | D.C. | Odd parity of the master station address |
| 8 | M.S. | Master Station Operational Status (1 = On-Line) Status (2 = Off-Line) |
| 9 | M.S. | Service Request (1 = Need interrupt service) (0 = No service needed) |

Instruction Character

| Bit Period | Transmitted By | Function |
|---|---|---|
| 0–7 | D.C. | Instruction for master station to execute (0 is MSB) |
| 8 | D.C. | Unspecified |
| 9 | M.S. | Odd parity of the received bits of bit periods 0–8 |

Data Character For Data Format A (1) Incoming Data Sequence

| Bit Period | Transmitted By | Function |
|---|---|---|
| 0–3 | M.S. | Data (0 is MSB) |
| 4 | M.S. | Unspecified (control bit) |
| 5–8 | M.S. | Data |
| 9 | M.S. | Odd Parity on the nine bits transmitted during bit periods 0–8 |

Data Character For Data Format A (2) Outgoing Data Sequence

| Bit Period | Transmitted By | Function |
|---|---|---|
| 0–3 | D.C. | Data (0 is MSB) |
| 4 | D.C. | Unspecified (control bit) |
| 5–8 | D.C. | Data |
| 9 | M.S. | Odd Parity on the bits received during bit periods 0–9 |

Data Character For Data Format B (1) Incoming Data Sequence

| Bit Period | Transmitted By | Function |
|---|---|---|
| 0–7 | M.S. | Data (0 is MSB) |
| 8 | M.S. | Unspecified (control bit) |
| 9 | M.S. | Odd parity on the nine bits transmitted during bit periods 0–8 |

(2) Outgoing Data Sequence

| Bit Period | Transmitted By | Function |
|---|---|---|
| 0–7 | D.C. | Data (0 is MSB) |
| 8 | D.C. | Unspecified (control bit) |
| 9 | M.S. | Odd parity on the bits received during bit periods 0–8 |

DATA CONTROLLER

Figure 2:
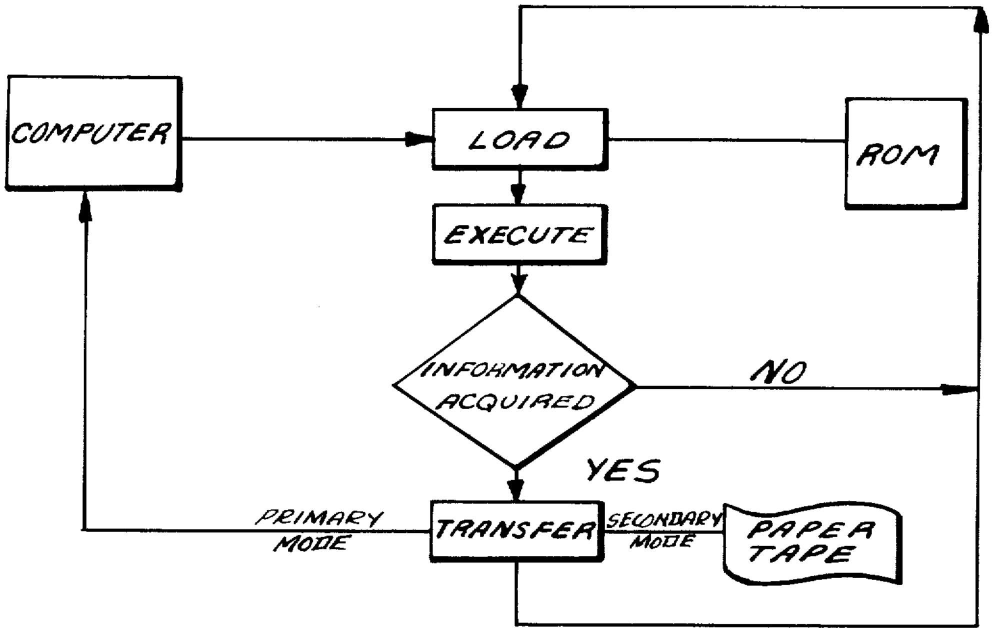
FIG. 2 shows a block diagram of the functions carried out by the data controller.

The data controller operation is broken into three operation phases — load, execute, and transfer and these phases are summarized by the operational flow chart in FIG. 2. In the load phase the data controller first makes the decision as to whether it is to accept a data transfer request from the computer and execute that request or whether it is to check a master station to determine if the master station has an interrupt service request. Once that decision has been made, the data controller either (1) loads the C register and A register with the datawords from its read-only memory if it is to check a master station for interrupt service, or (2) if it is responding to a computer request, the data controller loads from the computer the C register, A register and buffer data words. The buffer words are loaded if there is to be data output from the computer to a master station.

Upon termination of the load phase the data controller enters the execute phase. In this phase, the data controller establishes communication with the master station whose address has been placed in the A register and performs the appropriate functions with that station for either looking for an interrupt and acquiring the data if there is an interrupt, executing a data output operation, or executing a data input operation. In addition, the data controller checks the operational status of the remote station to determine whether it has changed from on-line to off-line or from off-line to online. If there is a change, this is either reported to the computer or logged in the transfer phase.

The execute phase can be terminated for one of several reasons such as: the station to be worked with is off-line, the station being checked for interrupt service has no interrupt, the TABLE 2: A Register

| L | Master Station No. | | Instruction | |
|---|---|---|---|---|
| 0 | 1 | 7 | 8 | 15 |

Line Select:
0 = First clock — data pairs
1 = Second clock — data pairs

MASTER STATION: 7 bit address of the master station on the line. Bits 1-7 determine the master station being addressed on the selected line (bit 1 is MSB of master station).

INSTRUCTION:
Bits 8-15 determine the instruction which the master station executes.

Bit 8 of an instruction determines whether the instruction is an incoming or outgoing data transfer:
Bit 8 = 1 designates data transfer from the master station to the data controller and computer.
Bit 8 = 0 designates data transfer from the computer to the master station.

data transaction between the master station addressed and the data controller has been completed, or a data error occurred during the transaction. The execute phase is terminated by entering either the load or transfer phases. The data controller enters the load phase immediately after execution if no pertinent data was obtained during the execute phase which is to be outputted to the computer or logged on paper tape. However, if data was acquired or generated during the execute phase, the data controller enters the transfer phase. If the data controller is operating in a primary mode the data controller will transfer the contents of the C register, the A register and the buffer memory to the computer. If the data controller is operating in the secondary mode, this data is logged with time on the paper tape or other storage.

Figure 3:
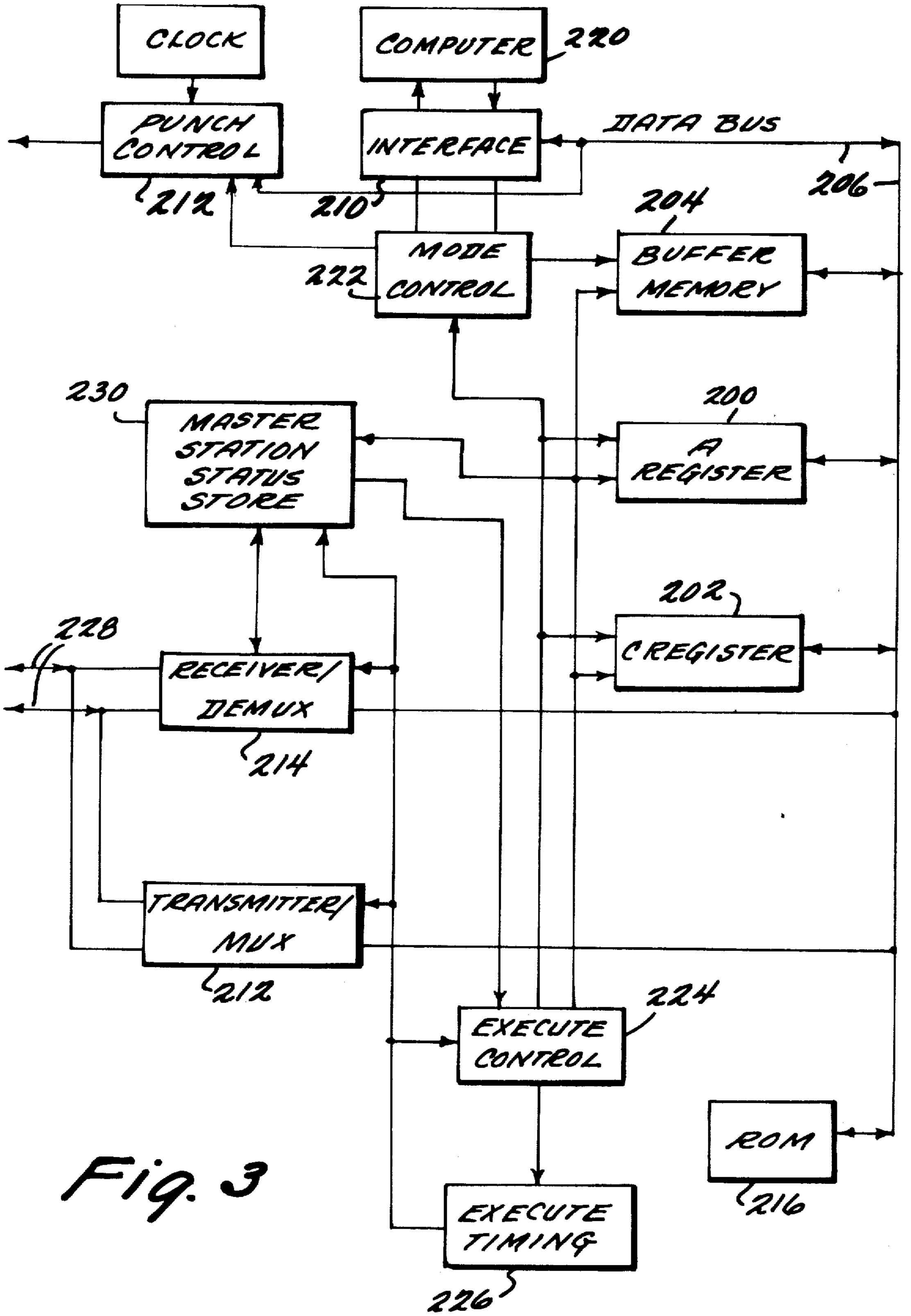
FIG. 3 shows a block diagram of the data controller.

As can be seen in FIG. 3, there are three 16 bit registers of significance in the data controller. These are the address (A) register 200, the control (C) register 202 and the buffer (B) memory 204. The B memory 204 actually consists of sixteen registers in a sequentially accessible form of random access memory such that 16 16-bit words can be stored in buffer memory 204 (these data words are numbered Bϕ–B17 octal). Thus, the data controller can transfer a maximum of 256 bits of data in or out in a single execute phase.

The register 200 determines the specific master station to be worked with and the data instruction to be transmitted to that master station. The most significant eight bits of A register 200 determine the specific master station to be worked while the least significant eight bits determine the operating instruction Table 3 — C Register (Bit ϕ) E: Error Occurrence Indicator
ϕ = No error
1 = Data parity error, (M=ϕ, O=1), multiple address attempt (M=1), or attempt to output data to an inoperative station (O=ϕ) or data parity error (P=1).

(Bit 1) U: Master Station Status Change
ϕ = No station operating status change has occurred
1 = The master station whose address is in the A register has changed operating status.

(Bit 2) O: Operational Status Indicator for Master Station Addressed.
ϕ = Station not operational
1 = Station operational (Bit 3) M: Multiple Address Attempt
ϕ = Normal addressing of station whose address is in the A register.
1 = Multiple attempt necessary to communicate with the master station whose address is in the A register.

(Bit 4) P: Data Parity Error (inclusive of A below)
ϕ = No error
1 = Error (Bit 5) A: Slave Station Address Error
ϕ = No error
1 = Error (Bit 6, 7) R: Response Identification
ϕϕ = No data was acquired
ϕ1 = The buffer contains data which resulted from a master station initiated data transfer (interrupt data).
1ϕ = The buffer contains data which was acquired at the request of the computer.

(Bit 8) C: Control Flog (set by the computer)
Set to 1 = The data controller responds only to computer originated requests and ignores master station service requests.
Set to 0 = The data controller operates in normal interrupt service manner.

(Bit 9) T: Timing Mode (settable by computer)
Set to 1 = Timing sequence A (Data transfer on bit periods 0–3, 5–8).
Set to 0 = Timing sequence B (Data transfer on bit periods 0–7).

(Bit 10) S; Slave Service Indicator (settable by computer)
1 = Slave service required if the master station addressed requests service.
0 = Normal interrupt service (Bit 11–15) N: Data Sequence Length in Bytes (settable by computer)

00000 –11111 =1 to 32 bytes of data (bit 11 is the MSB, bit 15 the LSB). to be transmitted to that station during the instruction character of the message. The format of the bits in the A register is summarized in Table II.

The C register 202 contains specific operating information for the data controller and also serves to transfer certain data controller statuses to the computer. The least significant five bits of C register 202 determine the *normal* number of bytes of data to be transferred during the particular message. This normal number of bytes can be altered by the slave station as discussed below. Bit 10 indicates whether the master station being communicated with has slave units. If this bit is set it allows the slave to modify the data sequence length to 8, 16, or 24 bytes of data in lieu of the normal number value of bytes for the particular master station. This specific feature allows mixing of special exception type slave stations with machine stations on a given slave multiplexer. Bits 8 and 9 of the C register 202 determine the specific timing sequence and whether the data controller is allowed to recognize interrupts or not. Bits 6 and 7 of the C register identify why the data controller has entered the transfer phase that is, whether the transfer results from a data acquisition directed by the computer, interrupt data, or other than data acquisition. As shown in Table 3 bit 4 indicates parity error and bit 5 an error in data character 1. Bit 3 is set if the data controller has made multiple attempts to raise the remote or master station. Bit 2 indicates the operational status of the master station whose address is currently in A register 200. Bit 1 is set if there has been a change in operating status of the master station, and bit zero indicates data parity error or multiple address attempts by the data controller.

Buffer register 204 functions as a temporary store for data received from the computer until it is serialized during the execute phase or to store demultiplexed data received from the master station until it is transferred to the computer.

The basic hardware structure of the data controller is organized around a 16 bit bi-directional single rail data bus 206 which interconnects all sub-assemblies handling data as shown in FIG. 3. This allows easy expansion of the data controller to incorporate other functions at later times or for up-dating of the given sub-assembly without having to modify the overall data controller structure. The conventional computer interface 210, paper tape punch control 212, A register 200, C register 202, data transmitter 212, data receiver 214, and the read-only memory (ROM) 216 all operate onto data bus 206. All functions within the data controller with the exception of program phase termination are by synchronous logic.

To briefly summarize the functions of the data controller elements illustrated in FIG. 3, a master station address and instruction is first derived from ROM memory 216 or from computer 220 and then loaded into A register 200. Similarly control information is loaded into C register 202. When the loading has been completed, mode control circuitry 222 causes the controller to shift into the execute phase which is carried out by execute control circuits 224 which control timing circuits 226. Transmitted circuits 212 then address the station on data lines 228. When communication with the addressed station has ended the execute control circuits cause the mode control 222 to shift the data controller into the transfer phase or the load phase depending upon the status of the C register 202 and other execute circuits. If computer 220 is malfunctioning, the mode control 222 causes the punch control 212 to store the information on a punched tape.

Figure 4:
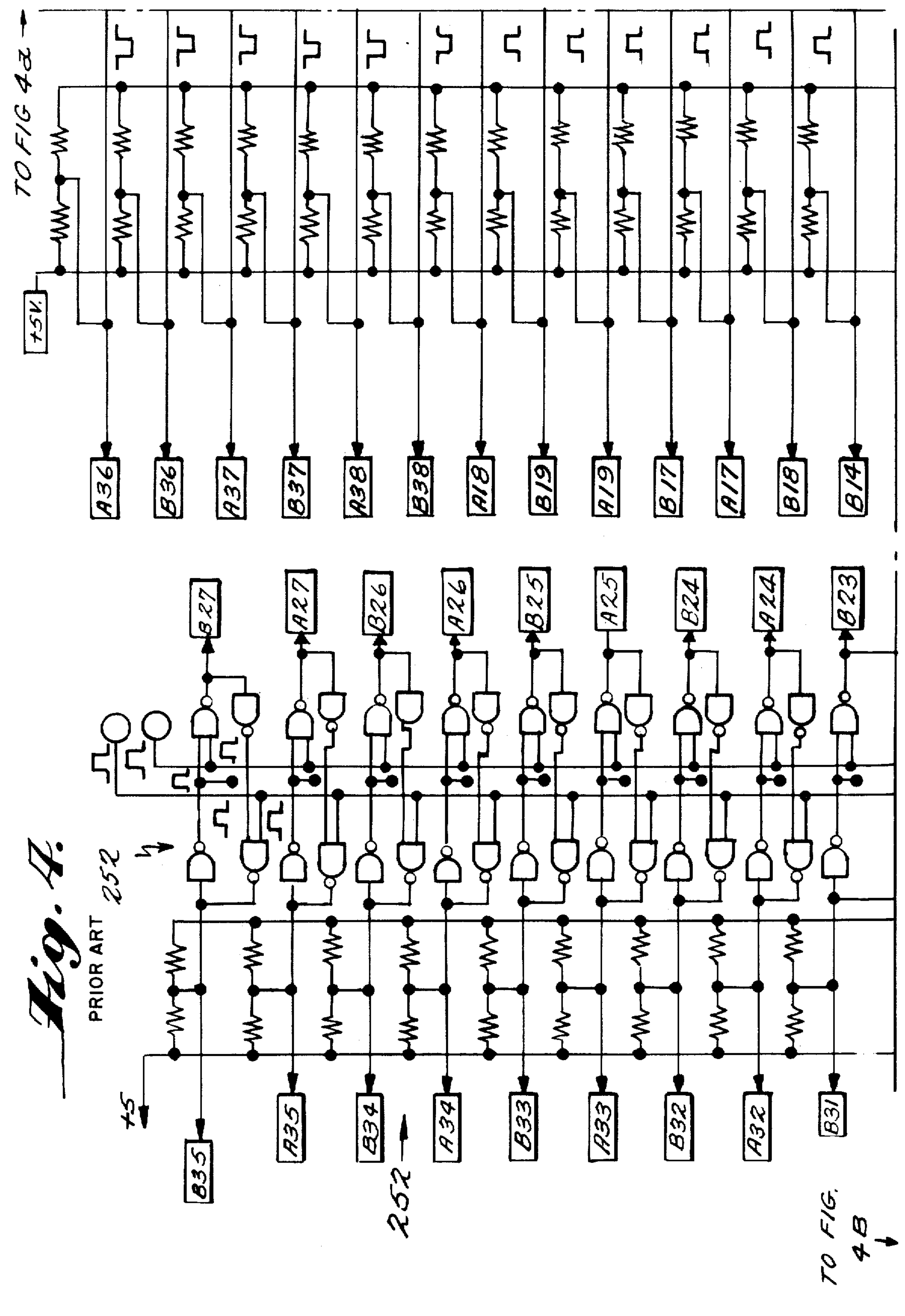
Fig. 4. PRIOR ART
FIG. 4, comprising
Figure 4A:
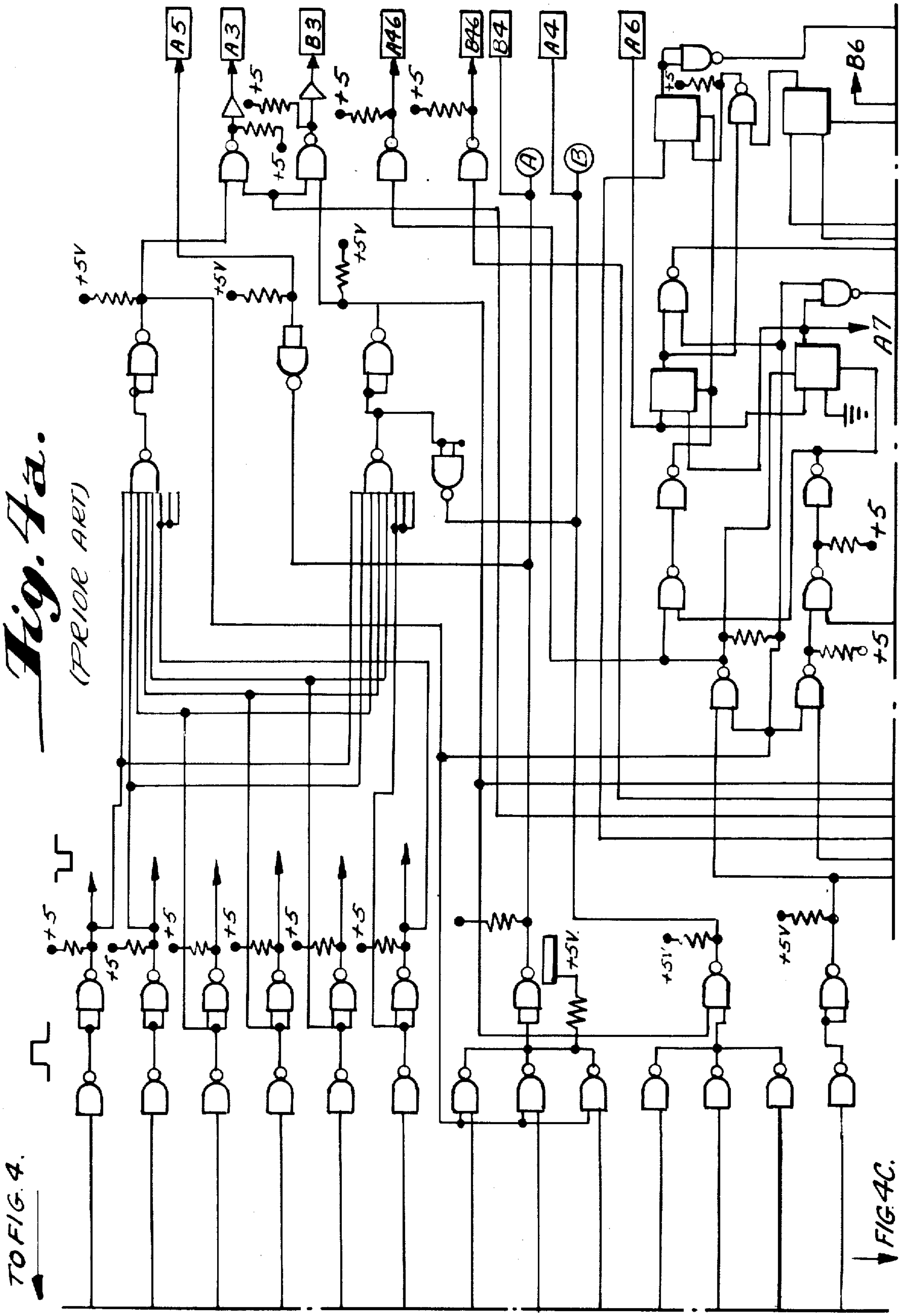
FIGS. 4*a*, 4*b* and 4*c* shows a detailed schematic of the Data General "Nova" interface between the computer and the data controller.
Figure 4B:
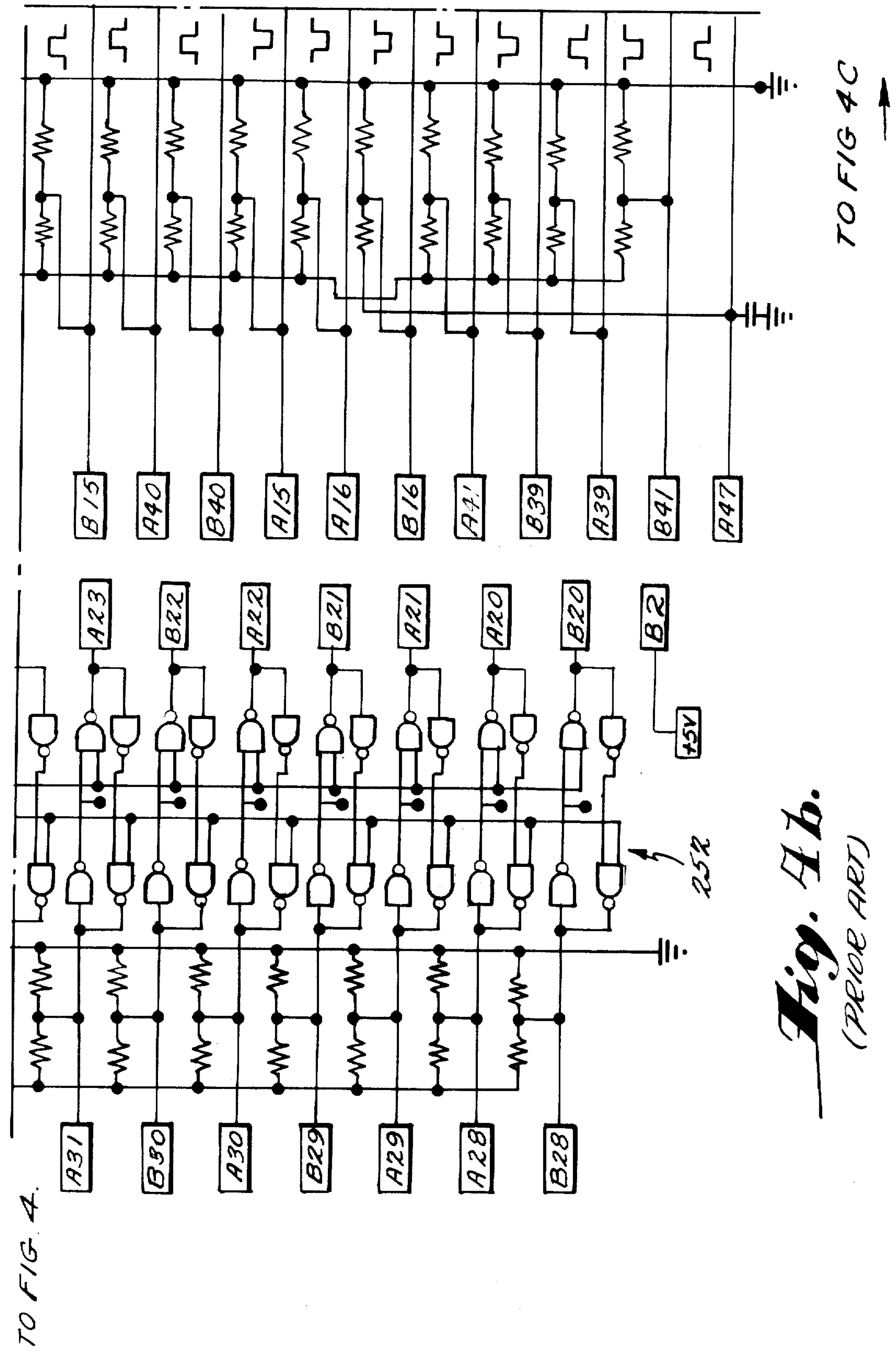
Fig. 4b. (PRIOR ART)
Figure 4C:
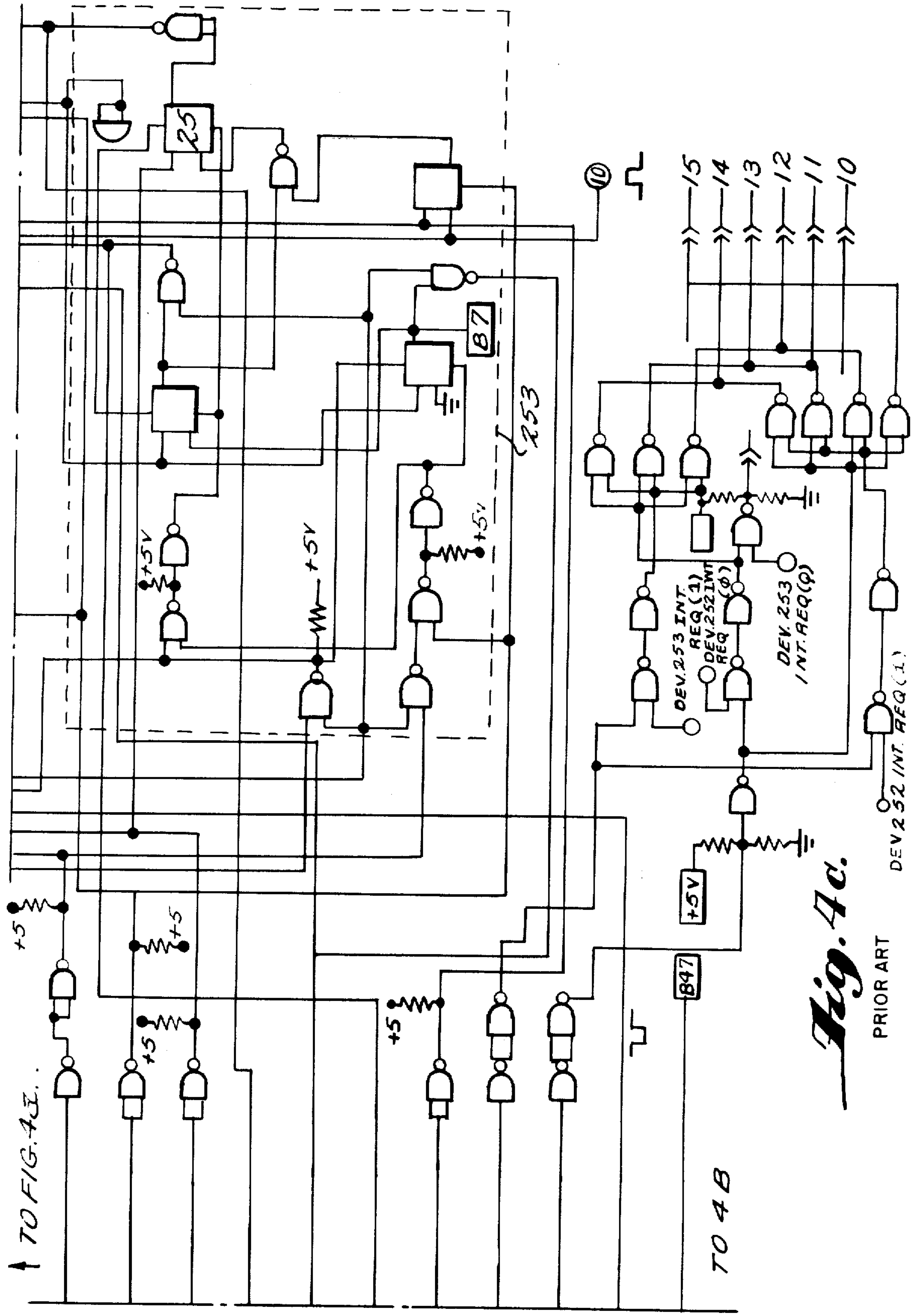
Fig. 4c. PRIOR ART
Figure 5A:
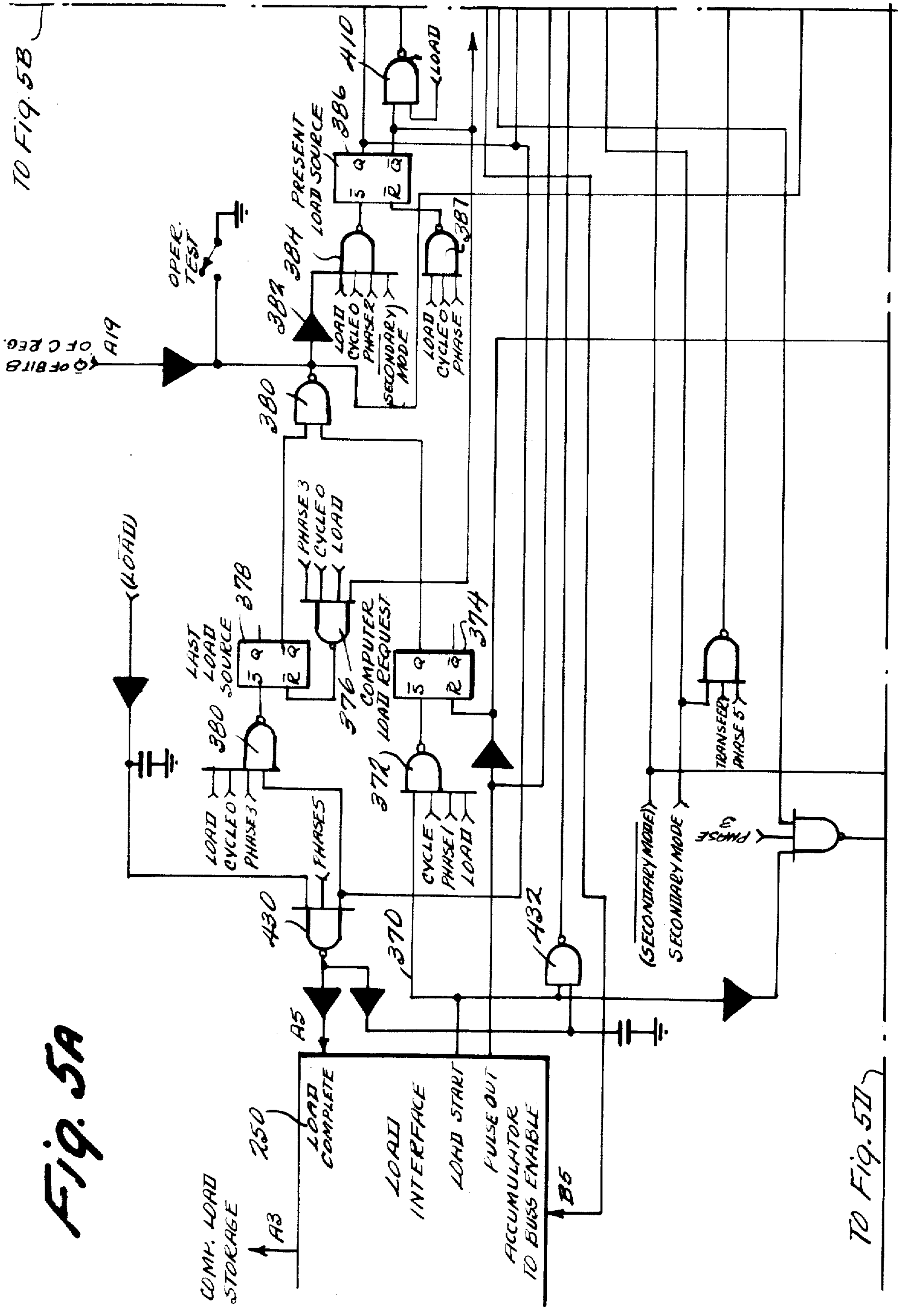
FIGS. 5*a*, 5*b*, 5*c*, 5*d* and 5*e* shows a detailed timing diagram of the mode control, load and transfer timing circuits of the data controller.
Figure 5B:
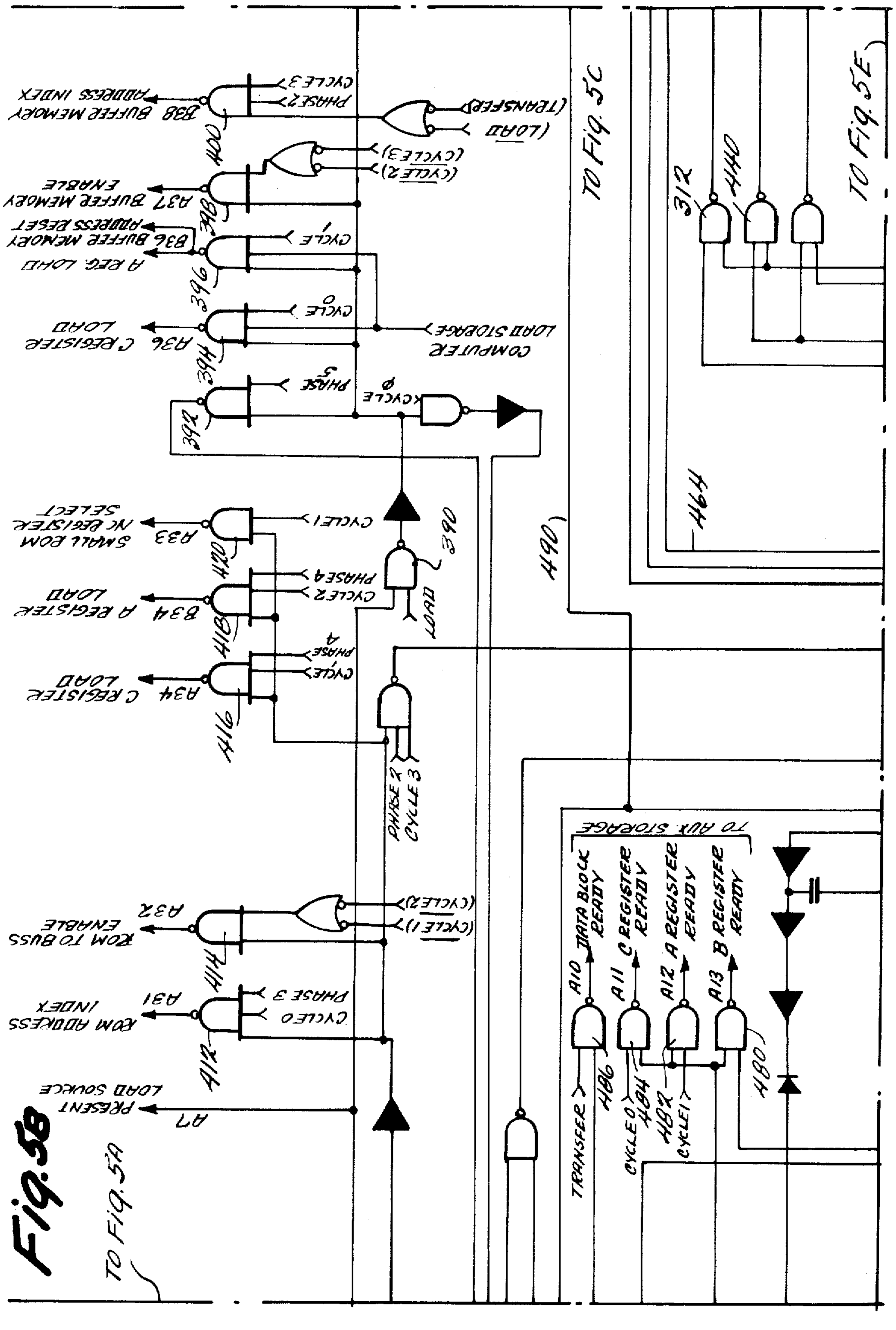
Figure 5C:
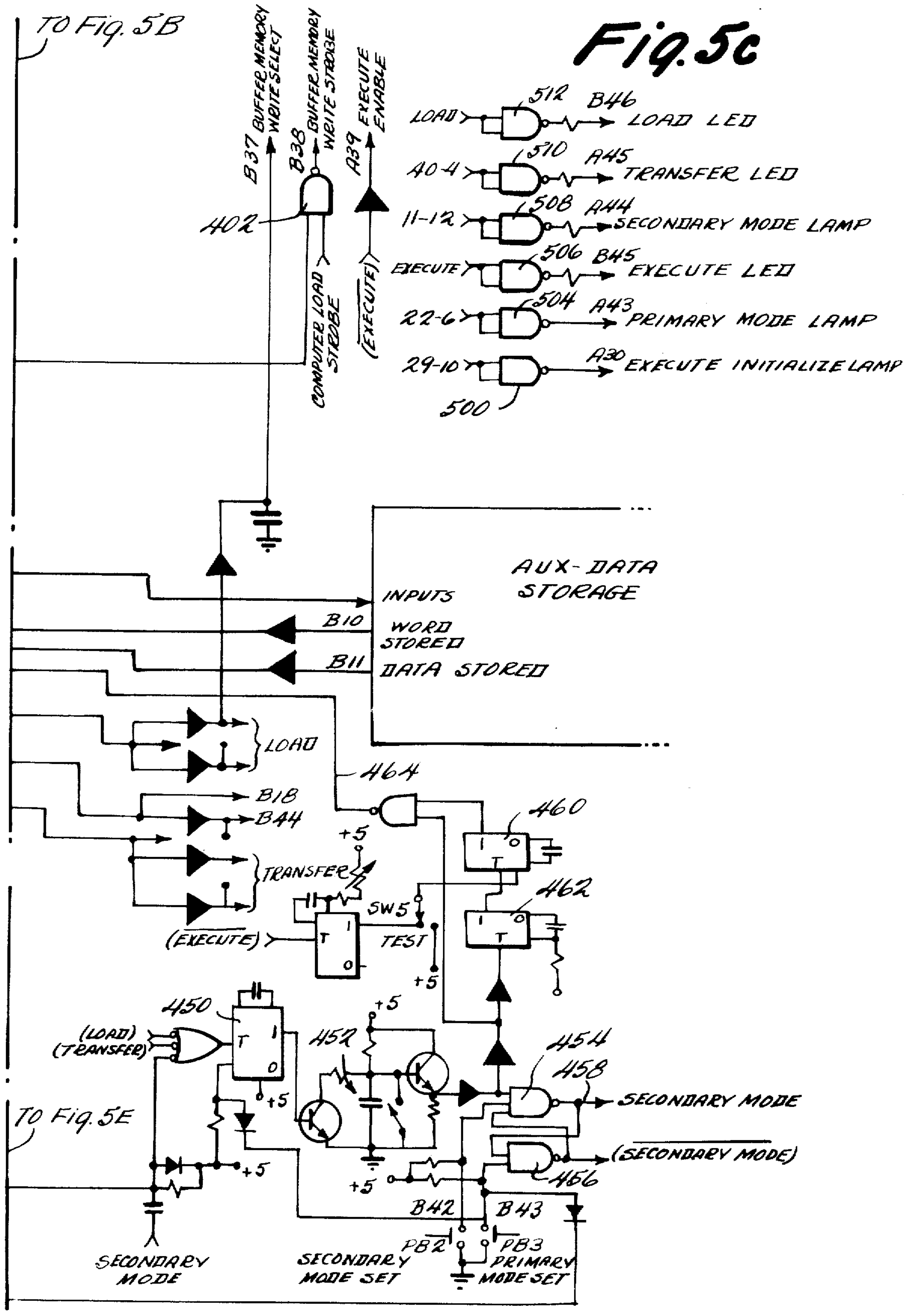
Figure 5D:
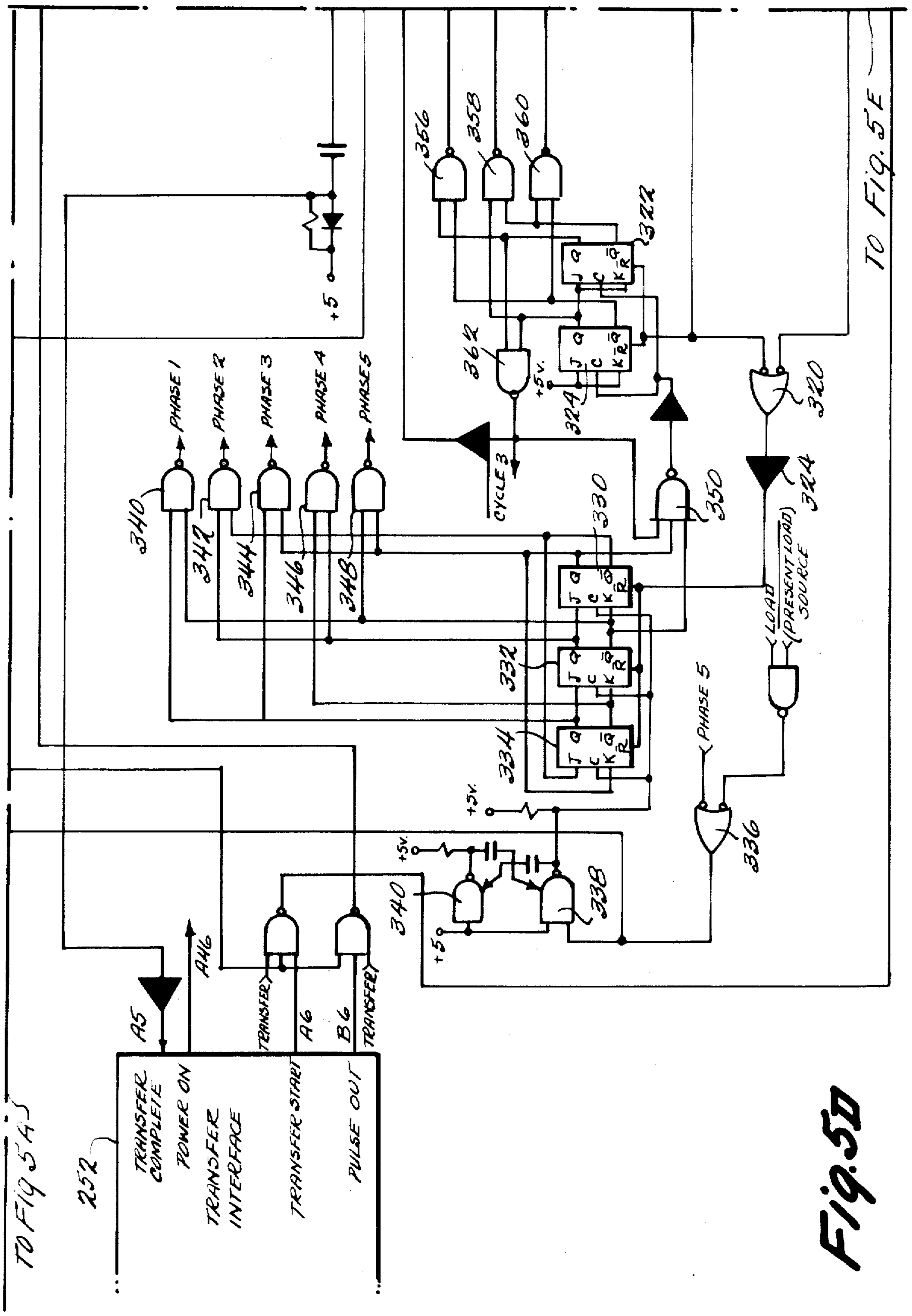
Figure 5E:
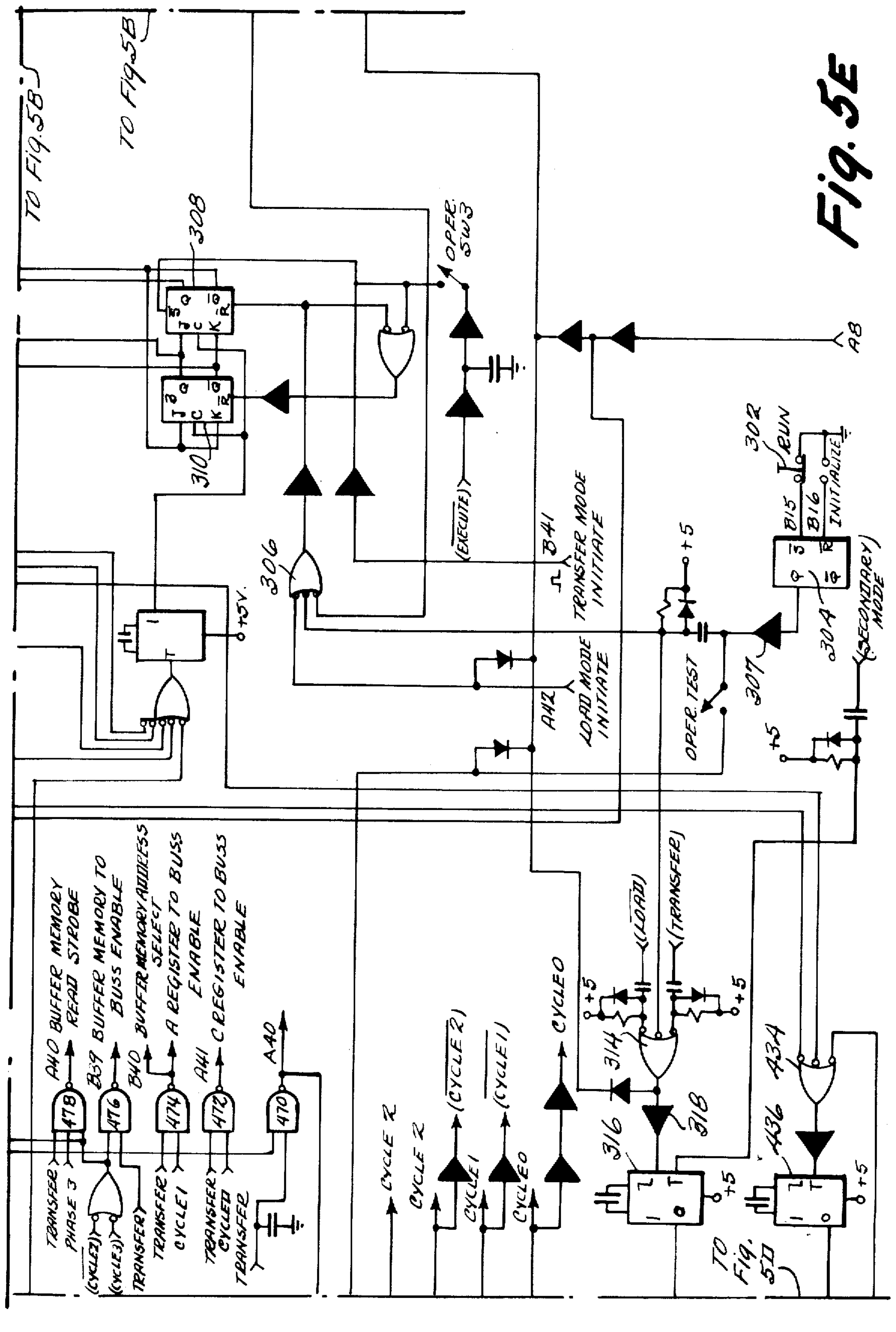

Reference is now made to FIG. 4 which shows a detailed schematic view of the Data General Nova computer interface circuit. This is a standard design by the Nova computer manual but serves to illustrate what would be necessary to interface the data controller to any computer. The interface consists of 16 data transfer lines with appropriate gating 252 to disable these lines from the data controller's internal data bus and two separate computer device interfaces. The first interface 250 interfaces into the data controller for allowing the computer to load the data controller as discussed in more detail below. Interface 253 allows the computer to transfer data from the data controller to the computer.

Interface 250 supplies a load complete signal, a pulse output signal which terminates the load phase, and a computer load signal to the data controller. Lines received from the data controller into interface 250 consist of the data controller load complete line and an accumulator to bus enable line. For interface 253, the transfer interface, the data controller supplies a data transfer complete signal to the computer interface and receives a transfer start and a pulse output or transfer termination signal from the interface. These few signals are all that is necessary to interface the data controller to any 16 bit or larger word length computer. The interface signal requirements are summarized in Tables 4 and 5.

FIG. 5 depicts the data controller mode control, and the load and transfer timing circuits. The function of this circuitry is to sequence individual registers onto the data bus for the load or transfer phase, to actually control the data transfers for read-only memory load, and to allow the computer to control the individual registers for the load or transfer phases with the computer. The timing generator for the load and transfer phases consists of decoded shift counters which generate timing intervals called cycles and sub-multiples of this interval called phases. Operation of the counters is initiated by resetting the shift counter to the all zero state. Cycle zero is devoted to the C register transfer; cycle 1, is devoted to the A register transfer; cycle 2, is devoted to the B $\phi$ word transfer; and cycle 3, is repeated for B2 and succeeding B words. The load or transfer phase is initiated through a gate which causes cycle zero to occur.

The load interface logic allows the computer interface to sequence the data controller after each word is loaded into the data controller when the data controller recognizes the computer as the load source. The computer load request register 374 is set by the computer load interface to request the computer be recognized as the next load source. Adjacent to this register are the last load source register 378 and the present load source register 386 and their associated gating. This portion of the circuitry determines the next load source — the computer or the read-only memory — and controls the above registers. Once this circuit makes the determination as to load source, register 386 holds its information until the next load phase entry and load source determination is made. In normal operation the data controller checks for a computer load request and at the same time determines that the computer did not initiate the last load request. If these conditions are met the request is honored and the present load source register 386 is set to computer load. If the computer was the last load source 386 then the data controller will load from its read-only memory for the current load phase. However, if bit 8 of the C register has been set to a 1 the data controller will only load from the computer. This serves to lock out all interrupt data until the computer reenables interrupt data service.

The mode control mode control circuitry also includes gating which brings specific registers on-line for the load or transfer phases. A counter (JK flip-flops 308 and 310) is used to determine the present data controller phase, i.e., load, execute, or transfer. Incrementing this counter sends the data controller to the next program phase. A change of state of this counter to any phase automatically initializes that phase. Thus, if the data controller is in execute and this counter is incremented the transfer phase will immediately be initialized. In addition, timing circuits are included to determine if the data controller remains in a single phase for too long a length of time. If this occurs, it causes the data controller to increment to the next phase, or if the data controller has to wait for a certain number of seconds before the computer accepts a data transfer, the timer times out causing the data controller to go into secondary mode by setting the secondary mode register. This causes the mode control circuit to reject the computer as a load or transfer source so that the data controller executes interrupt data checks and then transfers this data automatically to paper tape or other backup storage media.

Table 4 — COMPUTER — DATA CONTROLLER LOAD INTERFACE SIGNALS (Nova Device 250)

Data controller inputs to interface:

1. Load Complete: (complete is a high level) A signal generated by the data controller when it is ready to accept a register word from the computer.
   Note: a device complete signal generates an interrupt request to the computer to initiate the computer load.
2. Accumulator to Bus Enable: (enable is a low level) A level generated by the data controller when the computer is allowed to drive the data controller bus.

Interface outputs to the data controller:

1. Load Start: (high level to start) Note: Computer request to load data controller is initiated by a start.
2. End Load: (pulse is a high level) A pulse generated by the interface to terminate the load phase.
3. Computer Load Strobe: (high level to load) A pulse from the computer which loads the A or C register or the Buffer Memory. This pulse is generated after the data has been placed on the data controller bus and signal levels on the bus have settled.

TABLE 5 — COMPUTER — DATA CONTROLLER TRANSFER INTERFACE SIGNALS (Nova Device 253)

Data controller inputs to interface:

1. Data controller transfer complete (high level pulse) the transfer complete signal requests an interrupt service from the computer and initiates the transfer sequence with the computer.

Interface outputs to the data controller:

1. Data controller transfer start (high level to start): A level generated by the interface after a word has been accepted by the interface.
2. End Transfer (high level pulse:) A pulse generated by the interface to terminate the transfer phase.

Figure 15:
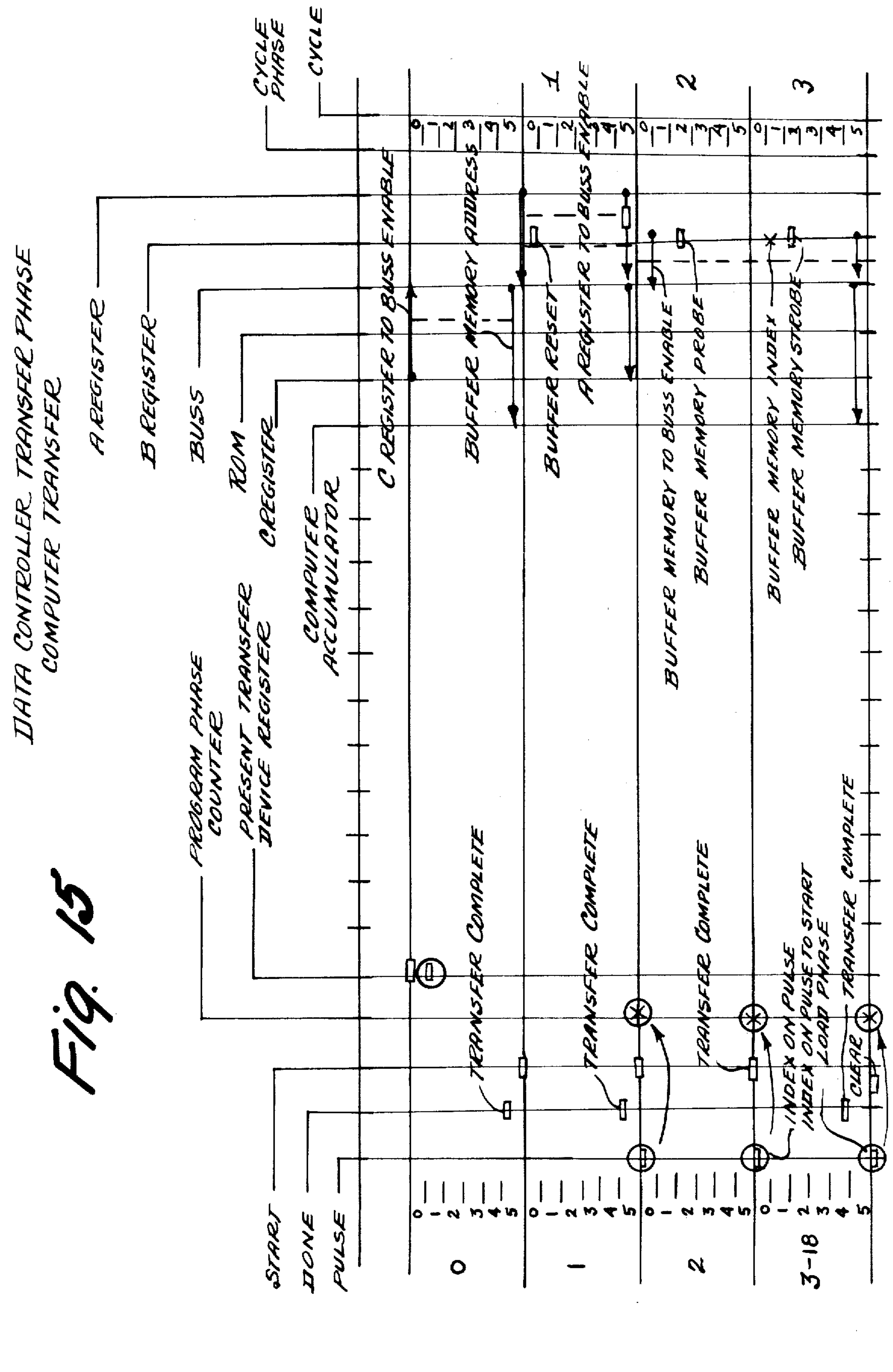
FIG. 15, comprising
Figure 15A:
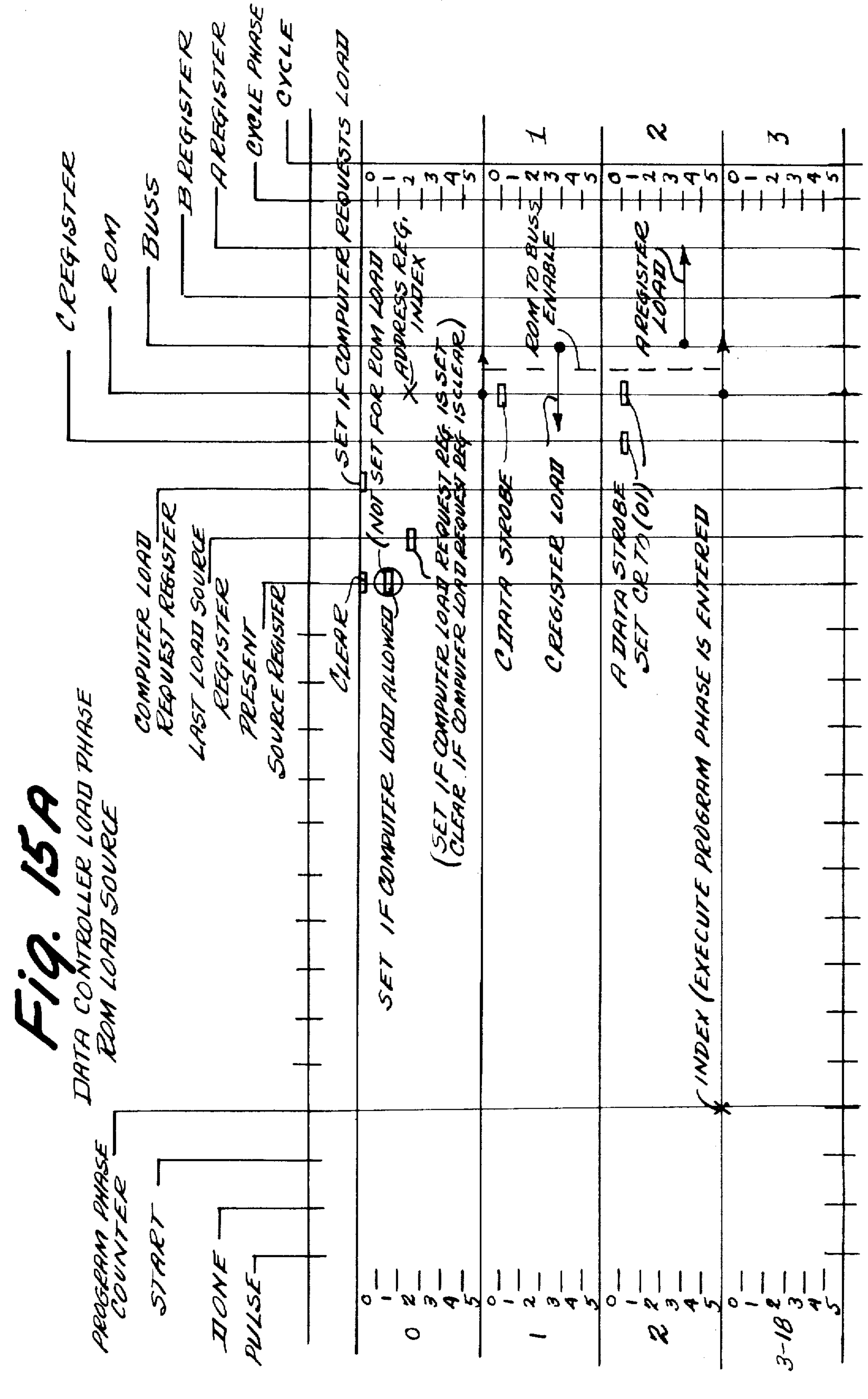
FIGS. 15*a*, 15*b* and 15*c*, shows a timing diagram of the data controller load and transfer phase.
Figure 15B:
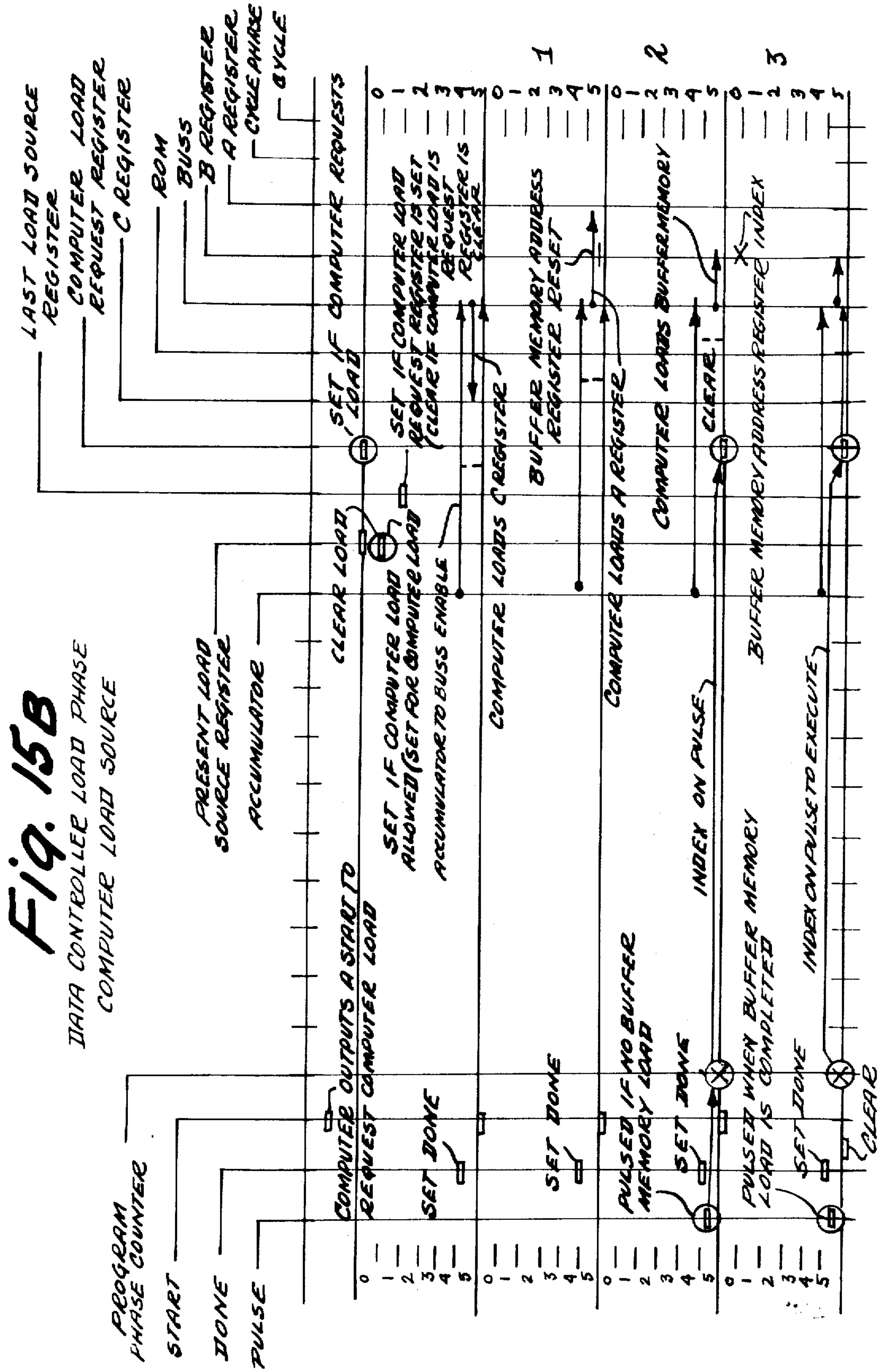
Figure 15C:
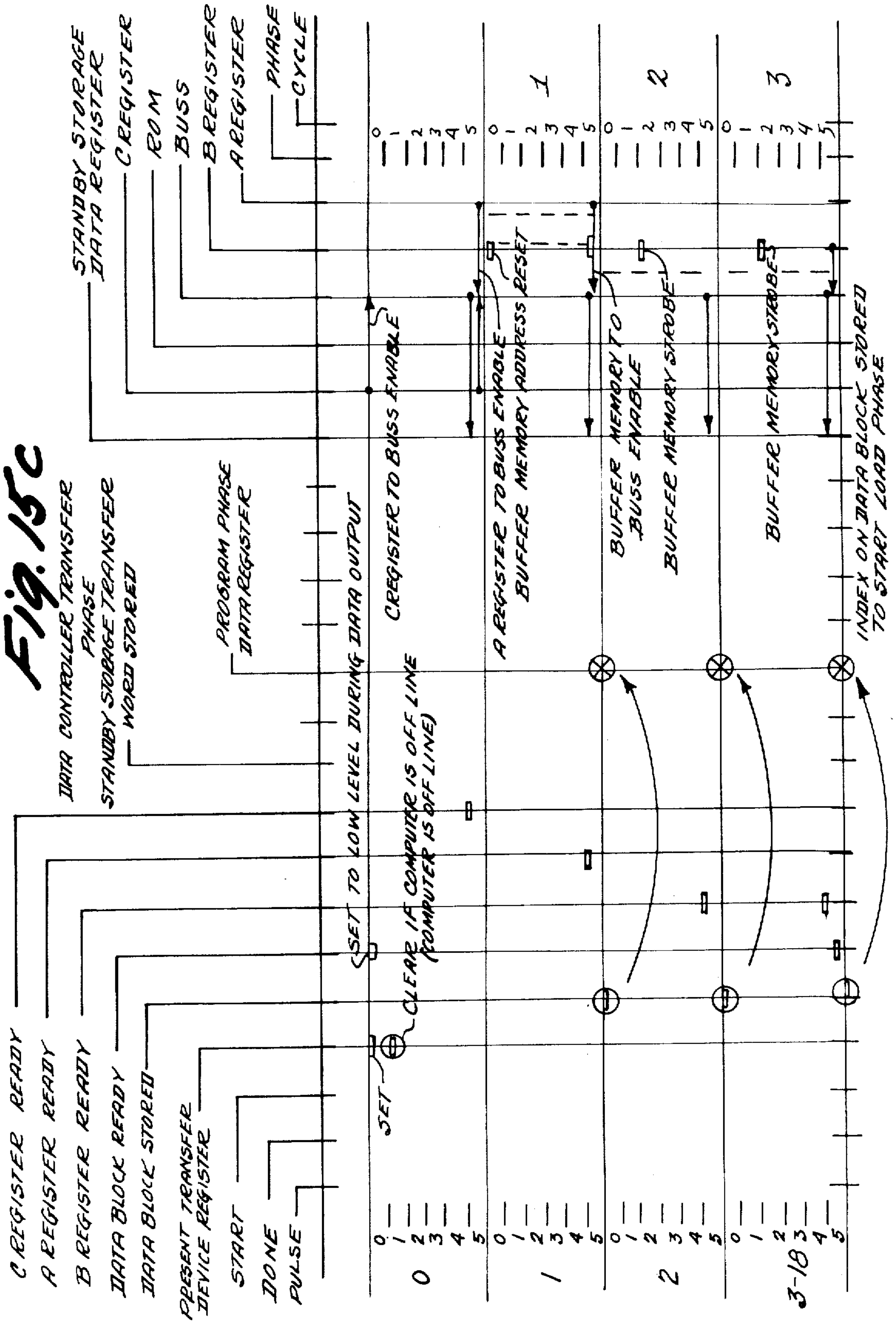

Reference is now made to FIG. 5 which illustrates the mode control load and transfer timing circuitry for the data controller FIG. 15*a* diagrammatically illustrates the timing for data controller load phase from ROM and 15*b* illustrates the same for the load phase from computer. FIG. 15*c* shows transfer phase from auxiliary storage. To reiterate briefly, the data controller loads information from either its read-only memory or from the computer into the C and A register during a load mode, then shifts into an execute mode in which information is transferred and/or or received from the addressed master or other station and finally, as needed, as needed into a transfer mode in which information received by the data controller is transferred into the computer, or if the computer is non-functioning into an auxiliary storage device such as a tape punch, magnetic tape or the like. The load mode is normally initiated by the completion of the execute or transfer mode.

The mode counter comprising flip-flops 308 and 310 may be incremented or directly set as will be described below in order to cause the data controller to shift to the load, execute and transfers modes at the appropriate times. The zero output of the counter comprising flip-flops 308 and 310 is decoded by NAND gate 312 to produce signals as shown indicating that the data controller is in the load mode.

Manual initialization of the mode circuitry is accomplished by the change of condition of flip-flop 304 and also causes NAND gate 314, which is connected to inverter 307 as shown, to shift its logical output and cause monostable flip-flop 316 to which gate 314 is connected by inverter 318 to produce a pulse which is applied as one input to NAND gate 320 and is also used to reset flip-flops 322 and 324 which comprise the counter which is used to produce the signal indicating the cycle in which the data controller is operating.

The pulse produced by monostable monostable flip-flop 316 and applied to gate 320 causes that gate to produce a logical one which is inverted by inverter 324, and applied to the reset input of flip-flops 330, 332 and 334, which generate the phase of the cycle in which the data controller is operating. Resetting flip-flops 330, 332 and 334 disables NAND gate 336 which is connected as one input to gate 338. Gate 338 together with gate 340 and the associated capacitors forms a gated free running oscillator which produces a sequence of pulses which are applied to the clock inputs of flip-flops 330, 332 and 334. These pulses increment the counter comprised of flip-flops 330, 332, and 334 with the output counts being decoded by AND gates 340, 342, 344, 346 and 348, as shown, in order to produce signals, each generating a unique phase. Upon phase 5, gate 336 disables gate 338 and halts the counter comprised of flip-flops 330, 332 and 334 in phase 5.

The termination of phase 5 enables NAND gate 350, which on the termination of increments the counter comprising flip-flops 322 and 324. The outputs of these flip-flops are decoded by NAND gates 356, 358 and 360. Upon a count associated with cycle 3, NAND gate 362 produces an output which disables gate 350 so that the counter comprised of flip-flops 322 and 324 is likewise halted in cycle 3. As mentioned briefly above, cycle 3 and the succeeding cycles are identical so there is no need to count greater than cycle 3.

As discussed briefly above, the data controller can derive the address of a station which is to be interrogated either from its read-only memory (ROM) which is discussed in detail below, or such an address can be derived directly from the computer. If the computer has an address of a station which the data controller is to interrogate, a signal is produced on line 370 which causes gate 372 to be enabled during phase 1, cycle zero of the load mode to cause flip-flop 374 to be set and denote that the computer is requesting that an address be loaded from itself rather than from the read-only memory. During the last interrogation, particularly during cycle zero of the load mode phase 3, gate 376 was enabled if the read-only memory was the source of the address, and this caused the last load source flip-flop 378 to be reset. Similarly, if the computer was the source, gate 380 set flip-flop 378. Flip-flop 374 and 378 are connected to NAND gate 380, the output of which is in turn connected via inverter 382 as one input to NAND gate 384 which is enabled during phase 2, cycle zero of the load mode provided that the data controller is not operating in the secondary mode as will be described below. Flip-flop 386 is reset by gate 387 during phase one of cycle zero of the load mode. If during phase 2 the computer load request flip-flop 374 is set indicating the computer has an address, and further the last load flip-flop 378 is reset indicating that the last load source was the read-only memory, gate 380 is enabled to permite flip-flop 386 to be set indicating that the computer is the source.

However, as discussed briefly above, it is assumed that the computer will not normally supply an address twice in succession and accordingly if the computer attempts this, the request of the computer is ignored and flip-flop 380 does not shift its output condition so that flip-flop 386 remains reset and the address is derived from the read-only memory. However, the circuitry permits the computer to take complete charge of the interrogation by placing an appropriate flag in bit 8 of the C register. This operates to apply a signal to the input to inverter 382 which overrides the output of flip-flop 380 and sets flip-flop 386 even if the last address source was the computer.

If flip-flop 386 is set indicating that the computer is the source, gate 390 is enabled to apply an appropriate signal to NAND gates 392, 394, 396, 398, and 402 which produce the signals indicated, activating the C and A registers for receiving the information from the computer and also readying other components of the data controller as indicated. Gate 400 indexes the buffer memory address during both load and transfer. Conversely, if the flip-flop 386 is reset, gate 410 produces a signal which enables gates 412, 414, 416, 418 and 420 which produces the same signals for deriving the address from the read-only memory and loading it into the appropriate registers during the cycles discussed above.

The signal generated by gate 430 is also applied to gate 432 which is connected as an input to gate 434 so that gate 434 produces an output signal which causes monostable flip-flop 436 to produce a pulse to initiate the next cycle. The pulse produced by monostable flip-flop 436 is applied to NAND gate 320 which resets flip-flops 330, 332 and 334 of the phaser counter, and likewise ends the disabling of gate 338 by gate 336. Accordingly, the gated free running oscillator comprised of gates 338 and 340 once again increments the counter comprised of flip-flops 330, 332 and 334 which counts through its five phases. The mode counter comprised of flip-flops 308 and 310 is incremented by the computer at the completion of the load mode to cause gate 440 to produce an output signal indicating that the data controller is now in the execute mode. On phase 5 of the load mode, gate 430 is enabled, if the computer is the load source, to indicate that the data controller is ready to accept computer output.

At the end of the execute mode, the mode counter comprising flip-flops 308 and 310 may be directly set to the transfer phase in which information in the data controller is actually transferred into the computer. As mentioned briefly above, in the event that the computer fails to accept the transfer, it is assumed that the computer is malfunctioning, and the system thereafter shifts into a secondary mode of operation in which the information from the stations is stored on auxiliary devices such as key punches, and the like. The shifting of the data controller into the load or transfer mode causes flip-flop 450 to produce a pulse which is applied to a conventional timer circuitry generally indicated as 452. This timer changes its output condition if the system remains in the load or transfer mode for longer than a predetermined time, for example, 20 seconds. If the timer times out, a signal is applied to gate 454 which together with gate 456 forms a flip-flop determining in which mode — primary or secondary — the system will operate. If a signal is applied to gate 454, the flip-flop which it comprises with gate 456 shifts its output condition and produces a secondary output signal on line 458 which is applied to various logic elements in the circuit to transfer the information to an auxiliary device rather than the computer. Further, on entry into secondary mode a signal is produced and applied to monostable flip-flop 460 via flip-flop 462 which, after a delay, produces an output signal on line 464, causing incrementing of the counter comprised of flip-flops 308 and 310 so that the data controller shifts from the transfer phase into the load phase to preclude locking up the data controller due to lack of synchronism between the data controller and auxiliary storage device.

During the transfer mode, gates 470, 472, 476 and 478 are enabled as shown in order to transfer the information in the data controller into the computer at the appropriate time. If the system is operating in the secondary mode, gates 480, 482, 484 and 486 are enabled in order to transfer information into the auxiliary by group of signal lines indicated as 490.

Gates 500, 504, 506, 508, 510 and 512 are also connected to the circuit for operating a front panel display indicating the mode in which the system is operated and other information.

A number of diagnostic test switches are included in this circuit to accomplish the following:

1. Switch 1 causes the data controller to loop in the load mode only by skipping the execute and transfer phases.

2. Switch 2 disables the timer so that the data controller can remain in any mode for an indefinite length of time.

3. Switch 3 sets up an execute modeskip which causes the data controller to go directly from the load phase to the transfer phase.

4. Switch 4 sets the control flag of the C register causing the data controller to recognize only the computer as the load source.

5. Switch 5 enables a timer which causes the data controller to go from execute phase to the next phase load or transfer phase depending on execute phase result after a predetermined length of time.

The remaining circuitry of FIG. 15 is devoted to: initializing the data controller on power-up, interfacing the front panel controls into the data controller, allowing the computer to interact with the data controller in the transfer phase.

Figure 6:
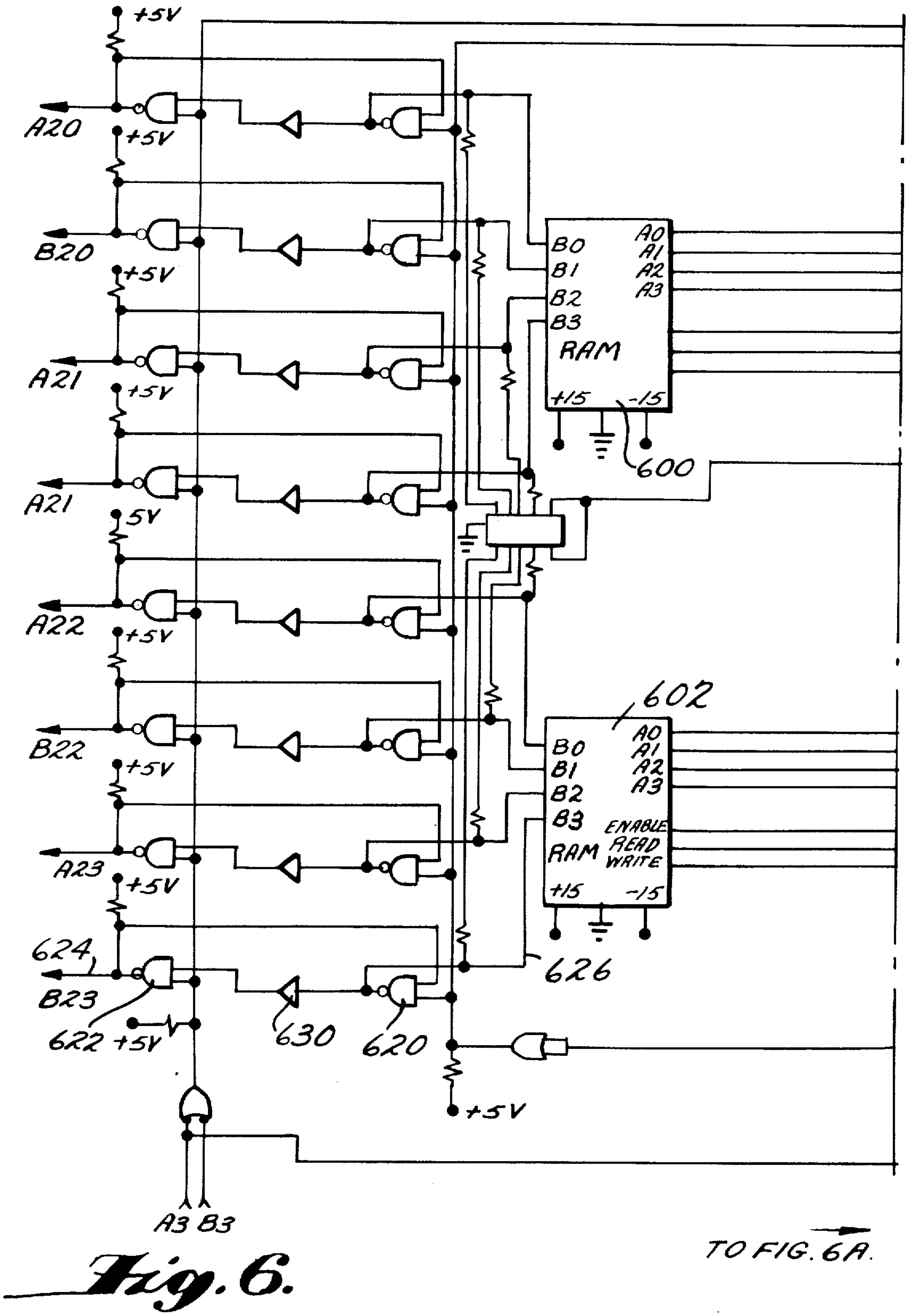
FIG. 6, comprising
Figure 6A:
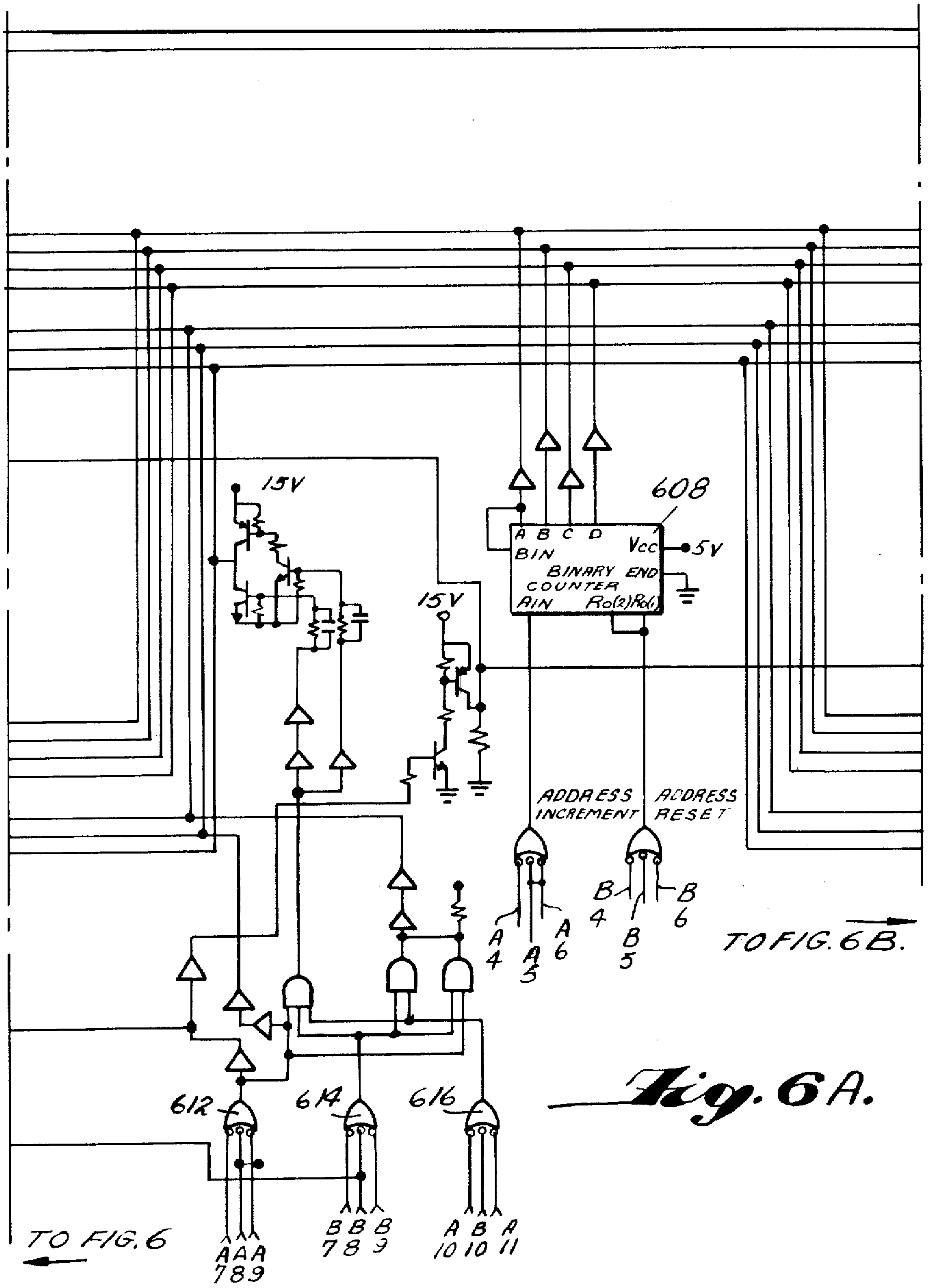
FIGS. 6*a* and 6*b*, shows a detailed schematic of the buffer memory of the data controller.
Figure 6B:
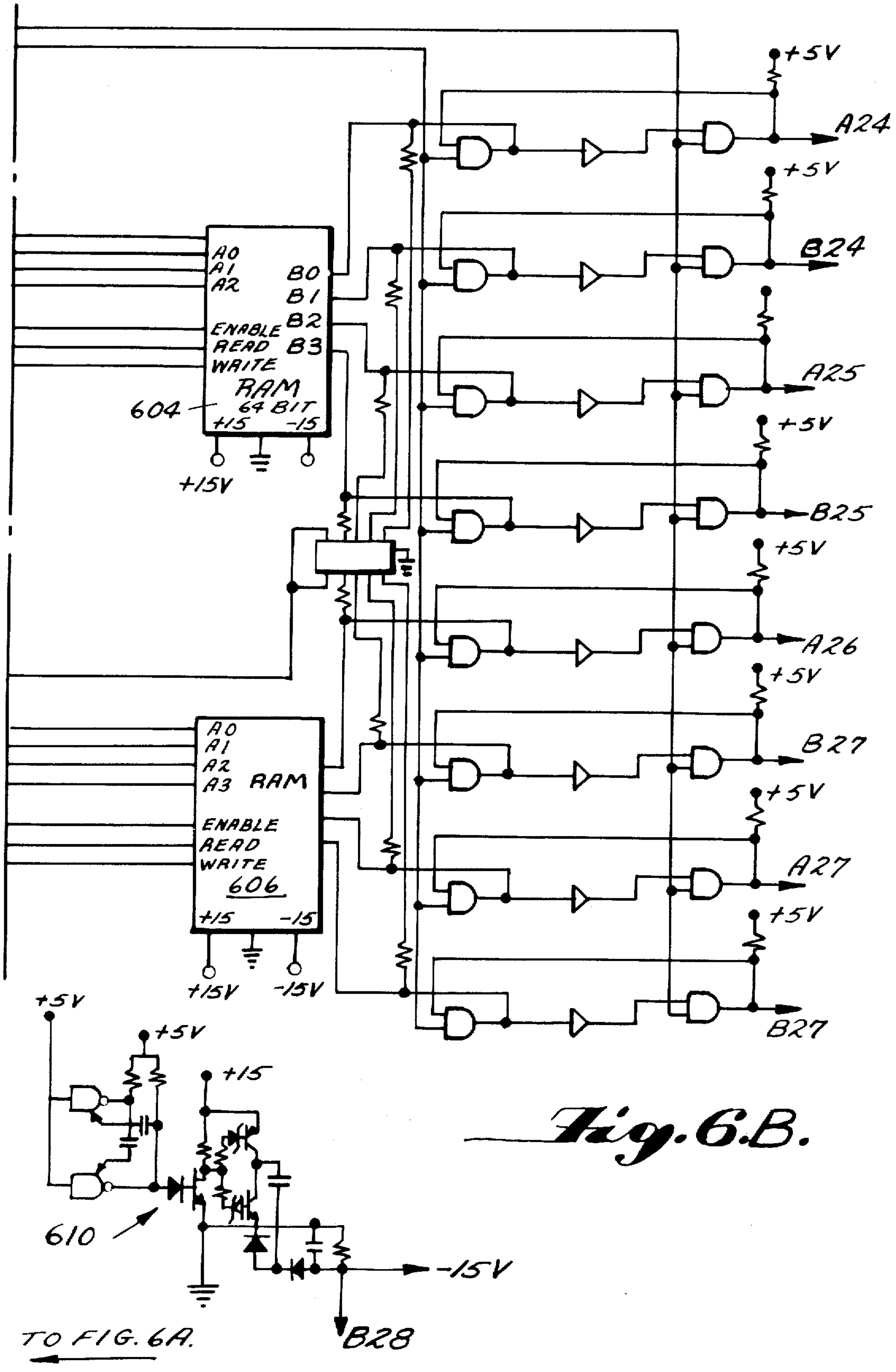

The buffer memory shown in detail in FIG. 6 is designed around four MOS 16 word by 4 bit memory cells 600, 602, 604 and 606 to form a 16 bit by 16 word random access memory. Appropriate circuitry is included to allow the buffer memory to drive the data bus or to allow the contents of the data bus to drive the buffer memory. A four stage resettable binary counter 608 serves to develop the buffer memory address. Additional circuitry is included to develop the read-write select, enable, and strobe functions for the memory. An astable multivibrator 610 drives a switching circuit which serves to develop the MOS negative bias from the positive voltage bus via the switching technique to eliminate the necessity for a negative voltage supply.

Gates 612, 614 and 616 are connected to the timing circuitry for enabling RAMs 600, 602, 604 and 606 for reading from and writing to the data bus. During writing, a logical one is applied as one input to NAND gate 620 as well as the other similar gates while gate 622 and similar gates remain disabled. The information received on bus line 624 is thus applied to line 626 and RAM 602 via gate 620. Similarly during writing, gate 622 is enabled and gate 620 disabled with the RAM then transmitting the information on line 626 to bus line 624 via impedance buffer 630.

Figure 7A:
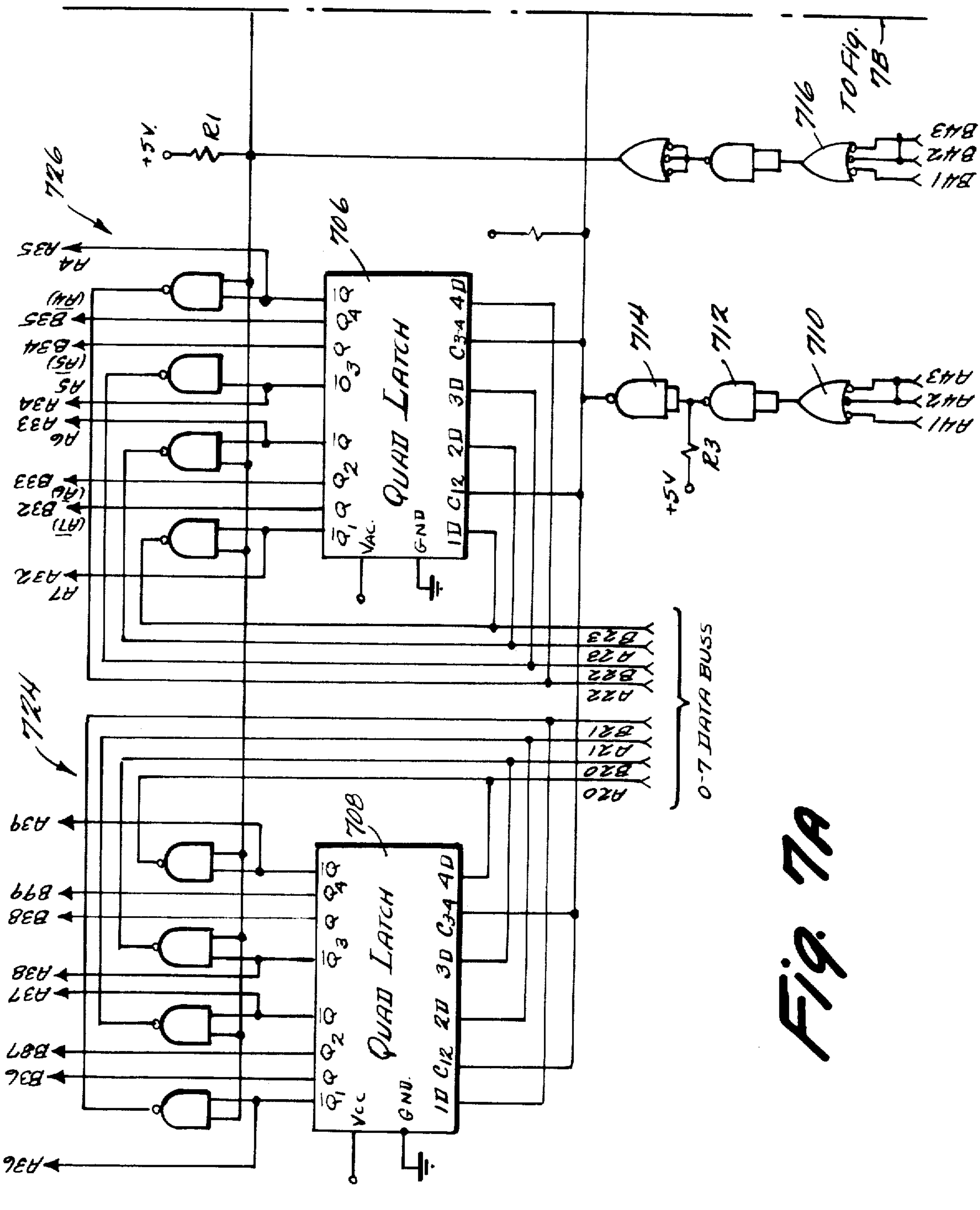
FIGS. 7*a* and 7*b*, shows a detailed schematic of the A register of the data controller.
Figure 7B:
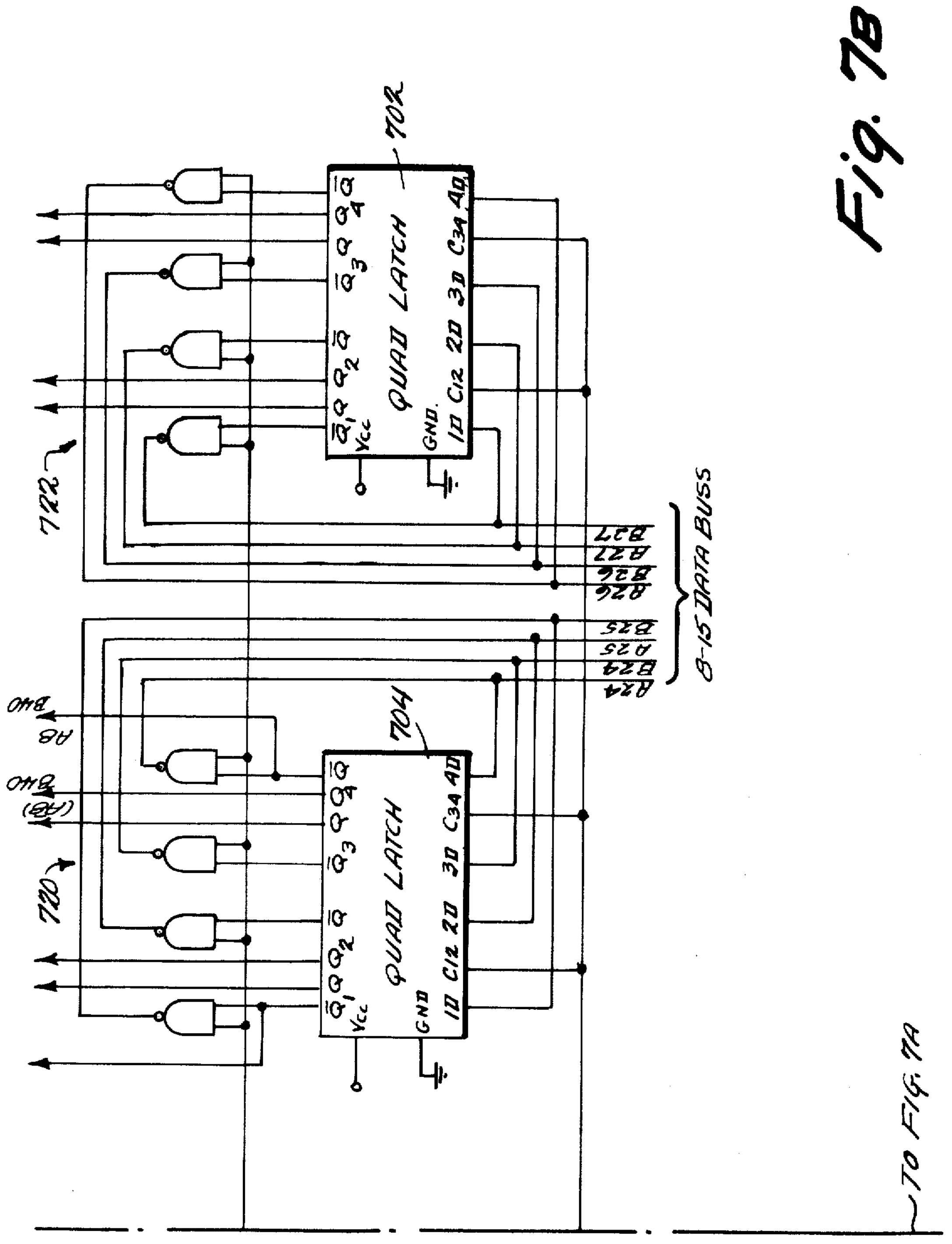
Figure 8A:
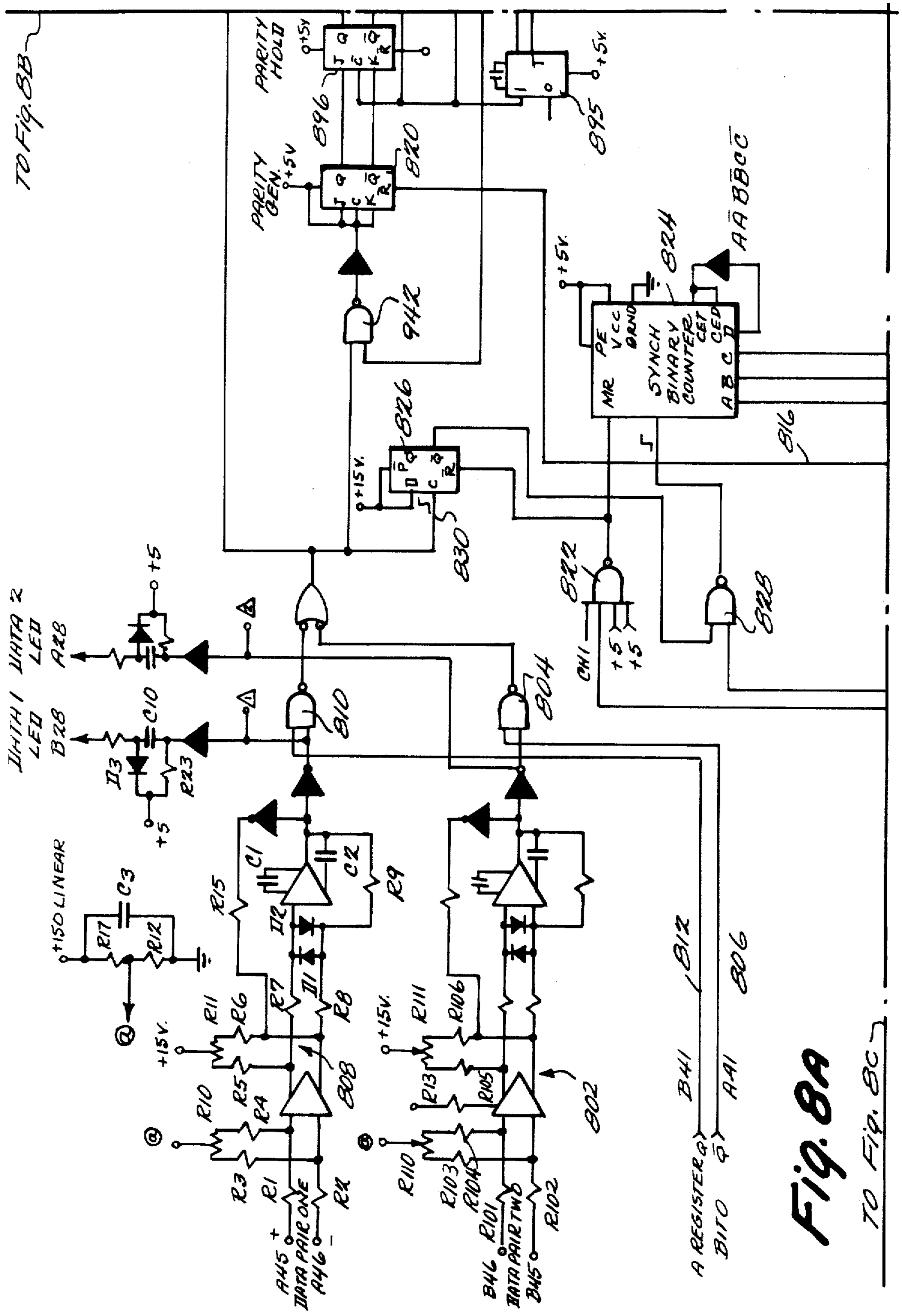
FIGS. 8*a*, 8*b*, 8*c* and 8*d*, shows a detailed schematic of the receiver and demultiplexing circuits of the data controller.
Figure 8B:
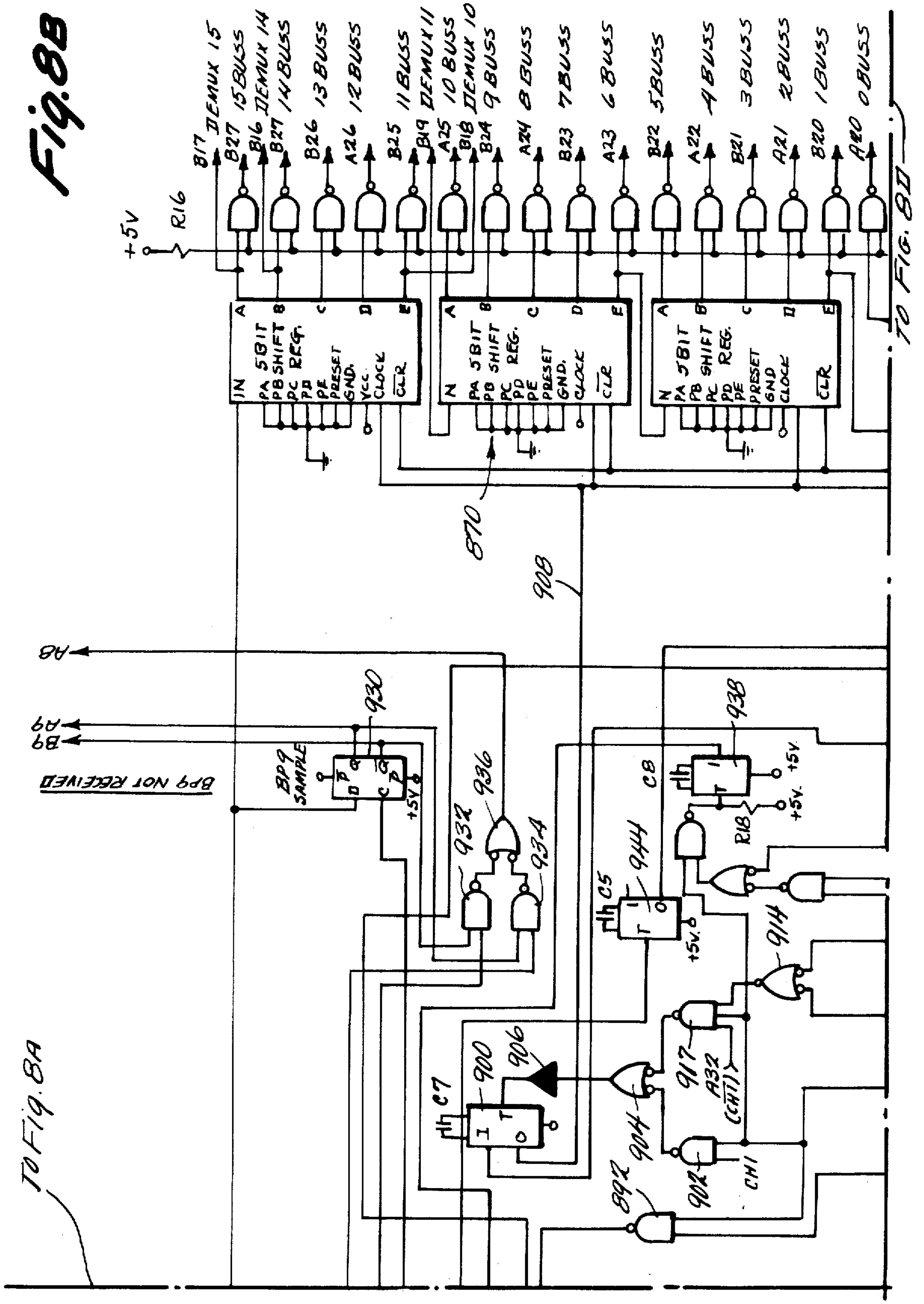
Figure 8C:
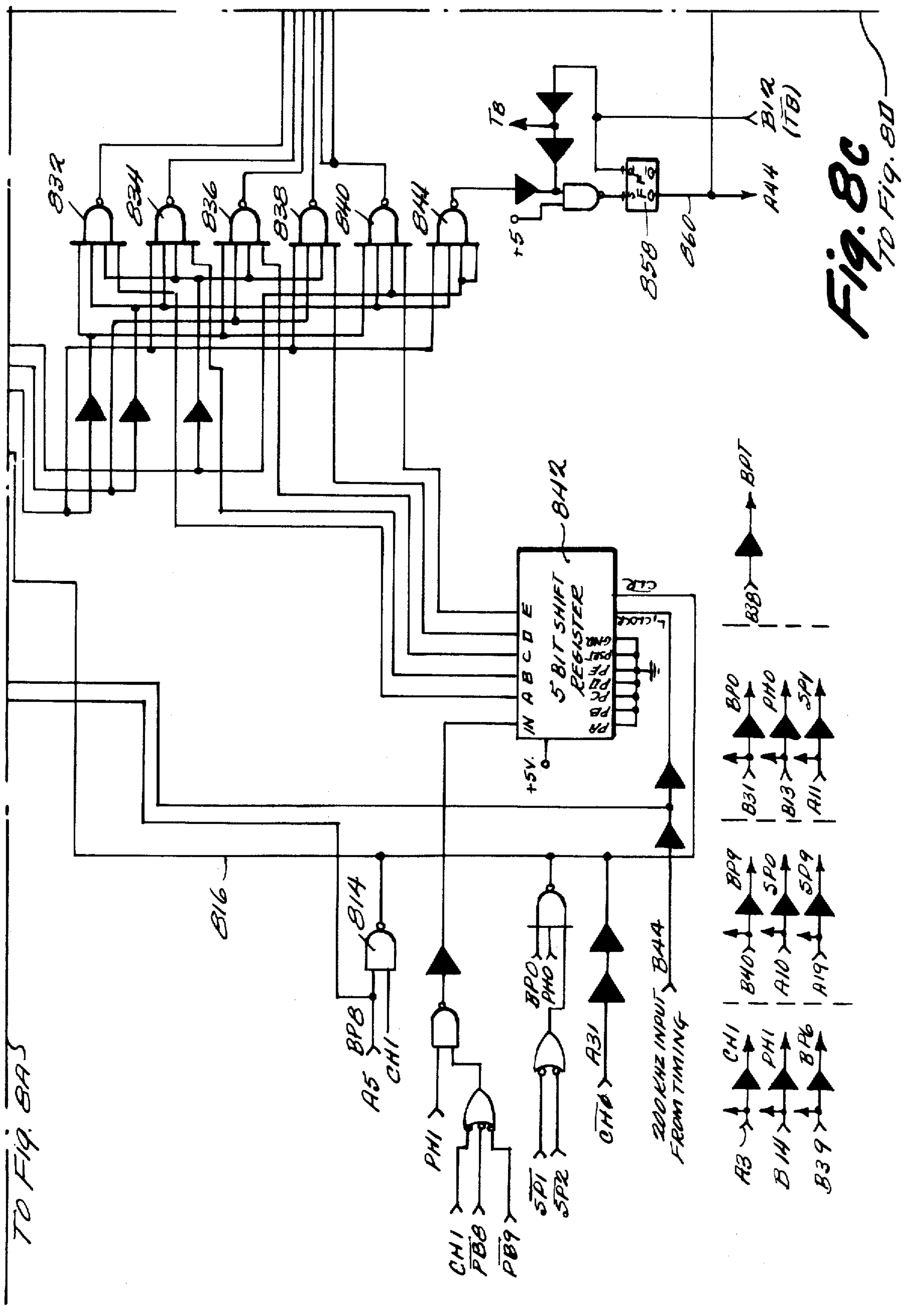
Figure 8D:
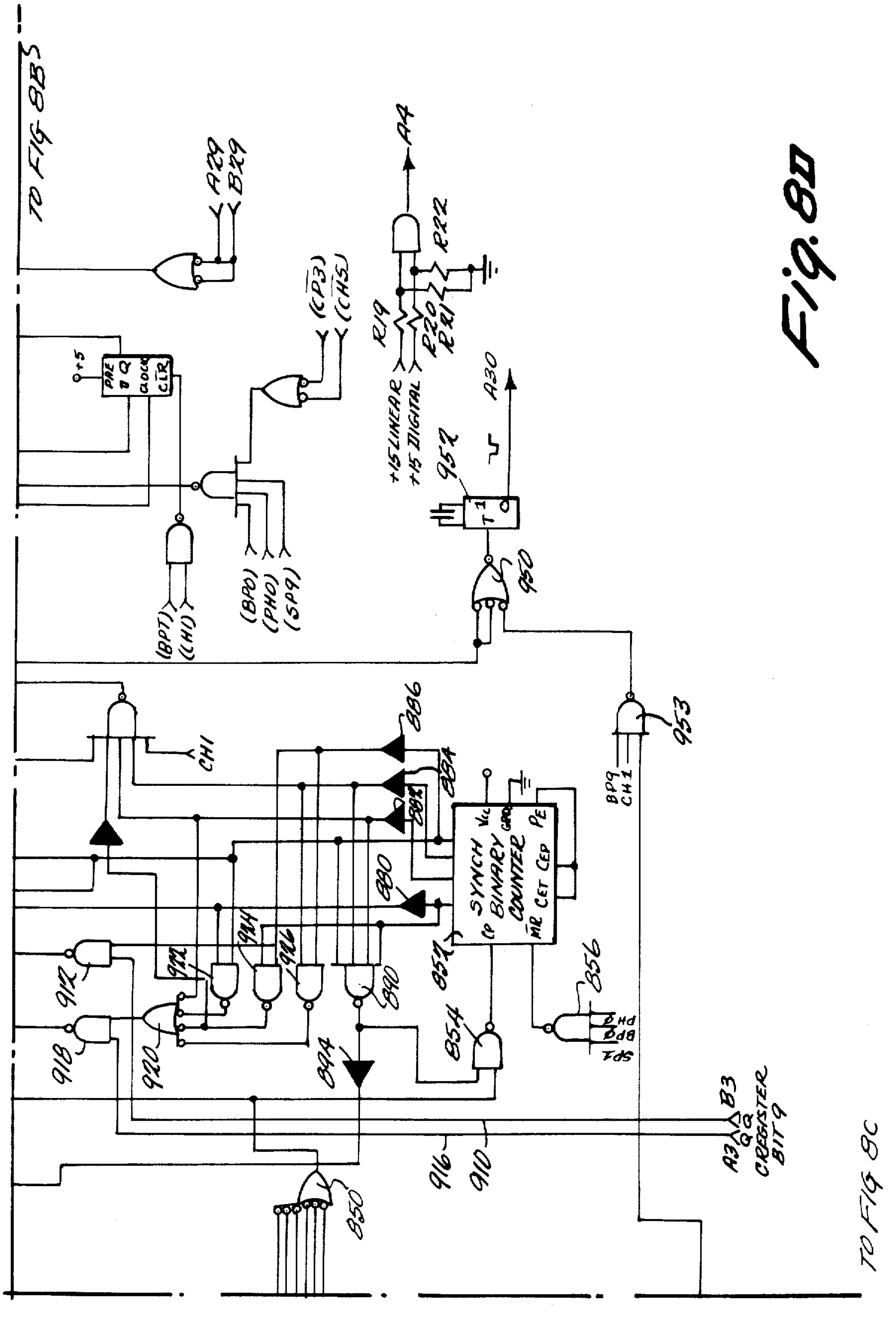

Referring now to FIG. 7 which illustrates the A register, which is comprised of four conventional four bit quad latches 702, 704, 706 and 708 with both the variable and its complement available for each bit. As discussed above, during the load phase information is entered either from the read-only memory or directly from the computer into the A register which includes the address of the station to be interrogated and the instruction that station is to execute. The A register is loaded during cycle 1 of the load phase when gate 482 of FIG. 5, which illustrates the mode control and timing circuitry, is enabled to cause gate 710 to produce a clock signal which is applied to quad latches 702, 704, 706 and 708 via gates 712 and 714 to clock the quad latches to store the address and instructions to be used during the execute phase. During the transfer mode, gate 716 is enabled which in turn causes the four groups of gates 720, 722, 724 and 726 to be enabled to permit latches 702, 704, 706 and 708 to read-out their data onto the 16 data bus lines as shown.

FIG. 8 is comprised of the data receiver circuits which convert the differential data line signals to a logic signal, the received data parity generator circuit which generates odd parity over the first nine bits of each message character and a parity sample register which samples the incoming parity bit from the master station. Also shown are a comparison circuit to compare the received and generated parity for parity checks on received data, a demultiplexing circuit to convert the incoming data serial stream to a 16 bit data word which can be transferred on the internal data bus, and a digital delay line. The delay line delays the data controller receiver sampling time to allow for signal propagation delay of the clock down the data pair to the master station and the propagation delay of the data signal from the master station back to the data controller.

To understand the operation of the receiver it is essential to appreciate the problem caused by communicating at a high data bit rate over long lines in a bidirectional manner. This problem is caused by both the long signal transmission distances which introduce phase shift greater than 180°, and the transmission of all data over the same data pair. In a typical outgoing message character sequence the data controller transmits a nine bit data sequence to a master station and receives a parity bit from the master station. The cable propagation delay can cause the phase shift between the clock signal generated by the data controller and propagated to the master station and the received data bit generated by this clock pulse at the master station and propagated to the data controller to have phase shift in excess of 180°. The problem is further complicated by the fact that master stations are located at varying distances from the data controller such that some stations produce 0° phase shift and others may produce greater than 360° phase shift. In addition, a given station with a given station number might be moved in the system causing its propagation delay and phase shift characteristic to change. This problem is solved by the sampling time delay circuit which actually measures the elapsed from the instant the time bit period eight clock pulse of the address character is transmitted until the instant the power on response pulse is received from the master station. Since each master station on line always responds with a pulse from this specific clock bit period this pulse will always be present in the system for timing purposes. The data controller measures the system propagation time of this pulse to the nearest 5 microsecond multiple. This value is then stored in a counter for the duration of data transfers during the execute phase with that master station. The receiver circuit then utilizes this propagation delay to select a tap on a digital delay line which serves to delay the operation of the receiver sampling circuits in time from the outgoing clock signals from the data controller to the master station.

The most significant bit of the A register is utilized by the data receivers to select the data lines currently being used. The incoming data stream then drives a parity generator which counts the one-zero transitions of the data line to compute odd parity on the data stream. The computed parity is then sampled and held at the end of bit period eight for utilization in checking the character parity. This check is accomplished during the initial part of the next character. The incoming data line also feeds a parity sample register which allows the incoming parity to be sampled during bit period nine. In addition, the incoming data stream is fed into a 16 bit shift register such that each sample is shifted into the register from the most significant bit and such that if only eight bits are received they will reside in the least significant eight bits of the register, or if 16 bits are received they will completely fill the register. Appropriate gating is included on this register to gate the contents of the register onto the internal data bus. The parity hold, partity sample, and the demultiplex register samples, as well as the termination of the present character are accomplished by logic which consists of a number of monostable multivibrators and gates which operate from a synchronous binary counter 852. The operation of this counter is skewed in time from the transmitter by the delay register 872 and the decoding of counter 852 is utilized to determine the specific sample times. The incoming bit period pulses from the execute phase timing circuit are shifted through the delay register 842 and a specific tap selected by a binary counter 824. The receipt of the positive edge of the pulse after bit period 8 causes binary counter 824 to be locked up, and the count locked in, the binary counter is decoded to select the specific delay line tap. If no pulse is received from the master station, then a pulse will eventually be generated to set a register which indicates no response was received from the master station within a predetermined length of time, (e.g., 30 microseconds). The fact that no response is received causes the data controller to go to the next character. The execute phase logic then causes the execute phase to be terminated.

As discussed briefly above, the data controller is coupled to the master stations by two pairs of data lines with the most significant bit of the A register selecting which of the two data lines is to be used. Data line receiver 802 is connected as one input to NAND gate 804 with the other input being connected so that a logical signal, enabling gate 804, appears on-line 806 whenever the most significant bit in the A register designates line receiver 802 as the data line. Similarly, line receiver 808 is connected as one input to gate 810 with the other input to gate 810 being connected to line 812 so that gate 810 is enabled for the data controller to receive the information on data transmission line receiver 808 when the most significant bit in the A register designates line receiver 808 as the line on which data is transmitted and received.

Figures 12, 12B:
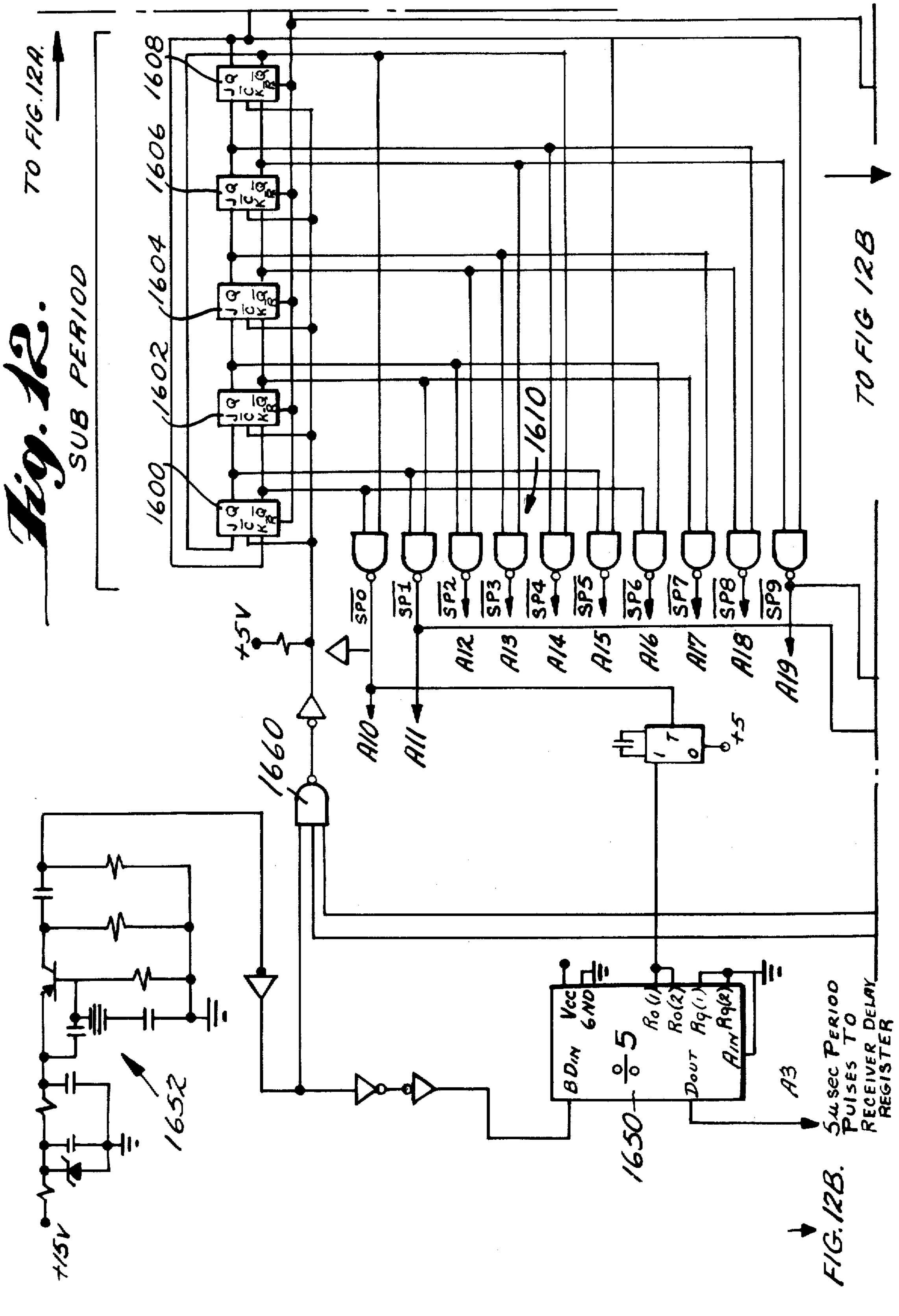
FIG. 12, comprising
FIGS. 12*a*, 12*b* and 12*c*, shows a detailed schematic of the execute program timing generator of the data controller.
Figure 12A:
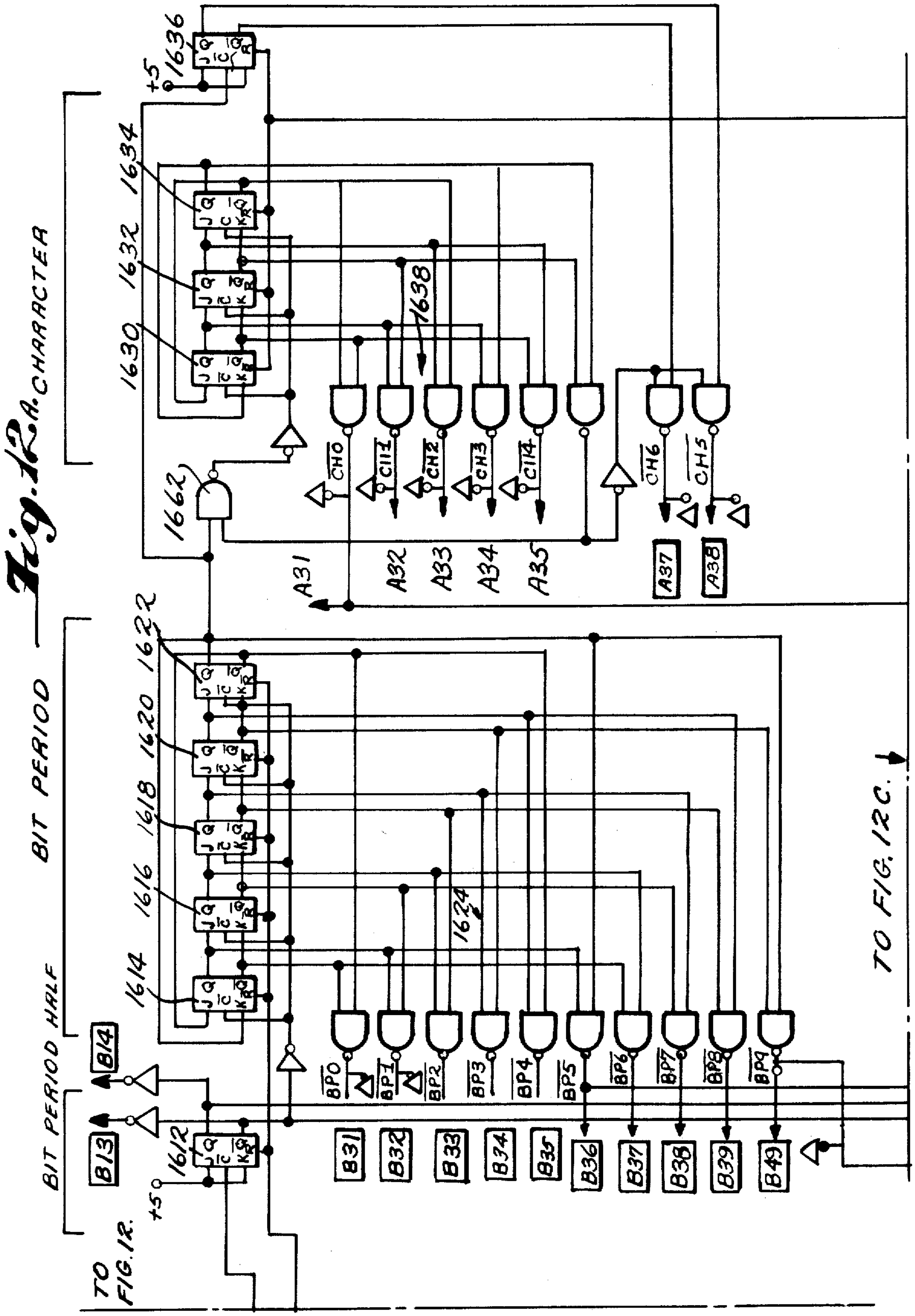
Figure 12B:
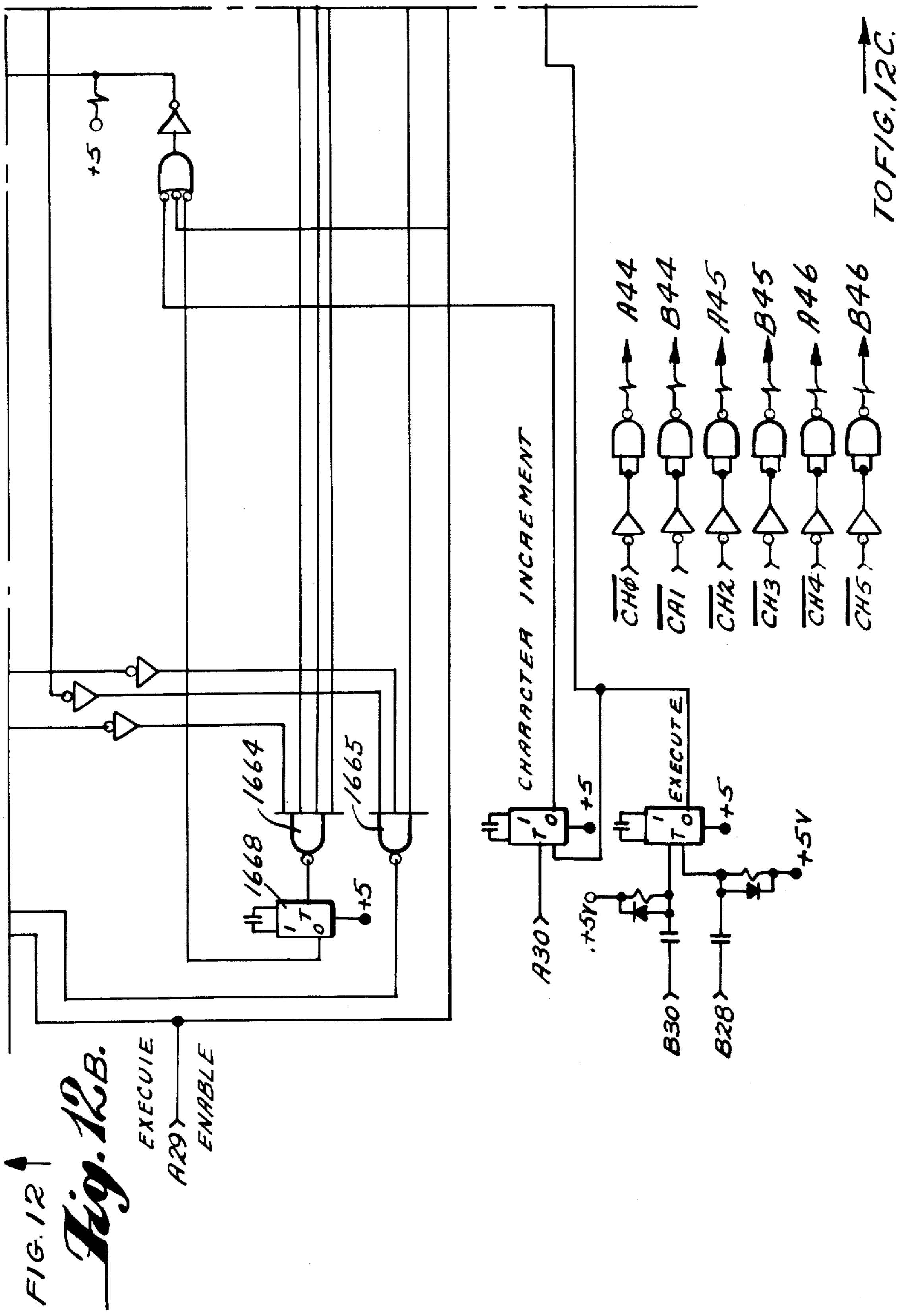
Figure 12C:
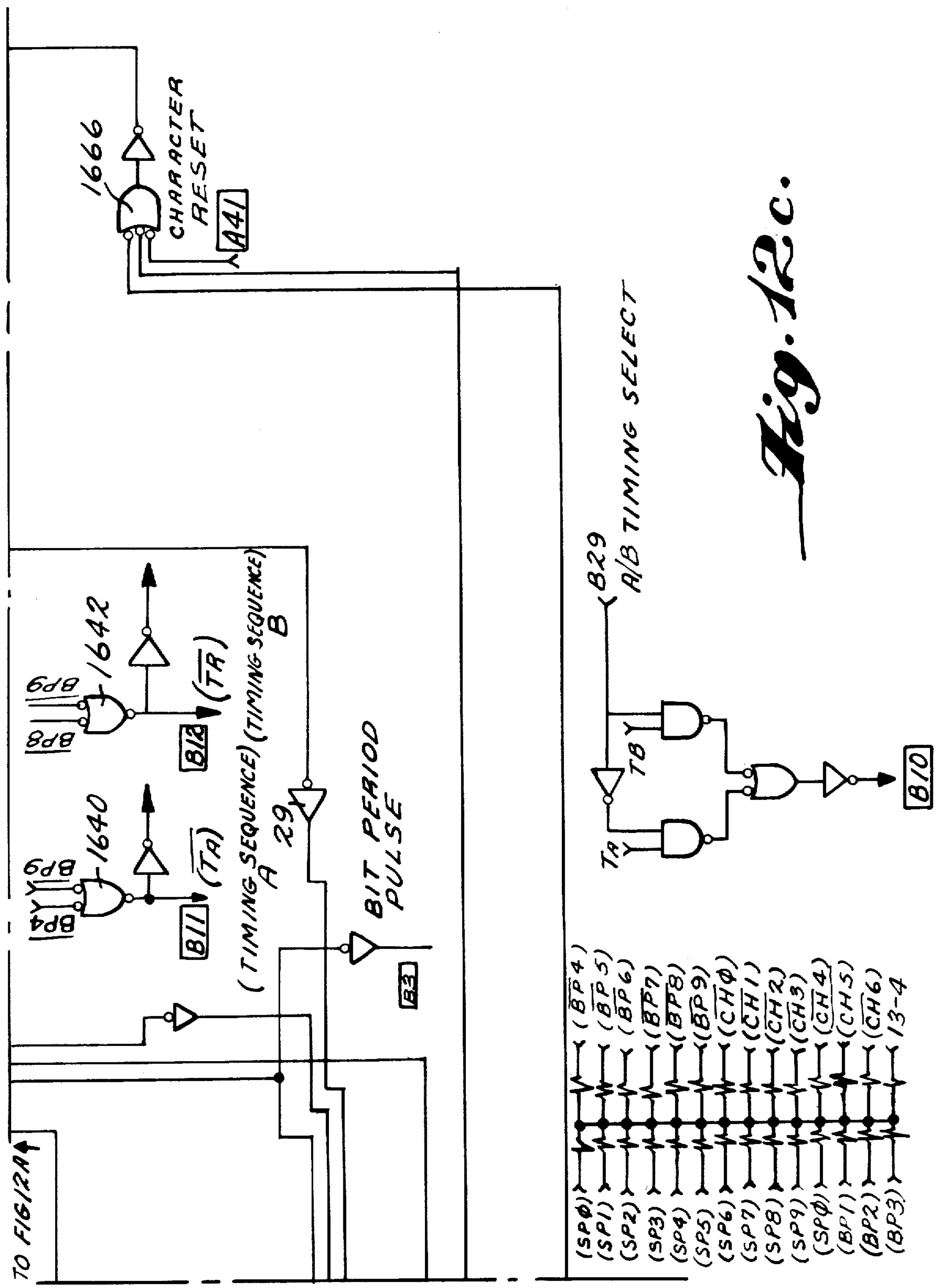

Also as discussed above, during the execute mode in which the data controller receives and transmits information to the master station, the first eight bit periods (0–7) of the first transmitted character address the station which then acknowledges during the eighth bit period, with the bit period signals being generated by the mode control load and transfer timing circuit as described above and shown in FIG. 5. When the signal associated with bit period 8 is produced during the first character, gate 814 is enabled, producing a suitable signal on line 816 which resets parity generator flip-flop 820. Further, during bit period 8 of the first character, gate 822 is enabled to produce a signal which resets a conventional synchronous binary counter 824, as well as conventional flip-flop 826. Flip-flop 826 then shifts its output condition, enabling gate 828 so that the 200 kilocycles input from the execute timing circuitry as described below and shown in FIG. 12 is applied to the clock input to binary counter 824 which begins to count, with each pulse representing a 5 microsecond time interval. The arrival of the acknowledge pulse from the addressed master station applies a signal via line 830 to flip-flop 826 such that flip-flop 836 shifts its output condition to block binary counter 824 so that the count therein represents the time delay between when a signal is transmitted from the data controller to the addressed master station and when a signal is received. The outputs of counter 824 are decoded by logic gates 832, 834, 836, 838 and 840 which are also connected to the outputs to a conventional five bit shift register 842. Shift register 842 is connected as shown to receive the 200 kilocycle pulses from the timing circuitry of FIG. 12 and these pulses are shifted through the register. Binary counter 824 thus selects the tap of the five bit shift register which corresponds to the time delay which has been ascertained by counter 824. The output of flip-flops 832, 834, 836, 838 and 840 are connected to a conventional NAND gate 850 with the output of that gate being connected to a further synchronous binary counter 852 via gate 854.

Also, as mentioned briefly above, in the event that a signal is not received by the data controller in response to an address within a given pre-determined time, an output signal is generated indicating that the addressed master station is off-line. In this embodiment, after a delay of 30 microseconds, gate 841 is enabled to cause flip-flop 858 to shift its output condition and to produce a signal on line 860 which is then set in the appropriate register as discussed above to be returned to the computer and the execute mode is terminated.

The delayed bit period pulses produced by shift register 842 and counter 852 are employed as timing signals for parity comparison and demultiplexing the data received on data line receiver 802 or 808 into a 16 bit shift register 870.

As mentioned briefly above, the novel data controller of this invention is capable of handling information received as successive characters from a master station in either of two timing formats so that each individual master station can be designed to operate in the data format which is most effective for the type of information it is conveying. Also, as discussed briefly above, each character is comprised of 10 bits with the parity digit being transmitted in the ninth position. In one mode of operation, bit 0–3 and bits 5–8 convey the information while in the second more bits 0–7 are employed. Bit 9 in the C register is set by the computer or Rom to indicate to the logic controller the format in which the addressed station will respond.

Synchronous binary counter 852, receives the bit period pulses delayed in time to synchronize with the signals received from the station and is provided with four outputs each representing a binary digit. These outputs are each inverted by inverters 880, 882, 884 and 886. NAND gate 890 is connected to the outputs of counter 852 such that gate 890 produces a logical zero at its output at a count in counter 852 which represents bit period 9. Production of this logical zero disenables gate 854 preventing the count in counter 852 from increasing until it is reset at the beginning of the next character by gate 856. The output of gate 890 is also applied as one input to NAND gate 892 via inverter 894. The other input to gate 892 is coupled to the output of gate 850 so that gate 892 produces a logical zero at bit period 9 causing monostable flip-flop 895 to shift its output condition and apply a signal to the clock input to parity flip-flop 896. Flip-flop 896 samples the parity digit generated in flip-flop 820 and holds that digit for comparison with the parity digit received from the remote station as will be described below.

The clock inputs to the shift registers which comprise the 16 bit shift register 870 are derived from monostable flip-flop 900. During character 1, NAND gate 902 shifts from a logical one to a logical zero output each time that a clock pulse is passed by NAND gate 850. The shifting of NAND gate 902 to its low output condition in turn shifts the output of NAND gate 904 to its high output condition, and this signal, as inverted by inverter 906, is applied to monostable flip-flop 900 to cause that flip-flop to produce a pulse on line 908 which is applied to the clock input to shift register 870 as illustrated. Thus, during the first character each of the bits is entered into the shift register. During the second and succeeding characters, only the information in bits 0–3 and 5–8 or the information in bits 0–7 is entered in the shift register depending on the format in which the addressed master station operates.

If the addressed station operates in the second format with the information contained in a string of successive bits 0–7, a logical one signal is produced on line 910 which is connected as shown to the C register and particularly to bit 9 thereof which is set by the computer to indicate in which format the master station is operating. Line 910 is connected as shown as one input to NAND gate 912 with the other input being connected to inverter 886 so that when the station operates in the second format both inputs to gate 912 are logical ones for a count of zero through 7 in the binary synchronous counter and the output of gate 912 accordingly remains a logical zero for that time interval. Since the output of gate 912 is a logical zero, the output of gate 914 is a logical one and this is applied as one input to NAND gate 916. One of the other two inputs to NAND gate 916 is connected to NAND gate 850 so that each successive pulse passed through the shift register 842 applies a logical one to that input. The third input is connected to logical circuitry which applies to a logical one during each character other than the first character. Thus for bits 0–7, gate 916 assumes a logical zero output and this in turn causes gate 904 to produce a logical one output which causes the clock to be driven on each of the bits zero through 7, but not on the bit 8 or the bit 9 which is used for a parity check as described below.

Similarly, when the station addressed operates in the format in which information is conveyed in two groups of four bits with an unused bit separating the two information groups, a logical one signal is produced on line 916 which is also connected to bit 9 of the C register as shown, and line 916 is connected as one input to NAND gate 918. The other input to gate 918 is connected to the output of NAND gate 920 which in turn receives the outout of NAND gates 922, 924 and 926. NAND gate 926 is connected to the outputs of counter 852 such that a logical zero is produced on bits 0–3. NAND gate 924 produces zero outputs on bits 1, 3, 5, and 7 and gate 922 on bit 8. The fourth input to gate 920 is connected to inverter 882 which provides a logical zero on bits 0, 1 and 5. Thus gate 920 has a logical zero input except on bits 4 and 9 at which time all the inputs to gate 920 are logical ones. Accordingly, on bits 0–3 and 5–8, gate 920 produces a logical one output which causes gate 918 to produce a logical zero output which in turn causes gate 914 to produce a logical one which in turn causes gate 917 to produce a logical zero which causes gate 904 to produce a logical one which is inverted by inverter 906 to drive the clock monostable flip-flop 900 during bits 0–3 and 5–8 to clock the information into shift register 870 during those time intervals.

The pulse produced by monostable flip-flop 895 during bit period 9 also operates to set the sample flip-flop 930 which thus samples the line during bit period 9 to receive and retain the parity digit transmitted at that time. The outputs of flip-flops 930 and 896 are connected to NAND gates 932 and 934, as shown. When the inputs to gate 932 are both logical one or and conversely the inputs to gate 934 are both logical one, a match is indicated between the sampled parity and the generated parity. The output of gate 976 is sampled by circuits shown later, and if a parity error is detected bits $\phi$ and 4 of the C register are set by circuits to be described later. a logical zero is During bit period 9, monostable flip-flop 938 fails to produce a pulse, which failure causes gate 942 to be disabled thus prevents parity generator 820 from counting this parity digits received during this period. The operation of flip-flop 895 also causes a further flip-flop 944, which is connected to the output of flip-flop 895, to produce a delayed pulse which is applied to one of the inputs to gate 950 with the other input being connected to the output of gate 953. The output of gate 953 is low during bit period 9 of character one only if the flip-flop 858 has been set indicating an absence of response from the addressed station. If a response has been, then gate 950 shifts from its logical zero output in response to the pulse produced by monostable flip-flop 944, in turn triggering monostable triggering flip-flop 952 which produces a pulse which is applied to the timing circuitry to cause the next character signal to be produced.

Figure 9A:
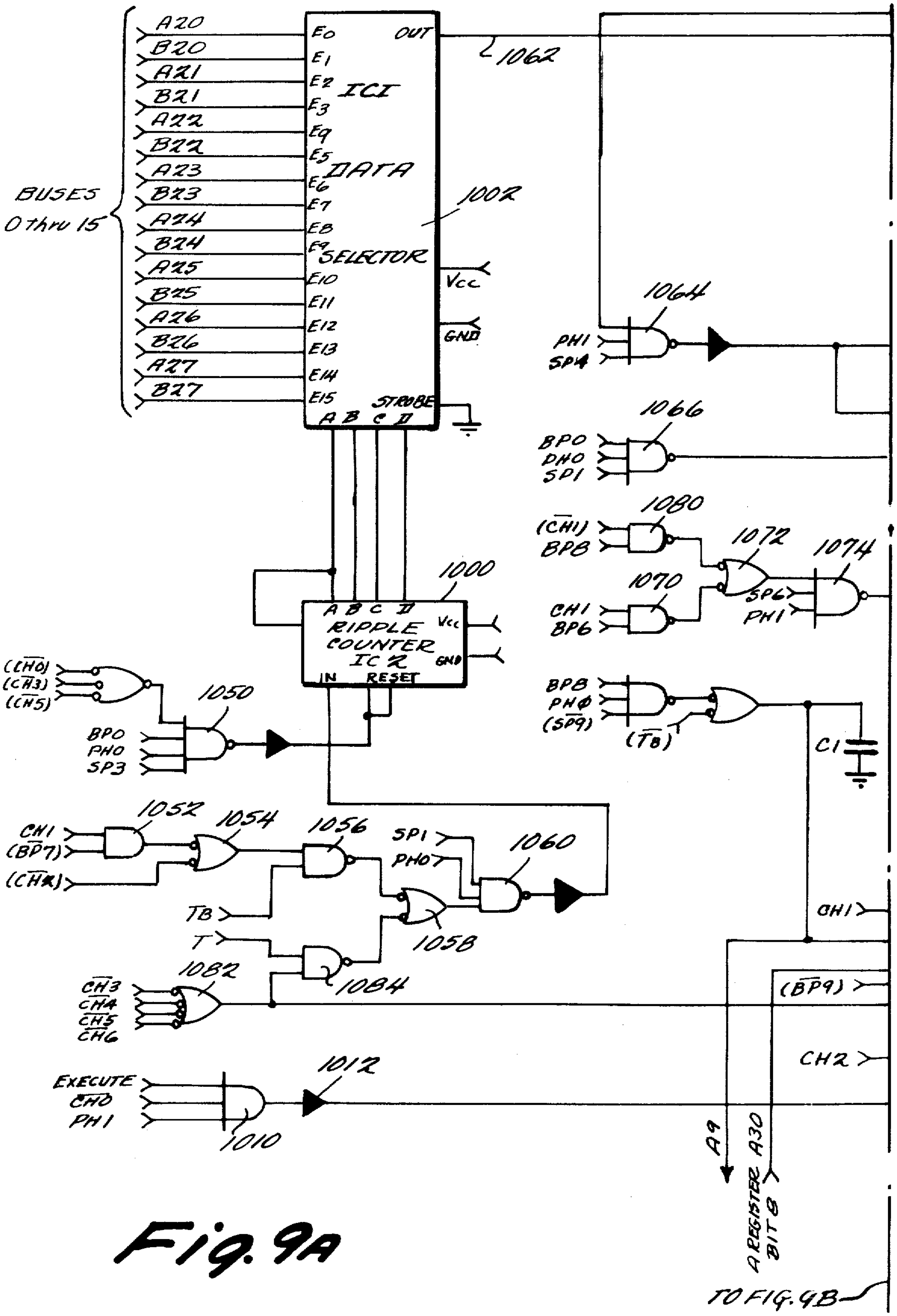
FIGS. 9*a*, 9*b* and 9*c*, shows a detailed schematic of the multiplexer, transmitter and transmit parity circuits of the data controller.
Figure 9B:
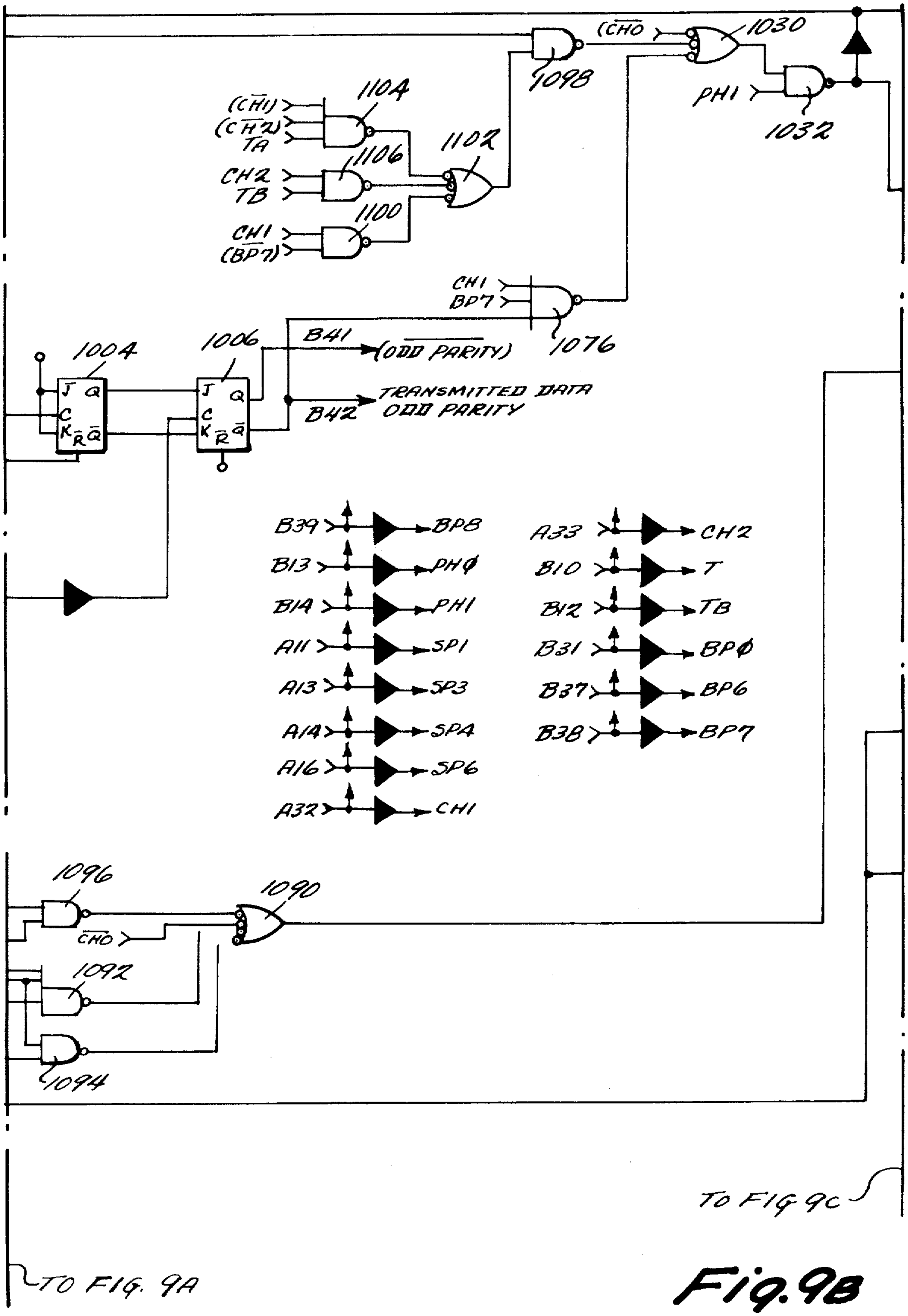
Figure 9C:
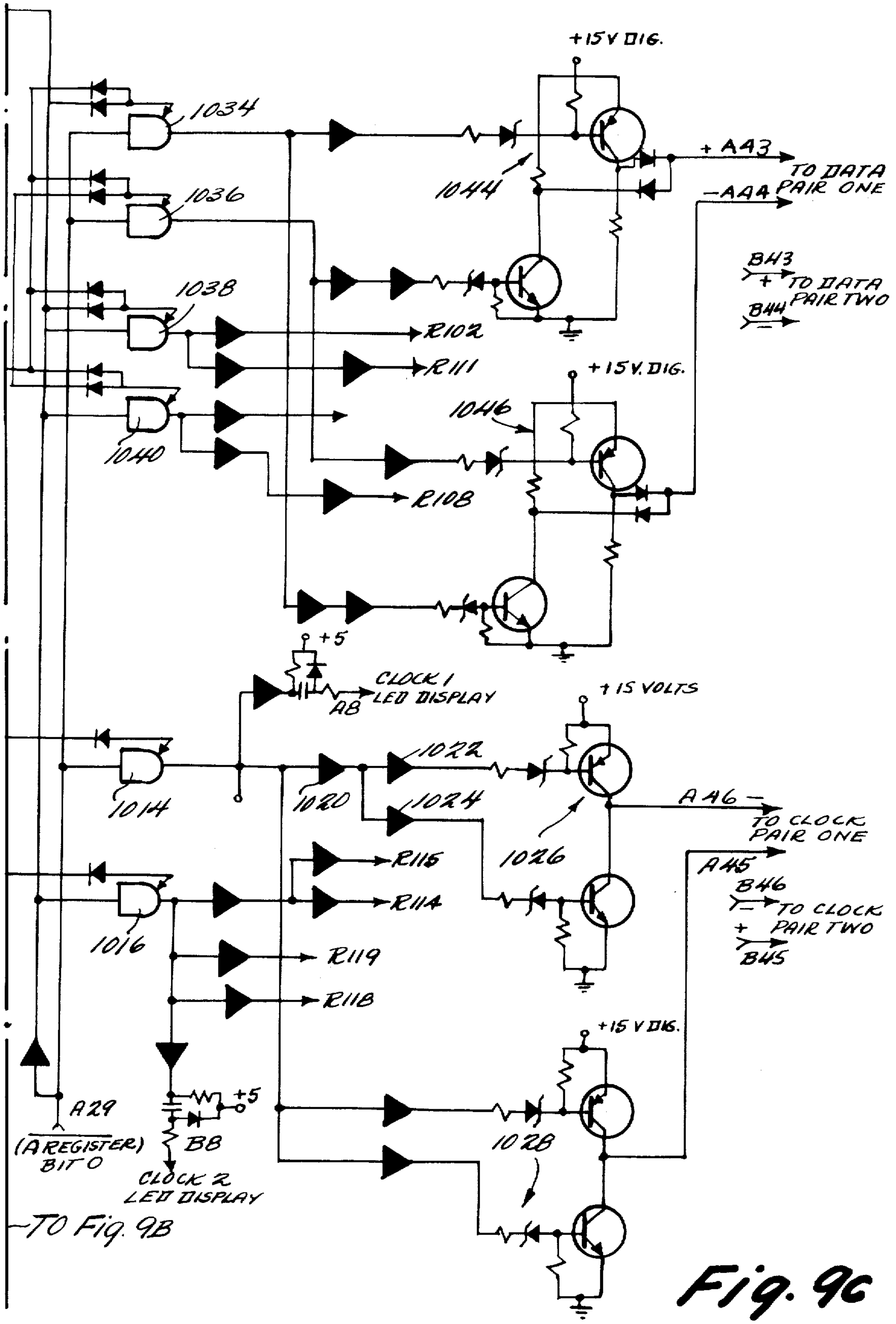

The circuitry shown in FIG. 9 is comprised of circuits which accept a 16 bit data from the data controller data bus and serialize this word into the transmitter circuit. The transmitter consists of drivers for both the data and clock pairs in each of the two sets of data-clock lines. A parity generator operates from the serial data stream to compute the parity of the transmitted data such that this parity can be compared with the received parity transmitted from the remote master station to check for the data transfer accuracy of outgoing data. In addition, selection circuits are included for selecting the appropriate clock and data transmitter such that the data is placed on the line determined by the most significant bit of the A register.

A conventional binary counter 1000 is incremented to select the appropriate data bit at the correct time according to which of the two data transfer timing formats is being utilized as determined by C register bit 9. The outputs of counter 1000 drive a conventional 16 bit data multiplexer 1002 to serialize the data word currently on the data controller data bus. Further gating generates the transmitter enable signals which cause the transmitter to generate the start of message signal, enable the transmitter at the appropriate times in each character for data transmission, and then disable the data transmitter but keep the clock transmitter enabled to cause the master station to send back data for reception at the data controller.

The outgoing serial data stream clocks flip-flop 1004 to generate the transmitted odd parity on the data transmitted. The contents of this register are then transferred into flip-flop 1006 at the end of bit period 8 to be utilized during the beginning of the next character for comparison with the received parity bit from the system to determine if the master station correctly received the data transmitted to it during the character.

The circuitry of FIG. 9 includes differential line drivers for both the clock and data lines. Only drivers for one of the data clock pairs is shown in detail but the inputs and outputs to the other drivers are indicated on the drawing. The data line drivers provide for reverse biasing the diodes onto the data lines such that the transmitter does not load the data lines during the receive portion of each character.

As will be recalled, the first signal transmitted to the master stations is a start of message signal comprised of four or more pulses on the data line pair being used with no timing pulses on the corresponding clock line pair. This start of message signal is transmitted during character 0 as determined by the execute timing circuitry shown in FIG. 12 and discussed in detail below. To summarize the timing signals produced by the circuitry of FIG. 12, each character is divided into 10 bit periods and each bit period is in turn divided both into two bit period halves and into 10 subperiods.

Gate 1010 produces the clock pulses which are inverted by inverter 1012 and applied to gates 1014 and 1016. Gate 1014 is associated with one clock pair and gate 1016 with the other clock pair with one gate enabled and the other disabled depending upon the bit in bit position 0 of the A register. Gate 1014 is connected via inverters 1020, 1022 and 1024 to differential drive circuits 1026 and 1028, which apply the logical signals to one pair of clock lines.

During character 0, one of the three inputs to gate 1010 is a logical zero so that the output of gate 1010 is a logical one. This output, inverted by inverter 1012, is applied to and disables gates 1014 and 1016. During the following characters, gate 1010 produces successive pulses during period half 1 of each bit period cause the drivers 1026 and 1028 to apply the clock pulses to the clock pair lines.

Also during character 0, one of the inputs to NAND gate 1030 is a logical zero so the output of gate 1030 is locked at logical one during character 0. The output of gate 1030 is applied as one of the inputs to gate 1032 with the other input being the pulse produced during the second half period. Thus gate 1032 produces a succession of pulses during character 0 which are applied to gates 1034, 1036, 1038 and 1040. Gates 1038 and 1040 are enabled when the bit in position 0 of the A register indicates that the data lines associated with these gates are to be used while gates 1034 and 1036 are enabled when the bit in position 0 of the register indicates that the data lines associated with those gates are to be used. Gates 1034 and 1038 drive differential drivers 1044 and 1046 and gates 1038 and 1040 drive similar circuits (not shown).

Following the start of message signal, a ten bit address character with the station addresses contained in bits 0 – 6 and an odd parity digit in bit 7 is transmitted. This transmission occurs during character 1. During bit period 0, period half 0, sub-period 3 of character 0, counter 1000 was reset by the inverted output of gate 1050. For bit periods 0 – 6 of character 1 thereafter, gate 1052 produces a logical zero output which causes gate 1054 to produce a logical one output whch in turn causes gate 1056 to produce a logical zero which in turn causes gate 1058 to produce a logical one which is applied as one of the inputs to gate 1060. Thus at sub-period 1, period half 0, bit periods 0 – 6 of character 1, counter 1000 is incremented to cause multiplexer 1002 to successively place the bits comprising the address on line 1062.

While the address is being transmitted during bit periods 0 – 6, parity is being generated by the data stream clocking flip-flop 1004 by gate 1064 during period half 1, sub-period 4 of each bit period. Flip-flop 1004 was reset by gate 1066 during period half zero, sub-period 1 of bit period zero. Gate 1070 produces at logical zero at bit period 6 of character 1 which in turn causes gate 1072 to produce a logical 1 output so that gate 1074 produces a clock pulse at period half 1, sub-period 6 of bit period 6 to cause the parity digit to be transferred from flip-flop 1004 into flip-flop 1006. During bit period 7 of character 1 gate 1076 is enabled to apply the parity digit to gate 1030 which applies it to the data pair being used.

The next character to be transmitted is the instruction character which is also derived from the A register. Therefore, counter 1000 is not reset during character 1 but is incremented eight additional times to serialize the instructions. The instruction character consists of an eight bit string transmitted in bit periods 0 – 7. During these bit periods the output of gate 1056 remains a logical zero which increments counter 1000 for each of the bit periods. Also during bit period 8 of character 2 and all succeeding characters, gate 1080 produces a logical zero to clock the parity digit into flip-flop 1006.

The data characters transmitted during character 3 and successive characters can be transmitted in either of two formats as discussed above. In the first format, data is transmitted during bit periods 0 – 3 and 5 – 8, while in the second format, transmission is during bit periods 0 – 7. The timing circuit shown in FIG. 12 forms a first timing sequence $T_A$ associated with the first format and a second sequence $T_B$ associated with the second format.

During character 3 and successive characters gate 1082 produces a logical one which is applied as one input to gate 1084 which also receives the timing sequence $T_A$ or $T_B$ depending upon the format as determined by bit 9 in the C register. Gate 1084 then drives gate 1058 to cause counter 1000 to be incremented either during bit periods 0 – 3 and 5 – 8 or bit periods 0 – 7 depending upon the state of bit 9 of the C register.

Gate 1090 is connected to gates 1034, 1036, 1038 and 1040 to disable those gates and prevent data transmission while information is being received and while information should not be transmitted. Gate 1092 has one of its inputs connected to bit 8 of the A register which designates whether data is to be transferred to the computer from the addressed station or vice versa. When that bit indicates the master station is transmitting, then gate 1092 produces a logical one which causes gate 1090 to disable gates 1034, 1036, 1038 and 1040. Gate 1094 causes gate 1090 to enable gates 1034, 1036, 1038 and 1040 during bit periods 0 – 8 of characters 2 and gate 1096 causes enabling during bit periods 0 – 7 of character 1. Gate 1092 also causes enabling during bit periods 0 – 8 of characters 3 – 6 when the A register indicates data transmission.

Gate 1098 also operates to block information transfer to gates 1034, 1036, 1038 and 1040 except during the proper times. During bit periods 0 – 6 of character 1, gate 1100 produces a logical o output which in turn causes gate 1102 to produce a logical one, enabling gate 1098. During bit periods 0 – 7 of character 2, gate 1098 is similarly enabled by gate 1104 as it is also during the bit transmission periods of character 3 and succeeding characters by gate 1106.

Figure 10A:
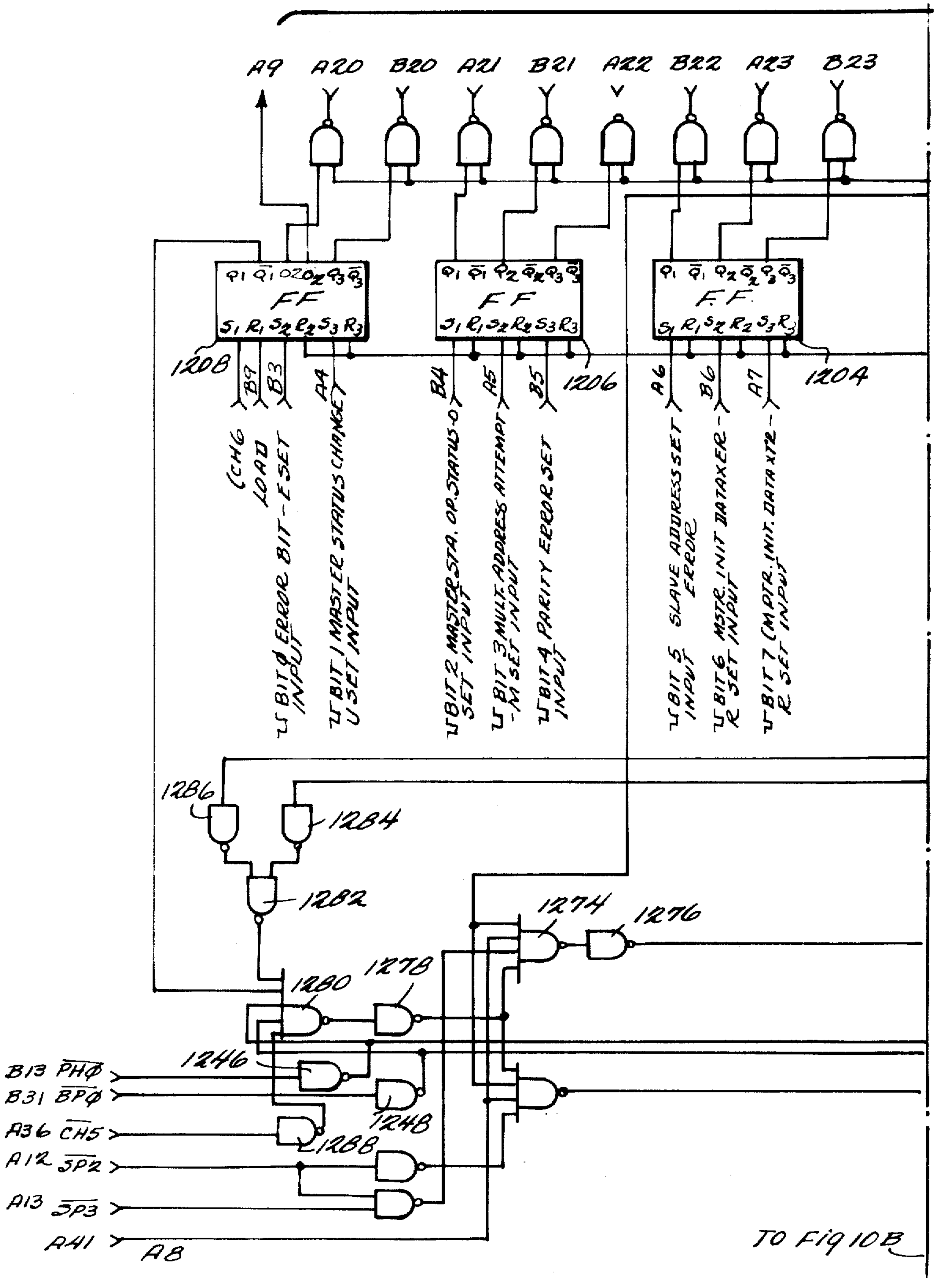
FIGS. 10*a*, 10*b* and 10*c*, shows a detailed schematic of the C register of the data controller.
Figure 10B:
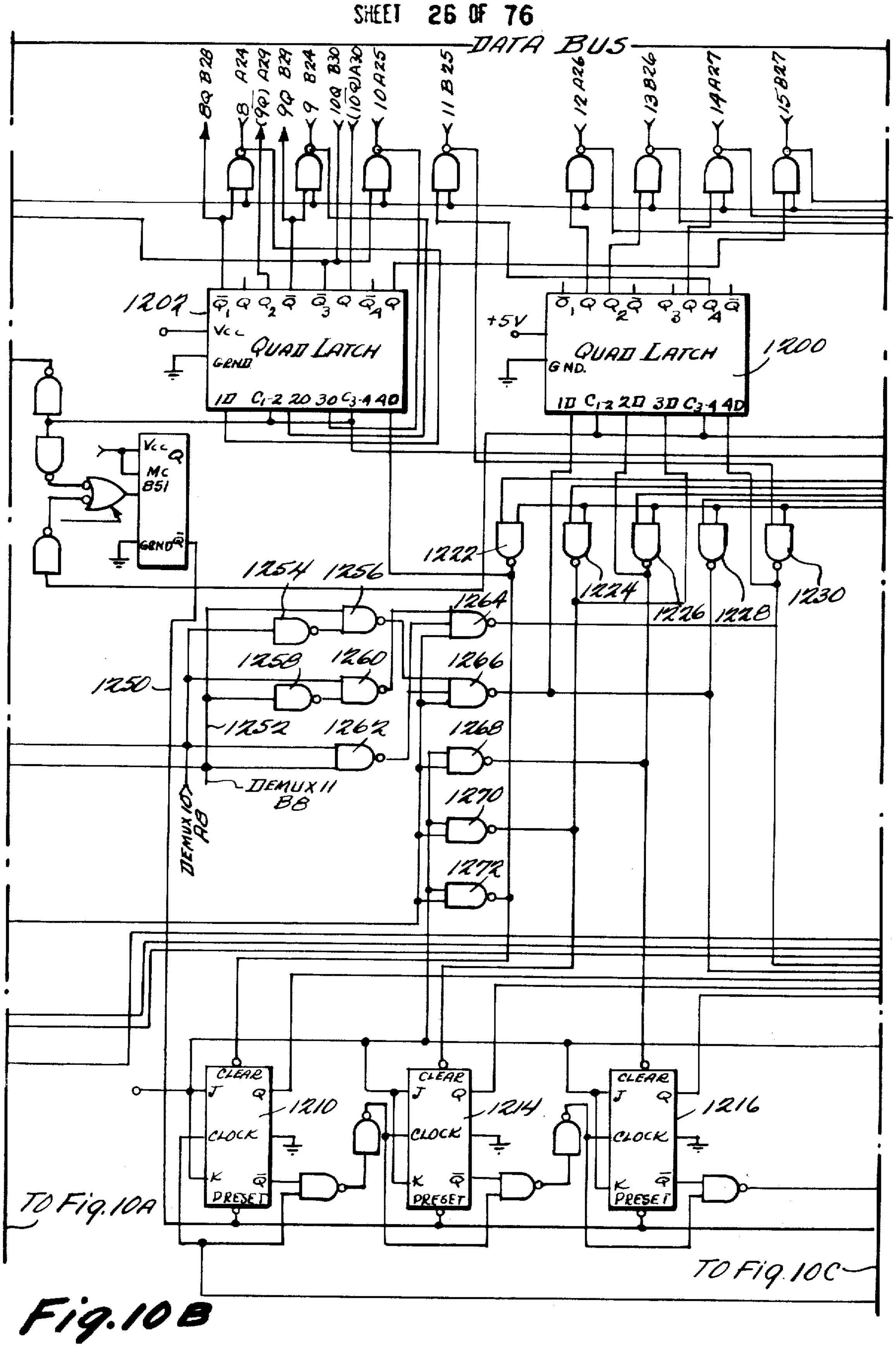
Figure 10C:
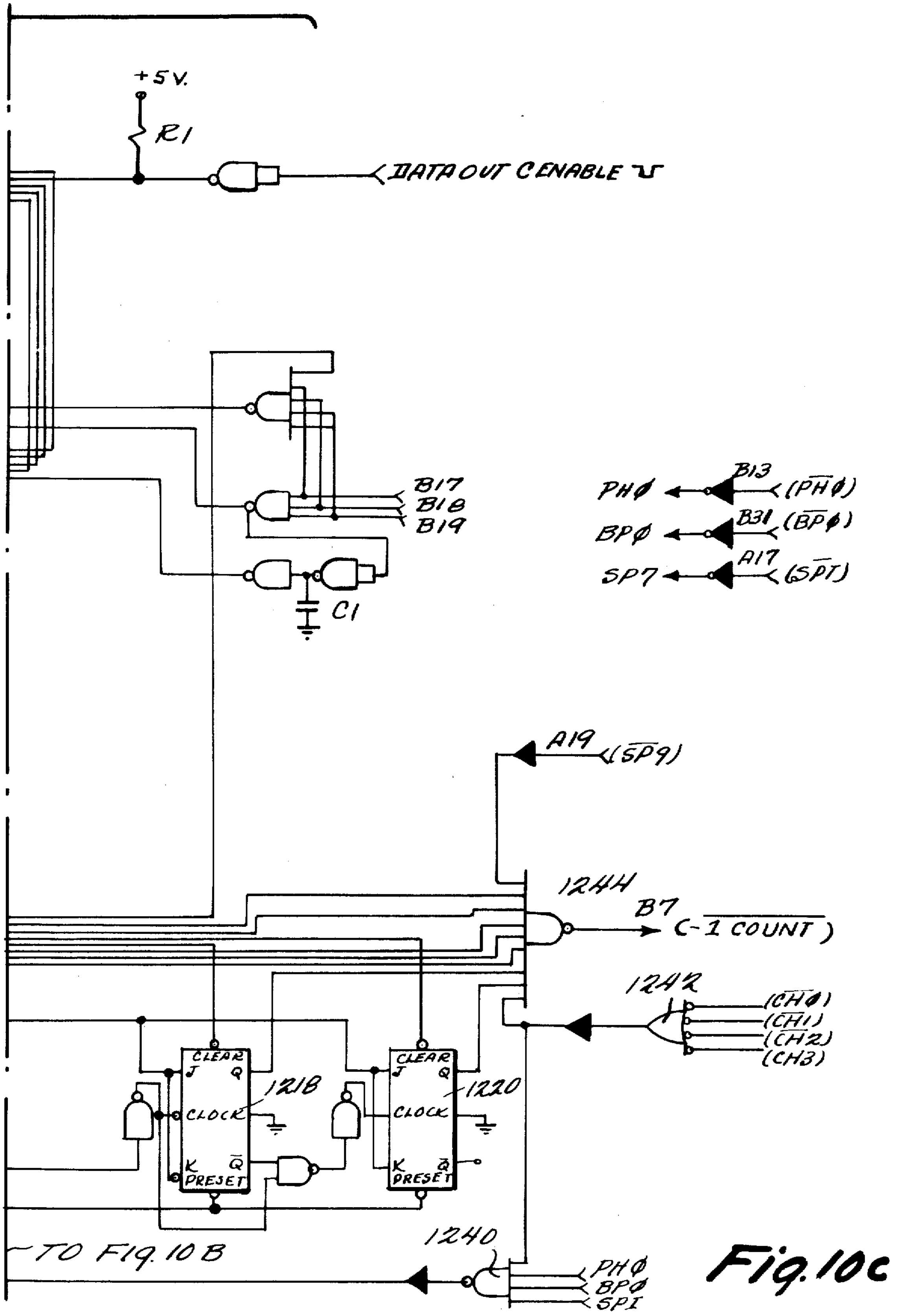

The C register shown in FIG. 10 includes a latch which stores all bits of the C register, and contains a data byte counter which determines when the number of data bytes indicated by the least significant 5 bits of the C register have been transferred signifying the end of the execute phase. The data controller then goes either to the transfer or load phase depending on the status of the data controller at the end of the execute phase.

Flip-flops are used to establish the most significant byte of the C register and latches are used to establish the least significant byte. Due to the fact that the most significant byte of the C register is generated during the execute phase of the data controller's operation, appropriate gating is included to load only the C register's least significant byte. Gating is also shown to gate the total contents of the C register onto the data bus. In normal operation of the data controller with a master station without slaves the byte counter is loaded with the same number as the least significant 5 bits of the C register. The value of the counter is then decremented at the end of each data transfer character until the counter reaches a negative value which in turn signifies the end of the execute phase. However, if the data controller is operating with a master station with slaves then the slave station has the ability to modify the contents of the byte counter by setting two bits in its output data stream to the data controller to a non-zero value. This allows different types of slaves to be intermixed on the same master station by taking advantage of the fact that the majority of slaves are going to be of a single type with an identical data bit sequence length and that the exception slaves can utilize either 8, 16, or 24 data bytes to accomplish their transfers. This ability of the data controller to look at the incoming data stream from a slave master station and to modify the data sequence length allows great flexibility and high efficiency in that the data sequence length can be optimum for the majority of slaves on a given station multiplexer and also significant for an exception type of slave such as a teletype interface slave station.

Further, logic in FIG. 10 is devoted to sampling the incoming data stream and modifying the byte counter and to controlling the sample time on the byte counter to determine when the data sequence length and point has been reached.

Conventional quad latches 1200 and 1202 store the least significant digits while triple flip-flops 1204, 1206 and 1208 store the most significant digits. The byte counter is comprised of JK flip-flops 1210, 1214, 1216 1218 and 1220. NAND gates 1222, 1224, 1226, 1228 and 1230 load the byte count into the byte counter from quad latches 1202 and 1200. The byte counter is decremented at bit period 0, period half 0 and subperiod 7 of character 4 and succeeding characters by gates 1240 and 1242. When the counter has been fully counted down, gate 1244 provides an output which triggers termination execute phase on period half 0, bit period 0 as provided by gates 1246 and 1248.

As mentioned, the count in the byte counter can be modified by a binary signal on lines 1250 and 1252. The binary signal on these lines is decoded by gates 1254, 1256, 1258, 1260 and 1262 and coupled to gates 1264, and 1266. Gates 1268, 1270 and 1272 are controlled in parallel with 1264 and 1266 and modify the three least significant bits of the byte counter to zero when enabled. Gate 1274 is in turn connected to gates 1278, 1280, 1282, 1284, 1286, 1288, 1246 and 1248 so that gate 1274 is enabled to modify the byte counter on bit period 0, period half 0, character 5, no error having been stored in bit 1 of the C register and a modify signal having been received.

Figure 11A:
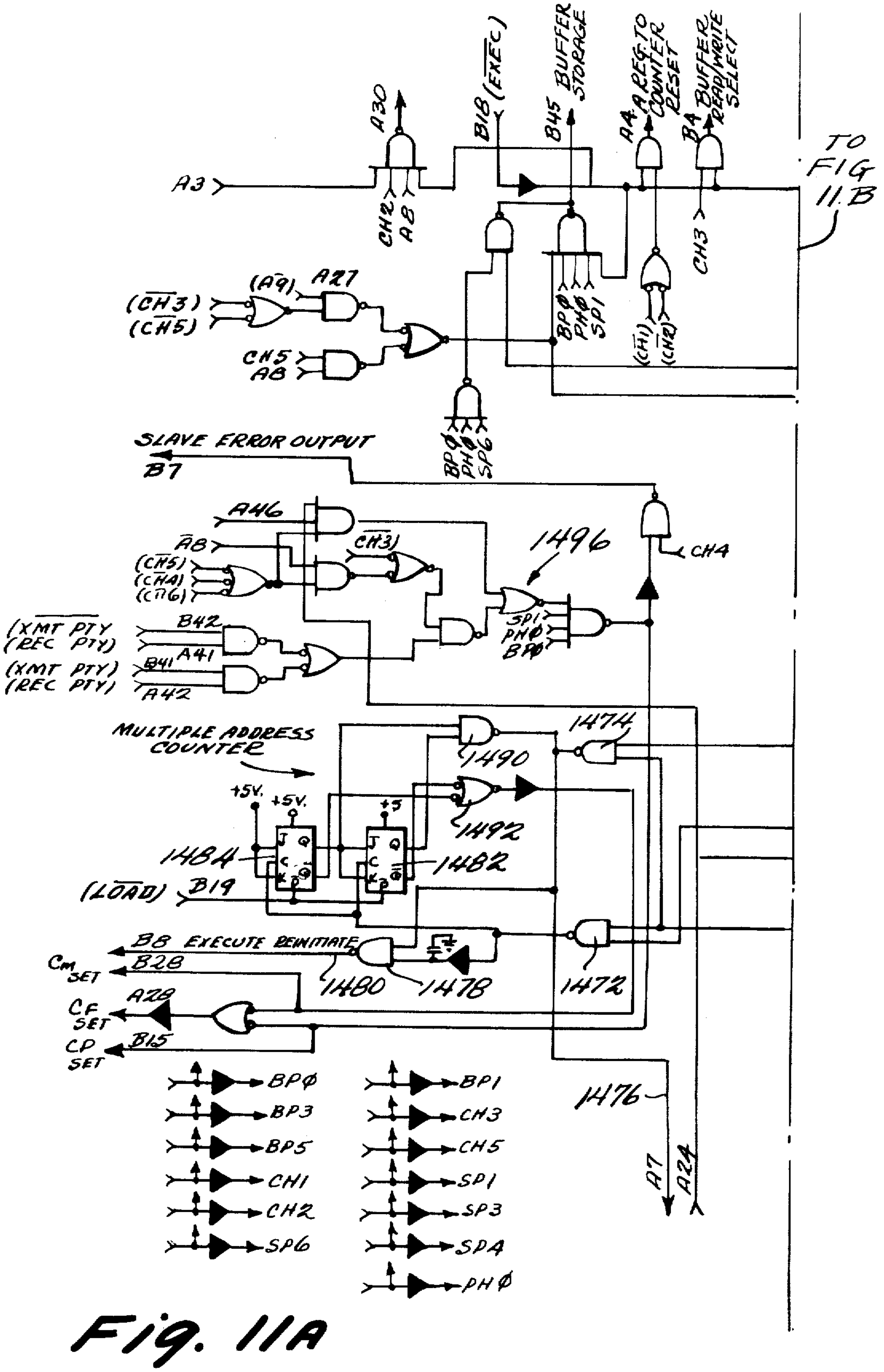
FIGS. 11*a*, 11*b* and 11*c*, shows a detailed schematic of the master station status storage and the execute control circuitry of the data controller.
Figure 11B:
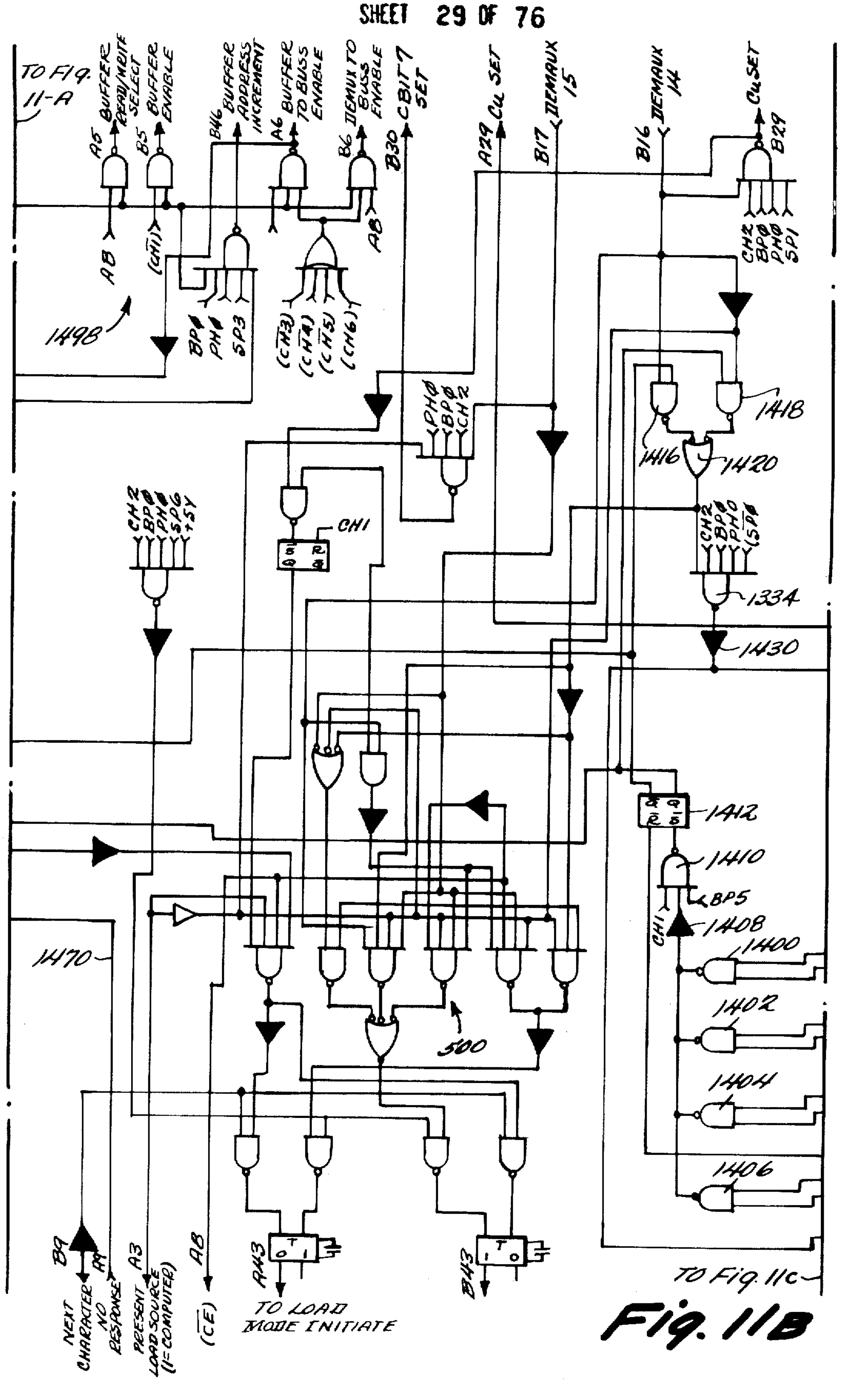
Figure 11C:
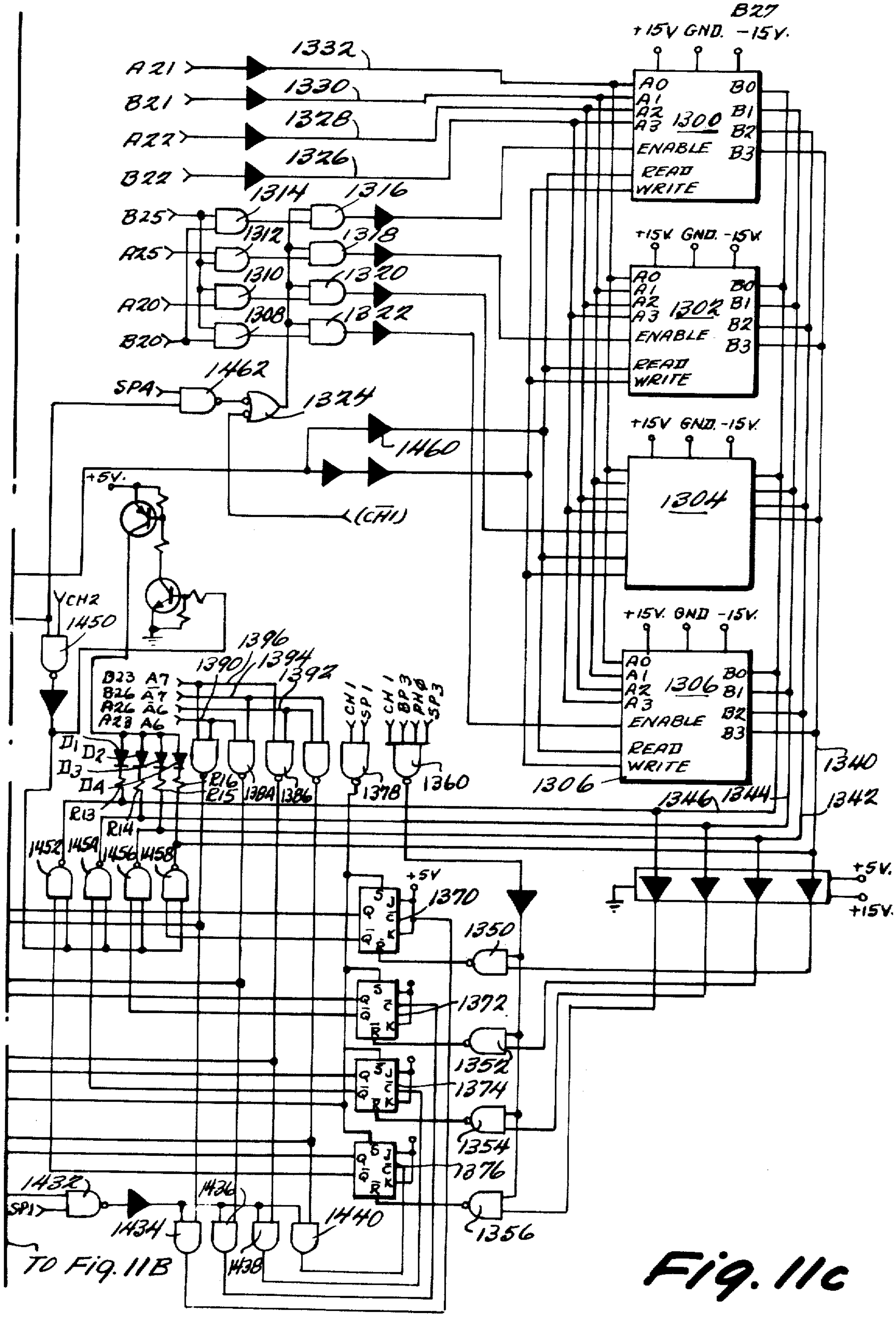

Reference is now made to FIG. 11 which includes circuits which control the time at which the A register, C register, buffer register and receiver demultiplexer register drive the data bus or are loaded from the data bus during the execute phase. In addition, FIG. 11 includes circuitry for both storing the status of each of the remote master stations and modifying the stored status when it changes so that computer interrupts can be generated by the data controller to report changes in status of master stations to the computer only when the status changes occur.

FIG. 11 also includes circuitry for determining when parity errors occur and for allowing multiple address attempts if a station was communicated with on the data controller's last communication attempt but cannot be raised this time, and circuits for determining the next data controller phase when the execute phase is terminated.

The circuitry includes a four bit by 64 word random access memory whose address is determined by the most significant six bits of the most significant byte of the A register (the current master station address). When the data controller communicates with a master station the first data bit received (bit period 8 of the address character) from that station is a logical one if the station responds to the address. If this logical one bit is received, then the data controller knows that the master station is on line. Once this status determination is made it is compared with the status which was stored in the memory on the last communication attempt with the station. If a difference is found, bit 1 of the C register is set to indicate that a change of station status has occurred. In addition the status of the station is loaded into bit 2 of the C register. The new status of the station is then stored in the random access memory for reference the next time the station is addressed. This feature allows the data controller to note all changes in status of master stations and report these changes to the computer but prevents redundant reporting to the computer of stations that are down. This allows ready addition of stations to the system or removal of stations from the system and insures that the computer always knows the operating status of all master stations without having to rely on a loss of data to determine this change of status.

The circuitry also includes gating which allows various registers to drive the data bus, and controls the buffer memory during the execute phase of the data controller's operation, as well as circuitry devoted to performing parity checks on data either transmitted or received. Transmission and reception of data are determined by the most significant bit in the least significant byte of the A register. If a parity error is determined, bit zero and bit 4 of the C register is set to a one. A counter counts multiple address attempts by the data controller. A multiple address attempt is made if the data controller was able to communicate with the master station the last time that station was addressed and does not succeed in communicating with the station on the current attempt. This is intended to catch momentary dropouts or failures in station addressing to prevent reporting a station out when actually an address parity error has occurred rather than the station actually having gone off line. The purpose of this counter is to allow the data controller to make three successive attempts to communicate with the station by executing the start of message character and the address character. If more than one attempt is made to address the station then the C register bit zero and bit three are set to indicate both a potential error condition and a multiple address attempt by the data controller. If communication is established with the master station on the second or third attempt the normal execute phase is carried out and the transfer phase entered.

The data controller can terminate the execute phase in a number of ways: It can go directly from execute to the load phase when it is operating from a read-only load and has failed to raise a station which it had not been able to communicate with previously, or when a station is raised and has no interrupt data. In addition, the data controller can go directly from the execute to the load phase if it has been doing a data output transfer initiated by the computer to transfer data to a master station, and the data transfer has in fact been successfully completed with no parity errors. The various termination conditions are shown in the truth table of Table 7. The data controller will go from the load phase to the transfer phase when either it: has received interrupt data, has acquired data requested by a computer load, has found a change in station operating status, has performed a computer directed data transfer out to a master station, has the a data error occur during an outgoing data transfer, or has required a multiple address attempt to communicate. The decision on how the execute phase is terminated is based on the following:

whether the master station interrupt was serviced, whether the current data sequence is an outgoing data transfer to a master station or an incoming data transfer from a master station, whether the data sequence has been completed, whether a response was received from the master station, what the load source was druing the load phase, the present status of the master station stored in the master station status storage, whether data errors have occurred, and whether a multiple address attempt was made.

Conventional RAM memories 1300, 1302, 1304 and 1306 store the last status-up or down-of each master station. Part of the station address transmitted during character 1 is decoded by gates 1308, 1310, 1312 and 1314 which enable one of the NAND gates 1316, 1318, 1320 or 1322. During character 1 gate 1324 applies a logical one to gates 1316, 1318, 1320 and 1322 to cause the enabled one of those gates to enable one of the RAM's 1300, 1302, 1304 and 1306. Address lines 1326, 1328, 1330 and 1332 choose four master station statuses in the enabled RAM and the four statuses appear on lines 1340, 1342, 1344 and 1346 and are applied to NAND gates 1350, 1352, 1354 and 1356.

Gate 1360 produces a logical zero at character 1, bit period 3, period half 0, sub-period 3 to enable gates 1350, 1352, 1354 and 1356 so that the four statuses are written into JK flip-flops 1370, 1372, 1374, and 1376, which were just set at bit period 1 of character 1 by the zero produced by NAND gate 1378. Gates 1380, 1382, 1384 and 1386 decode the two least significant bits of the address on lines 1390, 1392, 1394 and 1396 to select one of the NAND gates 1400, 1402,

EXECUTE PHASE TERMINATION—TRUTH TABLE 6

| Station Status | Change of Status | Computer Load Source | Interrupt | Data Error | Data Direction | Jump to Load | Jump to Transfer | Complete Execute Sequence and Transfer |
|---|---|---|---|---|---|---|---|---|
| 0 | 0 | 0 | 0 | Ø | Ø | 1 | 0 | 0 |
| 0 | 0 | 0 | 1 | Ø | Ø | Ø | Ø | Ø |
| 0 | 0 | 1 | 0 | Ø | Ø | 0 | 1 | 0 |
| 0 | 0 | 1 | 1 | Ø | Ø | Ø | Ø | Ø |
| 0 | 1 | 0 | 0 | Ø | Ø | 0 | 1 | 0 |
| 0 | 1 | 0 | 1 | Ø | Ø | Ø | Ø | Ø |
| 0 | 1 | 1 | 0 | 0 | Ø | 0 | 1 | 0 |
| 0 | 1 | 1 | 0 | 1 | Ø | Ø | Ø | Ø |
| 0 | 1 | 1 | 1 | Ø | Ø | Ø | Ø | Ø |
| 1 | 0 | 0 | 0 | 0 | Ø | 1 | 0 | 0 |
| 1 | 0 | 0 | 0 | 1 | Ø | 0 | 1 | 0 |
| 1 | 0 | 0 | 1 | Ø | Ø | 0 | 0 | 1 |
| 1 | 0 | 1 | 0 | 0 | 0 | 1 | 0 | 0 |
| 1 | 0 | 1 | 0 | 0 | 1 | 0 | 0 | 1 |
| 1 | 0 | 1 | 0 | 1 | Ø | 0 | 0 | 1 |
| 1 | 0 | 1 | 1 | 0 | 0 | 1 | 0 | 0 |
| 1 | 0 | 1 | 1 | 0 | 1 | 0 | 0 | 1 |
| 1 | 0 | 1 | 1 | 1 | Ø | 0 | 0 | 1 |
| 1 | 1 | 0 | 0 | Ø | Ø | 0 | 1 | 0 |
| 1 | 1 | 0 | 1 | Ø | Ø | 0 | 0 | 1 |
| 1 | 1 | 1 | Ø | Ø | Ø | 0 | 0 | 1 |
| 1 ⇒ On Line | 1 ⇒ Status Change | 1 ⇒ Computer is Source | 1 ⇒ Interrupt | 1 ⇒ Data Error | 1 ⇒ Incoming Transfer | | | |

1404 or 1406, which are connected to flip-flops 1370, 1372, 1374 and 1376 respectively. If the stored status of the addressed station as stored in the enabled RAM was operative, the selected gate 1400, 1402, 1404 or 1406 produces a logical zero which is inverted by inverter 1408 and applied to gate 1410 which produces a logical zero to set flip-flop 1412 at bit period 5 of character 1.

Gates 1416, 1418 and 1420 compare the received master station status with the last status as derived from the RAM memory. If the statuses are different, gate 1420 produces a logical one which is applied as one input ot NAND gate 1334 which then produces a logical zero at character 2, but period zero, period half zero, sub-periods 1 – 10. This output, inverted by inverter 1430 is applied to gate 1432 which then produces a logical zero causing a logical one to be applied as one input to NAND gate 1432 which then produces a logical zero at sub-period 1. The output of gate 1432 is applied to gates 1434, 1436, 1438, and 1440 which are connected respectively to gates 1380, 1382, 1384, and 1386, one of which is enabled to choose one of flip-flops 1370, 1372, 1374 or 1376. The enabled gate 1380, 1382, 1384 or 1386 enables the corresponding gate 1434, 1436, 1438 or 1440 to apply a clock input to change the status of the chosen flip-flop 1370, 1372, 1374 or 1376.

The inverted output of gate 1334 is also applied as one input to gate 1450 to cause that gate to produce a logical zero which is inverted and applied to gates 1452, 1454, 1456 and 1458 which are connected to flip-flops 1370, 1372, 1374 and 1376 which are enabled by gates 1380, 1382, 1384, and 1386, and the outputs of which are connected to lines 1340, 1342, 1344 and 1346 for writing the new statuses back into the RAM which the old status was derived along with the three unchanged stations from other master stations.

The output of gate 1334 also applies a logical one to the write inputs to RAMs 1300, 1302, 1304 and 1306 via inverter 1460. Further, on sub-period 4 when gate 1334 produces a logical zero, gate 1462 produces a logical zero to cause gate 1324 to produce a logical one and enable gate 1316, 1318, 1320 or 1322 to in turn enable the same RAM 1300, 1302, 1304 or 1306 from which the four statuses were derived. At this time, the statuses are written in via gates 1452, 1454, 1456 and 1458.

As mentioned briefly, if the addressed station has gone down since the last status check, three attempts are made to raise it. No response causes a logical one to be produced on line 1470 which is applied to gates 1472 and 1474, which are also connected to the outputs of flip-flops 1412. If the station was down last time and is down this time, gate 1474 produces a logical zero which is applied to line 1476 and which causes the data controller to move on to the next character. If the station was up last time and is now down, gate 1472 produces a logical zero which causes gate 1480 to produce a logical zero on line 1480 if three attempts have not been made. The signal on line 1478 causes the data controller to repeat the execute phase.

The output of gate 1472 also increments a counter comprised of JK flip-flops 1482 and 1484 which were reset during load. When the count therein reaches three, gate 1490 produces a logical zero causing the data controller to move to the next character and also disabling gate 1478. Gate 1492 is also activated to set bits zero and three of the C register. The gates generally indicated as 1496 compare parity and produce appropriate output signals. The gates generally indicated as 1498 control the timing for the buffer register during the execute phase. Gates 500 carry out the execute phase termination according to the truth table 7.

The circuitry shown in FIG. 12 includes the execute phase timing oscillator and frequency dividers for generating all timing signals utilized during the execute phase. The basic timing structure consists of characters which are sub-divided into 10 bit periods. Each bit period is further sub-divided into two period halves, and each period half is further sub-divided into sub-periods such that each period half has 10 sub-periods. The master oscillator is a 1 MHz circuit which is crystal controlled and which drives a sub-period counter directly such that each sub-period is 1 microsecond long. The bit period counter is decoded to furnish one of two timing sequences in addition to the 10 individual bit period signals. The timing sequences are designated $T_A$ and $T_B$. $T_A$ signifies that data bits are transferred during bit periods $\phi$, 1, 2, 3, 5, 6, 7, and 8. Timing sequence $T_B$ signified data is transferred during bit periods $\phi$ through 7 inclusive.

The individual sub-period, period half, bit period and character counters are shown along the top portion of FIG. 12. Immediately below each counter is decoding logic to decode to shift counter to develop the individual periods. The sub-period counter is decoded into one of ten sub-periods. The period half counter is decoded into one of two period halves, and the bit period counter is decoded into one of 10 bit periods. The character counter is decoded into one of seven characters with characters $\phi$, 1, 2, 3 and 4 being unique. The character counter then alternates between characters 5 and 6 since all characters beyond this point are data transfers either in the incoming or the outgoing direction, and all functions necessary for each character are similar.

The circuitry includes a divider which is synced to the sub-period counter and generates the 5-microsecond period pulses which drive the delay line shift register and propagation delay measurement counter in the receiver circuits of FIG. 8. The remaining logic in the Figure is devoted to control functions for the execute timing generator to initiate the next character to be executed or to initiate the execute phase.

Flip-flops 1600, 1602, 1604, 1606 and 1608 comprise the sub-period counter with the outputs decoded by the gates generally indicated as 1610. Flip-flop 1612 is the period half counter and flip-flops 1614, 1616, 1618, 1620 and 1622 define the bit period counter. The outputs of the bit period counter are decoded by gates 1624. Flip-flops 1630, 1632, 1634 and 1636 comprise the character counter with the output decoded by gates 1638. Gates 1640 and 1642 produce the timing sequence $T_A$ and $T_B$ respectively.

Signal divider 1650, driven by oscillator 1652 produces the signals for the receiver circuitry described above. Gates 1660, 1662 a 1664, 1665 and 1666 as well as monostable flip-flop 1668 reset the flip-flops at the required times.

Figure 13:
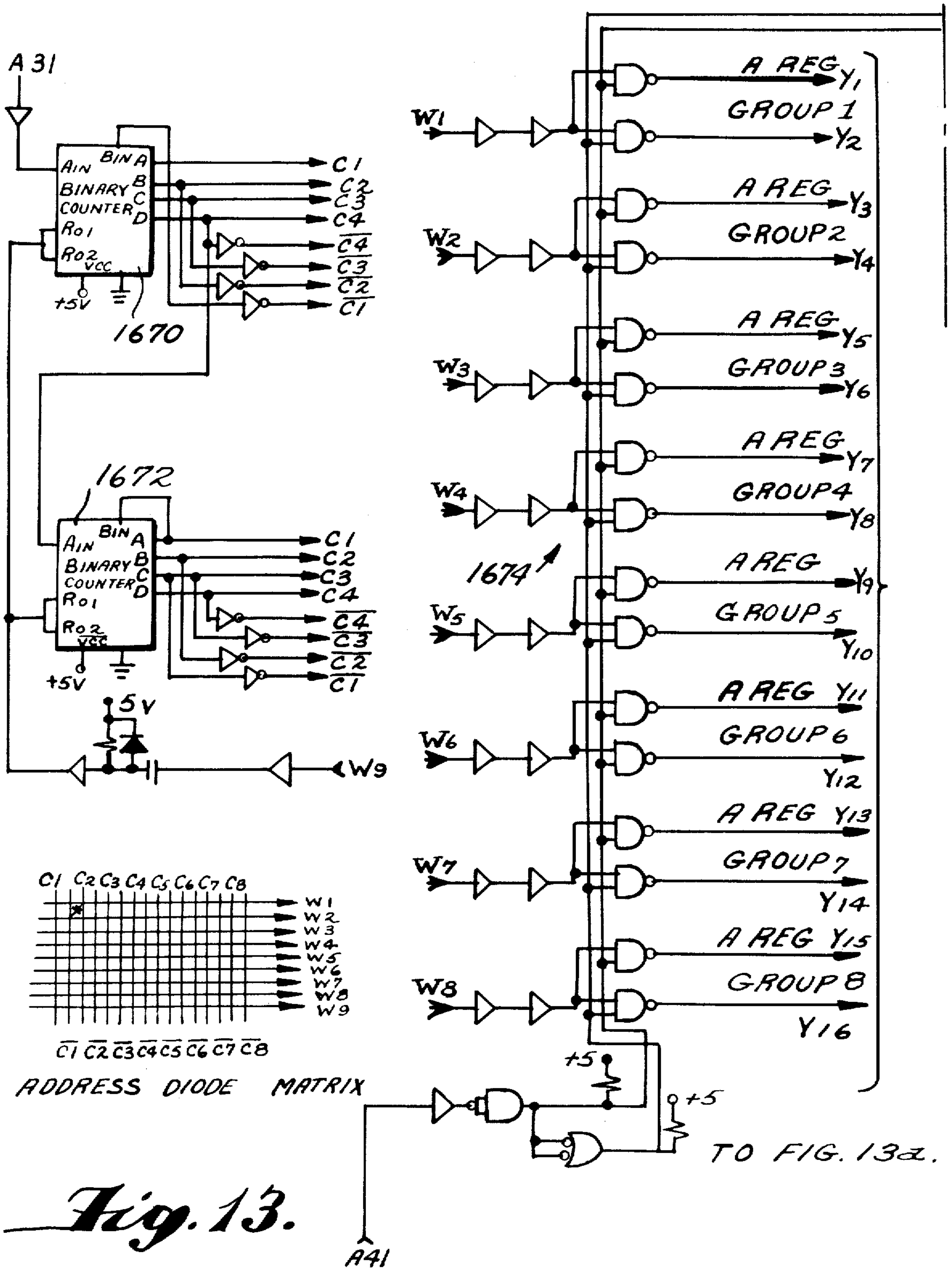
FIG. 13 and FIG. 13*a* show a detailed schematic of the read only memory of the data controller.
Figure 13A:
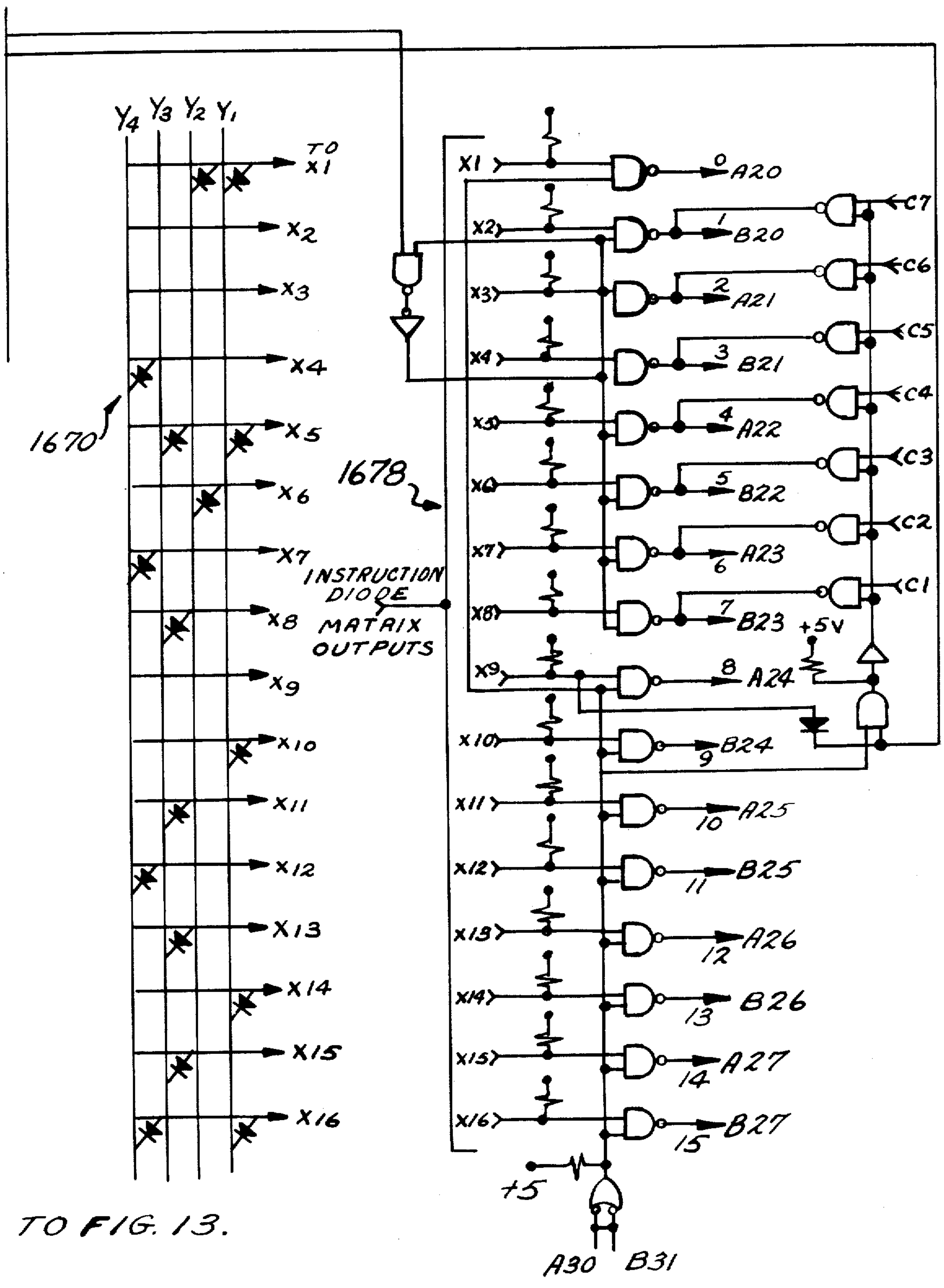
Figure 14:
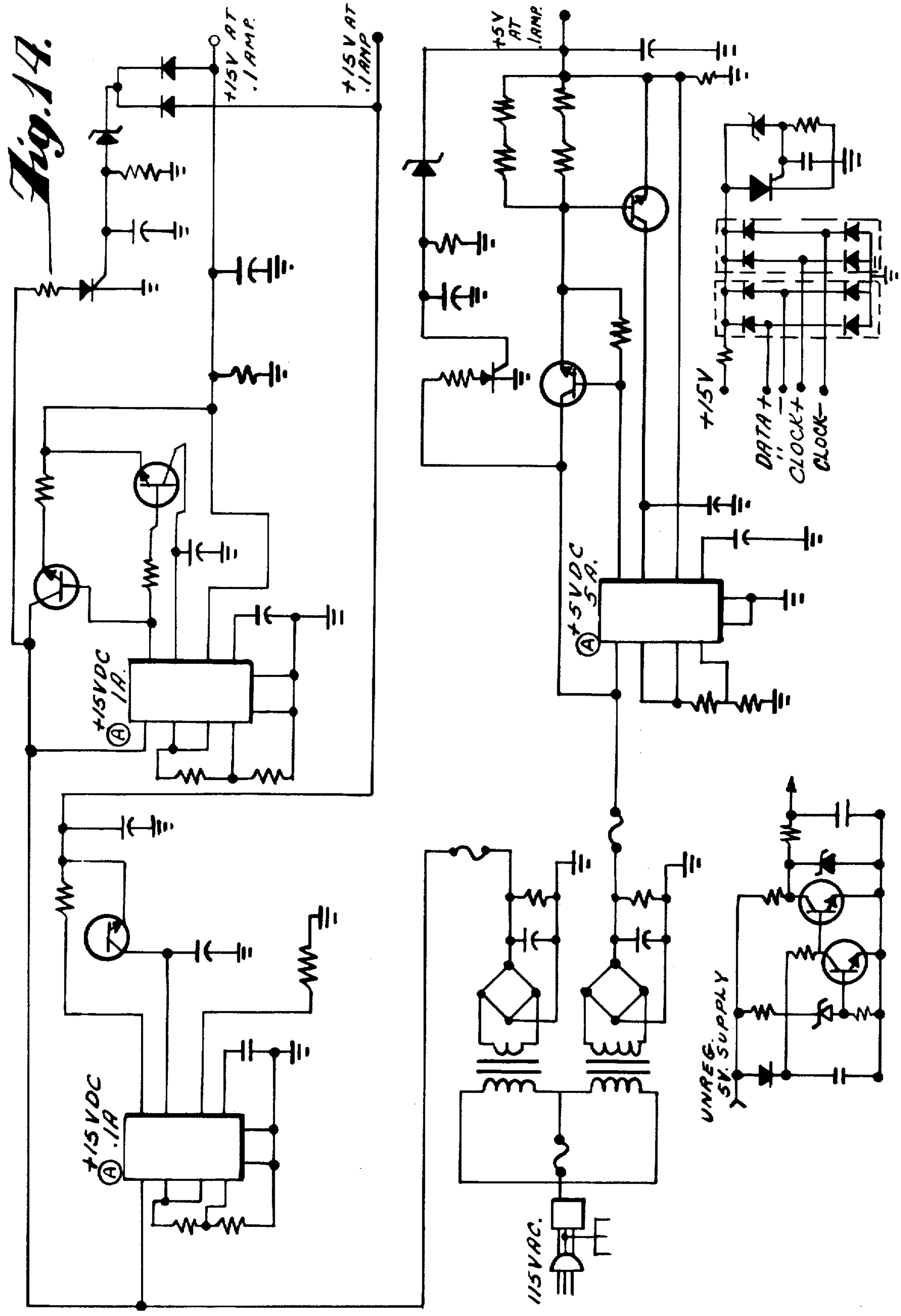
FIG. 14 shows a detailed schematic of the power supply for the data controller.

FIG. 13 shows the read-only memory from which the data controller determines the A register and C register values necessary to do interrupt data checks of master stations. To eliminate the necessity of having an A register and a C register value stored in read-only memory for each individual master station in the data system the types of master stations are grouped in address blocks of succeeding binary numbers. Thus, for example, in a system with eight or less master stations of one type, four or less of a second type, and four or less of a third type, the station address assignment might be ϕ through 7 for stations of the first type, addresses 8 through 11 for the second type, and 12 through 15 for the third type. All stations of the same type would require the same C register value and also the same instruction. In the least significant byte of the A register the read-only memory is designed such that the diode read-only matrix furnishes the C value, the least significant byte of the A register, and the most significant bit (line select) of the A register. The read-only address counters 1670 and 1672 furnish bits 1 through 7 of the A register (the address of the specific master station). The counter increment input is controlled by the data controller phase logic of FIG. 5, and the counter reset directly resets the address counter to zero when the station number of the highest station currently being checked has been serviced. Gates 1674 are utilized to decode the most significant bits of the binary counter necessary to establish a specific block of station addresses. These gates in turn drive the A register and C register select lines of the diode matrix. The diode matrix 1676 utilizes diodes which are inserted for logical zeros in the A and C registers. This matrix then drives an output logic gate which allows the read-only memory to be gated onto the data controller data bus. Gates 1678 are utilized to gate the individual master station addresses onto the data bus when the A register value is being gated onto the data bus.

It should be noted that master station addresses are assigned in blocks in ascending order from zero on upwards to the highest number necessary. The counter reset gate then decodes the next higher address block to reset the counter to zero to cause it to cycle again up through the block of stations being checked for interrupts by the data controller. If both data pairs are being utilized then the stations ϕ through 19 could be on the first data line and 20 through 30 on the second data line. Thus, if the same type of station is utilized on both data lines, the A and C register values for that station are repeated twice in the read-only memory—once for each line. It should be apparent from the discussion of the read-only memory that a unique diode matrix is utilized in each data controller to set up a specific data controller for a specific application.

MASTER STATION

Figure 16:
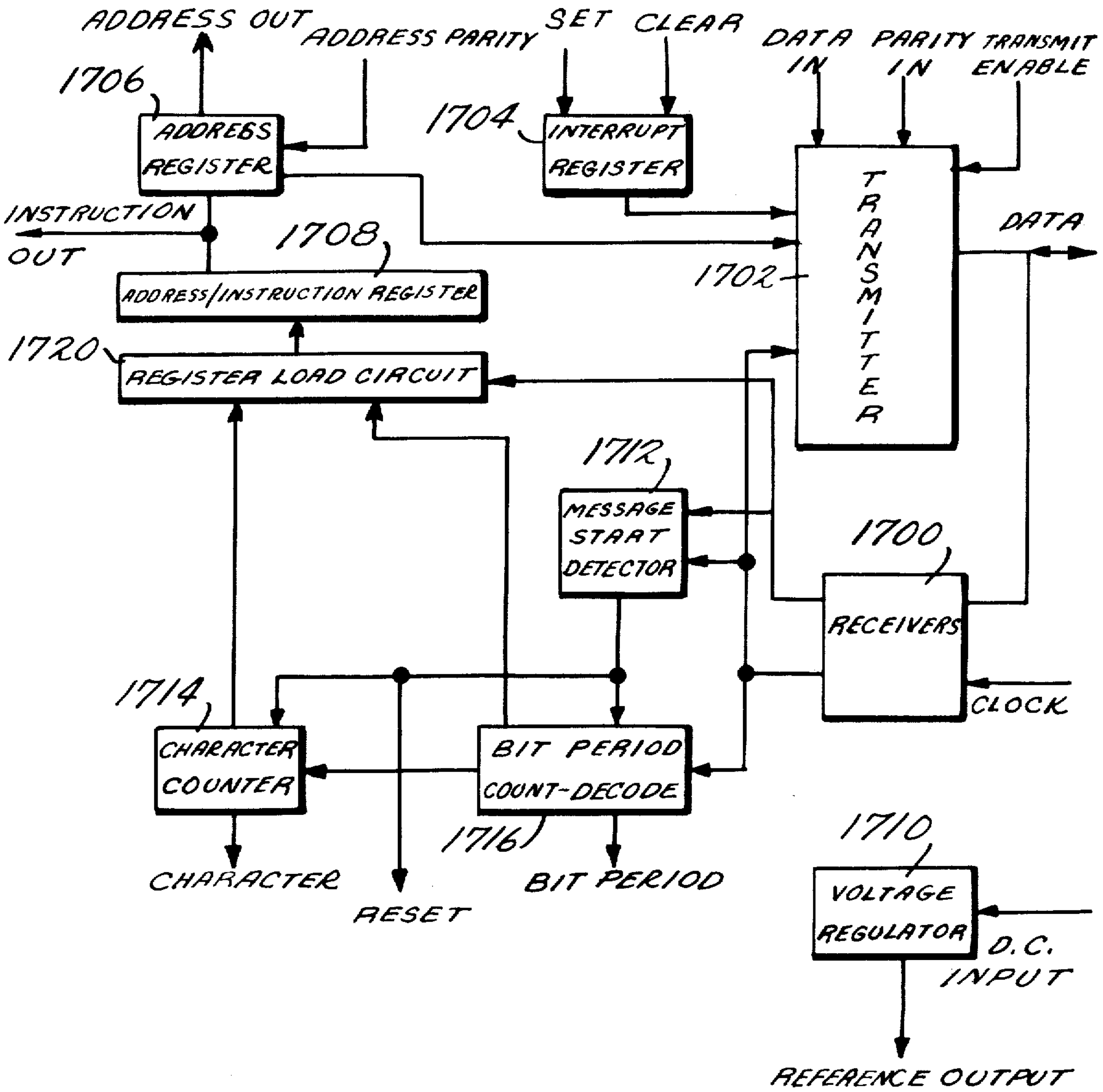
FIG. 16 shows a block diagram of a master station.
Figure 17:
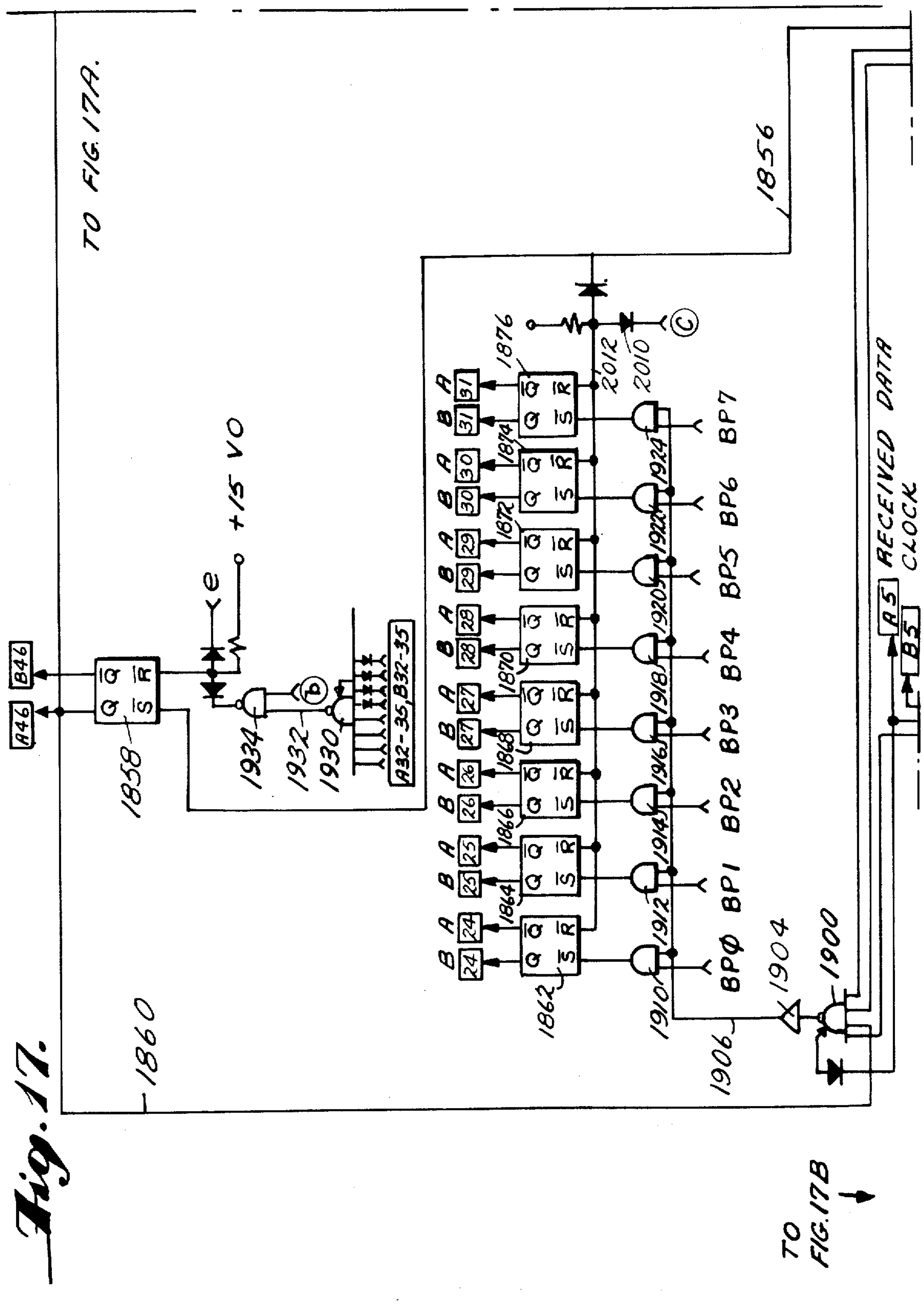
FIG. 17, comprising
Figure 17A:
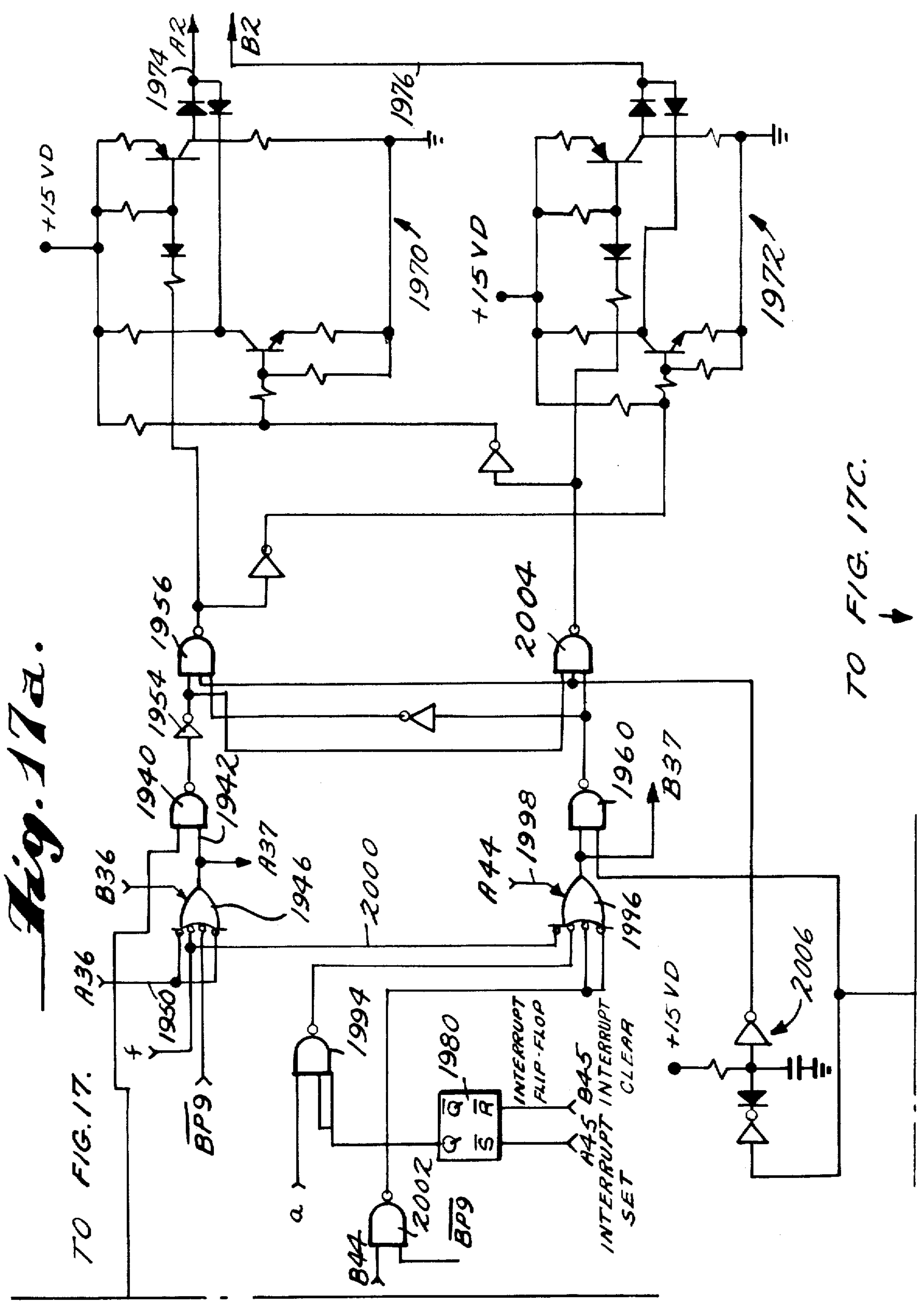
FIGS. 17*a*, 17*b* and 17*c*, shows a detailed schematic of part of the master station circuitry.
Figure 17B:
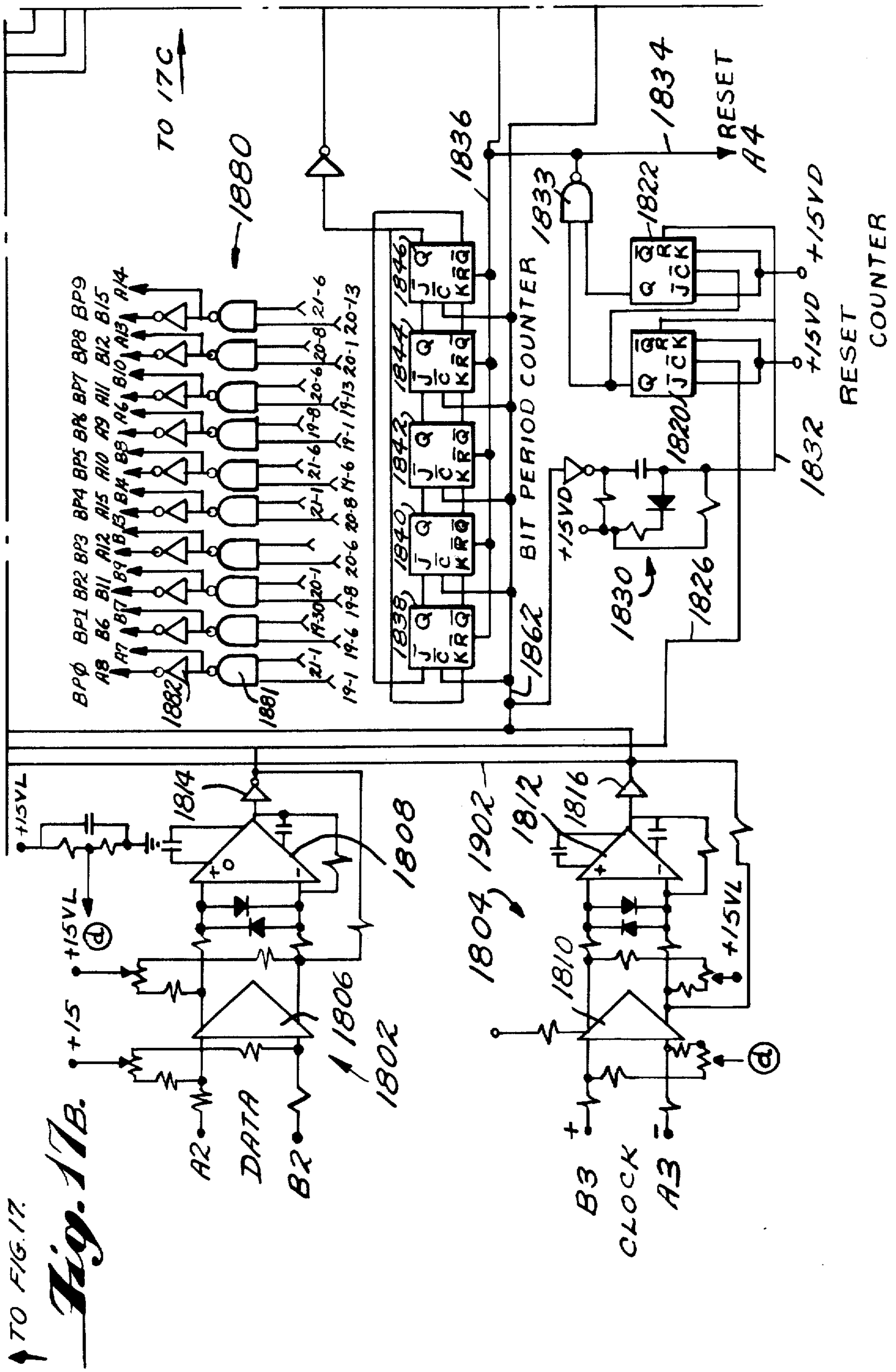
Figure 17C:
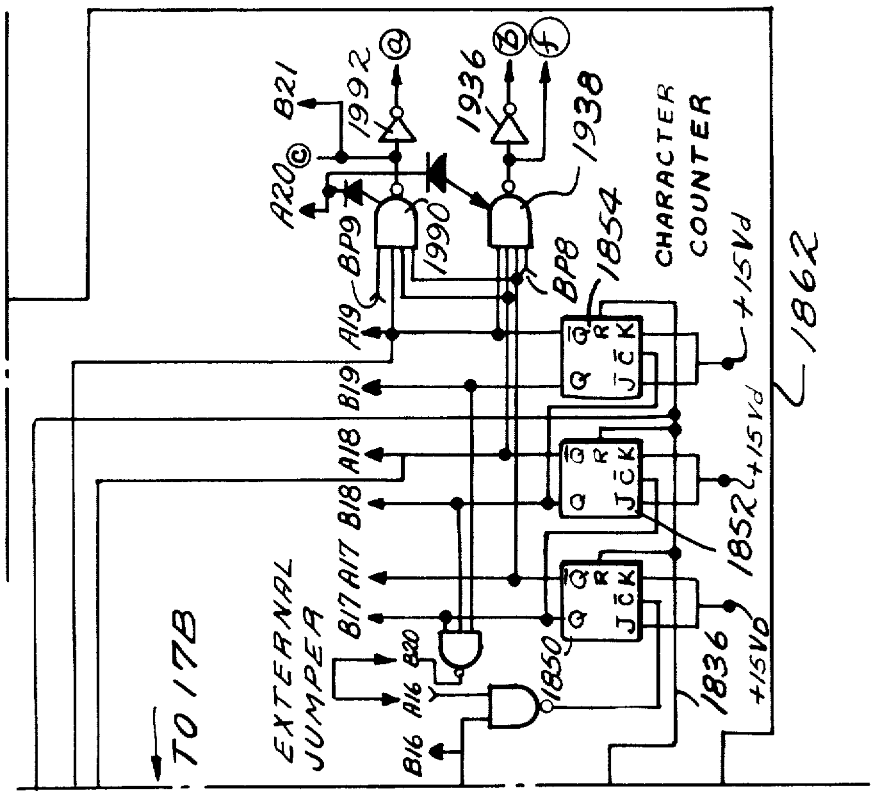

All master stations, be they keyboards, slave multiplexers or others, utilize the master station circuitry of FIGS. 16 and 17 combined with auxiliary circuitry to form the specific type of master station. As shown in FIG. 16, the master station includes line receivers 1700, data transmitter 1702, interrupt register 1704, station address register 1706, the address/instruction register 1708 and all necessary timing circuits for both the character and bit period determination. In addition, the master station has a voltage regulator 1710 which both provides reference voltage to the other circuits in the master station and also regulates voltages on the master station card itself.

Before discussing the specifics of the master station, it is useful to review how the master station operates with the data controller. All communications between a master station and the data controller are initiated by the data controller. A given message sequence consists of a data exchange between the data controller and a single master station. The message consists of a start-of-message signal, an address character, an instruction character, and some number of data characters up to a maximum of 32 data characters. The message is initiated by the data controller sending the start-of-message signal over the clock and data lines. This signal is detected by circuitry 1712 which resets both the character and bit period counters 1714 and 1716 of all master stations connected to the data controller. Next, the data controller transmits the address and the address parity check bit (odd parity) of the specific master station with which it wishes to communicate. The station addressed will recognize its address and set its address register. All other stations will have cleared their address registers. The station which is addressed will respond to the master station with a pulse during bit period 8. This pulse tells the data controller that the master station has received its address, and in addition allows the data controller to determine the signal propagation delay time for the station. The station then responds with the status of the interrupt register during bit period 9 of the address character. The data controller, next, transmits the eight bit instruction to the master station where it is retained in the address/instruction register until the completion of the message. On bit period 9 of the instruction character and all succeeding characters, the master station transmits to the data controller a parity check bit (odd parity) so that the data controller can determine whether information transmitted to the master station was received with correct parity. The data controller can terminate the message at any point in time. For instance, when the data controller is checking the master station to determine if interrupt data is present, and it finds that the interrupt register is not set, the data controller will terminate the message at the end of the address character.

Referring to the block diagram of FIG. 16, the receiver preferably consists of two differential line receivers which sense the data and clock signals. The clock and data signals are fed to the start-of-message detection circuit 1712 which determines that a new message is being initiated by the data controller. The start-of-message detector then resets the character and bit period counters and any other associated logic peculiar to the specific master station circuits appended to the master station circuitry. The bit period counter and decoder 1716, and the character counter 1714 determine the particular character and bit period within a given character for data steering purposes. By utilizing the decoded bit periods, the incoming serial data stream can be loaded into latches with simple gating. The data received during the address period is loaded into the 8 bit address/instruction register 1708 by load circuit 1720. At the end of bit period 7, a determination is made by the station as to whether its unique address and address parity been received or not. Initially, the station address register 1706 was set when the message start signal was received, and this register is then reset if the correct address for the particular master station was not received. If the station's address was received, then address register 1706 will enable the transmitter to transmit to the data controller during bit period 8 with a pulse and in bit period 9 with the interrupt register status. Transmitter 1702 generates a differential data signal on the data signal on the data pair during bit periods 8 and 9 of the address character in a return-to-zero data format which is synchronous with the received clock signal.

During the instruction character (character 2) the 8 bit instruction transmitted by the data controller is loaded into the address/instruction register 1708. The register then retains this instruction until a new start-of-message signal is detected. Thus, address/instruction register 1708 performs a dual function of deserializing the address information for determining if the station has been addressed and for holding the specific instructions for the station while the station interacts with the data controller. The actual instructions for the specific master station are decoded by the additional circuits added to the master station circuitry to form a specific type of master station.

Important inputs to the master station circuit are the interrupt register set and clear, the data input stream to be transmitted, the data parity input, and the transmit enable. All of the aforementioned signals are developed by the auxiliary circuits added to the master station circuitry to form a specific master station. Outputs from the master station to the auxiliary circuits include address register status, all bits of the address/instruction register, received clock and data signals, character counter status, decoded bit periods and bit period complements, and a reset signal which is activated by the start-of-message circuit.

The master station incorporates a voltage regulator 1710 which supplies regulated voltages to the master station circuitry and in addition supplies reference voltage to auxiliary circuits added to the master station circuitry so that only a simple series pass voltage regulator transistor is necessary to supply operating logic voltage to circuits on the auxiliary circuits.

The data and clock receivers are comprised of circuits which provide differential signal input detection with approximately 0.2 volts hysteresis and a plus or minus 10 volt common mode voltage range, and convert this received signal to a 15 volt logic signal. In addition, these logic outputs are fed back to generate the desired hysteresis in the data and clock receivers. A standard Johnson shift counter counts bit periods and bit period counter state decoding circuitry generates both the bit periods and their complements. All of these signals are provided as master station outputs for utilization on the auxiliary circuits used with the master station circuitry to comprise a specific type of master station. In addition, the decoded bit periods are utilized in the master station circuitry itself.

A character counter is incremented at the end of each bit period 9 and is preferably a simple ripple counter design with feedback such that it will lock up in the 1-1-1 state. There is an expansion provision on the counter such that it can be expanded on the auxiliary circuitry if necessary for a specific application. Character 0, bit period 8 and character 0, bit period 9 are decoded and the complement of this variable also provided for utilization in the master station circuitry.

The reset start-of-message detection circuit is a ripple counter which is reset to 0-0 each time a clock pulse is received in the master station. Data pulses cause the count to be incremented. When the count reaches the 1-1 state, a gate is enabled to generate the negative logic reset signal which clears all of the counter states plus any additional circuits desired in the auxiliary circuitry. Note that the reset coupling is A/C such that the positive edge of the received clock signal resets the counter and the negative edge of the received data signal causes the counter to be incremented.

The received address is checked during character 1, bit period 8 and if the correct address has not been received, the address register is cleared. Since the address bit period and character counters continue to increment upward in the counter until a new start-of-message signal is received, no further attempts will be made to modify the address register state. If the address register was not cleared by the address test, then the instruction will be loaded into the address/instruction register during character 2. The load gating for the address/instruction register is disabled from this point onward in time so that the instruction is maintained in the address/instruction register for the duration of the message. The specific station address is determined by taking either the variable output or its complement output from each state of the address register to obtain the binary address pattern desired and feeding the selected outputs into the inputs of a gate. A diode causes the address/instruction register to be cleared when the reset signal is generated by the start of message detector circuit and this diode clears the address register during bit period 9 of character 1. Thus the address/instruction register will contain all zeros for character 2 and all succeeding characters of the message if the station was not addressed during the address character.

The transmitter line drivers are differential drivers which can place either a logical high, a logical low or no load on the data lines. A negative logic OR function is performed at its inputs to enable the transmitter to drive the data lines. The output of this gate is positive logic which is ANDed with the status of the address register such that the transmitter can only be enabled when the address register is set. Whether the transmitter is enabled or not is determined by the auxiliary circuitry and its decoding of the received instructions. The transmitter is automatically enabled during bit period 9 of each character, assuming the address register is set, so that parity can be transmitted to the data controller. A negative logic OR is also performed on the transmitter data inputs to determine what data is transmitted when the transmitter is enabled, i.e. whether a logical one or a logical zero is transmitted. The interrupt register status is also transmitted during bit period 9 of character 1. A logical 1 pulse is transmitted by the master station during bit period 8 of character 1 when the station is addressed, and the transmitter is enabled by the master station circuits. Data inputs from the auxiliary circuits are brought into a gate as a positive logic data signal. The data parity signal is generated by the auxiliary circuits in negative logic from and connected to the expander node of gate 1996. The transmitter is capable of being enabled when the received clock signal is a logical one or for approximately 15 microseconds after the received clock signal makes its transition from a logical one to a logical zero. This time interval is necessitated by the fact that if a message is to be terminated at any point in time or if a station is to come on-line in a random manner, and be synchronized by the next start-of-message signal, then the data lines must not be loaded by the transmitter of any station. This is insured by the aforementioned circuit.

Reference is now made to FIG. 17 which shows a detailed schematic for the master station shown in block diagram in FIG. 17. Referring to FIG. 16, the data and clock signals from the data controller as discussed above are received by two conventional receivers 1802 and 1804 which are comprised of two conventional sets of operational amplifiers 1806 and 1808 and 1810 and 1812, respectively. Inverters 1814 and 1816, respectively, provide digital drive capability for the data and clock receivers 1802 and 1804.

As mentioned above, and according to one aspect of this invention, the start of the message signal is comprised of a plurality of pulses on the data line, with no corresponding pulses on the clock line and the master station shown in FIG. 17 recognizes this as the start of message and prepares to receive the address and the instructions following that address. This is accomplished through the use of a conventional counter circuit comprised of JK flip-flops 1820 and 1822 which are connected in a simple ripple counter design. The counter is incremented via line 1826 for each pulse received by the data receiver 1802 and similarly re-set by each pulse received on clock receiver 1804 and applied to the counter comprised of flip-flops 1820 and 1822 via circuit 1830 which applies a pulse to the reset line 1832 on the trailing edge of each clock pulse. Thus the counter is incremented on a positive leading edge of a data pulse and then reset on the trailing edge of a clock pulse.

While the start of message signal is being received, the counter comprised of flip-flops 1820 and 1822 is incremented to a count of 1-1, applying logical one inputs to NAND gate 1833 so that NAND gate 1833 produces a logical zero output on line 1834 which is applied via line 1836 to each of the reset inputs of flip-flops 1838, 1840, 1842, 1844 and 1846. These flip-flops, as discussed below, form a bit period counter which is incremented by the clock pulses to provide timing in the master station. Further, the logical zero applied via line 1836 is also applied to the reset input to flip-flops 1850, 1852 and 1854 which comprise the character counter and via line 1856 to the set inputs of address register 1858, so that flip-flop 1858 is set to produce a logical one on line 1860. The logical zero thus applied to line 1856 also operates to apply a logical zero to the reset inputs of flip-flops 1862, 1864, 1866, 1868, 1870, 1872, 1874 and 1876 which, as will be discussed below, receive the address and instruction signals in the characters transmitted after the start of message signal, and compare the address received with the address of the master station to determine whether that station should respond.

As discussed briefly above, the message character which is transmitted to the master station following the start of message signal is comprised of bits 0–7 which indicate the address of the station being interrogated. The bit counter comprised of flip-flops 1838, 1840, 1842, 1844 and 1846 is a standard Johnson shift counter design and provides a count from 0 to 9 of the bits received on the data line by incrementing the counter once for each pulse received by clock receiver 1804 and applied to the counter on line disc 1862. NAND gates 1880 are connected to the outputs of the bit counter comprised of flip-flops 1838, 1840, 1842, 1844 and 1846 to provide a decoded complement output for each bit count between zero and nine. Each of these outputs is further inverted to provide a true output signal as shown. Thus, during bit period zero, the two inputs to NAND gate 1881 are both logical ones, producing a logical zero output which represents BP$\phi$ and that signal is inverted by inverter 1882 to provide a logical one during a bit period zero. Similar signals are provided for bit periods 1 through 9.

The character counter comprised of flip-flops 1850, 1852 and 1854 is incremented at the end of each bit period nine and is a simple ripple counter design with feedback such that the counter will lock up in the 1-1-1 state. The counter can be expanded on an auxiliary circuit if necessary or desirable for a specific application; this counter provides an indication of which character is being received by the master station.

After the start message has been received and address flip-flop 1858 set as discussed above, a logical one exists on line 1860 and is applied as one input to expandable NAND gate 1900. Another input to NAND gate 1900 is connected to the output of clock receiver 1804 via line 1902 so that this input likewise assumes a logical one during the time that each successive clock pulse is received. The other two inputs to NAND gate 1900 are connected respectively to the outputs of flip-flops 1852 and 1854 and these outputs likewise will be in the logical one condition while character counter 1850, 1852 and 1854 is in its initial state indicating the address and instruction character. The data signals received by receiver 1802 are coupled to the expander input to gate 1900. The expander input diode creates one additional input to cause gate 1900 to function as a five input NAND gate. (The expander input diode creates one additional input to cause gate 1910 to function as a five input NAND gate.) Thus, when all the inputs but the data input to NAND gate 1900 are in the logical one state, the output of gate 1900 varies as the complement of the data input. Thus the positive logic data pulses appear at the output of inverter 1904 are applied to line 1906. Line 1906 is in turn connected to each of a plurality of NAND gates 1910, 1912, 1914, 1916, 1918, 1920, 1922 and 1924 with the other inputs being connected of the outputs to NAND gates 1880 such that upon successive bit periods, NAND gates 1910, 1912, 1914, 1916, 1918, 1920, 1922 and 1924 have logical ones successively applied to their input not connected to line 1906 so that the output of these gates 1910, 1912, 1914, 1916, 1918, 1920, 1922 and 1924 varies in accordance with the complement of the signal on line 1906 which in turn varies with the data signal received from receiver 1802 from the data controller. The outputs of gates 1910, 1912, 1914, 1916, 1918, 1920, 1922 and 1924 are successively loaded into flip-flops 1862, 1864, 1866, 1868, 1870, 1872, 1874, and 1876 which were start-of-message by the reset counter comprised of flip-flops 1820 and 1822, and which thus store the address which has been transmitted to the master stations by the data controller. It should be noted that each of the master stations including those which are not addressed will store the transmitted address in their address instruction register.

The outputs of flip-flops 1862, 1864, 1866, 1868, 1870, 1872, 1874 and 1876 are applied to a further NAND gate 1930 with the inputs being received from some combination of reset flip-flop outputs and set flip-flop outputs. The pattern of set and reset outputs, of course, represents the identity of the station such that when the address in flip-flops 1862, 1864, 1866, 1868, 1870, 1872, 1874 and 1876 corresponds with the address set as the inputs to gate 1930, gate 1930 produces a logical zero output on line 1932 which is applied to NAND gate 1934. The other input to NAND gate 1934 is connected to the output of inverter 1936 which in turn receives the output of NAND gate 1938. The inputs to NAND gate 1938 are connected to flip-flops 1850, 1852, and 1854 such that these three inputs will all be a logical one while character one is being detected and further to the output of the bit period 8 NAND gates 1880 so that the output of NAND gate 1938 assumes a logical zero only during bit period 8 of character one and likewise a logical one is applied to one of the inputs to NAND gate 1934 to in effect check during bit period 8 of character one the address which has now been received against the address of the station. If the address in the register consisting of 1862, 1864, 1866, 1868, 1870, 1872, 1874 and 1876 does not correspond with the address wired as the inputs to NAND gate 1930, NAND gate 1934 will have two logical ones as inputs and will produce a logical zero output which operates to apply a suitable signal to the reset input to address flip-flop 1858 to reset that input. However, if NAND gate 1930 produces a logical zero indicating correspondence, then the output of gate 1934 remains a logical one during the bit period 8 and address flip-flop 1858 is not reset.

As mentioned briefly above, the master station addressed by the data controller responds during bit period 8. The output of address flip-flop 1858 is also applied as one input to NAND gate 1940 together with a second input on line 1942 which is connected to the output of NAND gate 1946. The inputs to NAND gates 1946 are connected to the output of the inverted bit period 9 flip-flop and to the output of gate 1938. The other two inputs are connected to the enable inputs of line 1950 and these inputs will be a logical one when the equipment is functioning properly, so that gate 1946 will produce a logical one during both bit period 8 and bit period 9, and a logical zero during the remainder of character 1. The output of gate 1940 is inverted by inverter 1954 and applied as one input to NAND gate 1956, so that this input will be a logical zero during bit period 8 and bit period 9, and a logical one for the remainder of the character 1 bit periods.

Another input to NAND gate 1956 is the inverted output of NAND gate 1960. Gate 1960 which, as discussed below, in in a logical zero condition during bit period 8 so that the inverted output of gate 1960 is a logical one during bit period 8 so that the output of NAND gate 1956 is a logical zero during bit period 8. The outputs of NAND gates 1956 and 2004 are applied to the two conventional tri-state differential drivers 1970 and 1972. Drivers 1970 and 1972 are connected to the pair of data lines 1974 and 1976 as shown to transmit data back to the data controller. Thus the master station addressed sends a pulse back to the data controller acknowledging receipt of its address during bit period 8. If the interrupt register is set, a second pulse signal is sent during bit period 9 indicating that the interrupt flip-flop 1980 is set. The bit period 8 pulse sent to the data controller as discussed above also lets the data controller determine the signal propagation delay time for the master station.

The inverted output of NAND gate 1990, which as mentioned above, produces a logical zero output only during bit period 9 of character one, as inverted by inverter 1992, is applied as one input to a NAND gate 1994 with the other input connected to the output of interrupt flip-flop 1980 such that the output of NAND gate 1994 is a logical zero during bit period 9 of character one if the interrupt flip-flop 1980 is set. The output of NAND gate 1994 is applied as one input to an expanded NAND gate 1996 to which is also connected via line 1998 the circuitry which produces the data parity signal which is transmitted to the data control station during bit 9 of both the instruction character and data characters. A further input to NAND gate 1996 is connected to the output of NAND gate 1938 via line 2000 and this input assumes a logical one except during bit period 8 of the address character. The other inputs to gate 1996 are connected to the output of NAND gate 2002 which has as its input the output of NAND gate 1982 which is a logical one except during bit period 9. The other input to gate 2002 is connected to the data source which will be a logical one if there is a data 1 to convey to the data controller. Thus during bit period 9, NAND gate 2002 blocks any data inputs from the auxiliary circuitry to present interference with the parity signal applied via line 1998.

As mentioned above, the data parity signal is coupled to the expander input of gate 1996 for transmitting the parity signal during bit 9 of the character. The output of gate 1996 is applied as one input to gate 1960 with the other input connnected to the output of clock receiver 1804 so that, if the output of gate 1996 is a logical one, gate 1960 produces a logical zero during the first half of the bit period and a logical one during the second half of the bit period to generate a return to zero data signal. This signal is applied to further gates 2004 and 1956 to drive the differential line drivers if they are enabled by (1) gate 1946 and its associated logic, and (2) the output of circuitry 2006 which operates to allow the station to enable the differential line drivers for a given time, for example 15 μsec after the receive clock signal makes its transition from a logical one to a logical zero. This time interval is necessitated by the fact that if a message is to be terminated at any point in time, of if a station is to come on line in a random manner and be synchronized by the next message-start signal, the lines must not be loaded by the transmitter of any station, during the start-of-message sequence, and this is assured by circuitry 2006. The output of NAND gate 1990 is also applied via diode 2010 to reset line 2012 to reset flip-flops 1862, 1864, 1866, 1868, 1870, 1872, 1874 and 1876 so that those flip-flops then can receive the instructions received in the character one as is mentioned briefly above.

Figure 18:
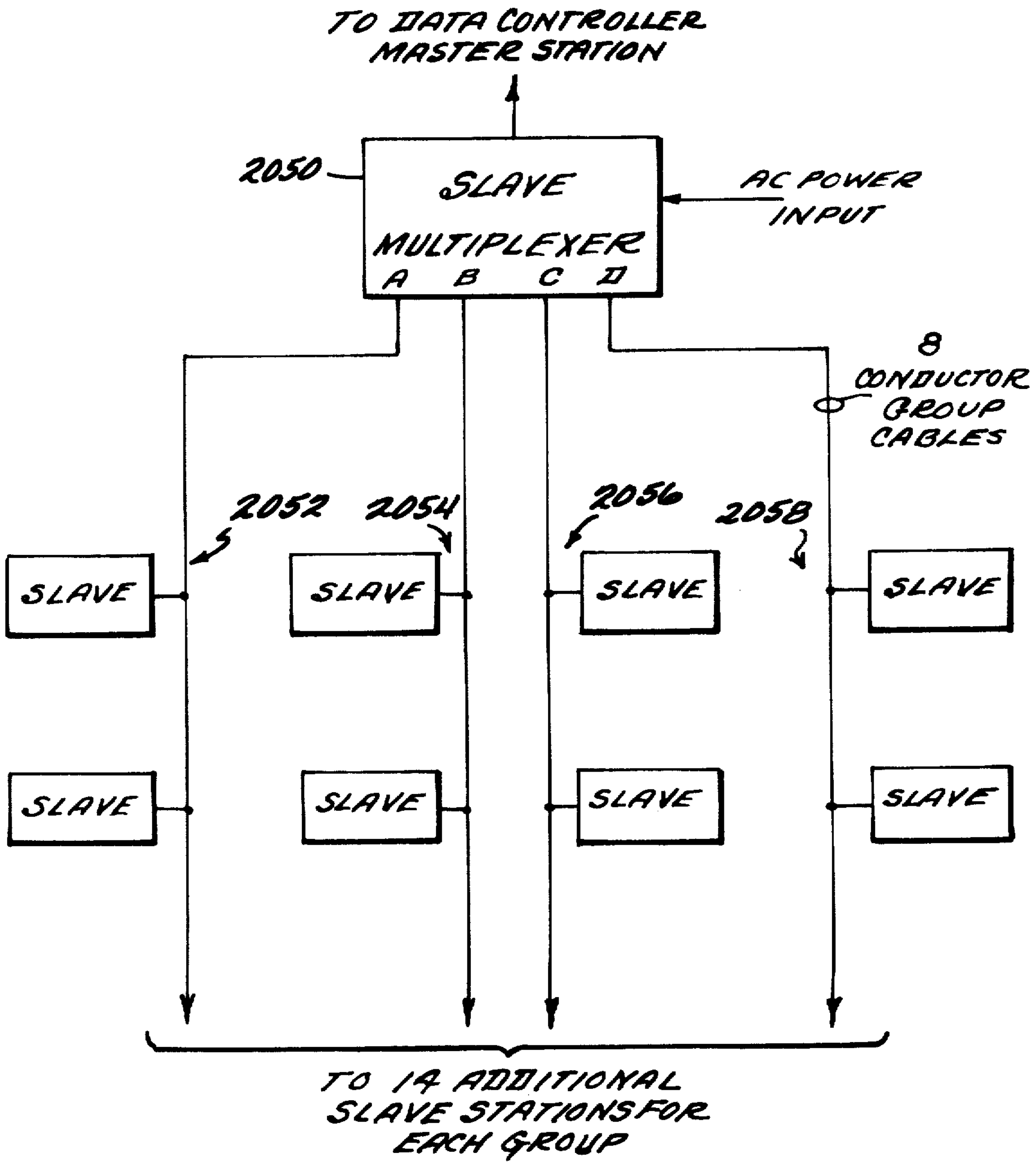
FIG. 18 shows a block diagram of a slave multiplexer master station.

Referring now to FIG. 18, the slave multiplexer is a master station which controls up to 64 machine monitoring and/or control or other type of slave stations and which perform the following functions in the system:

1. The slave multiplexer allows the data controller to communicate with a single slave station to either output data to that station or acquire data from the station.
2. The slave multiplexer monitors the operating status of the 64 slave stations assigned to it and reports to the computer via the data controller any changes in operating status of any of the 64 stations.
3. The slave multiplexer checks the individual slave stations for interrupt data transfers and sets its interrupt flag to cause a data transfer between the slave station requesting the data transfer and the data controller the next time the slave multiplexer is serviced for interrupt data by the data controller.

4. The slave multiplexer supplies operating power to the slave stations so that local power supply connections are not necessary for each individual station.

FIG. 23 illustrates the timing relationships for the slave multiplexer-data controller-slave station for each of the above modes of operation.

The slave stations are organized around the slave multiplexer station 2050 in four groups of 16 stations 2052, 2054, 2056 and 2058 each as shown in FIG. 18. A single 8 conductor cable supplies both power and signals to a group of 16 stations. All 16 stations in a single group are installed in parallel on the 8 conductor cable. The stations on a given cable are numbered in binary 0–15 inclusive and the four cable groups are lettered A, B, C and D. The slave multiplexer is connected to the data controller on the two pair cable in parallel with other master stations. In addition, 117 volt A/C power is supplied to the slave multiplexer to furnish operating power. The individual slave station cables are each limited to a maximum run of approximately 500 ft.; the exact length of run is dependent on the cable capacitance, machine station, power consumption, and the cable resistance.

The slave stations are capable of both transmitting data to the slave multiplexer for transmission to the data controller or receiving data from the data controller via the slave multiplexer. Thus, the slave stations can be used either for data input only or for both data input and for receiving control information from the computer. The specific design of the individual slave stations determine whether they can in fact receive information from the data controller. Regardless of the slave capability, various combinations of different slave stations can be intermixed on the same cable without any special precautions or modification of the other stations on the cable.

To understand the operation of the slave station multiplexer, assume that none of the slave stations are requesting an interrupt data transfer. Each time the slave multiplexer receives a start-of-message signal from the data controller, it will generate a new four-bit slave address code internally and simultaneously address a slave station with the particular code just generated on each of the four data cables. During character one, after each start of message signal, the slave multiplexer will address one station on each line and sequentially check the A, B, C and D lines to determine whether the station on each of those lines is in fact requesting an interrupt data transfer and/or has changed operating status. If the slave multiplexer finds neither of these has occurred at any of the four stations, it then assumes an inactive state until the next start of message signal is received unless it was the station addressed. When the next start of message signal is received, the slave multiplexer will increment the previous address by one and proceed to address simultaneously station one station on each of the four lines and check that station for the same information. This sequence continues until a station which has changed status and/or has an interrupt data transfer request is found. The slave multiplexer timing diagrams of FIG. 23 serve to clarify this and the succeeding operating descriptions.

Assume that station 4, on line B has an interrupt data transfer request. When the slave multiplexer receives the start of message signal and internally generates station address 4, and addresses station 4 on each of the 4 data lines, it then checks the A line station, and, finds no reason for initiating a data transfer with that station. Next, it checks the B line and finds an interrupt data transfer request from station 4 on the B line. The slave multiplexer then sets its interrupt flag, locks its station address circuits, and sets an internal flag to indicate that the station on line B must be serviced. Each time a start of message signal is received, the slave multiplexer will address station 4 again, but since it has already determined that the B station must be serviced, it will take no action other than to keep repetitively addressing the station until a start of message signal addressed to the particular slave multiplexer being described is initiated by the data controller.

When the data controller addresses the slave multiplexer to check for an interrupt service request and finds its interrupt flag set, it will output the interrupt service instruction to the slave multiplexer. The slave multiplexer will then respond to the data controller with the identification for the station to be serviced by giving the data controller both the slave station number and slave group identification. The slave multiplexer then serializes out the first four bits of data received from the slave station. After this four bits has been serialized, the slave multiplexer will cause the slave station to place its next four bits of data on the data lines to be serialized back to the data controller. This continues until the data controller terminates the message to end communication with the particular slave station.

When the slave multiplexer receives the next start of message signal it will check station 4 of group C to determine if it has an interrupt flag set of has had a change of status. If it were to find that this station had its interrupt data flag set, then the slave multiplexer would go through the same sequence of events until this station had been serviced. This operation continues with station 4 of group D and then with all groups for station No. 5, etc., until another data transfer need is determined.

Next, assume that the computer desires to either output data to or read data from a specific slave station. The computer outputs the appropriate message to the data controller. When the data controller executes this message, it will address the slave multiplexer serving the particular slave station which it desires to work with and then output an instruction to the slave multiplexer which identifies the operation it desires to do and the station number and group identification of the specific station to be worked with. When the slave multiplexer receives this information, it addresses the appropriate slave station numbers in the four groups and then works with the specific group which contains the station designated by the computer via the data controller. If data is being transferred out to the station, the slave multiplexer converts the serial data to four bit parallel format and outputs this data to the slave station. The slave multiplexer also generates parity on the data it received from the data controller and transmits data parity verifications back to the data controller for each byte of data received. For acquisition of data from the slave station by the data controller, the slave multiplexer addresses the station and causes the station to transfer its data to the slave multiplexer where it is serialized back to the data controller.

If the particular station addressed by the data controller for data output has its interrupt flag set, the output operation will not change or affect the pending station's request for data transfer in any way. However, if a slave station has its interrupt flag set and the slave multiplexer is directed by the data controller to read out the contents of that slave station, then the station's interrupt flag will be cleared by the fact that its data will have been read out. The slave multiplexer circuits are so constructed that if an interrupt flag of one station fails in the service request on-state, this station will be serviced every time it is checked; however, all other stations on the particular slave multiplexer will be given a chance for service prior to reservicing the station on which the interrupt flag has failed.

Communications between the slave multiplexer and individual slave stations are by unbalanced data transfer lines. The 8 conductor cable which services 16 machine stations has its conductors assigned as follows:

4 conductors for bi-directional data transfer
1 conductor for clock information
1 conductor for slave station transmit data or receive data select
2 conductor for D.C. supply voltage and ground.

The slave multiplexer has a single data line driver which drives all four data lines of a given bit significance for each of the four slave groups. The data lines are designated data 0, data 1, data 2 and data 3. Thus, the slave multiplexer has a single driver on the data 0 line of all four slave groups. The transmit-receive driver is common for all four groups; however, each group has an individual clock driver. By selectively activating the clock in one of the four groups, this allows the slave multiplexer to work with any given station in one group without affecting stations of the same number in each of the other three groups.

Slave station status change determination is accomplished by having a memory circuit in the slave multiplexer in which the last observed operating status of each slave station is stored. When slave stations are addressed, the present operating status of a station is compared with the last operating status obtained from that station, and if the stations differ, an interrupt flag is set to cause the particular station's data to be transferred to the data controller.

Since the data controller is doing interrupt service checks the majority of its time and finding the interrupt flag not set at the master station it is currently checking, the start of message signal is repeated approximately 4,000 times a second. Thus, an individual slave station is checked approximately 250 times a second for a power status change and/or its interrupt flag being set. It is important to note that when more than one slave multiplexer is involved in a system, a very efficient checking of a large number of stations is accomplished because each time a start of message signal is transmitted by the data controller, each slave multiplexer checks four machine stations. Thus, if one station in 640 has an interrupt, it will be located within a few milliseconds after the interrupt occurs. This is a far more efficient system for determining station interrupts than having all stations on a common cable, where 640 checks would have to be made before a stations interrupt status was determined.

It should be noted that the duration of data transfer from a slave station to the data controller is determined by the data controller and that the slave multiplexer simply serves as a switching network to allow a specific slave station to communicate with the data controller. This fact allows the data controller to modify the data sequence length with a given slave station to bring back a different number of bytes of data from the slave station then the number of bytes normally serviced from the majority of slave stations on the multiplexer. This is accomplished by having the individual slave station send back two bits in its data stream which can cause the sequence length to be modified. The data controller analyzes these two bits to determine whether the data message length should be modified for the slave and, if so, whether the total message length should be 8, 16, or 24 bytes of data. This feature allows special purpose functions such as keyboards, input/output display devices, or teletype controllers to be intermixed with machine monitoring stations on the same slave multiplexer without regard to special assignments of station numbers, or any modification to other stations on the slave multiplexer.

The communication between the slave multiplexer and the individual slave stations is by means of six signal conductors and a common ground line. An eighth conductor supplies DC voltage to the stations. The conductor assignments are as follows:

| Conductor No. | Utilization |
|---|---|
| 1 | Positive voltage supply |
| 2 | Ground (Common) |
| 3 | Clock signal |
| 4 | Transmit/receive select |
| 5 | Data line φ |
| 6 | Data line 1 |
| 7 | Data line 2 |
| 8 | Data line 3 |

The four data lines are utilized for bi-directional data transfers. Slave station addresses and data output to the slave stations is transmitted from the slave multiplexer to an individual station over the lines. In addition, an individual slave transfers its data over these lines for relay by the slave multiplexer. All the data transfer over the data lines is by current sinking logic. This means that the signal conductor is shorted to ground at the transmitting end and the voltage drop across a pull-up resistor at the receiving end is sensed. The total pull-up resistance distributed over a given data line is less than 300 ohms. The exact value depends on the number of stations connected to the lines since each station contributes 15K ohms to the total parallel resistance.

The clock and transmit/receive select (T/R Select) lines are utilized to transmit signals from the slave multiplexer to the individual stations. The slave multiplexer utilizes both sinking and sourcing devices to drive these lines to achieve short signal transitions times on the cable. The particular drivers used are capable of both sinking and sourcing in excess of 160 ma into each sixteen-station cable.

To allow installation of the system without resorting to heavy power and ground conductors the system is designed to allow a total of 9 volts IR drop in the power and ground circuits and still maintain the 7 volts noise immunity desired above and below the switching threshold. The positive voltage supply and the signal output circuits are connected to a +24 volt DC bus within the station controller. Each machine station regulates its voltage to the 15 volts necessary for its operation via a series pass regulating circuit.

Figure 19:
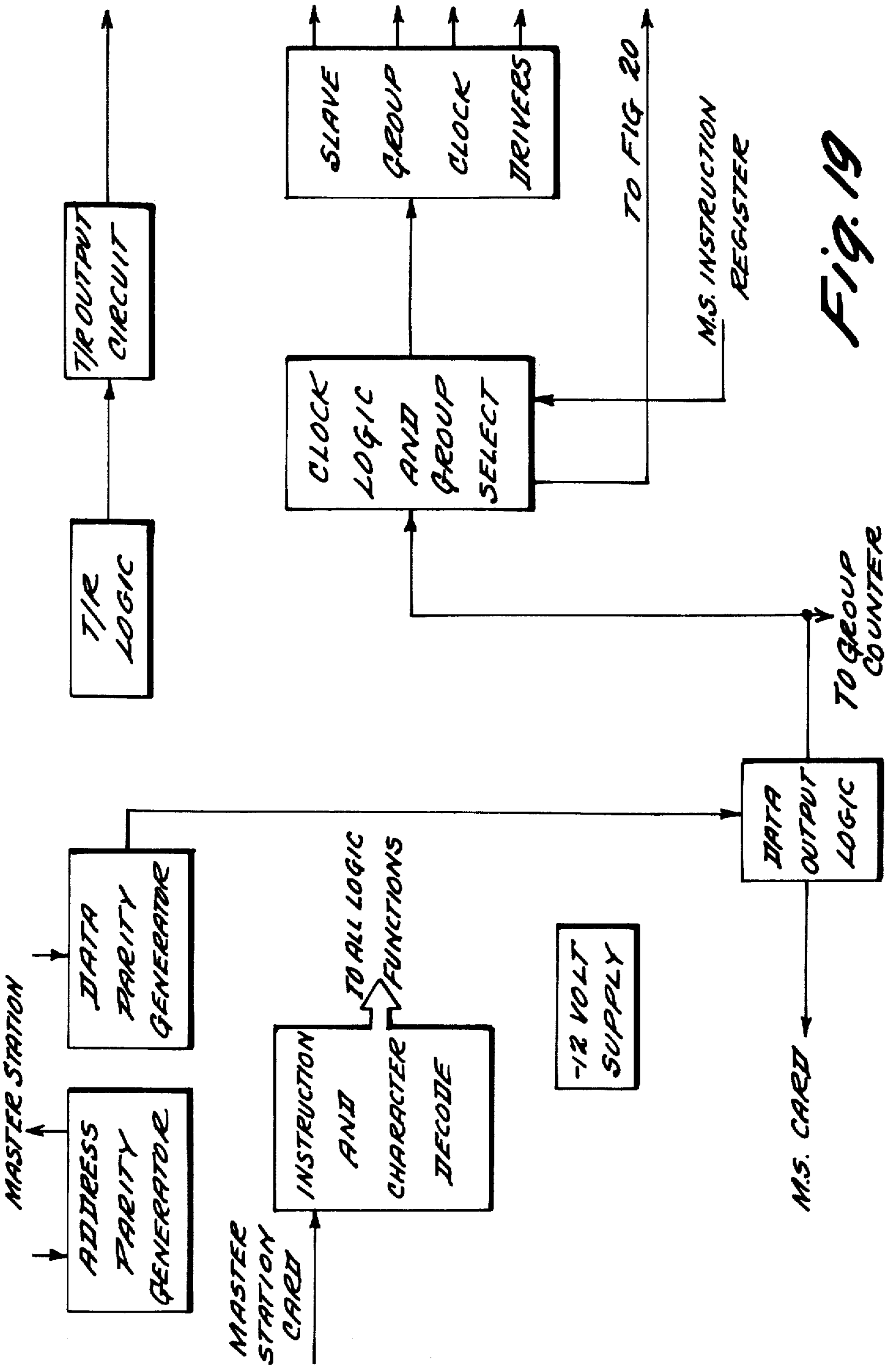
FIG. 19 shows a block diagram of a first portion of the slave multiplexer.
Figure 20:
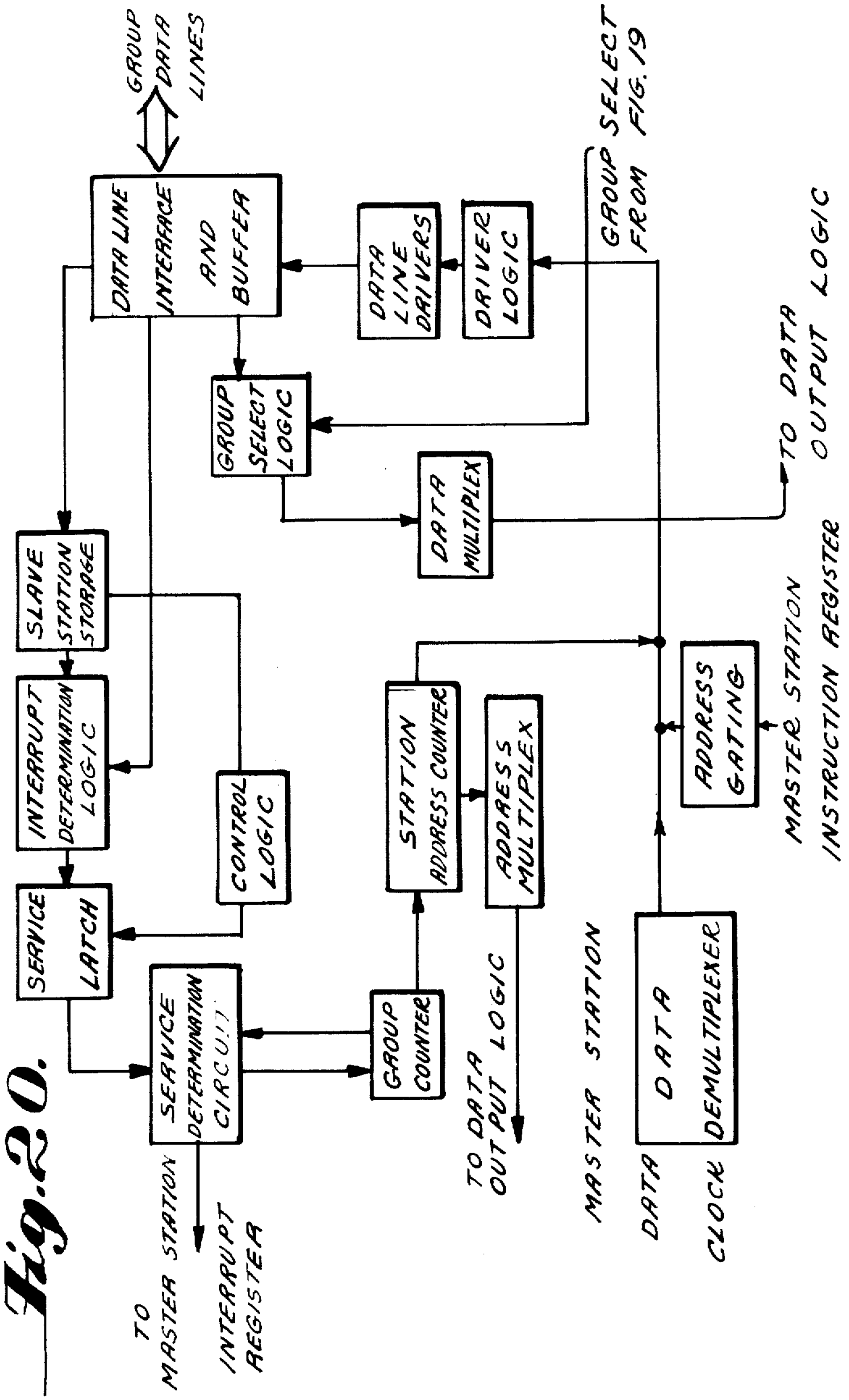
FIG. 20 shows a block diagram of a second portion of the slave multiplexer.

The slave multiplexer consists of a master station circuit with auxiliary circuitry to provide the slave station control and slave station data handling capability of the slave multiplexer. The slave multiplexer circuits are synchronized to the timing of the master station circuit and all slave multiplexer functions are synchronous with the master station circuit bit period and character counters. In addition, the slave multiplexer operating instructions are decoded from the master station circuit address/instruction register. The special slave multiplexer circuits are shown in block diagram form in FIGS. 19 and 20.

Figure 21:
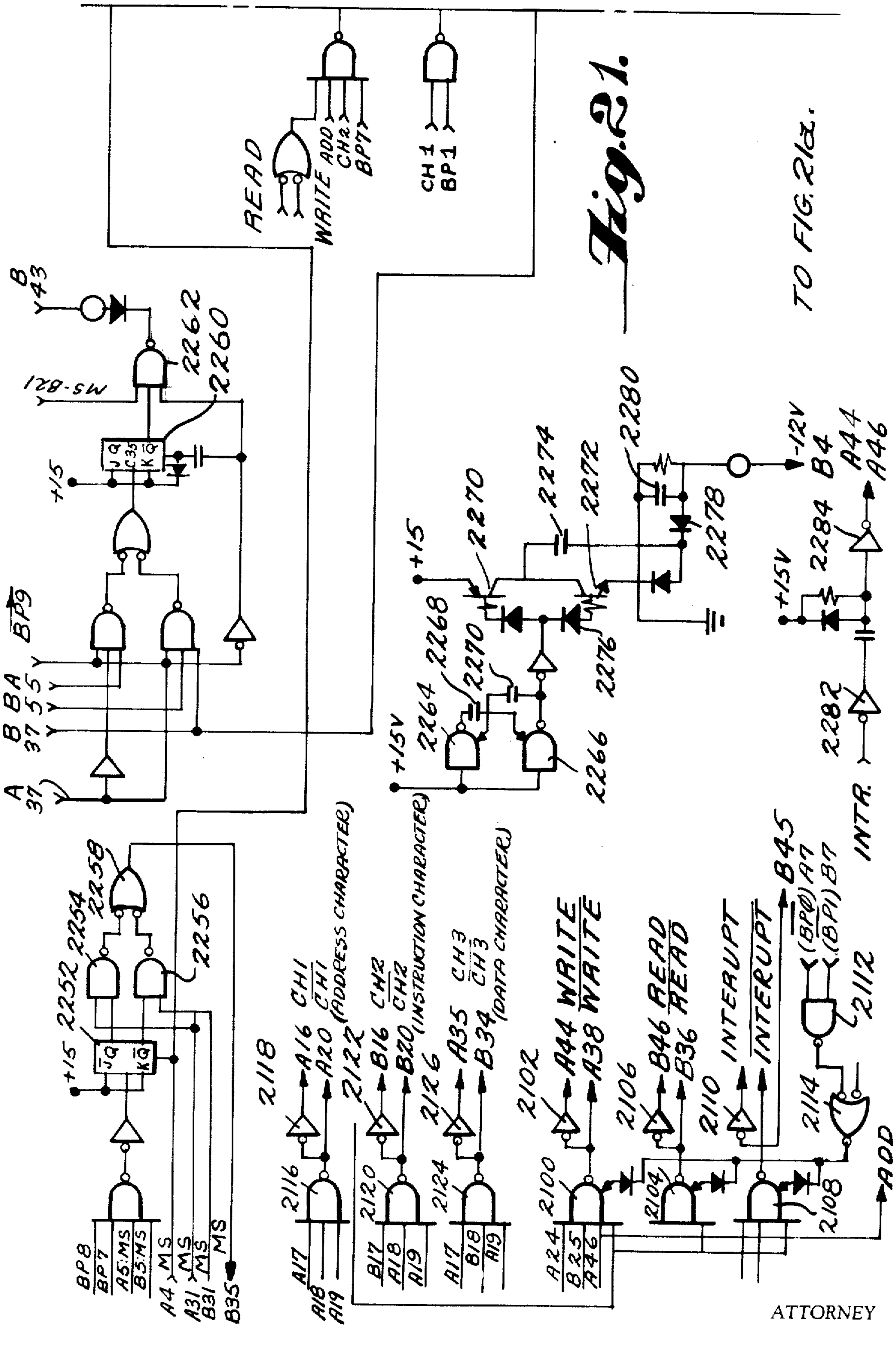
FIG. 21, comprising
Figure 21A:
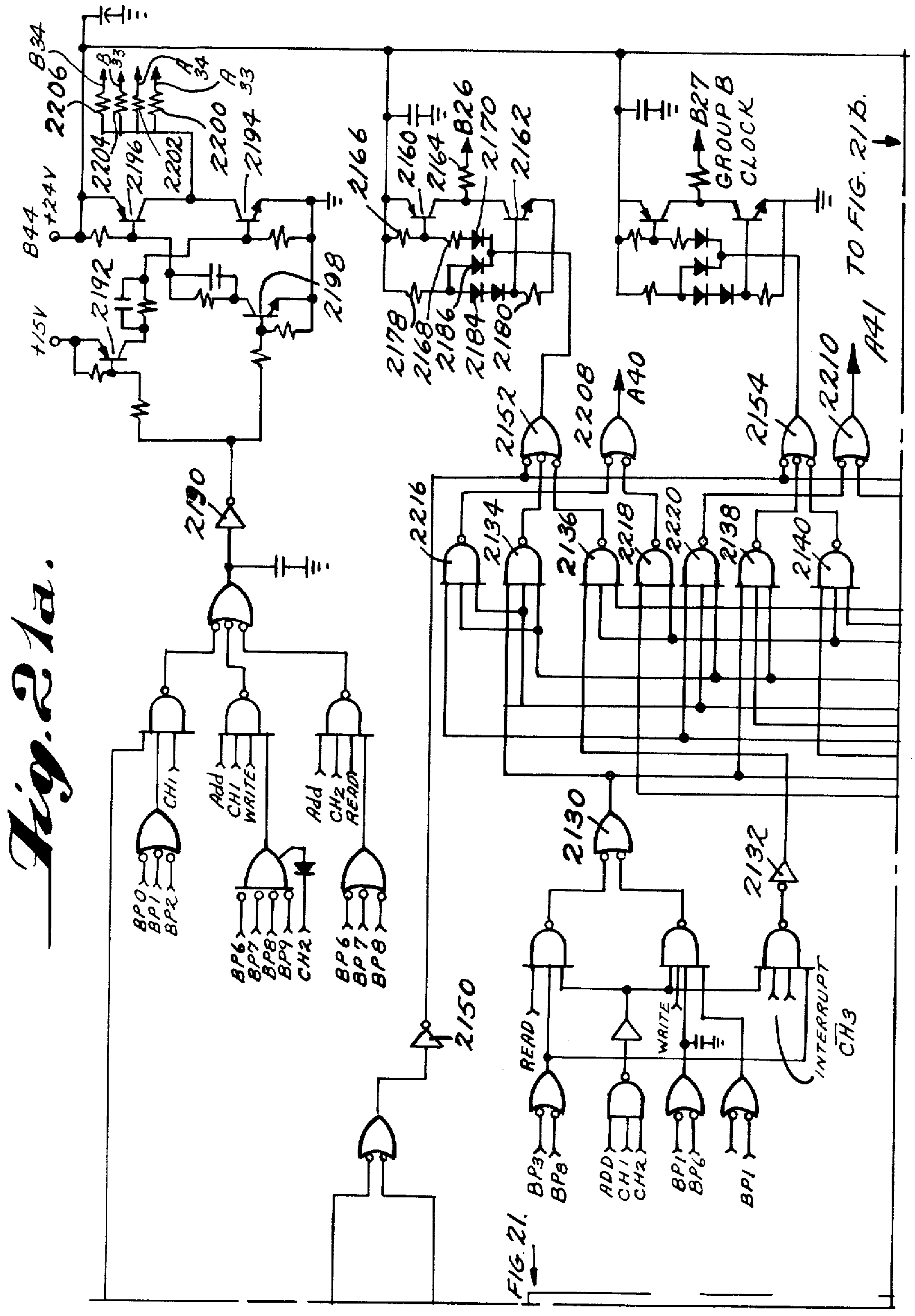
FIGS. 21*a* and 21*b*, shows a detailed schematic of the first portion of the slave multiplexer.
Figure 21B:
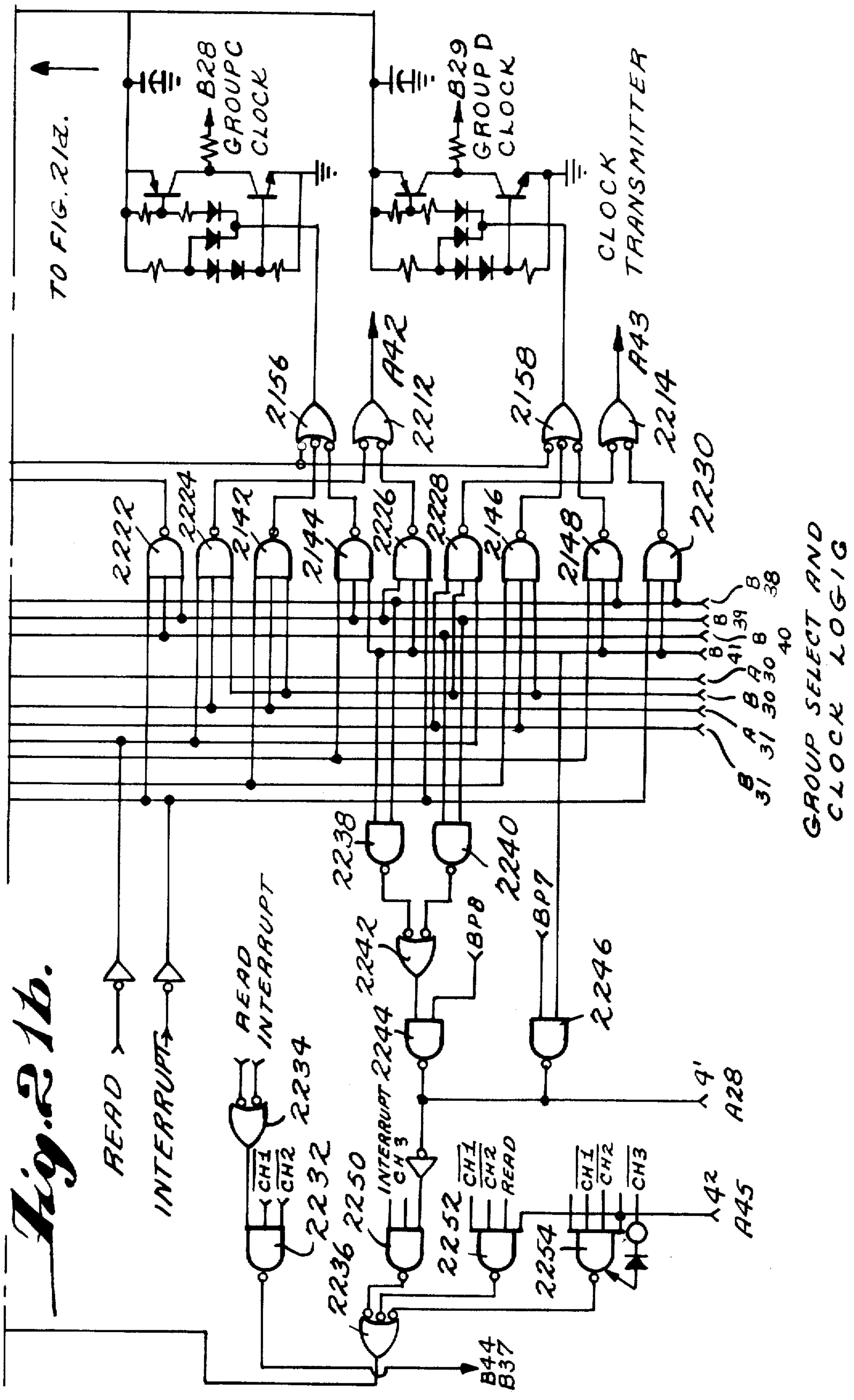
Figure 22A:
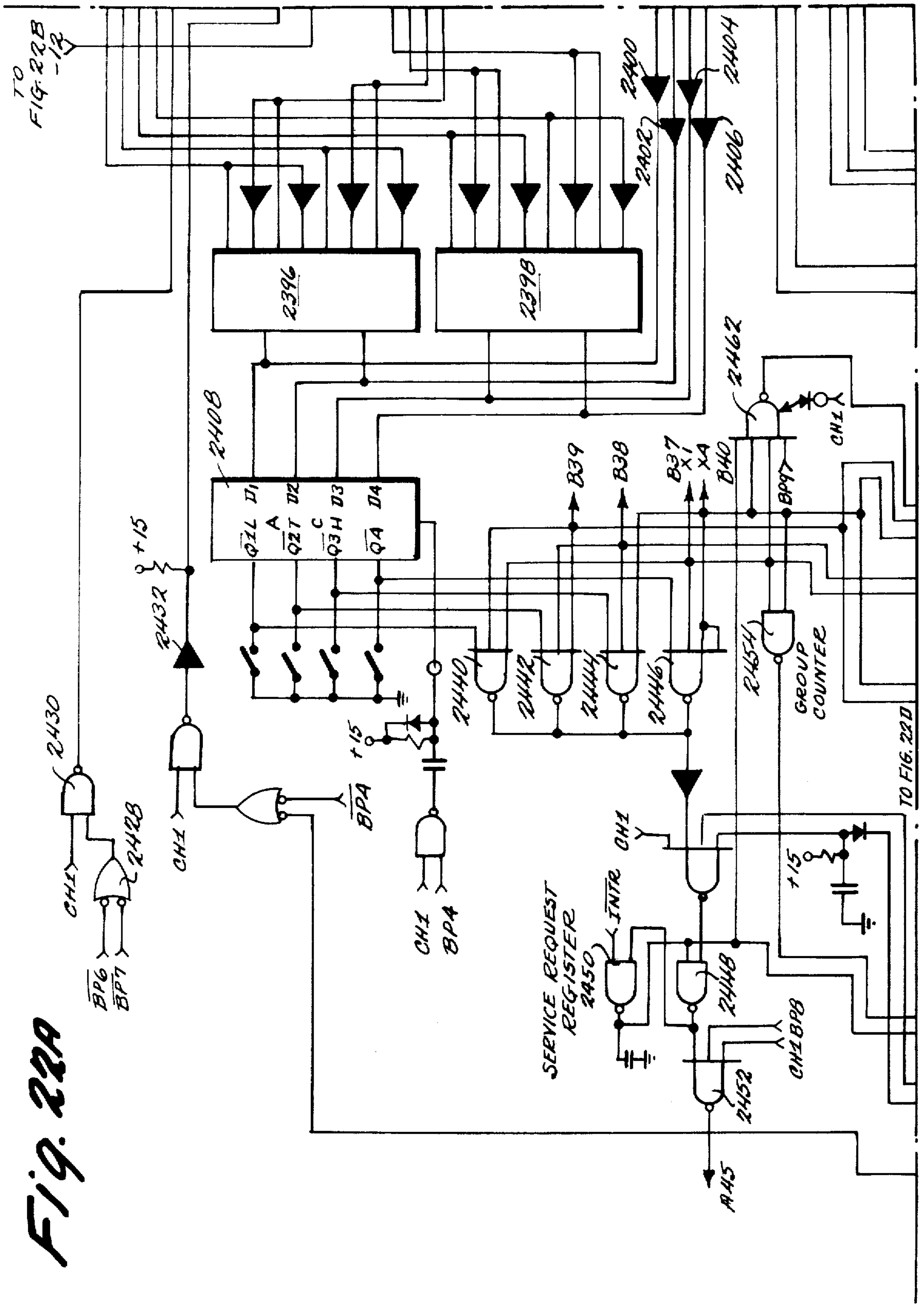
FIGS. 22*a*, 22*b*, 22*c* and 22*d*, shows a detailed schematic of the second portion of the slave multiplexer.
Figure 22B:
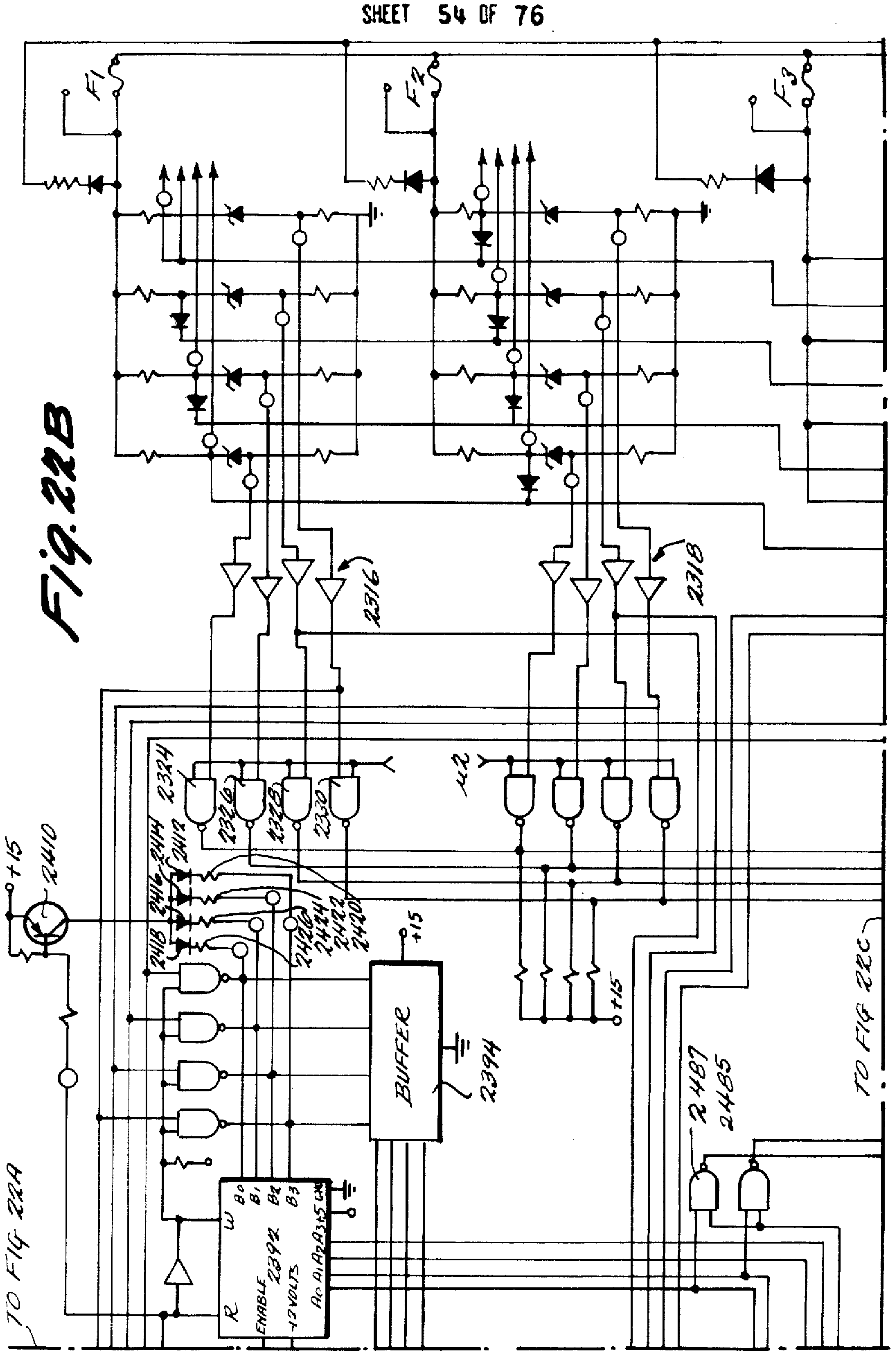
Figure 22C:
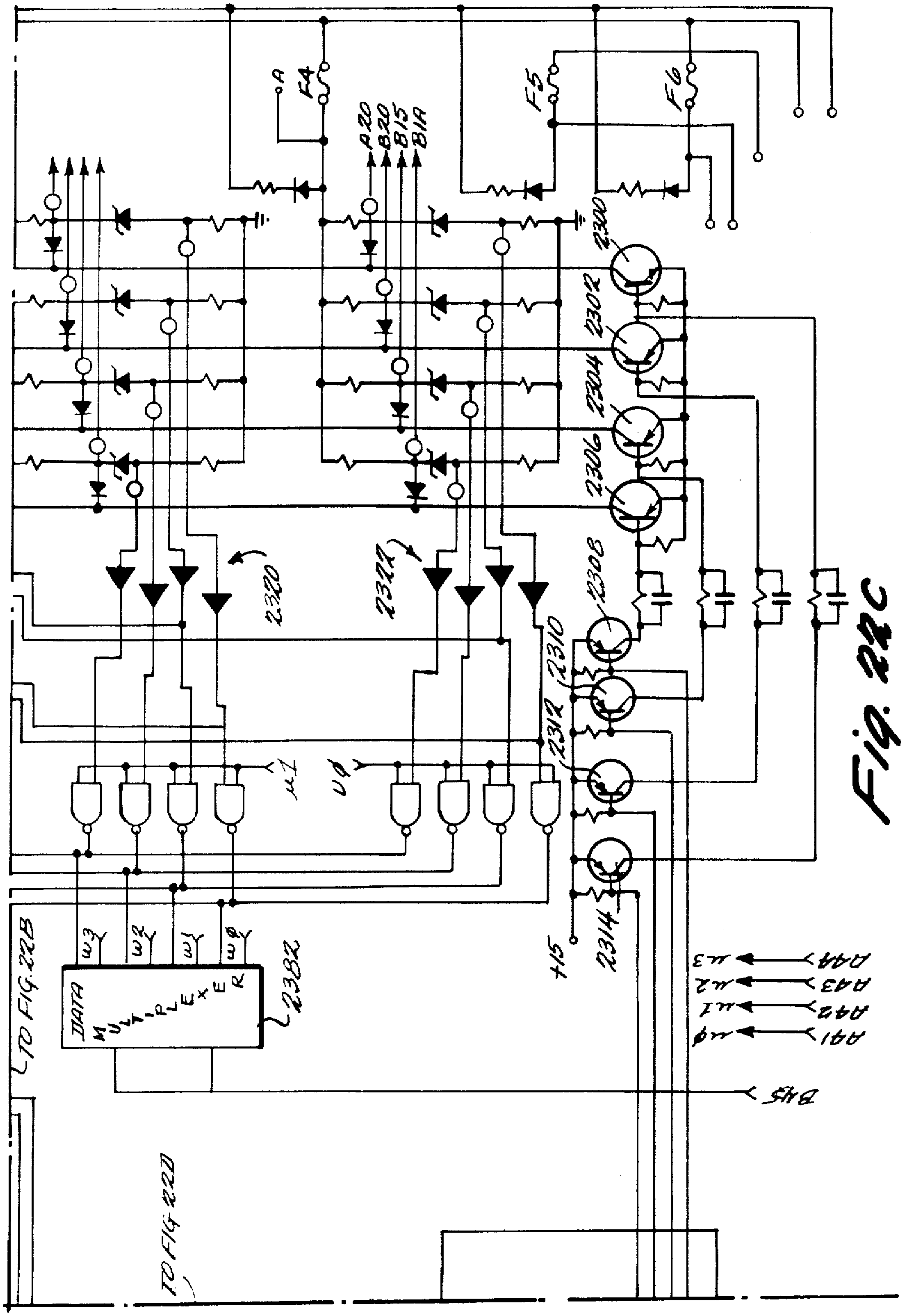
Figure 22D:
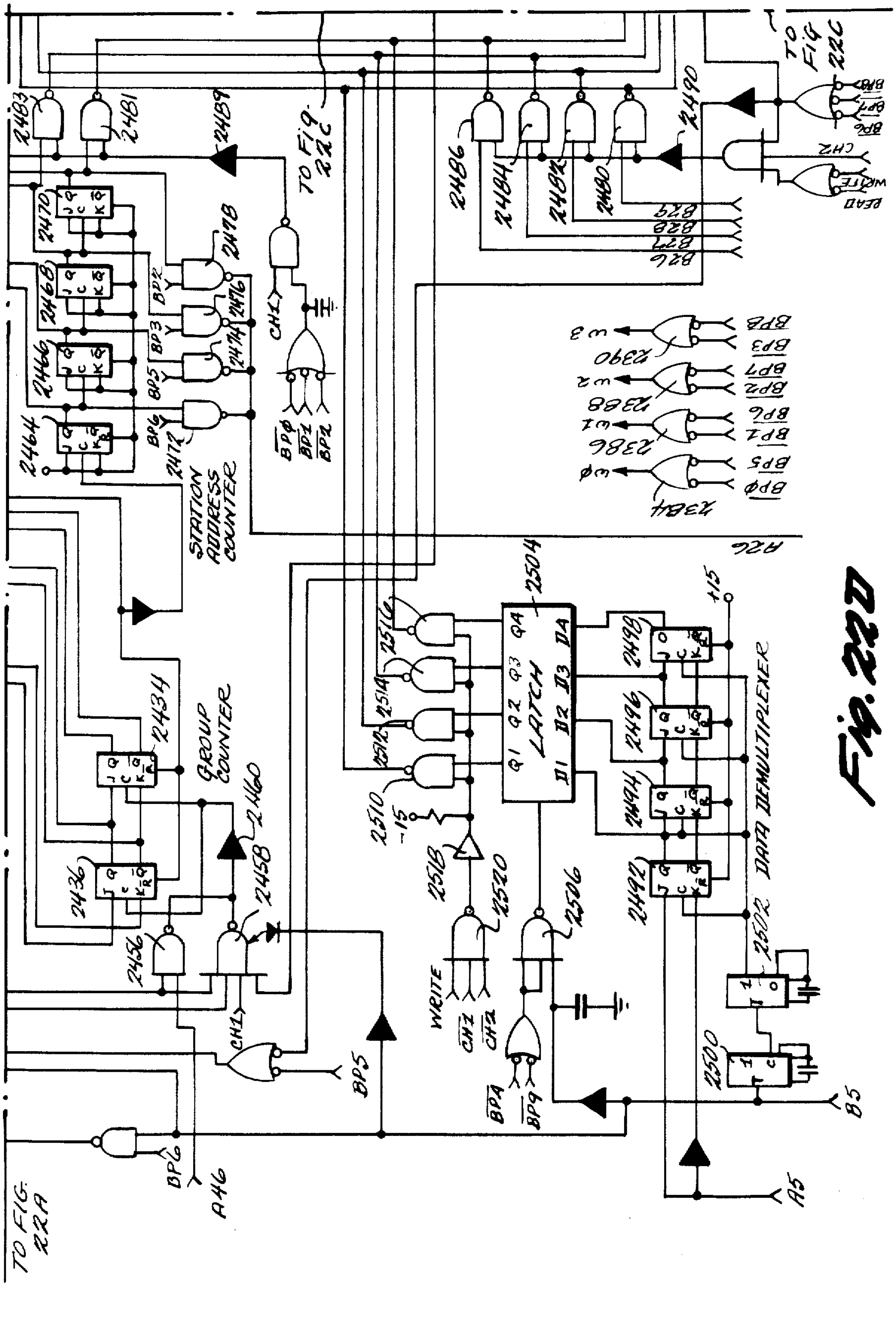
Figure 23A:
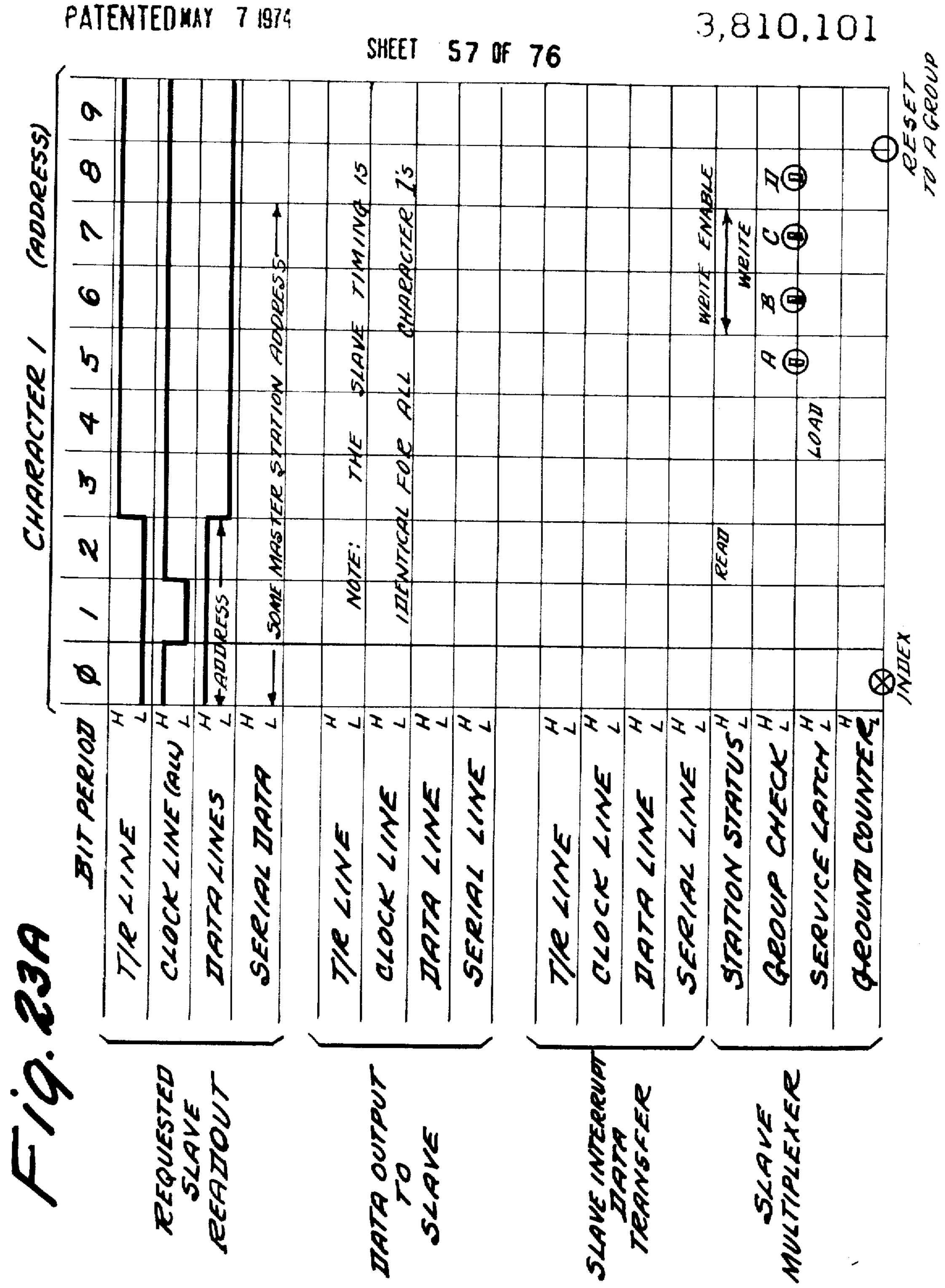
FIGS. 23*a*, 23*b*, 23*c* and 23*d*, shows the timing diagram for the slave multiplexer.
Figure 23B:
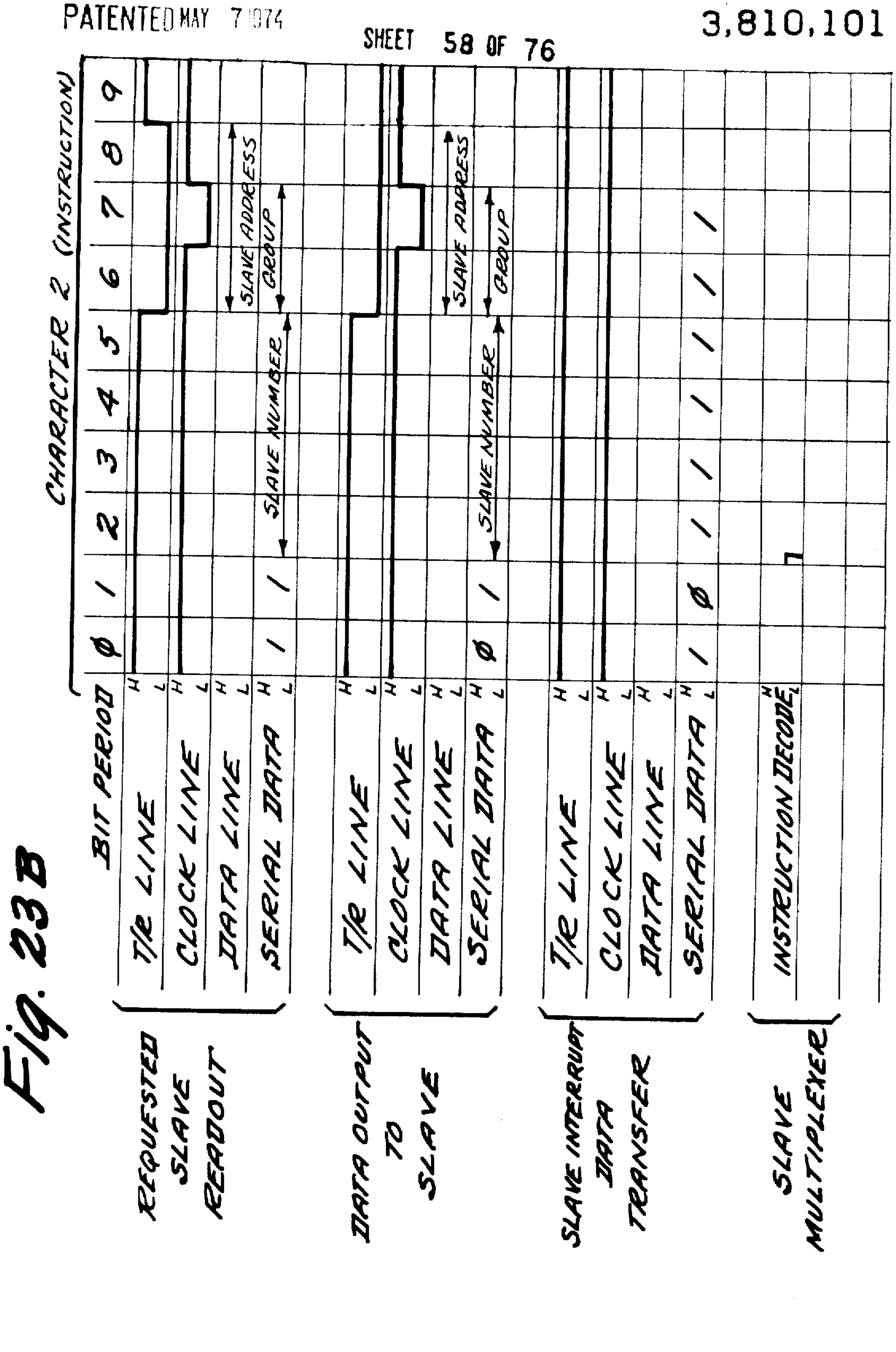
Figure 23C:
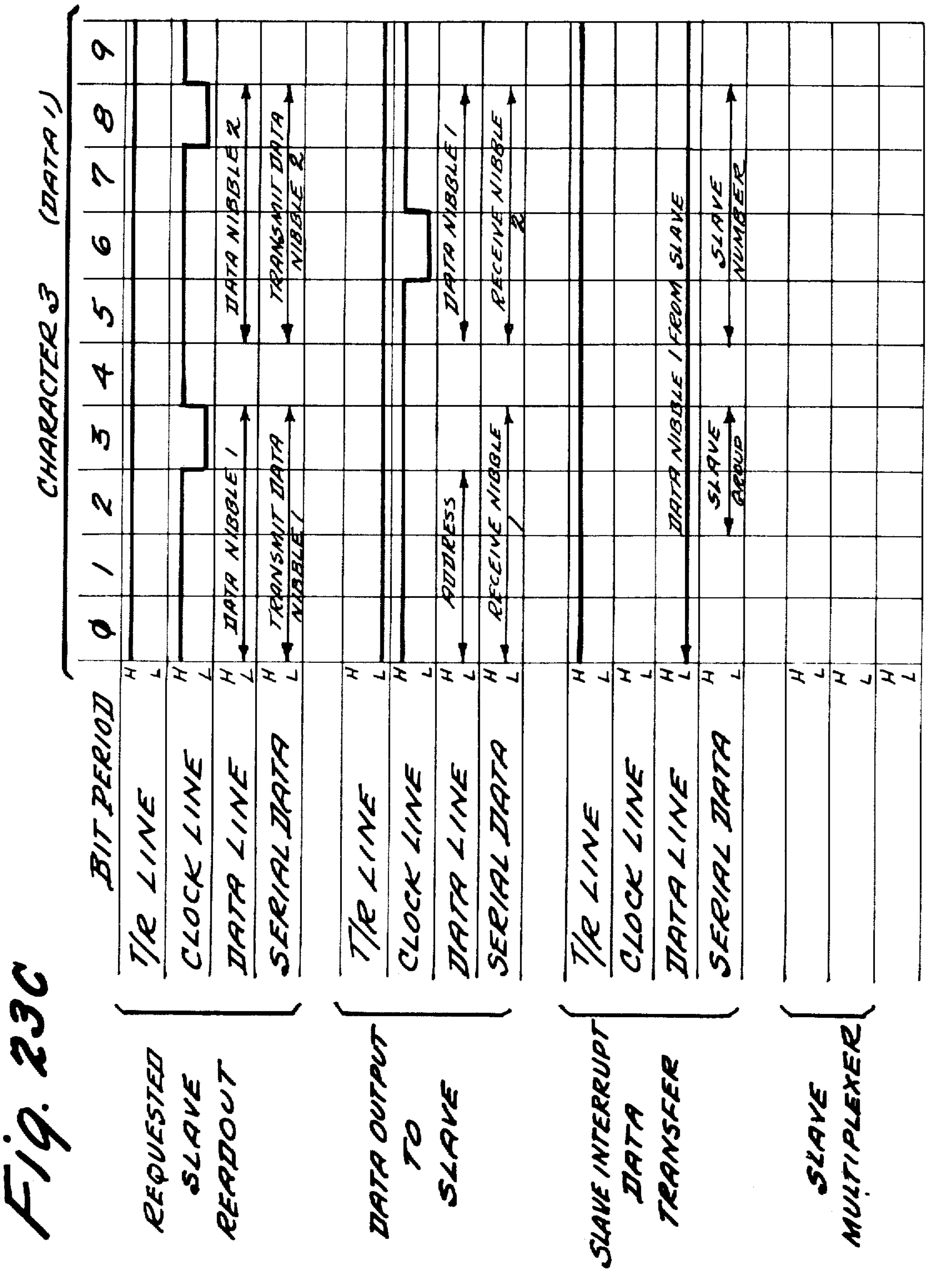
Figure 23D:
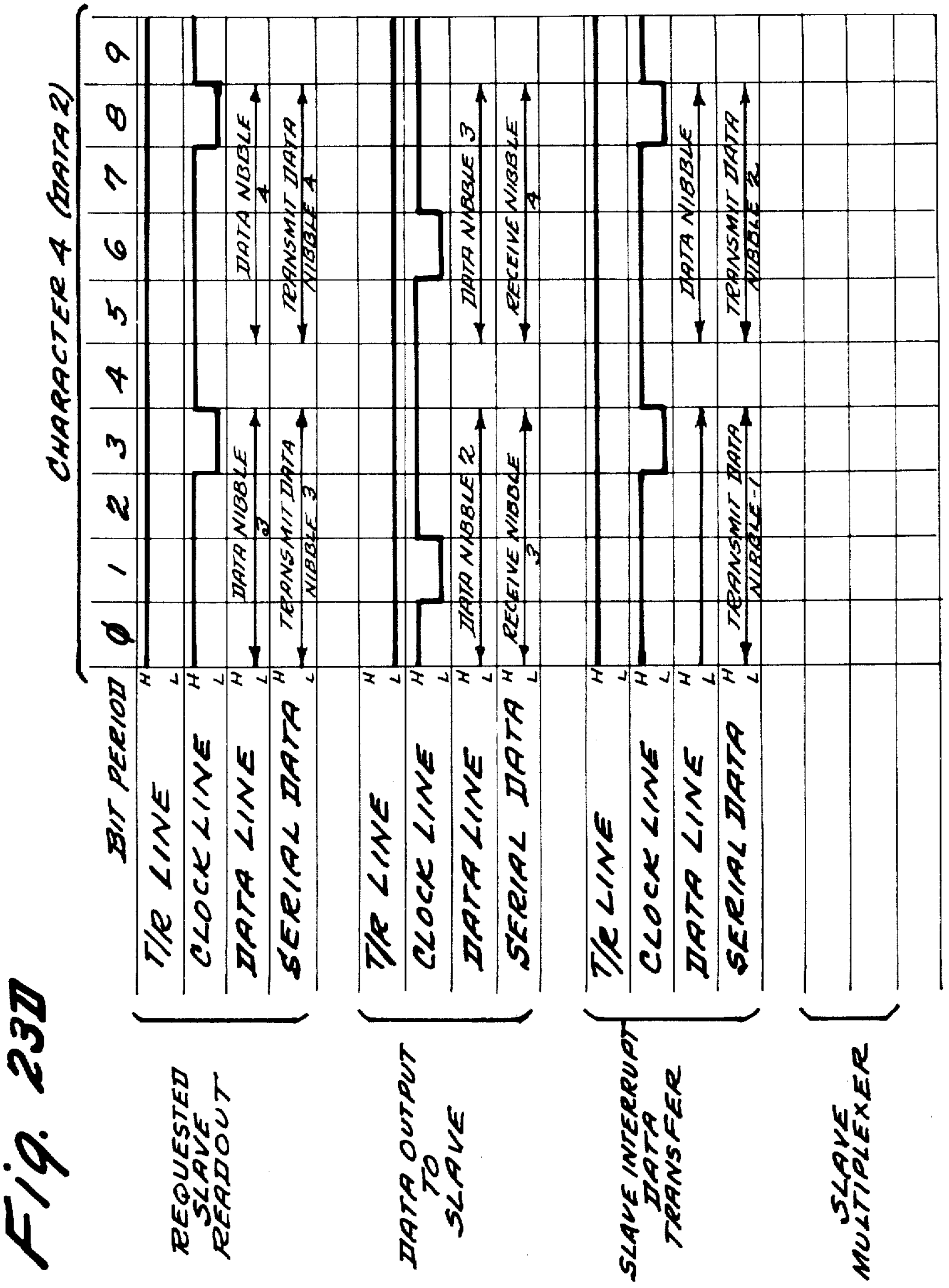

The three slave multiplexer operating instructions: slave read, slave write, and slave interrupt service are decoded in the in the schematic of FIG. 21. Referring to FIG. 21, the write instruction is decoded by gate 2100 and inverter 2102. The read instruction is decoded by gate 2104 and inverter 2106. The interrupt instruction is decoded by gate 2108 and inverter 2110. The instruction decoding is enabled only after character 2, bit period 1. This function is generated by gates 2112 and 2114. Only three message characters are of unique significance in the operation of the slave multiplexer. These are the address character, the instruction character, and the first data character.

Message character one; the address character, is decoded by gate 2116 and inverter 2118; the instruction character is decoded by gate 2120 and inverter 2122; and the data character is decoded by gate 2124 and inverter 2126. The group clock drivers for each of the four slave groups, and the clock function generating logic generate the proper clock signals to each of the four station groups as determined by both the current message character and the current instruction decoded from the master station card. Gate 2130 and the various gates comprising the logic tree driving this gate serve to generate the clock for the read and write instructions. Inverter 2132 and the gates forming its input logic tree serve to generate the clock functions for the interrupt service instruction. The aforementioned clock signals are steered to one of the four group clock output circuits as determined by the rank of group clock selection gating. This rank of gates includes gates 2134, 2136, 2138, 2140, 2142, 2144, 2146 and 2148. The proper group is selected by either the master station instruction register for the read and write instructions or by the group counter of FIG. 22 for the interrupt service instruction. Inverter 2150 and the logic tree which drives this inverter generate those clock signals common to all four clock groups. Gates 2152, 2154, 2156 and 2158 OR together the various clock signals for the respective group output circuits. All four clock group output circuits are identical and only the group A circuit will be described. Transistors 2160 and 2162 form an output stack to furnish either current drive or current sinking capability to the clock output line, and resistor 2164 provides short circuit protection and induced line signal dampening to the clock line. Resistors 2166 and 2168 and diode 2170 provide drive to transistor 2160. Resistors 2178 and 2180 and diodes 2182, 2184 and 2186 provide drive to transistor 2162.

The T/R select lines of each of the four slave groups are all driven by one driver circuit. Inverter 2190 and the logic tree driving this inverter generate the T/R signal from the appropriate instruction, character, and bit period signals and address register of the master station circuit. The output transistors 2194 and 2196 are high power devices capable of sinking or sourcing 160 ma for each of the four slave group T/R lines. Transistors 2192 and 2198 and the adjacent resistors and capacitors drive the output transistors. Resistors 2200, 2202, 2204 and 2206 provide short circuit protection for the T/R line and help to damp induced noise on the individual slave group cables.

The selection of one specific group of data lines from the four data line groups entering the slave multiplexer is determined by gates 2208, 2210, 2212 and 2214. These gates are driven by gates 2216, 2218, 2220, 2222, 2224, 2226, 2228 and 2230. The appropriate slave group data selection is accomplished in a similar manner to that of the group clock selection in that the selection is accomplished by decoding either the master station circuit instruction register or the station address counter of FIG. 22 and ANDing this with the proper service instruction — either read or interrupt service. The write instruction involves no data transfer from a slave station to the slave multiplexer.

The master station data output enable signal is generated by gate 2232 and gate 2234. The output data stream is generated by gate 2236 and its associated logic tree. Gates 2238, 2240, 2242, 2244 and 2246 encode the group counter state of the group counter of FIG. 22 for serial transmission. Input Y1 of FIG. 21 accepts the serialized station address counter output from FIG. 22. This serial data is controlled by gate 2250 which places it in the data stream during character 3 of the interrupt service instruction. The outgoing serial data steam of the serialized data from the slave stations is controlled by gates 2252 and 2254. Gate 2236 OR's these data streams together and furnishes output to the data parity generation circuit and to the master station circuit data input.

The address parity generator and the data parity generator include a JK flip-flop 2252 which generates the odd parity of the received address data stream and gates 2254, 2256 and 2258 which perform an exclusive OR on the received address parity and the generated address parity and output a logical one to the address gate of the master station if the parity check is valid. Flip-flop 2260 and its associated logic generate parity on each 9 bits of the instruction character and all data characters regardless of whether the data is being transmitted or received. This generated parity is transmitted by the master station to the data controller on bit period nine of the instruction character and each succeeding character. Gate 2262 furnishes output to the master station card data parity input.

The negative voltage supply for the MOS circuits of the slave multiplexer include gates 2264 and 2266 and capacitors 2268 and 2270 which form an astable multivibrator which oscillates at several kilohertz. This oscillator drives transistors 2270 and 2272 which form a switching circuit to switch the positive node of capacitor 2274 between plus 15 volts and ground. Capacitor 2274 is charged through diode 2279 and when switched is discharged through diode 2278 to charge capacitor 2280. The negative node of capacitor 2280 is minus 12 to minus 14 volts depending on load and furnishes negative bias to the MOS circuit. Inverters 2282 and 2284 and the associated discrete components form an AC coupled circuit to generate a pulse at the termination of the interrupt service instruction.

The data input circuits for each of the four slave station groups are shown in detail in FIG. 22. These circuits provide for translating 24 volt input signals to the 15 volt logic level and in addition provide coupling to the data line drivers. Transistors 2300, 2302, 2304 and 2306 form the data line drivers and are capable of sinking in excess 640 ma of current from the four data lines. Transistors 2308, 2310, 2312 and 2314 provide base drive to the data line output transistors. Inverter groups 2316, 2318, 2320 and 2322 serve to buffer the data line inputs and to convert the negative logic on the data line to positive logic.

Data output from one of the four data groups is selected by one of the ranks of four gates driven by the buffers from each of the four slave group data input circuits. The group A data line is selected by gates 2324, 2326, 2328 and 2380. The selection gates for each of the other three slave groups are shown immediately below the aforementioned gates. These gates are ORed onto a common bus which drives the serial data muliplexer 2382 which is comprised of a group of AND-OR-INVERT gates which are driven by the appropriate bit periods formed by gates 2384, 2386, 2388 and 2390.

The memory circuits which store the status of each of the slave stations to provide the reference for determining if a station's operating status has changed include a 64 bit MOS memory 2392 which is organized in 16 four bit words. Buffer 2394 buffers the output of the MOS memory to allow it to drive the status comparison logic 2396 and 2398 and the input inverters to these packages. Logic 2396 and 2398 are AND-OR-INVERT packages which perform a comparison operation on the present and last operating status of the slave stations. The logic is designed such that a difference in comparison of the current and last station states results in a low logic level on the output of the logic tree which services that particular group. A group A status change is determined by one output, group B by the other output, group C by the third output and group D by the fourth output. The data 1 line of each of the four slave groups inputs the interrupt service request status for that group of slave stations. These inputs are converted to negative logic by inverters 2400, 2402, 2402 and 2408 and wire ORed with the status change information and used as inputs to latch 2408. The status of these four lines is latched into latch 2408 during character one, bit period 4. The latch output can then be sampled to determine which stations require interrupt servicing by the slave multiplexer.

Transistor 2410, diodes 2412, 2414, 2416 and 2418 and resistors 2420, 2422, 2424 and 2426 provide a load to the memory input drivers for writing information into the memory. Transistor 2410 is off during a memory read operation to provide a high impedance load for memory 2392. Gates 2428 and 2430 perform the read-write select on the memory inverter 2432 and the logic tree driving this inverter control when the memory is is read from or written into.

JK flip-flops 2434 and 2436 comprise the group counter. This counter is utilized by the slave multiplexer to successively sample each of the four group service requests stored in latch 2408. The group counter is decoded by gates 2440, 2442, 2444 and 2446 and each decoded state is ANDed with one of the group service requests. If one of the aforementioned gates is enabled then it is allowed to set the interrupt service request register comprised of gates 2448 and 2450. When this register is set, then the group counter inputs are disabled and the counter is locked in its present state until an interrupt service request has been completed. The interrupt service request register is allowed to set the master station circuit interrupt register on character one, bit period 8 as determined by gate 2452. Gate 2454 locks up the group counter after group D has been checked. Gates 2456, 2458 and inverter 2460 provide input clocking to the group counter to increment the counter so that the next group can be checked. Gate 2462 resets the group counter to group A on bit period 9 if the group D has been checked and advances the station address counter which consists of JK flip-flops 2462, 2466, 2468 and 2470. The station address counter serves to bring up the next group of four stations so that they can be checked for interrupt service request and/or operating status change. Gates 2472, 2474, 2476 and 2478 are utilized to serialize the state of the station address counter on an interrupt service instruction to identify the station number being serviced.

The data line driver transistors 2300, 2302, 2304 and 2306 are controlled from one of three sources: the station address counter, the serial data demultiplexer, or the master station circuit instruction register. Gates 2481, 2483, 2485 and 2487 allow the station address counter to drive the data lines to address a slave station when enabled through inverter 2489 and its logic tree. The station address in the master station circuit instruction register is allowed to drive the data lines to gates 2480, 2482, 2484 and 2486 when enabled by a read or write instruction through the logic tree driving inverter 2490.

The incoming serial data stream to be transmitted to a slave station must be demultiplexed into four bit groups (nibbles) so that it can be clocked out to the slave station. This is accomplished in FIG. 22 by a shift register comprised of JK flip-flops 2492, 2494, 2496 and 2498. The incoming serial data stream is fed to the shift register input and the shift register is clocked by monostable multivibrators 2500 and 2502. Multivibrator 2500 provides a clock delay to ensure that the data is present at the input of the first stage of the demultiplexer shift register and monostable multivibrator 2502 generates the actual clock pulse to the shift register. When four bits of incoming data have been buffered in the shift register, the contents of the register are transferred to the latch 2504. The latch is operated by gate 2506 and its logic tree. Gates 2510, 2512, 2514 and 2516 gate the data onto the data lines via the data line drivers when enabled by inverter 2518 and gate 2520.

SLAVE STATION

The category of stations classified as slave stations perform data input and data output with the systems via the slave multiplexer. The slave station is comprised of both basic circuits common to all slave stations and special circuits which give the slave station the characteristics of a particular slave. The slave can be configured for up to 252 bits of data input or 248 bits of data output.

The slave station can be controlled for either of two purposes by the slave multiplexer: (1) to transfer its data inputs to the slave multiplexer and (2) to accept data output from the multiplexer. This is accomplished by the multiplexer first addressing the slave station and then either having it transmit data to the slave multiplexer or accept data from the slave multiplexer. The former is utilized for computer initiated readout of the slave station and for the interrupt service operating mode. The latter is used for the output of computer data to the slave station.

A single station is brought on line by the following sequence (also note FIG. 23 timing diagrams):

1. The transmit/receive line is brought to a high level if it is not already high. This line is then switched to a low level. The transition from a high level to a low level causes the shift counter of each station to be reset to the all zero state and causes the address register of each station on the line to be cleared. The reset state is the only state in which the station will accept address data.
2. The address of the desired station is then placed on the data lines. The clock line which is normally in the high state is pulsed low. The address circuit is enabled while the clock is low and the address register of the station whose address is currently on the data lines is set. The shift counter is incremented on the rise of the clock line back to the high level. The particular station selected will now remain on line and all other slaves on the line will remain off-line until another addressing sequence is repeated.
3. To output data to the station just addressed the transmit/receive line is maintained low and the data is placed on the four data lines. The clock line is then pulsed low to strobe the data into the slave station. This sequence is then repeated until all data has been transferred to the station.
4. To obtain data from the station addressed in steps one and two the transmit/receive line is switched to a high level at the end of the addressing sequence (1 and 2 above). This enables the data line drivers of the station addressed and places the first four bits of data on the data lines. The data lines are then sampled and the clock line pulsed low. Pulsing the clock line causes the shift counter to be incremented and the next four data bits to be placed on the data lines. This sequence is continued until all data has been transferred from the slave to the data controller via the slave multiplexer.

Figure 24:
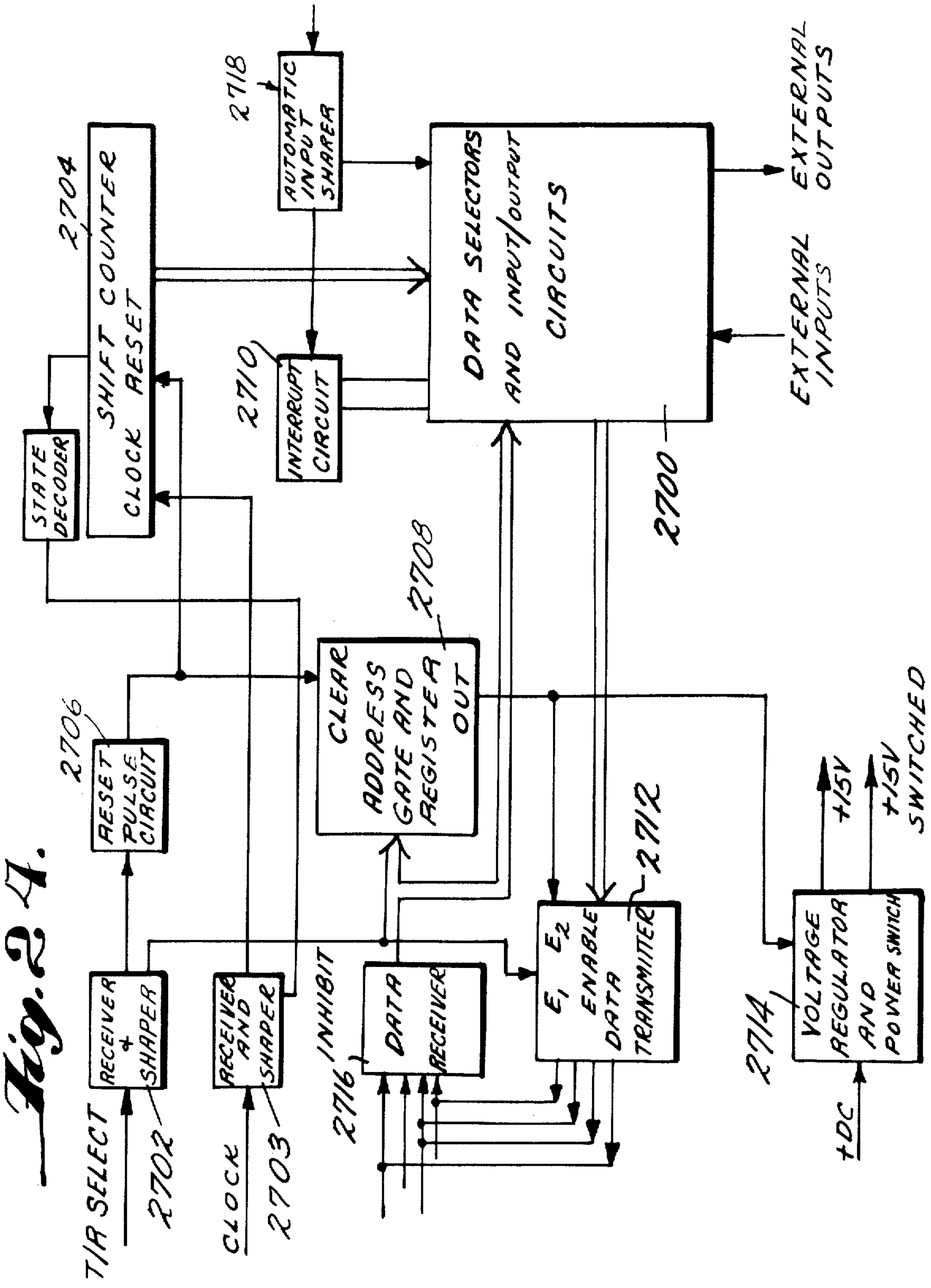
FIG. 24 shows a block diagram of a machine station.

The machine station can be broken down into several operational sections as shown in the block diagram of FIG. 24. The circuits common to all stations are block diagrammed outside the Data Selectors and Input/Output Circuits 2700. The latter block serves to represent that portion of the slave station which is designed for a specific form of slave station much as a machine monitoring station.

The transmit/receive select (T/R Select) input and the clock signal input enter the station via receiver and wave shaping circuits 2702 and 2703 to shorten the rise and fall times of these two signals. The clock receiver also has an inhibit feature which disables the clock input before the shift counter 2704 recycles to the reset state or reaches the count state at which the interrupt circuit is reset. The output of the T/R-select receiver is AC coupled to a reset circuit 2706 which generates a pulse to reset the address circuit 2708 and shift counter 2704 on a high to low transition of the T/R select signal line. Clock receiver 2702 drives shift counter 2704 by incrementing the counter on each low to high transition of the clock signal line. The data line receivers 2716 for each of the four data lines supply both an inverted and a non-inverted signal to the address and data output circuits as shown in the block diagram.

The shift counter is a conventional Johnson design and is used to simplify decoding of each state without decoding coincidence spikes common to ripple counter decoding. One state of the counter is decoded to disable the clock receiver output when the station is not addressed. This prevents the counter from incrementing up to the state in which the interrupt circuit is reset during station data readout when the station is not addressed.

The address circuit 2708 is enabled when the shift counter 2704 is reset to the reset state and the clock signal line is low. If the correct address is on the data lines, the slave station address flip-flop is set to place the station on-line with the data controller. If the station is not addressed, the station address register is not set and the station does not accept a new address until the shift counter is reset. This addressing approach allows the mixing of various sequence lengths and various data formats among stations on a common cable. The address register enables power to some of the logic within the station. Thus, the station consumes less power when it is not addressed than when it is transmitting or receiving data. This aids in reducing average station input current so that a number of stations can be fed operating power from a small wire gauge distribution system. The automatic input circuit 2718 shapes the automatic input voltage level for fast rise and fall times so that the signal can be AC coupled to the interrupt circuit.

The interrupt circuit 2710 consists of a flip-flop and an output delay. The flip-flop is AC coupled to the automatic and/or manual inputs so that a change in one or more of these inputs sets the interrupt flip-flop. The output of the flip-flop is connected to the data output circuit through a delay circuit which is designed to delay the interrupt signal by an amount of time greater than the uncertainity or "bounce time" of each input signal.

The data transmitter 2712 consists of four open-collector driver gates which are enabled when both the station is addressed and the T/R select line is high. The data input is supplied from the data selector circuit 2700 via four data output lines as shown in the block diagram.

The data selector and input-output circuit 2700 contains sufficient automatic and manual input circuits for the particular slave station application. These input circuits are fed to gates which are enabled by the shift counter state decoding gates to place a particular group of four data bits on the data lines. The various inputs are OR-ed together to feed the four data inputs of the data transmitter. The data output format is such that the first four bits transmitted are utilized by the slave multiplexer and data controller. These four bits are as follows:

Bit φ (MSB): A logical 1 to indicate a response for having received an address.

Bit 1: A logical 1 if the interrupt flip-flop is set.

Bit 2 and 3: A code which if non-zero indicates the station requires a longer service sequence than the majority of stations on the cable. The specific code indicates the exact sequence length as follows:

ϕ1: 8 bytes
1ϕ: 16 bytes
11: 24 bytes

The output buffer circuits are also included in this section and serve to buffer or latch the output data as dictated by the specific slave.

Voltage regulator 2714 establishes proper operating voltage for the station and provides active decoupling from the power distribution wire. In addition, this circuit includes the series pass elements which are controlled by the address register to turn off power to logic elements required only for data transmission and reception.

Should it become desirable to allow more than 16 stations on the same data cable it is possible to address the station with a sequence of two clock pulses. The first pulse sets an intermediate address register if the correct 4 most significant bits of the station address is on the data lines. The second clock pulse sets the address register if both the 4 least significant bits of the address are on the data lines and the intermediate address has been set. This addressing scheme allows a total of 256 stations on a common 8 conductor cable but, of course, the power distribution losses in the common cable become more of a problem.

The machine station is a particular form of slave station which is installed on or adjacent to the production machine to be monitored. There are two basic types of machine stations:

a. Machine Monitoring Station: A station which is capable of accepting both automatic and manual digital inputs and transferring the status of these inputs to the data controller via the slave multiplexer.

b. Machine Control Station: A station which is capable of all that the machine monitoring station can do and in addition can accept and buffer digital data transferred from the data controller via the slave multiplexer to the machine control station for automatic machine control and/or operator data display.

These stations are similar electronically and can be combined with other slave stations on a common cable from the slave multiplexer with up to 16 units on a common eight conductor cable. The following table briefly sets forth an example, the machine station Input/Output Format, for a specific type of machine station. For data byte ϕ, the first four bits are the same for all slave stations while the remainder are determined by the specific station type. The following table briefly sets forth the machine station Input/Output Format.

Example Machine Station Data Input/Output Format

TABLE 7

1. Computer initiated readout of a machine station:
The computer can interrogate a machine station by outputting the following C and A words to the Data Controller:
C Register: ϕϕϕ146

| A Register: | Master Station Address | 1 1 | Machine Station Number | Station Group |
|---|---|---|---|---|
| | 0 7 | 8 9 | 10 13 | 14 15 |

The data controller will acquire the data and pass the C, A, and data (B) words to the computer as follows:
C Register: ϕ21146
Note: If the data acquisition is unsuccessful or if errors result, the C register will be modified as described in the data controller operating description.
A Register: as above

| | | |
|---|---|---|
| Bϕ data word: | Data Byte ϕ | Data Byte 1 |
| | 0 7 | 8 15 |
| B1 data word: | Data Byte 2 | Data Byte 3 |
| | 0 7 | 8 15 |
| B2 data word: | Data Byte 4 | |
| | 0 7 | 7 15 |

Note: The specific data byte format is described in 4. below.

2. Computer output of data to a machine station:
The computer can output data to a machine station by outputting to the data controller the following C and A words and the appropriate data word.
C Register: ϕϕϕ141

| A Register: | Master Station Address | ϕ 1 | Machine Station Number | Station Group |
|---|---|---|---|---|
| | 0 7 | 8 9 | 10 13 | 14 15 |

Bϕ data word:
ϕϕ2ϕϕϕ for entry accepted lamp on
ϕϕ4ϕϕϕ for entry rejected lamp on
ϕϕ6ϕϕϕ for all lamps off 3. Computer acceptance of interrupt data from the machine station:
When the data controller has acquired the machine station interrupt data, it passes the following C, A, and data words to the computer:
C Register: ϕ2ϕ545 (normal interrupt)

| A Register: | Master Station Address | 277 |
|---|---|---|
| | 0 7 | 8 15 |

| Bϕ data word: | X X | Machine Station Number | Station Group | Data Byte ϕ |
|---|---|---|---|---|
| | 0 1 | 2 5 | 6 7 | 8 15 |

| | | |
|---|---|---|
| B1 data word: | Data Byte 1 | Data Byte 2 |
| | 0 7 | 8 15 |
| B2 data word: | Data Byte 3 | Data Byte 4 |
| | 0 7 | 8 15 |

Note: The specific data byte format is described in 4. below:

4. Data Byte Format:

Data Byte Ø:

| OP | IS | ID | W | T | U | V |
|---|---|---|---|---|---|---|
| 0 | 1 | 2 3 | 4 | 5 | 6 | 7 |

OP: Machine Station Operational Status
1 = Station On
0 = Station Off
IS: Interrupt Service Request Flag
1 = Service Requested
0 = No Request
ID: Station Identification
W, T, U, V = Automatic Data Entries Data Byte 1:

| M | STOP | Dig Ø |
|---|---|---|
| Ø | 1 3 | 4 7 |

M: Manual Entry by Digital Switches
1 = Manual Entry
φ = No Entry
STOP: Manual Stop Classifications
φ = No Stop Classification
1 = Stop 1
2 = Stop 2
3 = Stop 3
4 = Stop 4
5 = Stop 5
6 = Stop 6
Dig φ: Digital Switch Zero, BCD code (most significant switch digit)

Data Byte 2:

| Dig 1 | Dig 2 |
|---|---|
| Ø 3 | 4 7 |

Dig 1 = Digital Switch 1, BCD Code
Dig 2 = Digital Switch 2, BCD Code

Data Byte 3:

| Dig 3 | Dig 4 |
|---|---|
| 0 3 | 4 7 |

Dig 3 = Digital Switch 3, BCD Code
Dig 4 = Digital Switch 4, BCD Code

Data Byte 4:

| Dig 5 | |
|---|---|
| 0 3 | 4 7 |

Dig 5 = Digital Switch 5, BCD Code

INTERACTIVE KEYBOARD

Figure 25:
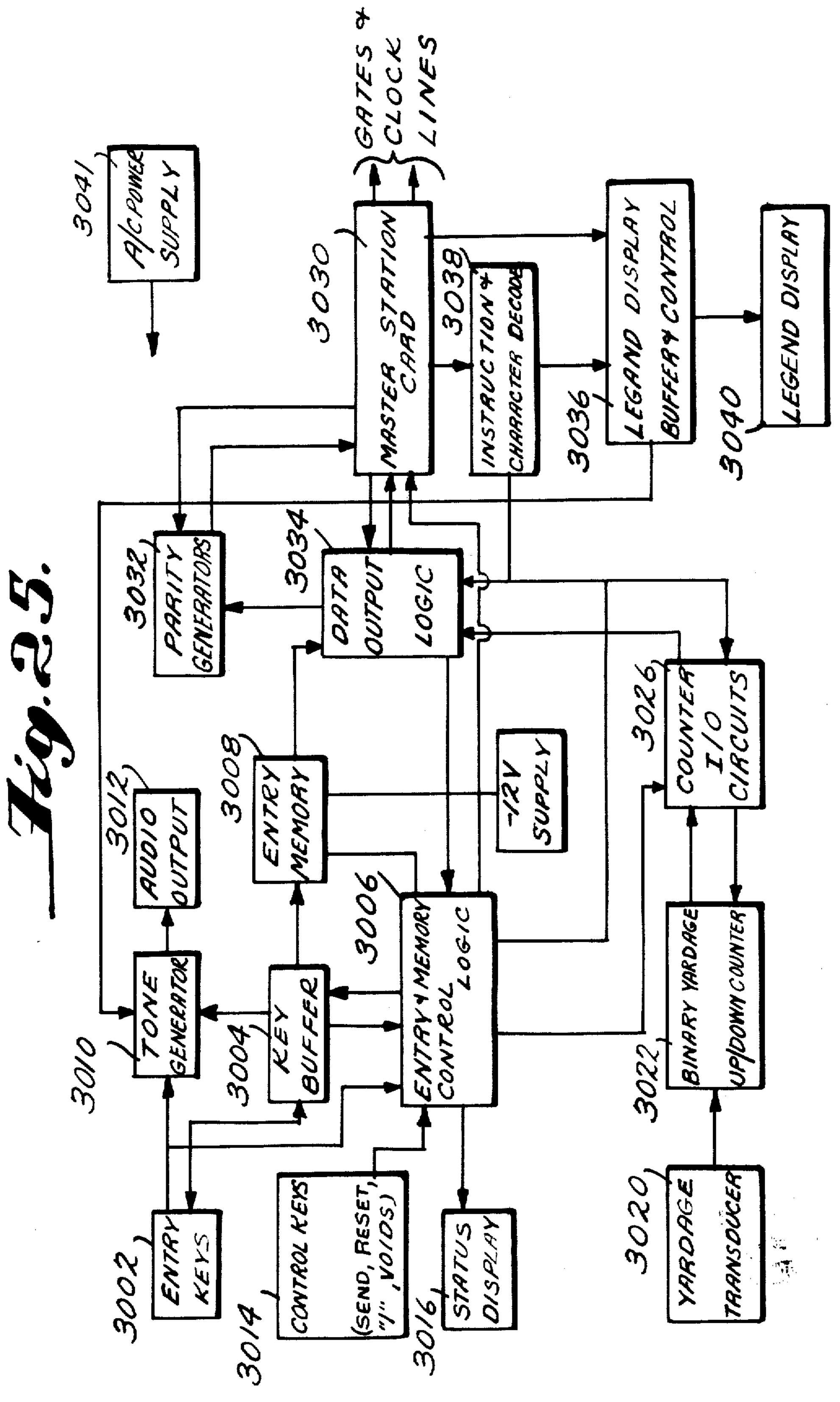
FIG. 25 shows a block diagram of the interactive keyboard.

The interactive keyboard as shown in block diagram in FIG. 25 is a master station which is configured for rapid manual entry of repetitive data such as occurs in cloth grading where the operator identifies and enters fabric cuts and defect information. It will be appreciated that the interactive keyboard can be used both in the system of FIG. 1 or in some other data communication system, inputing information directly to a computer or other recorder. The keyboard contains a legend display controlled by a remote computer to allow feedback of information to the keyboard operator. In addition, the keyboard station contains a binary up/-down counter which is utilized with a yardage transducer on grading frames to automatically input yardage information to the computer.

Figure 26:
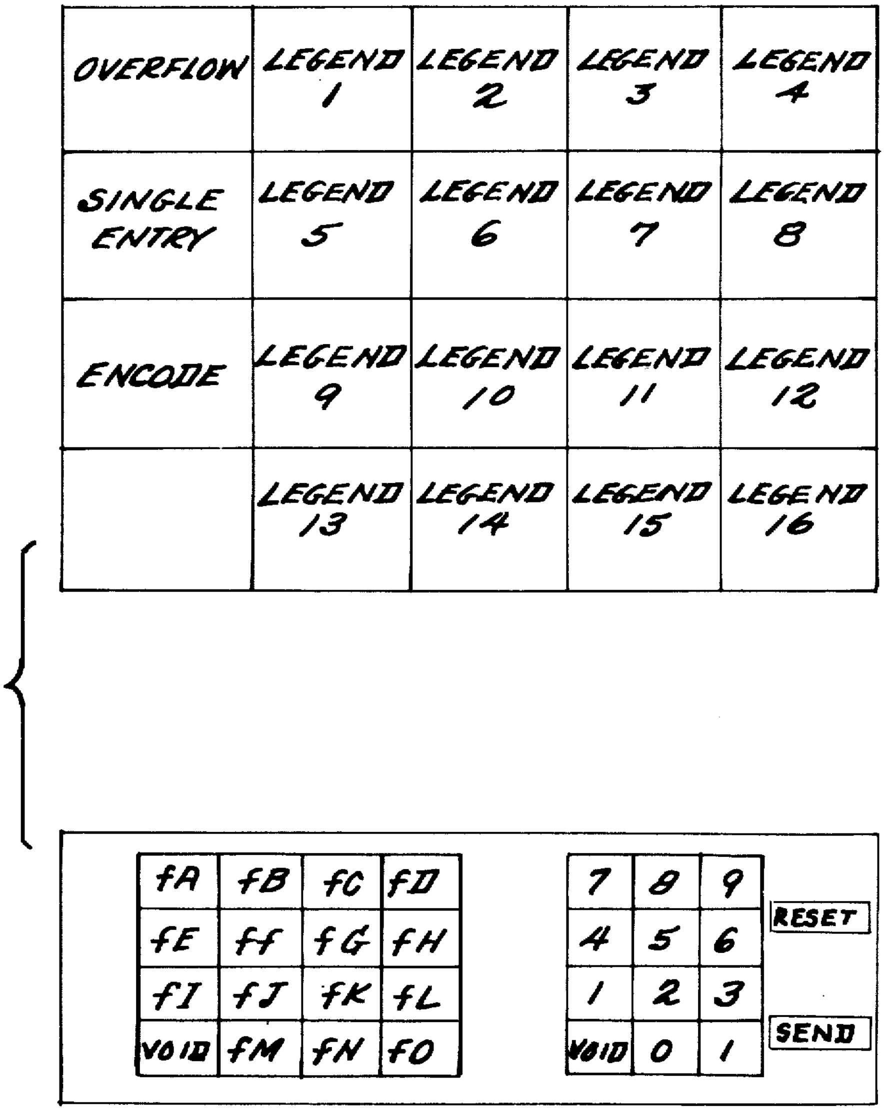
FIG. 26 shows the display and keyboard for the interactive keyboard.

A diagram of the station's keyboard and legend display is shown in FIG. 26. There are 15 function keys denoted *f*A through *f*O and a function void key on the left hand side of the keyboard. To the right is a bank of 12 code keys containing digits zero through nine, a code void key, and a slash (/) punctuation. On the extreme right of the keyboard are a reset and a send key. The keyboard operator makes an entry by first depressing a reset key if the keyboard is not already in the reset mode (indicated by the reset key being illuminated). The operator can next depress a function key to identify a code string and up to seven digits of code or vice versa; the operator then depresses a second function key and up to seven additional digits of code. When the first function key was depressed, the keyboard shifted from the reset to the encode state and this change was indicated by the illumination of an encode legend on the keyboard display diagramed in FIG. 26. Once the function and code entries are made, the operator can, by manual key operation, transmit the data to the computer by depressing the send key on the right hand side of the keyboard. The entry just completed by the operator is called a double entry in that two function-code strings were entered into the keyboard before the data was transmitted to the computer. A single code-function entry is also allowed with a single function key and up to 14 code keys being depressed.

In addition, the operator is free to enter code before the function or after the function as desired. Thus, for double entry the operator can enter a code string, a function to identify the code string, a second function, and then its code string. Alternatively, the operator can enter a code string, the function, a second code string and a second function, or the operator can enter a function, its code string, use the slash key, enter the second code string, and then the second function. Obviously, the operator cannot validly enter a function, its code string, a second code string and then a second function without separating the two code strings with a slash.

The function void and code void keys are used to erase the current function or code string being entered. Thus, if the operator depresses the wrong function key, the function void key can be depressed and the correct function entered. If a code string is being entered and an error is made, the code void is depressed, and the correct code string then entered. Both void keys affect only the current function or code string being entered, and any previously entered strings or functions are not affected. If the complete entry need be erased, this can be accomplished by depressing the reset key.

There are five keyboard status indicators visible to the operator: the reset, send, encode, single entry, and overflow indicators. The reset, send, and encode indicators indicate the present state of the keyboard. The single entry indicator is turned on by the keyboard if the first code string entered is in excess of 7 digits, indicating to the operator that the function-code string entry must be sent to the computer before another function-code string entry can be made. The overflow indicator is enabled by the keyboard if a code string in excess of 14 digits is entered with the first function, or if the second function code string entered is in excess of seven digits. If the overflow indicator is illuminated the operator must reset the keyboard and make a correct entry. The overflow indicator is also accompanied by a distinctive audio tone which continues until the keyboard is reset.

The keyboard preferably contains an internal tone generator which generates tones similar to those of a touch tone telephone as discussed in detail below. Each key on the keyboard has a unique low and high tone combination associated with it. Continued usage of the keyboard by the operator will enable the operator to recognize entries by their tone combination such that transposed digits will be detected audibly by the operator so that they can be erased and corrected. This audio circuit also generates a beep when the computer changes any of the keyboard legend displays. In addition, it generates a continuous tone if an overflow condition is caused by the operator.

When the yardage transducer is attached to the keyboard, it drives a binary up/down counter which records yardage to a quarter yard increment with, for example, minus 2,048 or plus 2,047 total yards allowed to be accumulated on the counter by, for example, one quarter yard increments. The counter can be reset to zero only by remote control of the computer. Each time the operator depresses the send key, the current yardage count is stored and held for transmission to the computer along with the keyboard data entry.

There are at least five basic operations that the keyboard can perform in conjunction with the computer data controller. These are: keyboard and counter data entry to the computer, legend display by the computer, yardage counter current value readout by the computer, yardage counter reset by the computer, and keyboard entry reset by the computer. When the operator makes an entry and depresses the send key, this action causes interrupt data to be transmitted to the computer. This data contains both the keyboard entries and the yardage counter reading at the time the send key on the keyboard was depressed by the operator. The keyboard remains in the send state and the computer is able to reaccess the key data and yardage reading if desired.

When the computer receives the interrupt data from the keyboard and rereads the data if desired, then the computer can output a reset command to the keyboard. This command clears the data just entered in the keyboard by the operator and causes the keyboard to enter the reset state with a reset indicator on. This verifies to the operator that the data has been received by the computer and that another entry can be made. The computer can operate the keyboard display legend shown in FIG. 26 at any time by outputing the correct commands to the keyboard. Once a legend is turned on by the computer, it remains on until turned off by the computer; the operator has no control over the sixteen computer controlled legends.

The computer can read the current value of the yardage counter at any time by outputing the yardage counter read command to the keyboard. The ability of the computer to read the yardage counter allows the computer to make decisions on fabric cutting and to control appropriate legends to indicate to the operator which way to move the fabric to find the cut point. By having the computer read the current yardage value and rapidly indicating the direction that the fabric is to be moved, the operator can identify the cut point quickly and easily. The computer can reset the yardage counter to zero by outputing the correct command to the keyboard as determined by the computer program. Since the computer controls and reads the electronic yardage counter and indicates only direction of movement to the operator, this simplifies the operator's task in that the operator does not have to synchronize mechanical and electronic yardage counters or make comparisons between a calculated cut yardage and current yardage counter value.

A block diagram of the interactive keyboard circuitry is shown in FIG. 25. The left hand portion of the block diagram is devoted to those circuit functions which control the operation of the keyboard as data is entered. The lower left hand portion of the block diagram shows the yardage counter and its associated circuits. The right hand portion of FIG. 25 is devoted to those circuits which interface with the standard master station circuitry to allow the data controller-computer complex to control the unit.

The fifteen function and ten code keys on the keyboard are depicted by the entry key block 3002. Depressing one of these keys causes key buffer 3004 to be loaded with the four bit binary code for the particular key depressed. Additional lines from the entry keyboard go to the entry and memory control logic 3006 to identify whether the particular key depressed is a function or a code key and to identify the fact that a key has been depressed. This information is used by the entry and memory control logic 3006 to address the correct storage location in memory 3008 and to store the data into entry memory 3008 when an operated key is released. Key buffer 3004 also drives tone generator 3010 which generates the unique tone associated with the key. The tone generator then drives an audio output amplifier 3012 and loud speaker.

The send, reset, slash, code void and function void keys are depicted by the control key block 3014. These keys control entry and memory control logic 3006 to (1) selectively erase memory entries and restore the memory address register such that the next entry keyed will be directed to the correct storage location, (2) clear the memory completely, (3) reset the address counter, or (4) change the address counter. The status display block 3016 indicates the send, reset, encode, single entry and overflow indicators which show the current status of the interactive keyboard for the operator.

The entry memory 3006 is preferably a MOS semiconductor memory organized in 16 words of four bits each. Since only four bits are used to encode an entry key, the particular key is identified by both the contents stored in the memory and the location the data is stored in memory. Memory address zero is reserved for the first function entry and memory address eight is reserved for the second function entry. The first code entry is stored in memory address one and successive code entries are stored in the next adjacent address through address 7. If a single function code entry is being made, then the remaining code entries are stored in addresses 9 through 15. If two function code entries are made, then the second code string will be stored in addresses 9 through 15. When the memory is reset, all memory locations are cleared to zero, and all entry keys generate a non-zero entry. Thus, when the memory is read, a memory word which contains zero indicates that no entry was made in that memory location. The negative voltage for the MOS memory is generated by a switching circuit which operates from the positive 15 volt logic supply.

Yardage transducer 3020 preferably consists of a solid state lamp and two photosensitive diodes which are illuminated by the lamp. A disc which is driven by the yardage sensing wheel rotates such that it first interrupts the light to one diode, then both diodes, then only the second diode. This information is fed to a sixteen bit binary up/down counter 3022 with an input circuit which derives direction information from the manner in which the two photo-diodes are illuminated by the chopper disc. A clock signal is generated to the counter for each one quarter yard increment of fabric under the sensing wheel. The yardage counter is insensitive to directional changes in that it will not record a false up or down count on direction changes. Thus, it is possible to reverse the direction of the yardage counter a number of times and still maintain a one quarter yard accuracy on the counter.

The sixteen bit counter value can be treated either as a 16 bit absolute number or as a 15 bit signed number. The counter outputs are fed to the counter input/ output circuits 3026 which allow the counter value to be stored in a latch when the send key of the keyboard is depressed. The counter value stored is then read from this latch whenever the keyboard memory is read out. In addition, when the keyboard station receives a counter read command, it latches the current yardage counter reading into the latch for readout. The counter input circuits in the latch circuit are designed such that the latch will not load on a counter transition. This precludes the loading of a false counter value into the latch. Counter input/output circuit 3026 also allows the counter reset instruction to set the counter to a value of zero.

A master station 3030 as discussed above, provides timing information to all of the keyboard station input-/output circuits. The station instructions and characters are decoded from master station 3030 as indicated on the block diagram. This decoded information is also fed to all station input and output circuits. The address and data parity generator 3032 depicted in the upper right hand portion of the keyboard block diagram interface to both the master station circuitry 3030 and data output logic 3034. There are two parity generators: the received master station address parity for station address checking and the data parity generator which generates the data and instruction parity bits which are transmitted back to the data controller by the keyboard station.

When the send control key is depressed by the operator, entry and memory control logic 3006 sets the master station interrupt flip-flop and enables data output logic 3034 to control entry memory address circuits in logic 3006. In addition, when the send control is depressed, this resets the memory address to zero and in addition latches the current yardage counter value into the latch. Station data output logic 3034 is enabled to control the memory address counter in logic 3006, and as the station data is read out, data output logic 3034 decodes the master station timing information and increments the memory address such that the memory data can be serialized onto the data lines. Data output logic 3034 also serializes the current yardage counter latch value onto the data lines.

Legend display buffer and control circuits 3036 depicted at the lower right hand portion of the keyboard block diagram, accept information from the master station and the instruction and character decode circuits 3038. These circuits accept the incoming data string and store it into a latch which then drives the legend display 3040. When a display instruction is decoded, the display latch is cleared and the new display data is loaded into the display latch. Due to speed of operation of the station, the legend display drive is blanked for a maximum of 400 microseconds when a display change is made. The display logic also drives the tone generator to generate an audible beep to catch the operator's attention when the display is updated by the computer.

The station contains an AC power supply 3041 which supplies DC voltage to the display lamps and also to the circuits. The unregulated DC output is supplied to the lamps and in addition is preregulated to 18 volts before being supplied to the master station and auxiliary voltage regulators.

The keyboard station circuitry is divided among five circuits: the keyswitch, the keyboard encoding circuit, the keyboard control circuit, the yardage counter circuit, and the master station circuit. The keyswitch card contains all of the entry and control keys. A diode matrix on the card encodes the key switch contacts; in addition a contact bounce suppression network is mounted on the circuit. The keyboard encoding circuit contains the key buffer, the entry and control logic, the status display logic, and the entry memory. The keyboard control circuit contains the tone generator and audio output stage, the parity generators, the minus 12 volt MOS supply, the data output logic, the instruction and character decoding logic, and the legend display buffer and control logic. The yardage counter circuit contains the binary yardage counter and the counter input and output circuits.

The key switch circuit preferably contains 30 key switches, a diode key switch encoding network, contact bounce suppression networks, and lamp current limiting resistors for the two lighted key switches. Each of the thirty key switches contain a normally open read switch which is closed when the key is depressed. A diode matrix encodes the depressed key in negative logic, and, the same diode matrix is utilized to encode both the function and the code keys.

The keyboard power supply accepts 115 volts 60 cycles input and furnishes 24 volts DC unregulated voltage to the display lamps and 18 volts of preregulated DC to the master station and auxiliary circuit of the keyboard. The 18 volt preregulated output is protected by a crowbar circuit in case of preregulator failure.

The power supply transformer primary side is protected by a fuse, a transient suppressor, and a by-pass capacitor to earth ground. The transformer supplies 24 volts AC to a rectifier bridge, the output of which is filtered by a filter capacitor. A darlington driven transistor preregulates the voltage to 18 volts as established by a zener reference diode. A fuse can be blown by the 18 volt crowbar circuit in case of an overvoltage output. The crowbar circuit is comprised of an SCR gate resistor, a time constant capacitor, a gate zener diode. A further resistor furnishes a load to the preregulator when all cards are removed from the keyboard. The crowbar is activated when the preregulated output exceeds 20 volts, thereby allowing the zener diode to supply gate current to the SCR gate input.

The keyboard encoding circuit contains those circuits associated with the memory which stores the encoded key data, and those circuits which indicate the operational status of the keyboard to the operator. It should be recalled that the particular key data stored is identified both by the key code and the storage position in the memory. Memory words 0 and 8 are reserved for functions 1 and 2 respectively and the remaining 14 words of memory are used for the code entry if only a single function is entered. If two functions are entered, locations 1 through 7 are used to store the first code entry and locations 9 through 15 are used to store the second code entry.

The following Table 8 summarizes the data input-/output format for the interactive keyboard.

TABLE 8

1. Computer reset of the keyboard:

The computer can reset the keyboard to allow the next data entry by outputing the following C and A words to the Data Controller:

C Register: ϕϕϕ141

A Register:

| Station Address | ØØ ØØ1 ØØØ |
|---|---|
| Ø 7 | 8 15 |

2. Computer reset of the yardage counter:

The computer can reset the yardage counter to zero by outputting the following C and A words to the Data Controller:

A Register: ϕϕϕ141

B Register:

| Station Address | ØØ Ø1Ø ØØØ |
|---|---|
| Ø 7 | 8 15 |

3. Computer readout of the keyboard and yardage counter:

The computer can read the contents of the keyboard and yardage counter for interrupt data verification by outputting the following C and A words to the data controller:

C Register: ϕϕϕ111

A Register:

| Station Address | 1Ø ØØØ ØØØ |
|---|---|
| Ø 7 | 8 15 |

The data controller will respond with the following when the data has been acquired:

C Register: ϕ21111 (normal response)

A Register: Same as above

BØ Data Word:

| Function 1 | Code 1 | Code 2 | Code 3 |
|---|---|---|---|
| 0 3 | 4 7 | 8 11 | 12 15 |

Function 1: First function key entry
Code 1: First code key entry for function 1
Code 2: Second code key entry for function 1
Code 3: Third code key entry for function 1

B1 Data Word:

| Code 4 | Code 5 | Code 6 | Code 7 |
|---|---|---|---|
| 0 3 | 4 7 | 8 11 | 12 15 |

Code 4: Fourth code key entry for function 1
Code 5: Fifth code key entry for function 1
Code 6: Sixth code key entry for function 1
Code 7: Seventh code key entry for function 1

B2 Data Word:

| Function 2 | Code 1 | Code 2 | Code 3 |
|---|---|---|---|
| 0 3 | 4 7 | 8 11 | 12 15 |

Function 2: Second function key entry
Code 1: First code key entry for function 2
Code 2: Second code key entry for function 2
Code 3: Third code key entry for function 2

B3 Data Word:

| Code 4 | Code 5 | Code 6 | Code 7 |
|---|---|---|---|
| 0 3 | 4 7 | 8 11 | 12 15 |

Code 4: Fourth code key entry for function 2
Code 5: Fifth code key entry for function 2
Code 6: Sixth code key entry for function 2
Code 7: Seventh code key entry for function 2

B4 Data Word:

| Yardage Count |
|---|
| 0 15 |

The yardage count is binary in ¼ yard increments and should be considered a 16 bit signed count since the yardage counter is bi-directional and can represent negative as well as positive yardage about the reset point.

4. Computer control of the display panel:

The computer controls the keyboard display panel by outputting a C register and an A register value and the Bϕdata word to the data controller as shown below:

C Register: ϕϕϕ1ϕ1

A Register:

| Station Address | ØØ Ø11 ØØØ |
|---|---|
| 0 7 | 8 15 |

BØ Data Word:

| A | B | C | D | E | F | G | H | I | J | K | L | M | N | O | P |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

Where A through P determine the state of their respective displays.

1 = Display On
ϕ = Display Off

The legends are identified as shown from the front of the keyboard:

| | | | | |
|---|---|---|---|---|
| | A | B | C | D |
| | E | F | G | H |
| | I | J | K | L |
| | M | N | O | P |

5. Computer read-out of the yardage counter:

The computer can read the current value of the yardage counter at any time by outputting the following values to the data controller.

C Register: ϕϕϕ1ϕ1

A Register:

| Station Address | 1Ø ØØ1 ØØØ |
|---|---|
| 0 7 | 8 15 |

The data controller will acquire the data and respond to the computer with the following:

C Register: ϕ21111

A Register: Same as above

BØ Data Word:

| Yardage Count |
|---|
| 0 15 |

6. Keyboard entry interrupt data to the computer:

When the keyboard "Send" key is depressed, the keyed entry and the current yardage count at that instant are transmitted to the data controller. The data controller then transfers the following to the computer:

C Register: ϕ2ϕ511

A Register:

| Station Address | 1Ø ØØØ ØØØ |
|---|---|
| 0 7 | 8 15 |

Bϕ through B5 are identical to those of 3 above for computer initiated readout.

The fifteen function keys are encoded in 1–15 binary. The code keys are encoded in BCD with the exception of the digit ϕ which is encoded as 1111. The data memory of the keyboard is cleared prior to entries being made, and 0000 in any function or code position indicates no entry was made in that position.

Figure 27:
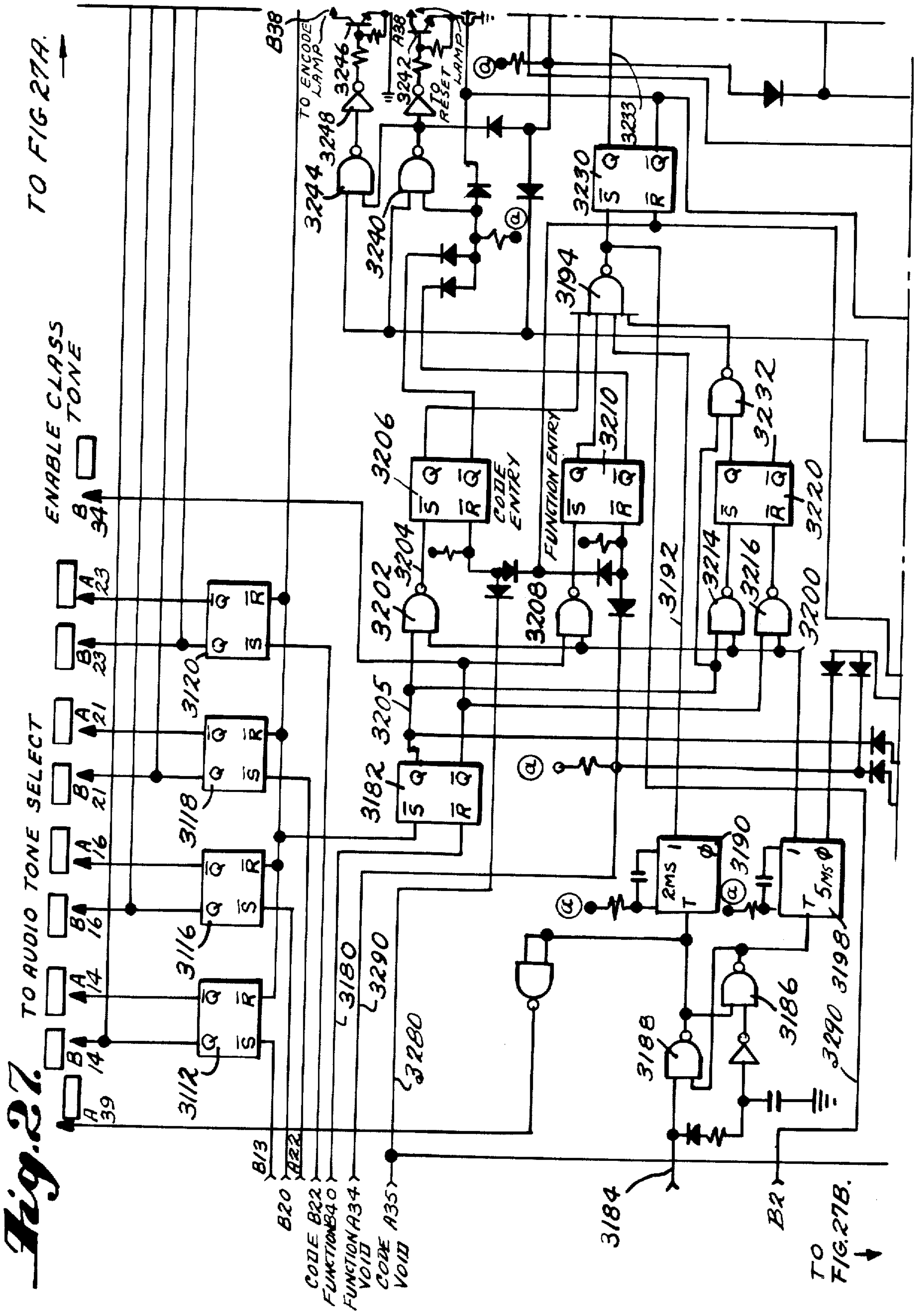
FIG. 27, comprising
Figure 27A:
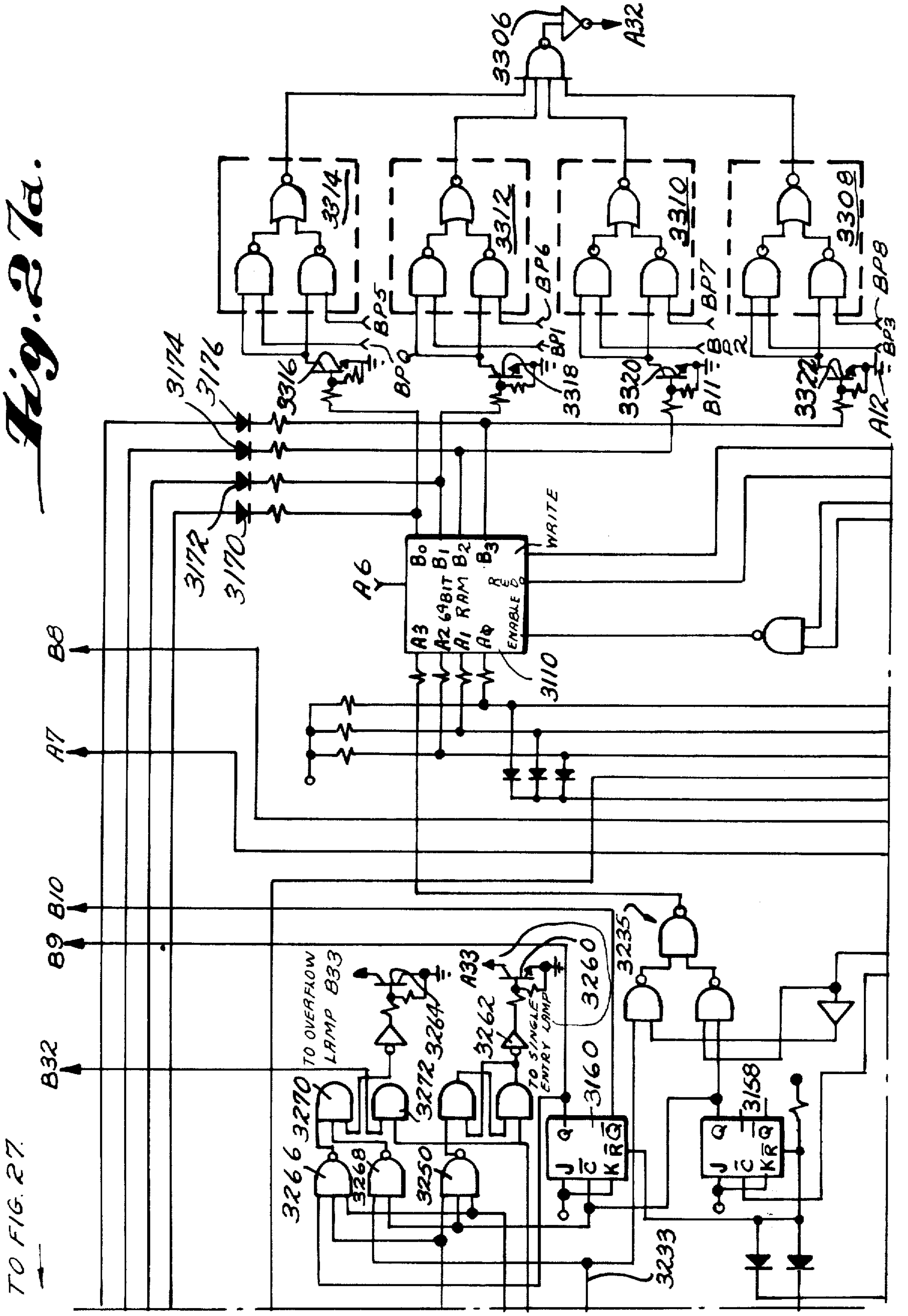
FIGS. 27*a*, 27*b* and 27*c*, shows a detailed schematic of a first portion of the interactive keyboard.
Figure 27B:
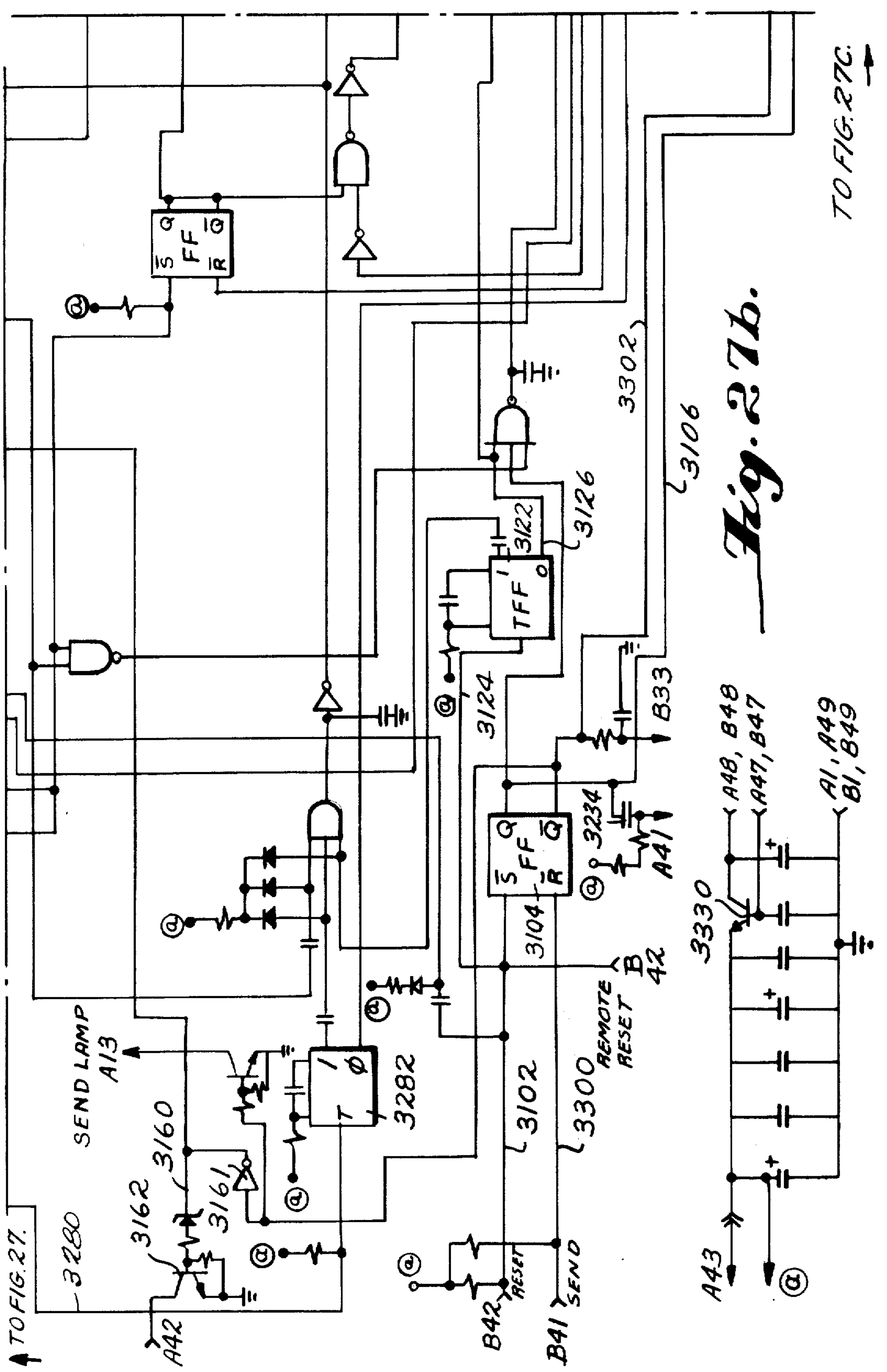
Figure 27C:
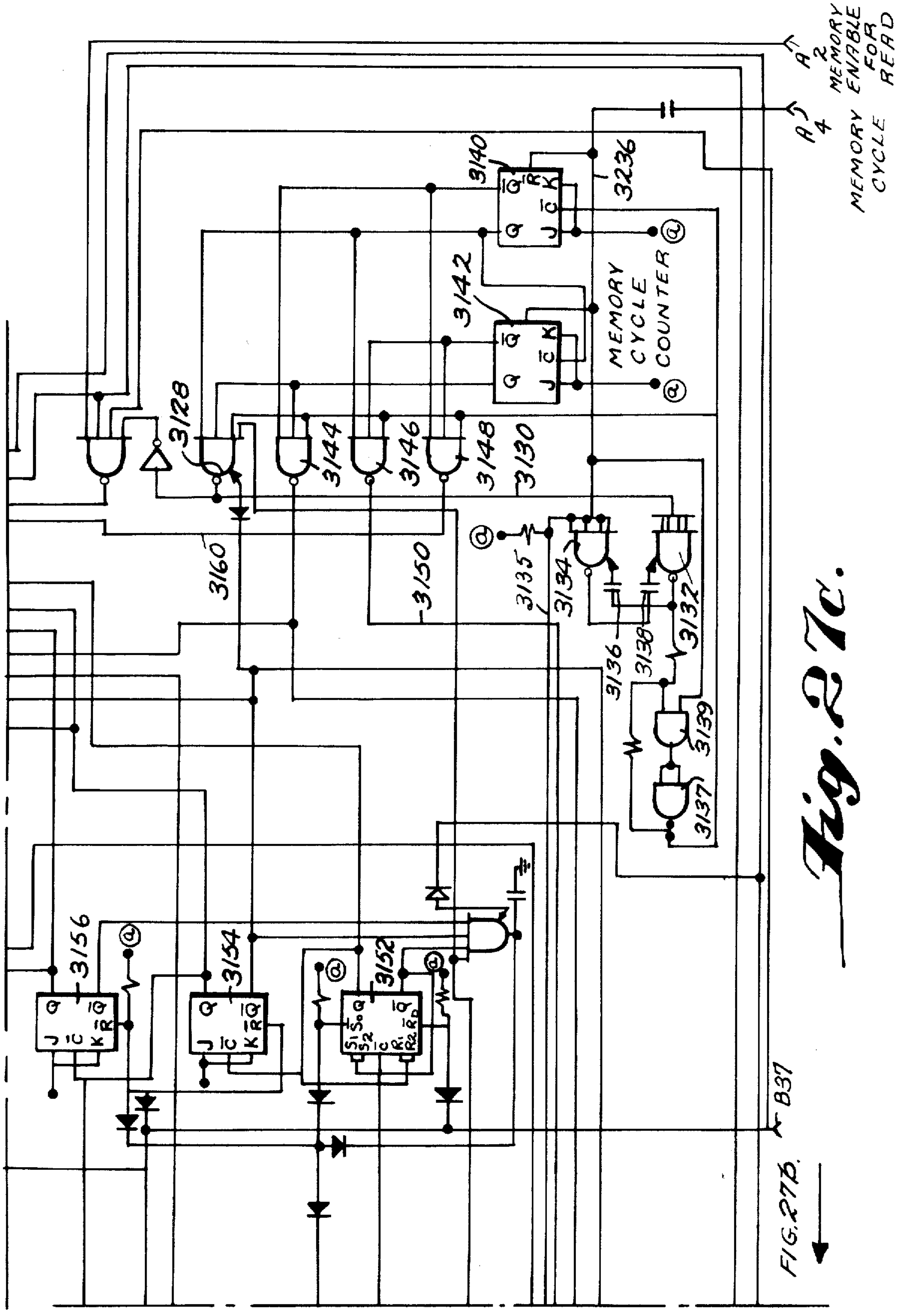
Figure 28:
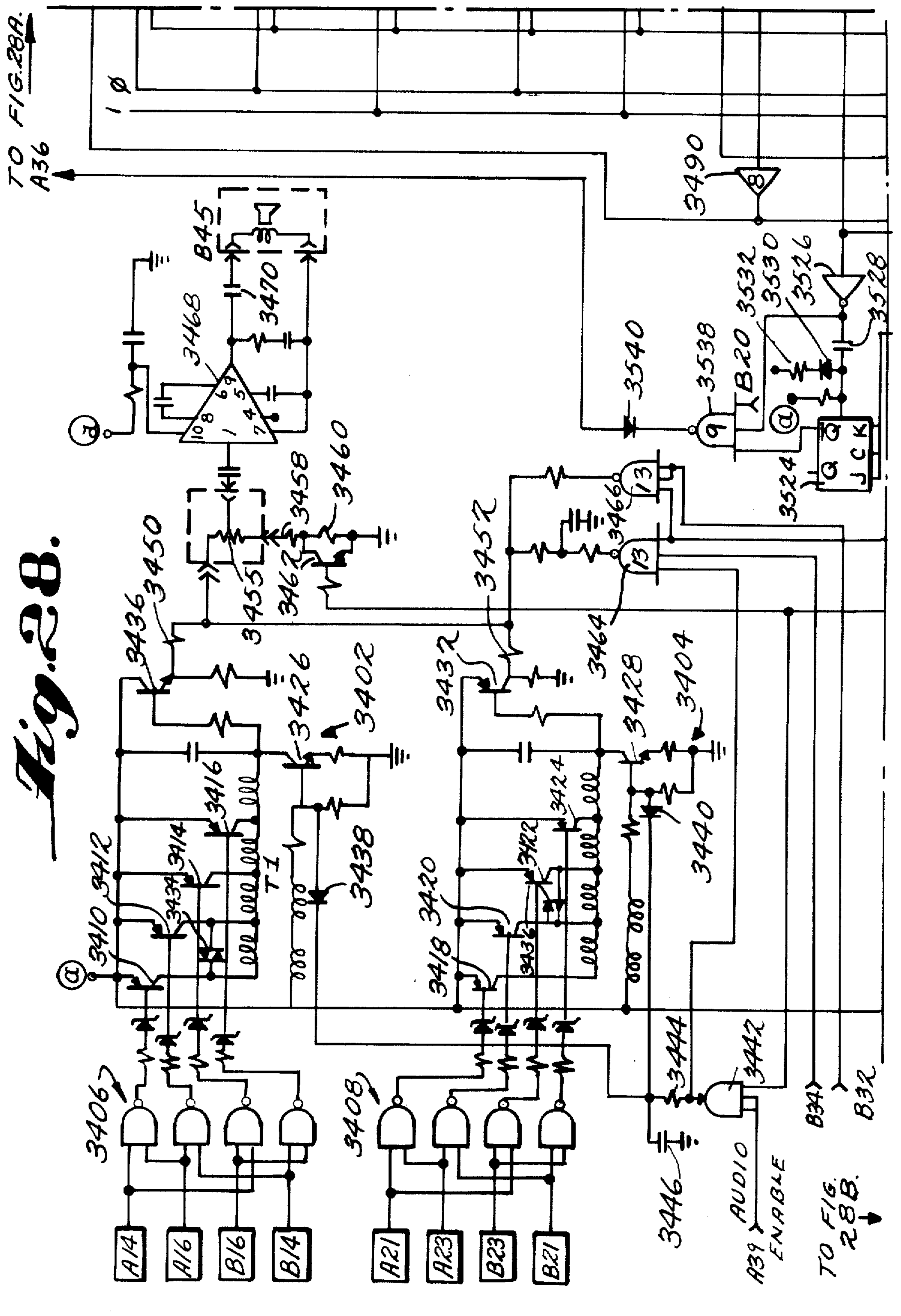
FIG. 28, comprising
Figure 28D:
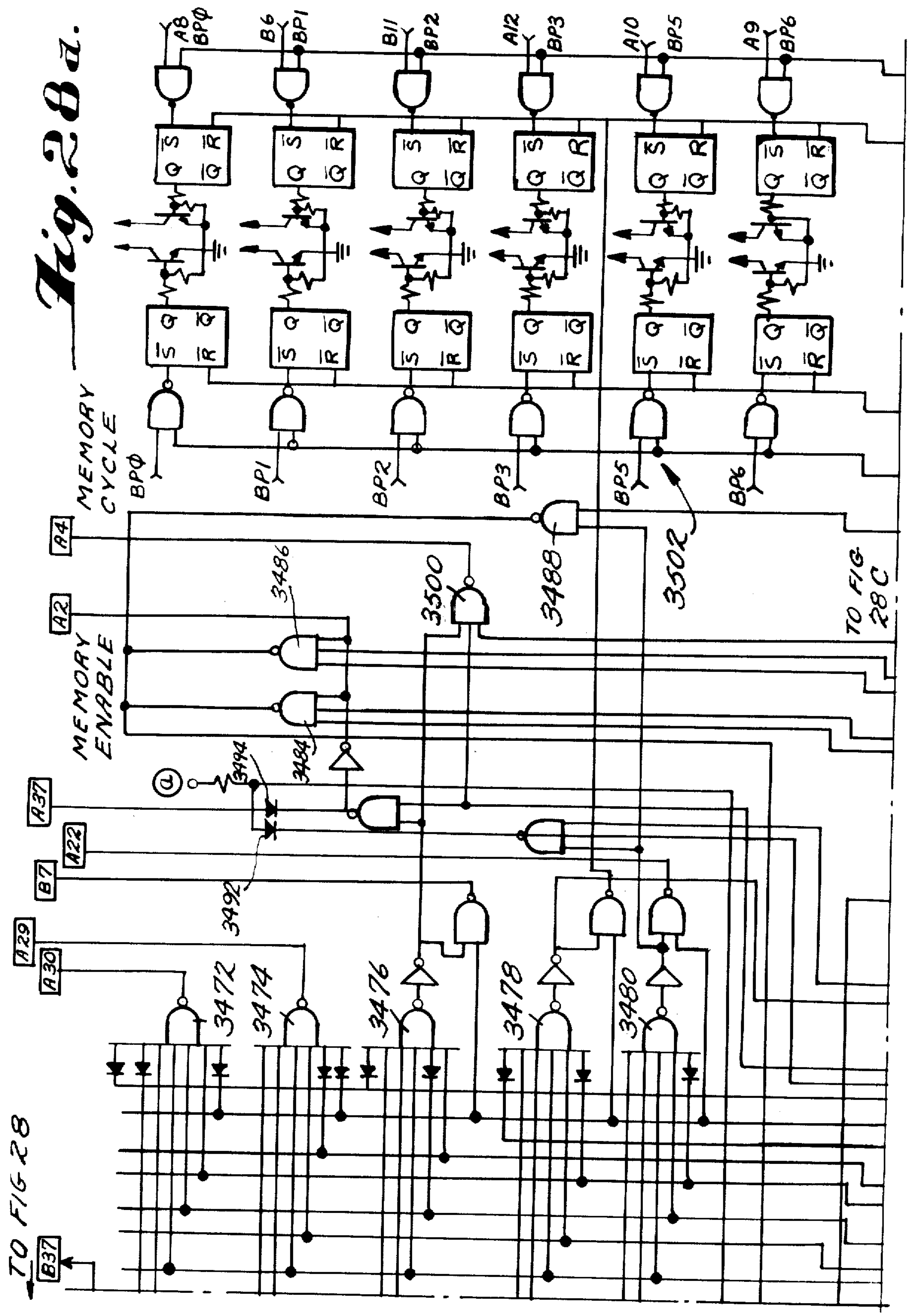
FIGS. 28*a*, 28*b* and 28*c*, shows a detailed schematic of a second portion of the interactive keyboard.
Figure 28B:
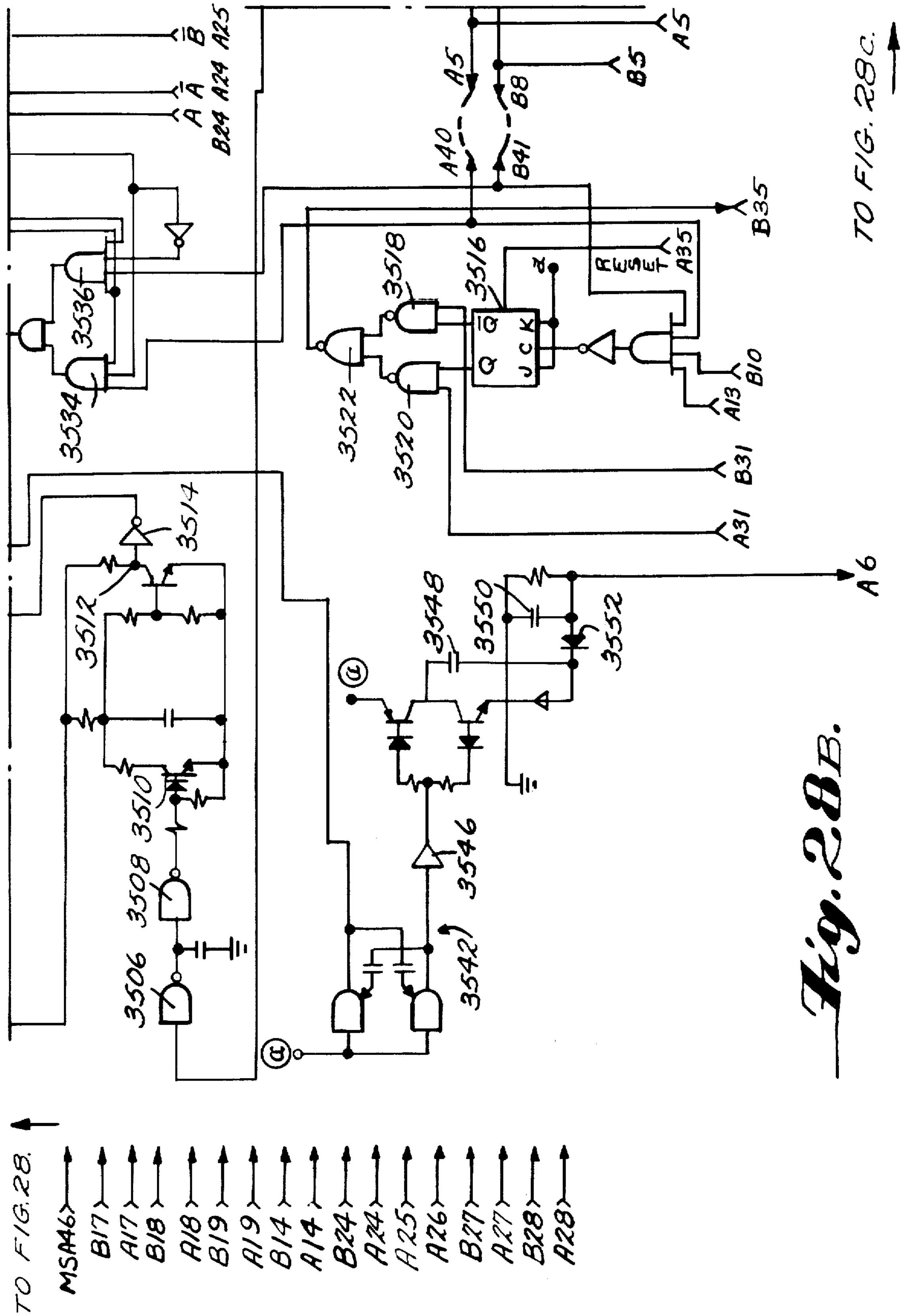
Figure 28C:
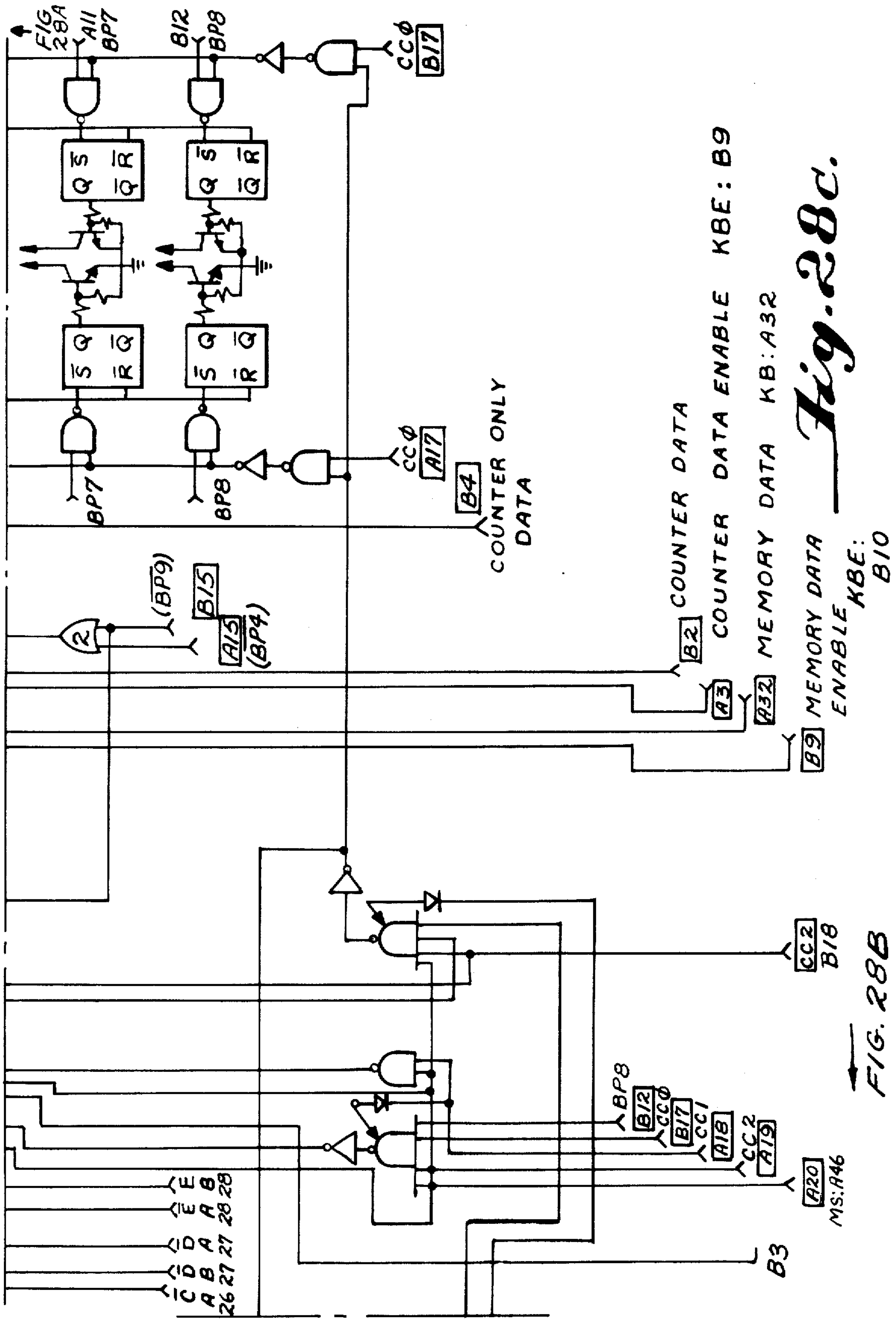

Reference is now made to FIGS. 27 and 28 which illustrate portions of the detailed schematic of the interactive keyboard shown in block diagram in FIG. 25. As discussed above, information is entered into the keyboard associated with this schematic by first operating the re-set key and then entering a string of code digits, either preceded or followed by manually operating a function key which identifies the code string. The information which results from operation of these keys is entered into a conventional random access memory (RAM), with the information resulting from operation of the function key being entered into a first of sixteen locations, and the information resulting from the operation of the code keys being entered into positions 1 – 7. If the capacity of this first portion of the memory, which includes locations 1 – 7, is exceeded by the operation of code keys associated with that first function, then all further information is entered into a second portion of the memory which includes positions 8 through 15, and a light is illuminated on the display panel indicating that only a single entry can take place before the entered data is transmitted. If the capacity of that first portion of the RAM memory is not exceeded, then a second function key can be depressed in connection with the operation of a number of code keys associated with that section function, with that information being stored in the second portion of the RAM.

Referring to FIG. 27, operation of the re-set key grounds line 3102, which causes RS flip-flop 3104 to be set and apply a suitable signal on line 3302, which is connected as shown to the read input to RAM memory 3110 which configures that memory to accept information from the latch entry circuit comprised of flip-flop 3112, 3116, 3118 and 3120. The signal on re-set line 3102 is also applied to monostable flip-flop 3122 via line 3124, so that flip-flop 3122 produces on line 3126 a logical zero for a suitable duration. This zero is applied as one input to NAND gate 3128 to cause that gate to shift its output to a logical one on line 3130 which is applied to gate 3132. Gate 3132 is interconnected with gate 3134 by capacitors 3136 and 3138 to form an astable multivibrator which produces a train of pulses when gate 3132 is enabled by a logical one on line 3130. The output of the astable multivibrator is applied to a Schmidt trigger which is composed of gates 3137 and 3139 which are interconnected as shown.

The output of the Schmidt trigger including gates 3137 and 3139 is applied to a memory cycle counter comprised of flip-flops 3140 and 3142. The outputs of flip-flops 3140 and 3142 are in turn connected to and decoded by gates 3128, 3144, 3146 and 3148, with the output of gate 3146 in particular being connected via line 3150 and gating to flip-flop 3152 which, together with flip-flops 3154, 3156, 3158 and 3160, form a memory address counter which is incremented by one byte each pulse produced by gate 3146 and applied to the counter on line 3150 and gating. The output of gate 3144 is connected to flip-flops 3112, 3116, 3118 and 3120 for resetting these flip-flops after their information has been read into RAM memory 3110.

As long as monostable flip-flop 3122 continues producing its pulse, gate 3128 does not shift to logical zero at a count of three, but instead keeps the astable multivibrator including gates 3132 and 3134 running so that the memory cycle counter increments the memory address counter through several cycles thus causing, as will be apparent from the discussion below, zeros to be written into each of the addresses in the convention RAM memory 3110 In this fashion, memory 3110 is cleared in preparation for the receipt of information which can now be manually entered on the keyboard associated with the schematics shown in FIGS. 27 and 28.

The shifting of flip-flop 3104 in response to operation of the re-set key shown in FIG. 26, also applies a suitable voltage to line 3160 via inverter 3161, which in turn causes transistor 3162, which is controlled by flip-flop 3104, to shift from its non-conductive to its conductive condition, thus producing a signal which is applied to the keys enabling them for encoding when the keyboard is in the reset-encode states. It will be apparent from the discussion below that, when the keyboard is in the send state, all switches on the key switch card are disenabled with the exception of the re-set key.

After the re-set key is operated, either a function key or a plurality of code keys are sequentially operated. Each time that a key is operated, the binary number representing that key is stored in latch flip-flops 3112, 3116, 3118 and 3120 with the outputs of those flip-flops applying appropriate voltages to the audio tone generator which is described in detail below. The outputs of flip-flops 3112, 3116, 3118 and 3120 are also connected via diodes 3170, 3172, 3174 and 3176 to RAM memory 3110 for reading the binary number in flip-flops 3112, 3116, 3118 and 3120 into RAM memory 3110 at the appropriate time, as discussed in detail below.

The operation of a function key causes a voltage to be produced on line 3180 which causes flip-flop 3182 to be re-set. Further, the depression of any key—function or code—causes a signal to be applied on line 3184 to a pulse stretcher which is comprised of NAND gates 3186, and 3188. A signal produced on line 3184 causes a first monostable flip-flop 3190 which is connected to the output of gate 3188 as shown to produce an output signal on line 3192 which is applied as one of the inputs to gate 3194 as will be explained below. Thereafter, following code or function entry storage, an appropriate signal is applied to monostable flip-flop on 3198 so that that flip-flop produces a logical one on output line 3200 which is coupled to the gates attached to line 3200.

Line 3200 is connected as one of the inputs to NAND gate 3202 with the other input to that gate being connected to the output of flip-flop 3182 such that a logical zero is produced on line 3204 to cause flip-flop 3206 to be set after a code entry has been stored. Similarly, line 3200 is connected as one input to NAND gate 3208, with the other input connected to flip-flop 3182 such that flip-flop 3210, which is connected to the output to gate 3208, is set after a function is stored. Line 3200 is connected as one input to both gates 3214 and 3216. The other input to gate 3214 is connected to one output of flip-flop 3182, while the other input to gate 3216 is connected to the other output of flip-flop 3182 such that flip-flop 3220, which is connected to the outputs of gates 3214 and 3216 as shown, has an output condition which reflects the last type key-function or code--which was stored. The output of flip-flops 3206, 3210, 3220 and 3182 are connected as inputs to a NAND gate 3194 such that gate 3194 produces a signal which sets flip-flop 3230 only whenever the second function group is initiated by the depression of a function key or in another manner by a code key as set forth above. Flip-flop 3220 is connected to NAND gate 3194 via NAND gate 3232, which produces a logical zero output only if the last key entered was a code key and a code key was also depressed for the current entry. The output of flip-flop 3230 is connected via line 3233 to RAM memory 3110 via gates 3235 to cause the information to be stored in either the first or second portion of the memory depending upon the output of flip-flop 3230 and accordingly whether the first or second function code group is being entered.

Entry of a code or function key causes monostable flip-flop 3198 to trigger producing a signal on line 3135, which is applied to the flip-flops 3140 and 3142 of the memory cycle counter to reset those flip-flops. The astable multivibrator is now enabled by the logical one on line 3130 and increments the count in the counter comprised of flip-flops 3140 and 3142 which upon the first count therein produces a signal on line 3160 which enables RAM memory 3110 and on the second count produces an output signal on line 3150 which increments the count in the memory address counter comprised of flip-flops 3152, 3154, 3156, 3158 and 3160 which controls the position at which the number stored in the entry latch comprised of flip-flops 3112, 3116, 3118 and 3120 is stored in RAM memory 3110. The number in those flip-flops is then stored in the appropriate location in RAM memory 3110, and the above process is repeated upon depression of the next key by the operator with the memory address counter being incremented by one upon each entry by the memory cycle counter to cause the information associated with each key depression to be stored in the appropriate place in RAM memory 3110.

Operation of the reset key, applying the appropriate signal to flip-flop 3104 through gating line, also causes gate 3240 to shift its output condition, causing transistor 3242 to shift from its non-conductive to its conductive position and apply a voltage to the reset lamp on the display so that that lamp is illuminated to indicate to the operator that the device has been reset. As soon as flip-flop 3206 is set by a code entry, gate 3240 is disabled and transistor 3240 returns to its non-conductive condition, thus cutting off the current through the reset lamp which is thus doused. Gate 3244 is also connected to flip-flop 3104 via gating as well as to the output of gate 3240, and when gate 3240 shifts its output condition, gate 3244, which is connected to transistor 3246 through conventional inverter 3248, likewise shifts its output condition causing transistor 3246 to become conductive and complete a current path through an encode lamp which is likewise situated on the display panel so that that lamp is illuminated indicating that the encoding is proceeding.

As mentioned briefly above, the display also includes a single entry lamp and an overflow lamp. The single entry lamp is illuminated whenever the string of code digits entered exceeds the capacity of the first portion of RAM memory 3110 so that succeeding digits are stored in the second portion, and that that second portion is not available for the storage of a second function and its associated code digits. As shown, gate 3250 is connected to the output of flip-flop 3230, which as discussed above is set whenever the second function group is initiated, and is also connected to the outputs of flip-flop 3154 and 3158, so that if a count is reached in the memory address counter which is associated with the second portion of RAM memory 3110 and the second function group has not been initiated by the setting of flip-flop 3230, a signal is produced and applied to transistor 3260 via conventional inverter 3262 which completes the current path through the single entry lamp on the display which is illuminated.

Similarly, the over-flow lamp is illuminated if the number of digits entered exceeds the total capacity of RAM memory 3110, and transistor 3264 is likewise coupled to the address counter via gates 3266, 3268, 3270 and 3272 such that transistor 3264 shifts from its non-conductive to its conductive condition to complete the current path through the over-flow lamp whenever the capacity of RAM memory 3110 is exceeded.

As mentioned briefly above, both the function and code keys have associated with them a separate key which can be used to void the function or code which has just been entered. The code void key is connected to line 3280 so that a suitable signal is applied to monostable flip-flop 3282 whenever the code void key is operated. This voltage causes flip-flop 3282 to provide a suitable output signal which operates to reset the memory counter to the start of the current code group and also to erase the information just entered into the key buffer. Also, as mentioned above, the two function groups can be separated by the operation of a slash key. The operation of this slash key applies an appropriate voltage on line 3290 which in turn operates to set flip-flop 3230.

After all of the information has been entered into the RAM memory the send key is depressed to ground suitable voltage on line 3300 which operates to cause flip-flop 3104 to re-set and to set the master station interrupt register via computer 3234 apply a signal on line 3302 which is coupled as shown to the write line of RAM memory 3110 so that memory 3110 is enabled to read the information stored therein on the memory data output line 3306 in a sequential order as determined by the bit periods generated by the master station as discussed above. Logic gates 3308, 3310, 3312 and 3314 operate to remove the digits in RAM memory 3110 one by one as determined by the bit period counter of the master station circuit. Transistors 3316, 3318, 3320 and 3322 provide current sinking logic drive capability for the MOS memory outputs. The two and-or-invert packages utilize both the memory data outputs and the bit period outputs from the master station card as inputs to serialize the data. The most significant bit of the memory data is serialized by bit periods F$\phi$ and 5, and the least significant data bit is serialized by bit periods 3 and 8. This schematic also depicts an active decoupling circuit for the logic power supply. The decoupling circuit consists of transistor 3330 and a number of decoupling and by-pass capacitors. This decoupling circuit also provides power to the key switch diode encoding matrix.

Reference is now made to FIG. 28 which shows a detailed schematic of a portion of the interactive keyboard termed the keyboard control. The keyboard control interfaces the master station card to the keyboard encoding and yardage counter circuitry and in addition performs several individual functions. These functions include: (1) tone and audio output, (2) master station circuit instruction decoding, (3) data and address parity generation, (4) legend display buffering and output, (5) master station card instruction and character decoding, (6) data output circuits, and (7) negative voltage generation for the keyboard encoding MOS memory.

The audio tone generator consists of two oscillators which utilize conventional touch/tone telephone signal transformers. Oscillator 3402 generates four different frequencies in the range of 1,100 to 1,400 hertz; the other oscillator 3404 generates frequencies in the range of 600 to 990 hertz. Each oscillator can generate four unique tones thus giving 16 possible tone combinations. The oscillators consist of a common emitter transistor stage with a tuned LC collector circuit and inductive feedback to the base circuit. Oscillation is initiated by causing one or four transistors connected into the coil of the tank circuit to conduct, thus completing the LC tank in the collector circuit. Logic gates 3406 and 3408 are used to decode the keyswitch buffer and enable one transistor in each of the two tank circuits. Transistors 3410, 3412, 3414, 3416, 3418, 3420, 3422, and 3424 provide the tank circuit tap selection. Transistors 3426 and 3428 form the oscillators and transistors 3436 and 3432 buffer the oscillator output. Varistors 3434 and 3430 limit the oscillator amplitude to a constant value for all frequencies. The two oscillators are disabled by grounding the oscillator bases through diodes 3438 and 3440 which are in turn controlled by NAND gate 3442. Resistor 3444 and capacitor 3446 serve to dampen this control so that the audio output does not thump when the tone is terminated. The oscillators are enabled through input A 39 from the keyboard encoding circuitry discussed above.

The two oscillator outputs are summed by resistors 3450 and 3452 and fed to a volume control variable resistor 3455 which is connected in series with two resistors 3458 and 3460. Resistor 3458 ensures that the volume can never be turned down completely. Resistor 3460 which is by-passed by transistor 3462 allows the volume to be increased by remote control; this can be utilized to generate an audible beep regardless of volume control setting when the legend display is updated.

The outputs of gates 3464 and 3466 are also summed with the two oscillator outputs. These serve to mix a 2.5 kilohertz (approximate) signal with the two oscillator outputs when a function key is depressed to give the function keys a different tone from the code keys. When an overflow condition occurs on the keyboard, gate 3466 gates the 2.5 kilohertz tone into the audio amplifier to generate a distinct tone to alert the operator. The tone combination which is not generated by the keyboard due to the fact that an all zero encoded state is not utilized on the keyboard, is enabled when the legend display is updated to generate the beep to alert the operator. The audio output stage consists of an integrated audio amplifier 3468 which is capacitively coupled to the loudspeaker by capacitor 3470. The remote speaker connection at the rear of the unit parallels the internal keyboard speaker.

FIG. 28 also shows the instruction decoding circuits. Gate 3472 decodes the keyboard reset command; gate 3474 decodes the counter reset command; gate 3476 decodes the counter and keyboard read command; gate 3478 decodes the display enabled command; gate 3480 decodes the counter read command. These instructions are decoded from the 5 most significant bits of the instruction register on the master station and are enabled only when the correct instruction is in the instruction register, the master station address flip-flop is set and for some instructions, only on bit period 8 of the instruction character. Individual characters are not decoded for data output since the keyboard encoding circuit memory address counter shown in FIG. 27 is utilized for data output control on the keyboard and counter read instructions.

The data output circuits are likewise shown in FIG. 28. Gate 3484 OR's the memory data onto the data output bus for the keyboard and counter read command; gate 3486 enables the counter data onto the data output bus with this command. Gate 3488 OR's counter data onto the data output bus for the counter read instruction. The data output line feeds the data parity generator, is inverted, and leaves the schematic at B37. Diodes 3492 and 3494 OR together the various data output enable instruction for the master station circuit. This signal leaves the keyboard control circuit at A37. The output of gate 3400 causes the keyboard encoding circuit memory to be cycled to increment the memory address counter and access the next four bits of data in the memory for serialization.

The legend display in this embodiment consists of 16 RS flip-flop latches generally indicated as 3502 with input gates and output driver transistor which control lamps on the legend display panel at the front of the unit. When the display enable instruction is decoded, the display latch is reset on bit period 8 of the instruction character. The latch is then sequentially loaded on each data bit period of the first two data characters after this instruction.

When the display enable instruction is decoded, the display data stream initiates a pulse stretcher comprised of gates 3506 and 3508, which in turn drive a second pulse stretching circuit which consists of transistors 3510 and 3512 and inverter 3514. These stretch the data display command to approximately one-half second to drive the tone generator to generate the tone signifying the legend display has been updated.

The master station address parity is generated by JK flip-flop 3516 and its associated logic. The flip-flop is reset on the start-of-message signal and generates odd parity on the first 7 bits of the address character. The odd parity on these 7 bits is then held and a comparison is made by the Exclusive OR formed of gates 3518, 3520, and 3522. The output of this parity comparison is fed to one input of the master station address gate such that the gate is enabled if a valid parity comparison is made.

JK flip-flop 3524 generates the parity transmitted during bit period 9 of the instruction and each succeeding data character. This flip-flop is reset at the end of bit period 9 by inverter 3526 and the AC coupling circuit comprised of capacitor 3528, diode 3530 and resistor 3532. Gate 3534 is utilized to generate odd parity on received data and the instruction character; gate 3536 is utilized to control the flip-flop to generate parity on outgoing data. Gate 3538 drives expander inputs of the master station circuitry through diode 3540 for parity output.

An astable multivibrator circuit 3542 outputs a square wave with a frequency of approximately 2.5 kilohertz. This output is fed to the tone generator and also to inverter 3546 which drives a switching circuit which switches a capacitor 3548 between +15 volts and ground. The charge on this capacitor is transferred to capacitor 3550 by diode 3552 to generate the negative voltage output. This negative voltage is then fed to the MOS circuit in the keyboard encoding card.

Figure 29A:
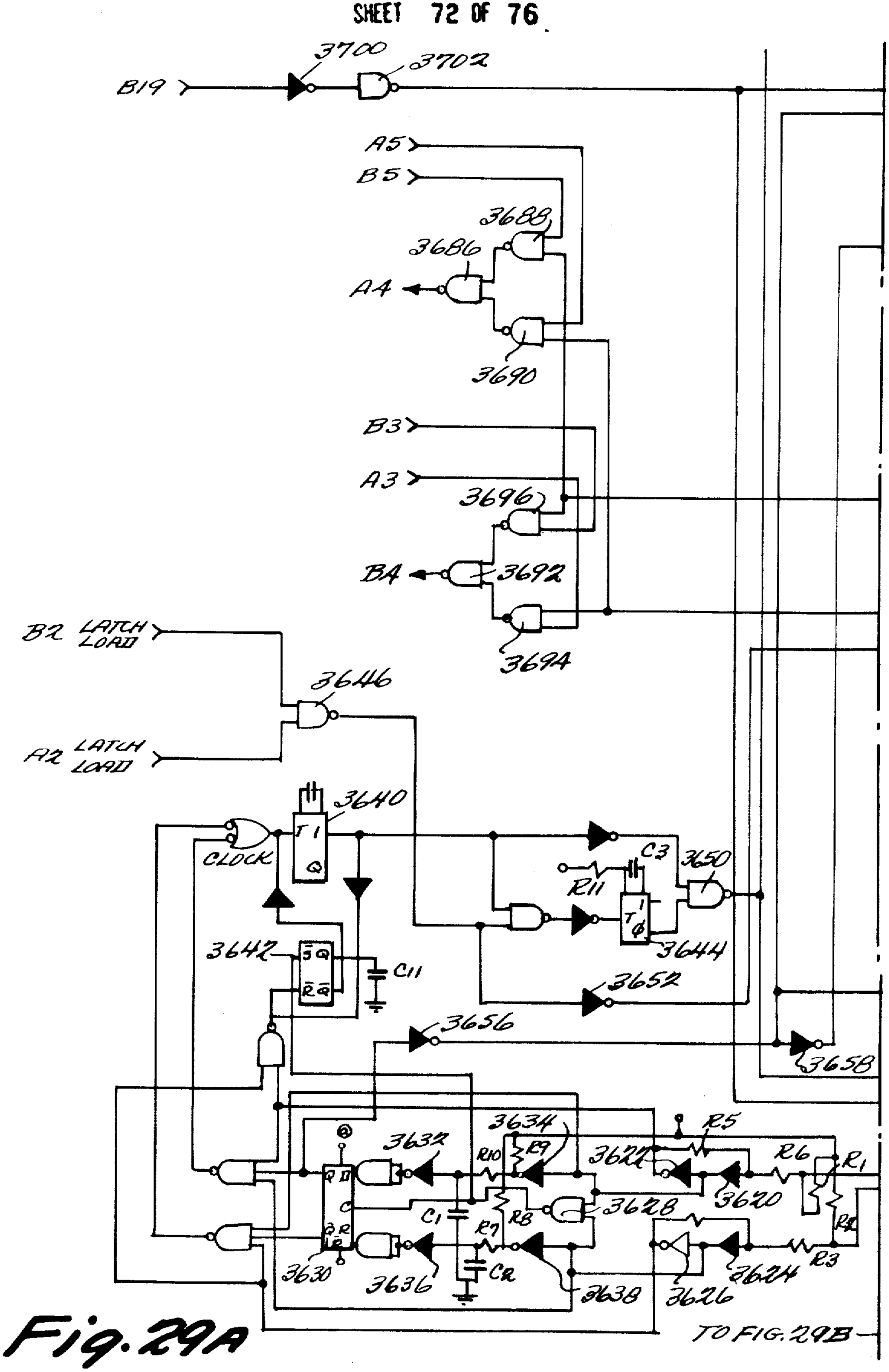
FIGS. 29*a*, 29*b* and 29*c*, shows a detailed schematic of up/down binary counter of the interactive keyboard.
Figure 29B:
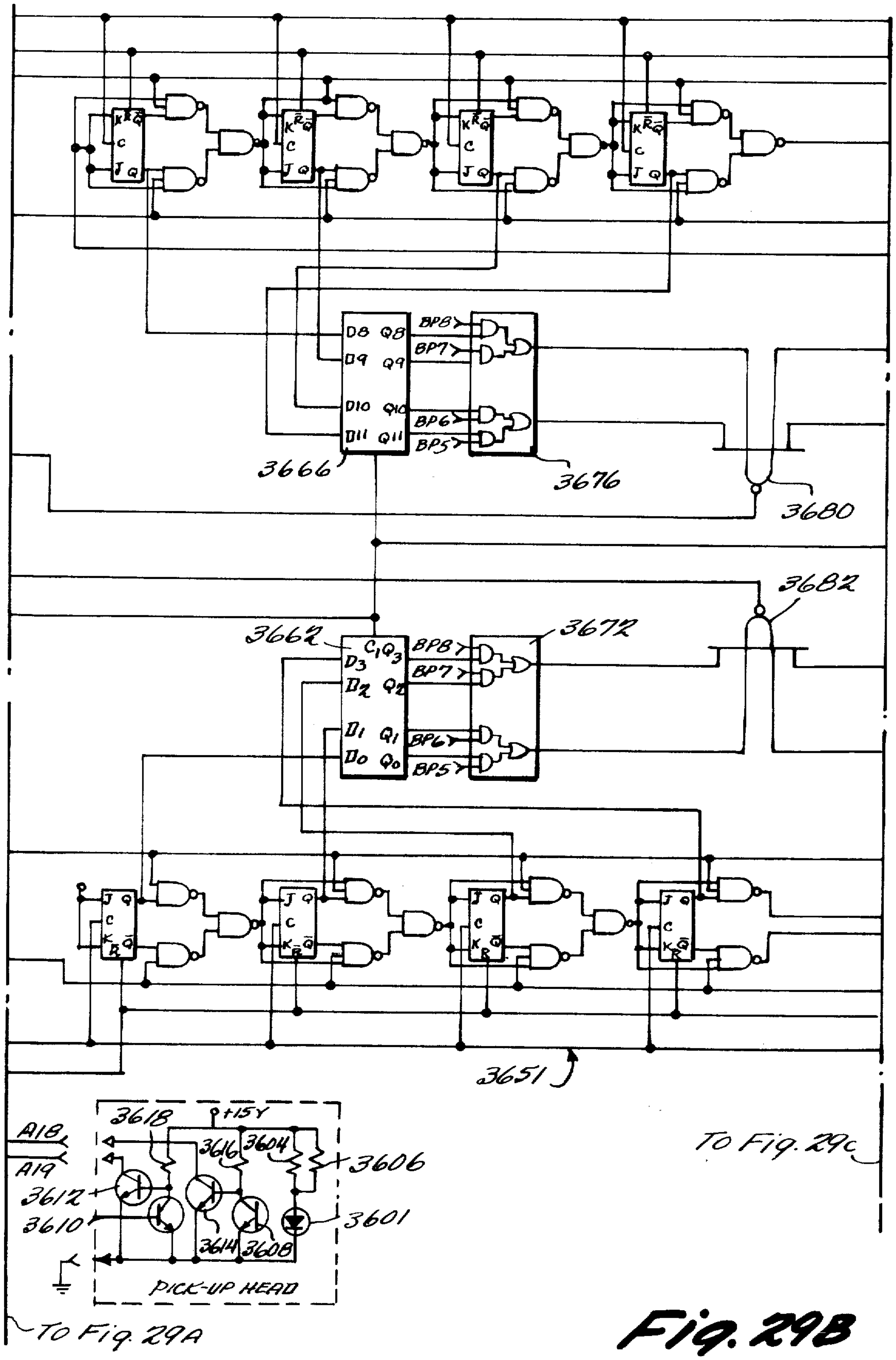
Figure 29C:
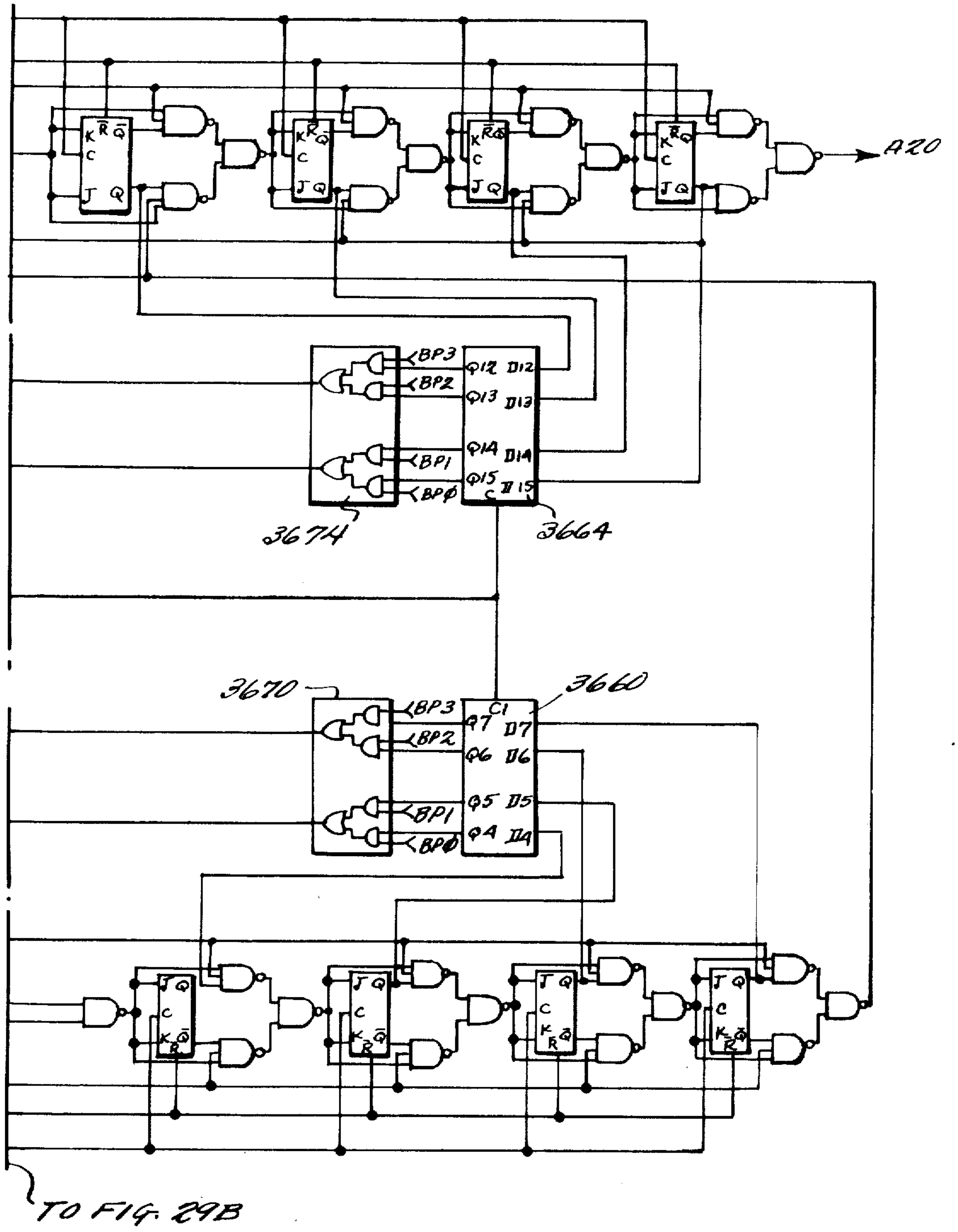
Figure 30:
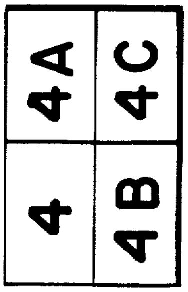
FIGS. 30–45 show how the multi-sheet FIGS. 4–13, 17, 21, 22, 27, 28 and 29 fit together.
Figure 31:
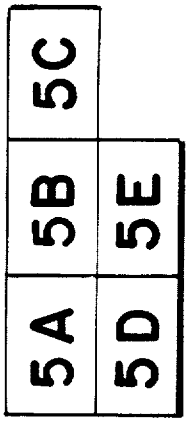
Figure 32:
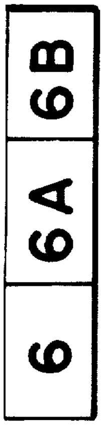
Figure 33:
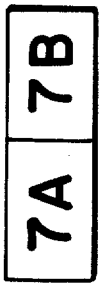
Figure 34:
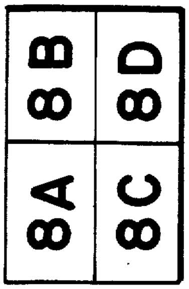
Figure 35:
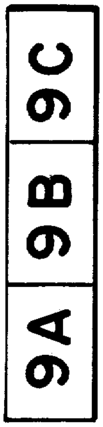
Figure 36:
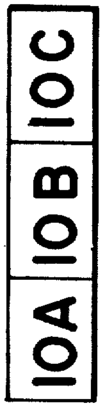
Figure 37:
Figure 38:
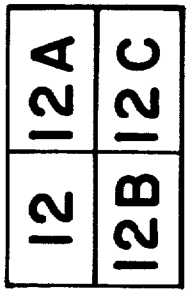
Figure 42:
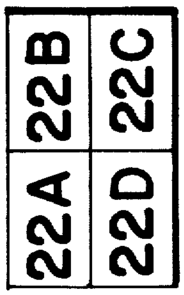
Figure 41:
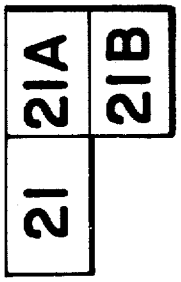
Figure 40:
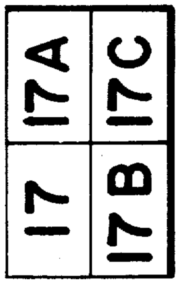
Figure 39:
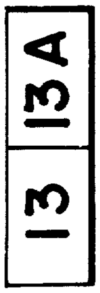
Figure 45:
Figure 44:
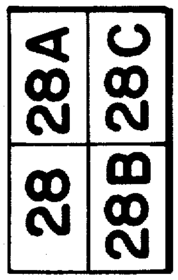
Figure 43:
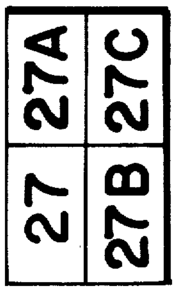

Reference is now made to FIG. 29, which depicts further elements of the interactive keyboard shown in block diagram in FIG. 25, and particularly the up/down binary counter circuit.

The pickup head provides the counter circuit with signals to determine count direction and counter clocking for determining the yardage. Preferably, a chopper disc is rotated between an infrared solid state lamp and two phototransistor light sensors. The light source is both exposed to the light sensor, and blocked from the sensor during specific intervals as determined by slots in the chopper disc which is driven by the mechanical yardage counter. The direction of count is determined by the order in which the sensors are exposed to the light source.

The schematic of the pickup head includes a solid state lamp 3601, connected in series with resistors 3604 and 3606 which provide current limiting for lamp 3601. When the circuit is in a non-counting status, photo-transistors 3608 and 3610 are in the non-conductive state. This enables base current to transistors 3612 and 3614 as provided by resistors 3616 and 3618, causing both transistors to be conducting and their outputs to be low.

When the circuit is in a counting status, lamp 3601 illuminates photo-transistors 3608 and 3610 in a sequence which is dependent on the direction of count. This causes two photo-transistors to conduct each in turn and this grounds the base of the respective transistors thereby turning these transistors off so that no voltage drop occurs across their collector load resistors. Thus, when the disc is turning in one direction phototransistor 3608 will produce its signal first followed by transistor 3610. Conversely, when the disc is rotating in the opposite direction the signal from phototransistor 3610 will precede the signal from phototransistor 3608.

The counter input circuit has three functions. These are: (1) to determine the count direction from the two pickup head inputs, (2) to determine when to operate the counter clock to increment or decrement the counter value, and (3) to insure that the counter clock edge does not coincide with a latch load clock edge such that a false value is loaded into the yardage counter latch.

The two outputs from the pick up head enter at edge connections A18 and A19. Each of these signals is shaped by a Schmidt trigger formed by invertors 3620 and 3622 and associated resistors on the A18 side and by invertors 3624 and 3626 on the A19 side. The inverted outputs of these Schmidt triggers are fed to NAND gate 3628 to form a clock input for master slave RS flip-flop 3630 which determines count direction. Invertors 3632 and 3634 in one channel and invertors 3336 and 3638 in the other channel, along with their associated transistors and capacitors, form signal input delay circuits to flip-flop 3630. Thus, flip-flop 3630 has its state determined by the inputs just prior to the time gate 3628 generates a negative clock edge. Monostable multivibrator 3640 generates the counter's clock signal. The counter clock output resets flip-flop 3642 which then blocks further inputs to monostable flip-flop 3640 until flip-flop 3642 is reset by a further output from inverters 3622 and 3626. This blockage serves to prevent false counts on a change of counter direction. The output of monostable flip-flop 3640 is fed to a pulse stretching circuit composed of monostable flip-flop 3644 and the associated gates. The second input to this circuit is the latch load command output of NAND gate 3646. If a latch load signal occurs while the clock pulse is high, then the clock pulse is stretched 50 microseconds to allow the latch to be loaded before the counter value is incremented. Gate 3650 generates the actual clock output to the conventional 16 stage counter 3651. Inverter 3652 generates the clock signal to the counter latches. The count direction signal is generated by inverters 3656 and 3658; when the output of 3656 is a logical high, then the counter counts down. When the output of 3658 is high, the counter is in the upcount position.

The binary up/down counter is preferably a conventional synchronous up/down counter of JK flip-flops and gate input steering networks. There are 16 counter stages with the last stage having the expansion gating to drive additional counter stages on another circuit. The counter latch comprised of logic circuits 3660, 3662, 3664 and 3666 is connected to the appropriate counter stages as shown.

The counter output is serialized from the latch by four and-or-invert packages, 3670, 3672, 3674, and 3676. The inputs to these gates consist of both the appropriate bit periods from the master station and the latch outputs. Circuits 3674 and 3676 have their outputs ORed by gate 3680 to form the most significant counter data byte. Circuits 3670 and 3672 have their outputs ORed by gate 3682 to form the least significant counter data byte. The two serial data bytes are gated out during the appropriate characters for the interrupt data service instruction by gate 3686 and its two associated input gates 3688 and 3690. The two data bytes are gated out during data characters 0 and 1 of the counter read instruction by gate 3692 and its two associated gates 3694 and 3696. The yardage counter is reset by applying a logical low to input B19. This input is buffered by inverters 3700 and 3702 and fed directly to the reset input of the 16 counter stages as shown.

The following summarizes the interdrawing connections discussed briefly above:

INTERDRAWING CONNECTIONS

| | | | |
|---|---|---|---|
| Figure 5 | Figures 6 and 7 | | |
| A-37 to | B-7 | Buffer Memory Read/Write Enable | |
| Figure 5 | Figures 6 and 7 | | |
| A-38 to | A-4 | Buffer Memory Address Index | |
| Figure 5 | Figures 6 and 7 | | |
| A-40 to | A-10 | Buffer Memory Read Strobe | |
| Figure 5 | Figures 6 and 7; | Figures 6 and 7 | |
| B-36 to | A-41 | B-4 | A Register Load |
| Figure 5 | Figures 6 and 7 | | |
| B-37 to | A-7 | Buffer Memory Write Select | |
| Figure 5 | Figures 6 and 7 | | |
| B-38 to | A-11 | Buffer Memory Write Strobe | |
| Figure 5 | Figures 6 and 7; | Figures 6 and 7 | |
| B-39 to | A-3 | B-8 | Buffer Memory to Bus Enable |
| Figure 5 | Figures 6 and 7; | Figures 6 and 7 | |
| B-40 to | B-5 | B-41 | A Register Bus Enable Buffer Memory Address Re-set |
| Figure 5 | Figures 6 and 7 | | |
| B-34 to | A-42 | A Register Load | |
| Figure 4 | Figure 5 | | |
| B-4 to | A-3 | Device 16 Computer Load Strobe to D.C. | |
| Figure 4 | Figure 5 | | |
| A-6 to | A-4 | Device 16 Load Complete from D.C. | |
| Figure 4 | Figure 5 | | |

A-46 to B-3 Device 16 Load Start to D.C.
Figure 4 Figure 5
A-3 to B-4 Device 16 Pulse Out to D.C.
Figure 4 Figure 5
A-5 to B-5 Device 16 Accumulator to Bus Enable
Figure 4 Figure 5
B-6 to A-5 Device 17 Transfer Complete from D.C.
Figure 4 Figure 5
B-47 to A-46 Power-on signal from computer
Figure 4 Figure 5
B-7 to A-6 Device 17 Transfer Start to D.C.
Figure 4 Figure 5
B-3 to B-6 Device 17 Pulse Out to D.C.
Figure 8 Figure 10
A-3 to B-27 C9
Twisted Pair (Figure 8 Figure 9
A-45 to A-44 Data Pair One −
(Figure 8 Figure 9
A-46 to A-43 Data Pair One +
Figure 8 Figure 12
B-44 to A-3 200 Khz
Twisted Pair (Figure 8 Figure 9
B-45 to B-44 Data Pair Two −
(Figure 8 Figure 9
B-46 to B-43 Data Pair Two +
Figure 9 Figure 5; Figure 12
A-42 to B-44 A-29 Execute
Twisted Pair (Figure 9
A-45 + Clock One
(Figure 9
A-46 − Clock One
Twisted Pair (Figure 9
B-45 + Clock Two
(Figure 9
B-46 − Clock Two
Figure 10 Figure 8
A-8 to B-18 Denux Bit 10
Figure 10 Figure 8
B-8 to B-19 Denux Bit 11
Figure 10 Figure 5
B-28 to A-19 C8
Figure 12 Figure 11
B-28 to B-8 Execute Initiate
Figure 11 Figures 6 and 7
A-26 to B-33 ($\overline{A6}$)
Figure 11 Figures 6 and 7; Figure 9 ($\overline{A8}$)
A-27 to B-40 A-30
Figure 11 Figure 10 $C_E$ Set (C φ)
A-28 to B-3
Figure 11 Figure 10
A-29 to A-4 $C_I$ Set (C 1)
Figure 11 Figure 10
A-30 to B-6 $C_R$ Set (C M)
Figure 11 Figures 6 and 7
B-20 to A-38 A1
Figure 11 Figures 6 and 7
B-21 to A-36 A3
Figure 11 Figures 6 and 7
B-22 to A-34 A5
Figure 11 Figures 6 and 7
B-23 A-32 A7
Figure 11 Figures 6 and 7
B-25 to B-38 ($\overline{A1}$)
Figure 11 Figures 6 and 7
B-26 to B-32 ($\overline{A7}$)
Figure 11 Figures 6 and 7
B-27 to B-28 −15 volt supply
Figure 11 Figure 10
B-28 to A-5 $C_N$ Set (C 3)
Figure 11 Figure 10
B-29 to B-4 $C_O$ Set (C 2)
Figure 11 Figure 10
A-30 to A-7 C7 Set (C M)
Figure 11 Figure 8
A-41 to A-9 Received Data Parity
Figure 11 Figure 8
A-42 to B-9 ($\overline{\text{Received Data Parity}}$)
Figure 11 Figure 5
A-43 to A-42 Load Initiate
Figure 11 Figure 8
A-46 to A-8 Received Parity Comparison
Figure 11 Figure 5
A-3 to A-7 Present Load Source
Figure 11 Figures 6 and 7
A-4 to B-42 A Register to Bus Enable
Figure 11 Figures 6 and 7
A-5 to A-8 B Read/Write Select
Figure 11 Figures 6 and 7
A-6 to B-3 B to Bus Enable
Figure 11 Figure 12; Figure 8

A-7 to A-30 A-30 Next Character
Figure 11 Figure 8
A-9 to A-44 No Response
Figure 11 Figures 6 and 7
B-4 to B-6 Buffer Address Re-Set
Figure 11 Figures 6 and 7
B-5 to B-9 Buffer Enable
Figure 11 Figure 8
B-6 to B-29 Demultiplex to Bus Enable
Figure 11 Figure 10
B-9 to B-7 Count Down Complete
Figure 11 Figure 8
B-16 to B-16 Demultiplexer Bit 14
Figure 11 Figure 8
B-17 to B-17 Demultiplexer Bit 15
Figure 11 Figures 9 and 12
B-18 to B-18 B-30 ($\overline{\text{Execute}}$)
Figure 11 Figures 9 and 10
B-19 to B-19 B-9 ($\overline{\text{Load}}$)
Figure 11 Figures 6 and 7 and 8
A-20 to A-39 A-41 A φ
Figure 11 Figures 6 and 7
A-21 to A-37 A2
Figure 11 Figures 6 and 7
A-22 to A-35 A4
Figure 11 Figures 6 and 7
A-23 to A-33 A6
Figure 11 Figures 6 and 7; Figure 10
A-24 to A-40 A-41 A8
Figure 11 Figures 6 and 7; Figures 8 and 9
A-25 to B-37 B-41 A-29 ($\overline{A\phi}$)
Figure 5 Figure 13
A-31 to A-31 Rom Address Index
Figure 5 Figure 13
A-32 to A-30 Rom to Bus Enable
Figure 5 Figure 10
A-34 to B-18 C Register Load
Figure 5 Figure 13
A-33 to A-41 Small Rom A/C Register Select
Figure 5 Figure 10
A-36 to B-17 C Register Load
Figure 10 Figure 11
A-9 to A-8
Figure 5
B-35 Cold Start Rent
Figure 5
B-42 Secondary Mode Set
Figure 5
B-43 Primary Mode Set
Figure 5
B-41 Transfer Mode Initiate
Figure 5 Figure 10
A-41 to A-28 C Register to Bus Enable
Figures 8 and 9
A-5 to A-9 Logic Connection
Figure 11 and Figure 10
B-15 to B-5 Data Parity Error
Figure 11 and Figure 10
B-7 to A-6 Slave Address Error
Figure 11 and Figure 9
B-41 to B-42 Transmit Parity
Figure 11 and Figure 9
B-42 to B-41 ($\overline{\text{Transmit Parity}}$)
Figure 11 and Figure 5
B-43 to B-41 Transfer Mode Initiate
Figure 11 and Figures 6 and 7
B-45 to B-10 Buffer Strobe
Figure 11 and Figures 6 and 7
B-46 to A-6 Buffer Address
Figure 4 and Figure 5
A-8 to A-8 Initialization

INTERACTIVE KEYBOARD INTERCONNECTIONS

Note: 27 A1 denotes FIG. 27, point A1, etc.
27 A1 - 28 A1 - 17 A1 - 29 A1 - Keyswitch Panel ground
27 A1 - 28 A2
17 A2 - Data "+" Cable
28 A3 - 27 B9
17 A3 - Clock "−" Cable
29 A3 - 17 B17
27 A4 - 28 A4
17 A4 - 28 A35
28 A5 - 17 A5
27 A6 - 28 A6
27 A7 - 29 A5

27 A8 - 28 A8 - 17 A8 - 29 B33
27 A9 - 28 A9 - 17 A9 - 29 B45
27 A10 - 28 A10 - 17 A10 - 29 B37
27 A11 - 28 A11 - 17 A11 - 29B44
27 A12 - 28 A12 - 17 A12 - 29 B30
27 A13 - Keyswitch Panel "Send" lamp
28 A13 - 17 A13
27 A14 - 28 A14
17 A14 - 28 B15
28 A15 - 17 B14
27 A16 - 28 A16
17 A16 - 17 B20
28 A17 - 17 A17
28 A18 - 17 A18
29 A18 - Counter Input A
28 A19 - 17 A19
29 A19 - Counter Input B
28 A20 - 28 A46
27 A21 - 28 A21
27 A22 - Keyswitch Panel Key Code Bit 3 Signal
28 A22 - 29 A2
27 A23 - 28 A23
28 A24 - 17 A24
28 A25 - 17 A25
28 A26 - 17 A26
28 A27 - 17 A27
28 A28 - 17 B28
17 A28 - 28 B28
28 A30 - 27 B42
28 A31 - 17 A31
27 A32 - 28 A32
27 A33 - Single Entry Status Lamp
27 A34 - Keyswitch Panel Class Void Key
27 A35 - Keyswitch Panel Code Void Key
29 A35 - 29 B44
28 A36 - 17 A44
28 A37 - 17 A36
27 A38 - Keyswitch Panel "Reset" Lamp
27 A39 - 28 A39
28 A40 - 28 A5
29 A40 - 29 B29
27 A41 - 17 A45
27 A42 - Keyswitch Panel Contact Common
27 A43 - Keyswitch Panel +15 Volt DC Supply
28 A43 - Volume Control
28 A46 - 17 A46
27 A47 - 28 A47 - 17 A47 - 29 A47
27 A48 - 28 A48 - 17 A48 - 29 A48
27 A49 - 28 A49 - 17 A49 - 29 A49
27 B1 - 28 B1 - 17 B1 - 29 B1
27 B2 - Keyswitch Panel Slash "/" Key
28 B2 - 29 A4
17 B2 - Data "−" Cable
29 B2 - 27 B41
27 B3 - 28 B3
17 B3 - Clock "+" Cable
29 B3 - 17 A17
17 B4 - 17 B1
29 B4 - 28 B4
17 B5 - 28 B8
29 B5 - 27 B8
27 B6 - 28 B6 - 17 B6
27 B7 - 28 B7 - 17 B45
27 B10 - 28 B9
28 B10 - 17 B10
27 B11 - 28 B11 - 17 B11
27 B12 - 28 B12 - 17 B12 - 29 B36
27 B13 - Keyswitch Panel Key Code, Bit 1 Signal
27 B14 - 28 B14
27 B16 - 28 B15
28 B17 - 17 B17
28 B18 - 17 B18
28B19 - 17 B19
29 B19 - 28 A29
27 B20 - Keyswitch Panel Key Code, Bit 2 Signal
28 B20 - 17 B21
27 B21 - 28 B21
27 B22 - Keyswitch Panel Key Code, Bit 4 Signal
27 B23 - 28 B23
29 B23 - 29 B42
28 B24 - 17 B24
28 B27 - 17 B27
29 B29 - 17 B11
29 B30 - 29 B40
28 B31 - 17 B31
27 B32 - 28 B32
27 B33 - Overflow Status Lamp
29 B33 - 29 A41
27 B34 - 28 B34
28 B35 - 17 B33
29 B36 - 29 B43
28 B37 - 17 B44
29 B37 - 29 B46
27 B38 - Encode Status Lamp
27 B39 - Keyswitch Panel "Key Entered" Signal
27 B40 - Keyswitch Panel "Class Key Entered" Signal
27 B41 - Keyswitch Panel "Send Key" signal
28 B41 - 28 B8
27 B42 - Keyswitch Panel "Reset Key" Signal
29 B42 - 17 B6
28 B43 - Volume Control
28 B45 - Speaker
29 B45 - 29 A37
28 B46 - Volume Control Center Tap
27 B48 - 28 B48 - 17 B48 - 29 B48
27 B49 - 28 B49 - 17 B49 - 29 B49

SLAVE MULTIPLEXER INTERCONNECTIONS FOR FIGS. 17, 21 AND 22

22 A1 - B1 - 21 A1 - B1 - 17A1 - B1 GND
22 A47 - B47 - 21 A47 - B47 - 17A47 - B47 +15.7 Ref. output
22 A48 - B48 - 21 A48 - B48 - 17A48 - B48 +DC Supply
22 A49 - B49 - 21 A49 - B49 - 17A49 - B49 GND.

22 B6 - 21 B4 - 12V
21 A4 - 17 A4 Reset output
22 B5 - 21 B5 17B5 Rcvd. clock (digital output)
22 A5 - 21 A5 - 17A5 Rcvd. data (digital output)
21 B6 - 17 B6 (BP1 output)
22 A6 - 21 - A6 - 17A6 (($\overline{\text{BP6}}$ output)
22 B7 - 21 B7 - 17B7 (($\overline{\text{BP1}}$) output)
22 A7 - 21 A7 - 17A7 (($\overline{\text{BP}\phi}$) output)
22 B8 - 21 B8 - 17B8 (($\overline{\text{BP5}}$) output)
22 A8 - 17 A8 (BPϕ output)
22 B9 - 21 B9 - 17B9 (($\overline{\text{BP2}}$) output)

22 A16 - 21 A16 - 17A16 CH1
22 B17 - 21 B20 ($\overline{\text{CH2}}$)
22 A17 - 21 A20 ($\overline{\text{CH1}}$)

22 B26 - 17 B26

22 B27 - 17 B27
22 B28 - 17 B28
22 B29 - 17 B29

21 B17 - 17 B17 CCϕ
21 A17 - 17 A17 ($\overline{\text{CC}\phi}$)
21 B18 - 17 B18 CC1
21 A18 - 17 A18 ($\overline{\text{CC1}}$)
21 A19 - 17 A19 ($\overline{\text{CC2}}$)
21 B21 - 17 B21 Character data parity disable
21 B22 T/R Line Out
21 B23 T/R Line Out
21 B24 - 17 B24
21 B25 - 17 B25
22 A9 - 17 A9 (BP6 output)
22 B10 - 21 B10 - 17B10 (($\overline{\text{BP7}}$) output)
22 A10 - 17 A10 (BP5 output)
22 B11 - 17 B11 (BP2 output)
21 A11 - 17 A11 (BP7 output)
22 B12 - 21 B12 - 17 B12 (BP8 output)
22 A12 - 17 A12 (BP3 output)
22 B13 - 21 B13 - 17 B13 (($\overline{\text{BP3}}$) output)
22 A13 - 21 A13 - 17 A13 (($\overline{\text{BP8}}$) output)
21 A14 - 17 A14 (($\overline{\text{BP9}}$) output)
22 B15 - 17 B15 (BP9 output)
22 A15 - 17 A15 (BP4 output)
22 B16 - 21 B16 - 17 B16 CH2
21 A24 - 17 A24
21 A25 - 17 A25
21 B26 A clock Out
21 B27 B clock Out
21 B28 C clock Out
21 B29 D clock Out
22 A28 - 21 A28
21 B30 - 17 B30
21 A30 - 17 A30
21 B31 - 17 B31
21 A31 - 17 A31
22 B36 - 21 B36 $\overline{\text{Write}}$
22 A36 - 21 A38 $\overline{\text{Read}}$
21 A36 - 17 A36 Transmitter enable input
21 B37 - 17 B44 Data-to transmitter output
21 A37 - 17 A37 Transmitter enable to parity gen. output
22 B37 - 21 B38 X1
22 B38 - 21 B39 X2
22 B39 - 21 B40 X3
22 B40 - 21 B41 X4
22 A41 - 21 A40 Uϕ
22 A42 - 21 A41 U1
22 A43 - 21 A42 U2
22 A44 - 21 A43 U3
22 B45 - 21 A45 Y2
22 B46 - 21 B46 Write
22 A45 - 17 A45 ($\overline{\text{Set}}$) Input to interrupt request flip-flop 22 A46 - 21 A44 Read
21 B44 - +24V
21 B45 - 17 B45

21 B35 - 17 B35 ($\overline{\text{Reset}}$) Input to interrupt ($\overline{\text{Intr}}$) request flip-flop
21 A46 - 17 A46 (Q) output of address flip-flop
17 A16 - 17 B20

What is claimed is:

1. A data communication system comprising:

recording means;

a plurality of data stations, each having an address;

a data controller connected to said recording means and to said data stations for interrogating said data stations and controlling information transfer between said stations and said recording means including:

means for storing an address signal identifying one of said stations;

means for loading said address signal into said storing means during a load mode;

means for producing an address signal identifying the station whose address is stored in said storing means and transmitting that signal to said stations in an execute mode;

means for transferring information acquired from an addressed station to said recording means in a transfer mode;

means for producing a first signal for initiating said load mode, a second signal for terminating said load mode and initiating said execute mode and a third signal for terminating said execute mode and initiating said transfer mode, and memory means for storing a plurality of addresses and the order of interrogation, means for connecting said memory means to said loading means for deriving address signals from said memory means, means responsive to a load signal from said recording means for causing said loading means to load an address signal derived from said recording means rather than said memory means.

2. A system as in claim 1 wherein said recording means includes a digital computer.

3. A system as in claim 2 wherein said recording means further includes auxiliary recording means for recording information from said data stations as indicia on a media, and further including means for interrogating said computer as to its readiness to receive information and causing that information to be recorded on said auxiliary recording means.

4. A system as in claim 3 wherein said auxiliary recording means is a paper tape punch.

5. A system as in claim 1 further including means for storing an indication of whether the last address signal loaded into said address signal storing means was derived from said memory means or said recording means, means connected to said indication storing means for preventing said causing means from causing said loading means to load an address signal derived from said recording means in response to said load signal whenever said indication means indicates the last address signal was derived from said recording means.

6. A system as in claim 5 wherein said indication means includes a flip flop, and logic means connected to a first input to said flip flop for causing said flip flop to assume a first output condition when said recording means produces said load signal.

7. A data system as in claim 1 wherein at least one of said data stations includes:

means for detecting a start of message signal from said data controller, means for connecting said one data station to a plurality of groups of slave stations, means responsive to receipt of each said start of message signal for producing an address signal identifying a slave station in each of said groups so as to successively produce address signals identifying each of said slave stations of said plurality of slave stations, means responsive to said address signal identifying one of said slave stations for successively interrogating one at a time each slave station identified by that address signal, means for receiving information signals from a slave station following said interrogation of said slave stations and for halting said interrogation of said slave stations upon receipt of a given information signal from a slave station, means for receiving an address signal from said data controller following each said start of message signal, means for defining the data station address, means for comparing the address of said defining means with the received address from said data controller and producing a given signal when the address of said defining means is the same as the received address, and means for transmitting information to said data controller after said given signal is produced and said interrogation has been halted by receipt of said given information signal and for thereafter causing said halting to end and said interrogation of said slave stations to continue.

8. A data system as in claim 1 wherein at least one of said data stations includes:

a manually operable keyboard having a first group of manually selectable function keys and a second group of manually selectable code keys, memory means for storing information entered into said keyboard by operation of said keys, and having first and second portions, each having a given capacity and logic means connecting said keyboard to said memory means for (1) causing information entered by said code keys to be stored in said first portion together with information entered by operation of one of said function keys until said given capacity is exceeded and then stored in said second portion and (2) causing information entered by said code keys to be stored in said second portion together with information entered by operation of another one of said function keys unless said given capacity of said first portion has been exceeded.

9. A data system as in claim 1 wherein at least one of said data stations includes:

means for detecting a start of message signal from said data controller, means for storing an address signal, identifying one of said plurality of stations, transmitted to said stations after said start of message signal, and for thereafter storing instruction signals transmitted to said stations after said address signal, means defining the station address, means for comparing the address stored in said data station storing means with the address defined by said defining means and for producing a first signal when the addresses are the same and a second signal when they are not the same, means for emptying said data station storing means at the end of said address signal, means for preventing storage of said instruction signal when said comparing means produces said second signal, means for transmitting an acknowledge signal to said data controller at the end of receipt of said address signal when said comparing means produces said first signal.

10. A data system as in claim 1 wherein said data controller includes:

means for storing a past source signal indicating at least the last source of the last address signal, means for producing a present source signal indicating the source of the present address signal, and means for comparing said past source signal and said present source signal and deriving the present address from said memory means rather than said recording means if the number of addresses derived from said recording means during a predetermined number of past addresses is greater than a given number.

11. A data system as in claim 1 wherein said data controller includes:

clock pulse generating means for producing clock pulses which control timing within said data controller, means for receiving signals from the addressed data station, including an acknowledge signal transmitted by the addressed station at a predetermined time following receipt of said address signal by the addressed station, means connected to said signals receiving means and to said pulse generating means for determining the delay time between the time that said clock pulse generating means produces a clock pulse at said predetermined time following transmission of said address signal and the time said data controller receives said acknowledge signal, and means connected to said determining means for delaying said pulses produced by said clock pulse generating means by said delay time so that said clock pulses are synchronized with the signals received from the addressed station.

12. A data system as in claim 1 wherein said data controller includes:

means for receiving information signals from the addressed stations as successive characters, register means for storing at a predetermined location therein an information signal indicating whether the addressed station will operate in a first data format in which the character is comprised of a parity bit and first and second information bit groups separated by an unused bit or in a second data format in which the character is comprised of a parity bit and a single group of successive information bits, means for storing said information bits and logic means connected to said register means, said information signals receiving means and said information bits storing means for causing said information bits storing means to store the bits of said first and second groups when an addressed station responds in said first format and to store said bits of said single group when an addressed station responds in said second format.

13. A data system as in claim 1 wherein said data controller includes:

means for receiving a data interrupt signal from the station identified by an address signal indicating that station has information to transmit to said recording means, means for producing an instruction signal following each address signal after which a data interrupt signal is received from the data station identified by that address signal and for causing said address signals producing means to produce the next sequential address signal immediately whenever a data interrupt signal is not received after an address signal, and means for receiving information signals from a station following an instruction signal and for transmitting said information signals to said recording means.

14. A data controller for controlling output signals from recording means to signal responsive devices and input signals from said signal responsive devices comprising:

memory means having a plurality of addresses each uniquely identifying one of said signal responsive devices, means connected to said memory means for producing address signals each uniquely identifying one of said signal responsive devices and for transmitting said address signals to said devices, including means for deriving an address from said memory means and means for receiving an address from said recording means, means for storing a past source signal indicating at least the last source of the last address signal, means for producing a present source signal indicating the source of the present address signal and means for comparing said past source signal and said present source signal and deriving the present address from said memory means rather than said recording means if the number of addresses derived from said recording means during a predetermined number of past addresses is greater than a given number.

15. A controller as in claim 14 further including register means for storing at a predetermined location therein an override signal and means connected to said register means and connected to said comparing and deriving means for permitting derivation of said present address from said recording means even if the last source and the present source are both said recording means.

16. A controller as in claim 14 wherein said recording means is a computer.

17. A controller as in claim 14 wherein said memory means is a read only memory.

18. A data controller for controlling output signals from recording means to signal responsive devices and input signals from said signal responsive devices comprising:

means for producing address signals each uniquely identifying one of said signal responsive devices and for transmitting said address signals to said devices, means for receiving information signals from the addressed device and transmitting information signals to the addressed device as successive characters, register means for storing at a predetermined location therein an information signal indicating whether the addressed device will operate in a first data format in which the character is comprised of a parity bit and first and second information bit groups separated by an unused bit or in a second data format in which the character is comprised of a parity bit and a single group of successive information bits, means for storing said information bits, and logic means connected to said register means, said receiving and transmitting means and said information bits storing means for causing said information bits storing means to store the bits of said first and second groups when said device responds in said first data format and to store said bits of said single group when said device responds in said second data format.

19. A data controller as in claim 18 wherein each said character has 10 bits, wherein in said first data format said first group of bits comprises bits 0–3, said second group of bits comprises bits 5–8, and said parity bit is bit 9 and wherein in said second data format said single group of bits comprises bits 0–7 and said parity bit comprises bit 9.

20. A data controller as in claim 18 including means for generating a parity signal for each received character, means for comparing said generated signal with said parity bit and means for generating a first signal when the compared parity is the same and a second signal when the compared parity is not the same.

21. A data controller as in claim 18 wherein said information bits storage means includes a shift register and wherein said logic means includes means for applying clock pulses to said shift register.

22. A data controller as in claim 18 further including:

clock pulse generating means for producing clock pulses which control timing within said data controller, means for receiving signals from the addressed signal responsive device, including an acknowledge signal transmitted by the addressed device at a predetermined time following receipt of said address signal by the addressed signal responsive device, means connected to said receiving and transmitting means and to said pulse generating means for determining the delay time between the time that said clock pulse generating means produces a clock pulse at said predetermined time following transmission of said address signal and the time said data controller receives said acknowledge signal, and means connected to said determining means for delaying said pulses produced by said clock pulse generating means by said delay time so that said clock pulses are synchronized with the signals received from the addressed signal responsive device.

23. A data controller as in claim 22 wherein said determining means includes pulse counting means connected to said clock pulse generating means, means for producing bit period pulses, means for producing a given signal upon a given bit period pulse which is produced at said predetermined time following transmission of said address signal, flip-flop means connected to said receiving means, to said given signal producing means and to said pulse counting means for shifting from a first to second output condition to enable said pulse counting means to count clock pulses when said given signal producing means produces said given signal and for shifting from said second to first output condition to lock up said counting means, upon receipt of said acknowledge signal and wherein said delaying means includes a shift register for receiving said clock pulses and having a plurality of output terminals and logic means connected to said counting means and said shift register for enabling one of said shift register output terminals in accordance with the count in said counting means.

24. A data controller as in claim 23 further including means for producing a signal indicating no response if said time delay exceeds a given time.

25. A data controller as in claim 24 wherein said no response signal producing means includes a further flip-flop means connected to said logic means for shifting from a first to second output condition when the count in said counting means exceeds a given number.

26. A data controller as in claim 25 further including further counting means connected to said logic means for counting the delayed pulses from said shift register.

27. A data controller as in claim 18 further including:

means for producing an instruction signal following each address signal after which a data interrupt signal is received from the data station identified by that address signal and for causing said address signals producing means to immediately produce the next sequential address signal whenever a data interrupt signal is not received after an address signal, and means for communicating information signals with a station following an instruction signal and for transmitting said information signals to said recording means.

28. A data controller as in claim 18 wherein said address signals producing means includes:

memory means providing a plurality of addresses each uniquely identifying one of said signal responsive devices and a plurality of instructions, means connected to said memory means for producing address signals each uniquely identifying one of said signal responsive devices and for transmitting said address signals to said devices, including means for deriving an address from said memory means and means for receiving an address from said recording means, means for storing a last source signal indicating the source of the last address signal, means for producing a present source signal indicating the source of the present address signal and means for comparing said last source signal and said present source signal and deriving the present address from said memory means rather than said recording means if the last source and the present source are both said recording means.

29. A controller as in claim 28 further including register means for storing at a predetermined location therein an override signal and means connected to said register means and connected to said comparing and deriving means for permitting derivation of said present address from said recording means even if the last source and the present source are both said recording means.

30. A controller as in claim 28 wherein said recording means is a computer.

31. A controller as in claim 28 wherein said memory means is a read only memory.

32. A data controller for controlling output signals from recording means to signal responsive devices and input signals from said signal responsive devices to said recording means comprising:

means for producing address signals one at a time each uniquely identifying one of said signal responsive devices and for transmitting said address signals to said devices, means for receiving a data interrupt signal from the station identified by an address signal indicating that station has information to transmit to said recording means, means for producing an interrupt instruction signal following each address signal after which a data interrupt signal is received from the data station identified by that address signal and thereafter causing said address signals producing means to produce the next sequential address signal and for causing said address signals producing means to produce another address signal immediately whenever a data interrupt signal is not received after an address signal, and means for communicating information signals with a station following an instruction signal and for transmitting said information signals to said recording means.

33. A data controller as in claim 32 further including:

clock pulse generating means for producing clock pulses which control timing within said data controller, means for receiving signals from the addressed signal responsive device, including an acknowledge signal transmitted by the addressed device at a predetermined time synchronization following receipt of said address signal by the addressed signal responsive device, means connected to said acknowledge signal receiving means and to said pulse generating means for determining the delay time between the time that said clock pulse generating means produces a clock pulse at said predetermined time following transmission of said address signal and the time said data controller receives said acknowledge signal, and means connected to said determining means for delaying said pulses produced by said clock pulse generating means by said delay time so that said clock pulses are synchronized with the signals received from the addressed signal responsive device.

34. A data controller as in claim 33 wherein said determining means includes:

pulse counting means connected to said clock pulse generating means, means for producing bit period pulses, means for producing a given signal upon a given bit period pulse which is produced at said predetermined time following transmission of said address signal, flip-flop means connected to said receiving means, to said given signal producing means and to said pulse counting means for shifting from a first to second output condition to enable said counting means to count clock pulses when said given signal producing means produces said given signal and for shifting from said second to said first output condition to lock up said counting means, upon receipt of said acknowledge signal and wherein said delaying means includes a shift register for receiving said clock pulses and having a plurality of output terminals and logic means connected to said counting means and said shift register for enabling one of said shift register output terminals in accordance with the count in said counting means.

35. A data controller as in claim 34 further including means for producing a signal indicating no response if said time delay exceeds a given time.

36. A data controller as in claim 35 wherein said no response signal producing means includes a further flip-flop means connected to said logic means for shifting from a first to second output condition when the count in said counting means exceeds a given number.

37. A data controller as in claim 36 further including further counting means connected to said logic means for counting the delayed pulses from said shift register.

38. A data controller as in claim 32 wherein said address signal producing means includes:

memory means having a plurality of addresses each uniquely identifying one of said signal responsive devices, means connected to said memory means for producing address signals each uniquely identifying one of said signal responsive devices and for transmitting said address signals to said devices, including means for deriving an address from said memory means and means for receiving an address from said recording means, means for storing a last source signal indicating the source of the last address signal, means for producing a present source signal indicating the source of the present address signal and means for comparing said last source signal and said present source signal and deriving the present address from said memory means rather than said recording means if the last source and the present source are both said recording means.

39. A controller as in claim 38 further including register means for storing at a predetermined location therein an override signal and means connected to said register means and connected to said comparing and deriving means for permitting derivation of said present address from said recording means even if the last source and the present source are both said recording means.

40. A controller as in claim 38 wherein said recording means is a computer.

41. A controller as in claim 38 wherein said memory means is a read only memory.

42. A data controller for controlling output signals from recording means to signal responsive devices and input signals from said signal responsive devices comprising:

means for producing address signals each uniquely identifying one of said signal responsive devices and for transmitting said address signals to said devices, clock pulse generating means for producing clock pulses which control timing within said data controller, means for receiving signals from the addressed signal responsive device, including an acknowledge signal transmitted by the addressed device at a predetermined time following receipt of said address signal by the addressed signal responsive device, means connected to said acknowledge signal receiving means and to said pulse generating means for determining the delay time between the time that said clock pulse generating means produces a clock pulse at said predetermined time following transmission of said address signal and the time said data controller receives said acknowledge signal, and means connected to said determining means for delaying said pulses produced by said clock pulse generating means by said delay time so that said clock pulses are synchronized with the signals received from the addressed signal responsive device.

43. A data controller as in claim 42 wherein said determining means includes pulse counting means connected to said clock pulse generating means, means for producing bit period pulses, means for producing a given signal upon a given bit period pulse which is produced at said predetermined time following transmission of said address signal, flip-flop means connected to said receiving means, to said given signal producing means and to said pulse counting means for shifting from a first to second output condition to enable said pulse counting means to count clock pulses when said given signal producing means produces said given signal and for shifting from said second to said first output condition to lock up said counting means upon receipt of said acknowledge signal and wherein said delaying means includes a shift register for receiving said clock pulses and having a plurality of output terminals and logic means connected to said counting means and said shift register for enabling one of said shift register output terminals in accordance with the count in said counting means.

44. A data controller as in claim 43 further including means for producing a signal indicating no response if said time delay exceeds a given time.

45. A data controller as in claim 44 wherein said no response signal producing means includes a further flip flop means connected to said logic means for shifting from a first to second output condition when the count in said counting means exceeds a given number.

46. A data controller as in claim 45 further including further counting means connected to said logic means for counting the delayed pulses from said shift register.

47. A data controller as in claim 42 further including:

means for producing an interrupt instruction signal following each address signal after which a data interrupt signal is received from the data station identified by that address signal and for causing said address signals producing means to produce the next sequential address signal immediately whenever a data interrupt signal is not received after an address signal, and means for receiving information signals from a station following an instruction signal and for transmitting said information signals to said recording means.

48. A data controller as in claim 42 wherein said address signals producing means includes:

memory means having a plurality of addresses each uniquely identifying one of said signal responsive devices, means connected to said memory means for producing address signals each uniquely identifying one of said signal responsive devices and for transmitting said address signals to said devices, including means for deriving an address from said memory means and means for receiving an address from said recording means, means for storing a last source signal indicating the source of the last address signal, means for producing a present source signal indicating the source of the present address signal and means for comparing said last source signal and said present source signal and deriving the present address from said memory means rather than said recording means if the last source and the present source are both said recording means.

49. A controller as in claim 48 further including register means for storing at a predetermined location therein an override signal and means connected to said register means and connected to said comparing and deriving means for permitting derivation of said present address from said recording means even if the last source and the present source are both said recording means.

50. A controller as in claim 48 wherein said recording means is a computer.

51. A controller as in claim 48 wherein said memory means is read only memory.

52. A data controller for controlling output signals from recording means to signal responsive devices and input signals from said signal responsive devices to said recording means comprising:

memory means having a plurality of addresses each uniquely identifying one of said signal responsive devices, means for sequentially producing address signals from either said recording means or said memory means each uniquely identifying one of said signal responsive devices and for transmitting said address signals to said devices, means for receiving a data interrupt signal from the station identified by an address signal indicating that station has information to transmit to said recording means, means for producing an instruction signal following each address signal after which a data interrupt signal is received from the data station identified by that address signal and for causing said address signals producing means to produce the next sequential address signal immediately whenever a data interrupt signal is not received after an address signal, means for receiving information signals from a station following an instruction signal and for transmitting said information signals to said recording means, means for receiving information signals from the addressed device as successive characters, register means for storing at a predetermined location therein an information signal indicating whether the addressed device will respond in first data format in which the character is comprised of a parity bit and first and second information bit groups separated by an unused bit or in a second data format in which the character is comprised of a parity bit and a single group of successive information bits, logic means connected to said register means, said information signals receiving means and said storing means for causing means to store the bits of said first and second groups when said device responds in said first data format and to store said bits of said single group when said device responds in said second data format, clock pulse generating means for producing clock pulses which control timing within said data controller, means for receiving signals from the addressed signal responsive device, including a data interrupt signal transmitted by the addressed device at a predetermined time following receipt of said address signal by the addressed signal responsive device, means connected to said data interrupt signal receiving means and to said pulse generating means for determining the delay time between the time that said clock pulse generating means produces a clock pulse at said predetermined time following transmission of said address signal and time said data controller receives said acknowledge signal, means for storing a last source signal indicating the source of the last address signal, means for producing a present source signal indicating the source of the present address signal and means for comparing said last source signal and said present source signal.

53. In a data station for transmitting information to a data controller in response to a start of message signal the improvement comprising means for receiving a train of clock pulses from said data controller, means for receiving at the same time a train of data pulses from said data controller with said start of message signal comprising a plurality of data pulses with no corresponding clock pulses, a counter, means for incrementing said counter for each received data pulse, means for resetting said counter to zero for each clock pulse received, and means for producing a given signal upon a given count in said counter to establish receipt of a start of message signal.

54. In a station as in claim 53 wherein said counter includes a pair of flip-flops.

55. In a station as in claim 53 wherein said incrementing means includes means for incrementing said counter upon the leading edge of said said data pulse and said resetting means includes means for resetting said counter upon the trailing edge of each said clock pulse.

56. In a station as in claim 53 wherein said station further includes means for storing an address signal received in said data pulses and means for emptying said address signal storing means when said counter produces said given signal.

57. In a data station as in claim 53 further including:

means for connecting said data station to a plurality of groups of slave stations, means responsive to receipt of each said start of message signal for producing a slave station address signal identifying at least one slave station in each of said groups so as to successively produce address signals identifying each of said slave stations of said plurality of slave stations, means responsive to receipt of said slave station address signal for successively interrogating one at a time each slave station identified by said address signal, means for receiving information signals from a slave station following said interrogation and for halting said interrogation upon receipt of a given information signal, means for receiving a data station address signal from said data controller following each said start of message signal, means for defining the data station address, means for comparing the address of said defining means with the received address from said data controller and producing a given signal when the address of said defining means is the same as the received address, and means for transmitting information to said data controller after said given signal is produced and said interrogation has been halted by receipt of said given information signal and for thereafter causing said halting to end and said interrogation of said slave stations to continue.

58. A data station for use in a system having a plurality of data stations connected to a data controller which interrogates said data stations successively comprising:

means for counting the number of received signals each representing a given yardage increment, a pickup head mounted adjacent a quantity of textile material for producing a first signal when a given yardage of textile material passes said head in a first direction and a second signal when said given yardage passes said head in the opposite direction, including:

a disc having at least a first aperture therein mounted for clockwise rotation with movement of said material in one direction and counterclockwise rotation with movement in the other direction, a light source, and first and second photoresponsive elements mounted so that light from said source illuminates each of said elements via said aperture at different rotational positions of said disc and each of said elements produces in response thereto an electrical signal in an order which indicates the direction of rotation of said disc, logic means for incrementing the count in said counting means when said first signal is produced and decrementing the count in said counting means when said second signal is produced including flip-flop means having first and second output conditions and means for causing said flip-flop to have said first output condition when said first element produces its signal before said second element produces its signal and to have said second output condition when said second element produces its signal before said first element produces its signal, and means for transmitting a signal to said data controller representing the count in said counting means upon receipt of an interrogation signal from said data controller.

59. A station as in claim 58 wherein said transmitting means includes means for receiving a latch load signal and said logic means includes means for producing a clock signal for causing incrementing when said flip-flop means is in said first output condition and decrementing when said flip-flop is in said second output condition and means for delaying said clock signal when said latch load signal is being received.

60. A station as in claim 59 including means for resetting said counting means.

61. A station as in claim 60 wherein said flip-flop means is an RS flip-flop and wherein said logic means includes first and second Schmidt trigger circuits connected to said first and second elements for producing a pulse, a logic gate having inputs connected to the outputs to said first and second Schmidt trigger circuits and its output connected to said RS flip flop for applying a clock input and first and second delay circuits for coupling the outputs of said first and second Schmidt trigger circuits to the set and reset inputs to said RS flip flop respectively.

62. A data station for use in a system having a plurality of data stations connected to a data controller which interrogates said data stations comprising:

means for detecting a start of message signal from said data controller, means for connecting said data station to a plurality of groups of slave stations, means responsive to receipt of each said start of message signal for producing an address signal identifying one slave station in each of said groups so as to successively produce address signals identifying each of said slave stations of said plurality of slave stations, means responsive to said address signal for successively interrogating one at a time each slave station identified by said address signal, means for receiving information signals from a slave station following said interrogation and for halting said interrogation upon receipt of a given information signal, means for receiving an address signal from said data controller following each said start of message signal, means for defining the data station address, means for comparing the address of said defining means with the received address from said data controller and producing a given signal when the address of said defining means is the same as the received address, and means for transmitting information to said data controller after said given signal is produced and said interrogation has been halted by receipt of said given information signal and for causing said interrogation to resume.

63. A data station as in claim 62 wherein said connecting means includes a plurality of data lines each connecting the slave stations of one of said groups to said data station.

64. A data station as in claim 63 including four said data lines and 64 slave stations connected to each said data line.

65. A data station as in claim 64 wherein said given information signal indicates whether the status of the slave station has changed and whether the slave station has information to transfer to said data controller.

66. A data station as in claim 65 further including said data controller and a computer connected to said data controller.

67. A data station as in claim 62 further including means for transmitting an acknowledge signal to said data controller at the end of said address signal when said comparing means produces said given signal, an interrupt flip-flop having a first condition indicating that the data station has information to transfer to said data controller and a second condition indicating that the data station does not have information to transfer to said data controller, means responsive to said given information signal for causing said flip-flop to shift to said first condition upon receipt of said given information signal, and means for transmitting a signal to said data controller after said acknowledge signal.

68. A data station as in claim 62 including means for storing the status of each slave station at the last interrogation, means for comparing the current status of a slave station being interrogated with the last status and for causing said interrupt flip-flop to shift to its first condition if the current status differs from the stored status.

69. A data station as in claim 62 further including counting means for counting the number of characters, each character being comprised of a predetermined number of bit periods.

70. A data station as in claim 62 further including means for receiving a train of clock pulses from said data controller and means for receiving a train of data pulses from said data controller.

71. A data station as in claim 70 wherein said start of message signal is comprised of a plurality of data pulses with no clock pulses from said data controller and wherein said detecting means includes a counter, means for incrementing said counter for each data pulse received and for decrementing said counter for each clock pulse received, and means connected to said counter for producing a given signal when said counter reaches a predetermined count.

72. A data station as in claim 62 including means responsive to a slave station address signal identifying a given slave station from said data controller for interrogating the slave station so identified and transmitting information from the identified slave station to said data controller.

73. A data station comprising:

a manually operable keyboard having a first group of manually selectable function keys and a second group of manually selectable code keys, memory means for storing information entered into said keyboard by operation of said keys, and having first and second portions, each having a given capacity and logic means connecting said keyboard to said memory means for first causing information entered by said code keys to be stored in said first portion together with information entered by operation of one of said function keys until said given capacity is exceeded and then stored in said second portion and second causing information entered by said code keys to be stored in said second portion together with information entered by operation of another one of said function keys unless said given capacity of said first portion has been exceeded.

74. A station as in claim 73 including means for transmitting information in said first and second portions to a central station and means for connecting said memory means to said central station.

75. A station as in claim 73 including means for producing a unique audio signal upon operation of each of said keys.

76. A station as in claim 75 wherein said audio signal producing means includes means for generating any one signal of a first group of unique audio signals means for causing said generating means to generate a different one of said unique audio signals in response to manual operations of each one of said function keys and to generate a unique audio signal in response to manual operation of each one of said code key so that manual operation of each one of said function keys causes generation of the same audio signal as manual operation of one of said code keys, means for mixing said audio signal with a further frequency signal whenever one type of key is manually operated to produce a mixed signal and means for receiving said audio signal when the other type of key is operated and said mixed signal when said one type of key is operated and for producing an audio tone.

77. A station as in claim 76 including means for producing an overflow signal when the information entered into said keyboard exceeds the capacity of said memory means, and wherein said generating means includes means for receiving said overflow signal and producing an audio signal different from any generated by operation of said function and code keys.

78. A station as in claim 77 including means for varying the level of said tones.

79. A station as in claim 73 wherein said transmitting means includes manually operable means for initiating transmission.

80. A station as in claim 73 wherein said logic means includes a memory address counter comprised of a plurality of binary flip-flops and connected to said memory means, said counter including a first flip-flop having a first output condition until two of said function keys have been operated to cause information entered by said code keys to be first stored in said first portion and a second output condition after two of said function keys have been operated to cause information thereafter entered by said code keys to be stored in said second portion unless the capacity of said first portion has been exceeded.

81. A station as in claim 73 wherein said keyboard including a manually selectable void key among said code keys and a manually selectable void key among said function keys.

82. A station as in claim 81 wherein said logic means includes means connected to said memory means and said code void key for causing, upon manual selection of said code void key, information entered in said first portion by said code keys to be erased if one of said function keys has been operated and in said first and second portion by said code keys if the capacity of said first portion has been exceeded and causing the information entered in said second portion by said code keys to be erased if two of said function keys have been operated and means connected to said memory means and said function void key for causing, upon manual selection of said function void key, information entered by said function void key in said first portion to be erased if one of said function keys has been operated and causing the information entered in said second portion by said function keys to be erased if two of said function keys have been operated.

83. A data station as in claim 73 further including:

means for counting the number of received signals each representing a given yardage increment, a pickup head mounted adjacent a quantity of textile material for producing a first signal when a given yardage of textile material passes said head in a first direction and second signal when said given yardage passes said head in the opposite direction, logic means for incrementing the count in said counting means when said first signal is produced and decrementing the count in said counting means when said second signal is produced and means for transmitting a signal to a data controller representing the count in said counting means upon receipt of an interrogation signal from said data controller.

84. A station as in claim 83 wherein said head includes a disc having at least a first aperture therein mounted for clockwise rotation with movement of said material in said first direction and counterclockwise rotation with movement in said second direction, a light source, and first and second photoresponsive elements mounted so that light from said source illuminates each via said aperture at different rotational positions of said disc and each produces in response thereto an electrical signal in an order which indicates the direction of rotation of said disc and wherein said logic flip-flop means having first and second output conditions and means for causing said flip-flop to have said first output condition when said first element produces its signal before said second element produces its signal and to have said second output condition when said second element produces its signal before said first element produces its signal.

85. A station as in claim 82 wherein said transmitting means includes means for receiving a latch load signal and said logic means includes means for producing a clock signal for causing incrementing when said flip-flop means is in said first output condition and decrementing when said flip-flop is in said second output condition and means for delaying said clock signal when said latch load signal is being received.

86. A station as in claim 85 including means for resetting said counting means.

87. A station as in claim 86 wherein said flip-flop means is an RS flip-flop and wherein said logic means includes first and second Schmidt trigger circuits connected to said first and second elements for producing a pulse, a logic gate having inputs connected to the outputs to said first and second Schmidt trigger circuits and its output connected to said RS flip-flop for applying a clock input and first and second delay circuits for coupling the outputs of said first and second Schmidt trigger circuits to the set and reset inputs to said RS flip-flop respectively.

88. A data station for use in a system having a plurality of data stations connected to a data controller which interrogates said data stations successively comprising:

means for detecting a start of message signal comprised of a plurality of data pulses with no clock pulses from said data controller, including a counter, means for incrementing said counter for each data pulse received and for decrementing said counter for each clock pulse received, and means connected to said counter for producing a given signal when said counter reaches a predetermined count, means for storing an address signal, identifying one of said plurality of stations, transmitted to said stations after said start of message signal, and for thereafter storing instruction signals transmitted to said stations after said address signal, including a plurality of flip-flops, means defining the station address, means for comparing the address stored in said storing means with the address defined by said defining means and for producing a first signal when the addresses are the same and a second signal when they are not the same, means for emptying said storing means at the end of said address signal, means for preventing storage of said instruction signal when said comparing means produces said second signal including an address flip-flop connected to said counter so as to be set by said second signal, a logic gate connecting said data pulse receiving means to said storing means and enabled while said address flip-flop is set, logic means connected to said address flip-flop for resetting said address flip-flop at the end of said address signal unless said comparing means produces said first signal, and means for transmitting an acknowledge signal to said data controller at the end of said address signal when said comparing means produces said first signal including means for transmitting said acknowledge signal if said address flip-flop remains set at the end of said address signal.

89. A data station as in claim 88 further including means for counting the number of clock pulses received after said counter produces said given signal to provide a bit period count, and means connecting said counting means to said emptying means for causing said emptying at a given bit count.

90. A data station as in claim 89 further including counting means for counting the number of characters, each character being comprised of a predetermined number of bit periods.

91. A data station as in claim 90 further including an interrupt flip-flop having a first condition indicating that the station has information to transfer to said data controller and a second condition indicating that the station does not have information to transfer to said data controller and means connected to said interrupt flip-flop and to said clock pulse counting means for transmitting upon a predetermined bit period count the condition of said interrupt flip-flop.

92. A data station for use in a system having a plurality of data stations connected to a data controller which interrogates said data stations successively comprising:

means for detecting a start of message signal from said data controller, means for storing an address signal, identifying one of said plurality of stations, transmitted to said stations after said start of message signal, and for thereafter storing instruction signals transmitted to said stations after said address signal, means defining the station address, means for comparing the address stored in said storing means with the address defined by said defining means and for producing a first signal when the addresses are the same and a second signal when they are not the same, means for emptying said storing means at the end of said address signal, means for preventing storage of said instruction signal when said comparing means produces said second signal, means for transmitting an acknowledge signal to said data controller at the end of said address signal when said comparing means produces said first signal, means for connecting said data station to a plurality of groups of slave stations, means responsive to receipt of each said start of message signal for producing a slave station address signal identifying a slave station in each of said groups so as to successively produce slave station address signals identifying each of said slave stations of said plurality of slave stations, means responsive to said slave station address signal for successively interrogating one at a time each slave station identified by said slave station address signal, means for receiving information signals from a slave station following said interrogation and for halting said interrogation upon receipt of a given information signal, and means for transmitting information to said data controller after said given signal is produced and said interrogation has been halted by receipt of said given information signal and for causing said halting to end and said interrogation to continue.

93. A data station for use in a system having a plurality of data stations connected to a data controller which interrogates said data stations successively comprising:

means for detecting a start of message signal from said data controller, means for storing an address signal, identifying one of said plurality of stations, transmitted to said stations after said start of message signal, and for thereafter storing instruction signals transmitted to said stations after said address signal, means defining the station address, means for comparing the address stored in said storing means with the address defined by said defining means and for producing a first signal when the addresses are the same and a second signal when they are not the same, means for emptying said storing means at the end of said address signal, means for preventing storage of said instruction signal when said comparing means produces said second signal, means for transmitting an acknowledge signal to said data controller at the end of said address signal when said comparing means produces said first signal, a manually operable keyboard having a plurality of keys for entering information with a first group of manually selectable function keys and a second group of manually selectable code keys, memory means for storing information entered into said keyboard by operation of said keys and having first and second portions, each with a given capacity, means for transmitting the information in said memory means to said data controller, and logic means connecting said keyboard to said memory means for first causing information entered by said code keys to be stored in said first portion together with information entered by operation of one of said function keys until said given capacity is exceeded and then stored in said second portion and second causing information entered by said code keys to be stored in said second portion together with information entered by operation of another one of said function keys unless said given capacity of said first portion has been exceeded.

94. A station as in claim 93 including means for producing a unique audio signal upon operation of each of said keys.

95. A station as in claim 93 wherein said logic means includes a memory address counter comprised of a plurality of binary flip-flops and connected to said memory means, said counter including a first flip-flop having a first output condition until two of said function keys have been operated to cause information entered by said code keys to be first stored in said first portion and a second output condition after two of said function keys have been operated to cause information thereafter entered by said code keys to be stored in said second portion unless the capacity of said first portion has been exceeded.

96. A station as in claim 93 wherein said keyboard including a manually selectable void key among said code keys and a manually selectable void key among said function keys.

97. A station as in claim 93 wherein said logic means includes means connected to said memory and said code void key for causing upon manual selection of said code void key information entered in said first portion by said code keys to be erased if one of said function keys has been operated and in said first and second portion by said code keys if the capacity of said first portion has been exceeded and causing the information entered in said second portion by said code keys to be erased if two of said function keys have been operated and means connected to said memory and said function void key for causing upon manual selection of said function void key information entered by said function void key in said first portion to be erased if one of said function keys has been operated and causing the information entered in said second portion by said function keys to be erased if two of said function keys have been operated.

98. A data station for use in a system having a plurality of data stations connected to a data controller which interrogates said data stations successively comprising:

means for detecting a start of message signal from said data controller, means for storing an address signal, identifying one of said plurality of stations, transmitted to said stations after said start of message signal, and for thereafter storing instruction signals transmitted to said stations after said address signal, means defining the station address, means for comparing the address stored in said storing means with the address defined by said defining means and for producing a first signal when the addresses are the same and a second signal when they are not the same, means for emptying said storing means at the end of said address signal, means for preventing storage of said instruction signal when said comparing means produces said second signal, means for transmitting an acknowledge signal to said data controller at the end of said address signal when said comparing means produces said first signal, means for counting the number of received signals each representing a given yardage increment, a pickup head mounted adjacent a quantity of textile material for producing a first signal when a given yardage of textile material passes said head in a first direction and second signal when said given yardage passes said head in the opposite direction, logic means for incrementing the count in said counting means when said first signal is produced and decrementing the count in said counting means when said second signal is produced, and means for transmitting a signal to said controller representing the count in said counting means upon receipt of an interrogation signal from said data controller.

99. A station as in claim 98 wherein said head includes a disc having at least a first aperture therein mounted for clockwise rotation with movement of said material in said first direction and counterclockwise rotation with movement in said second direction, a light source, and first and second photoresponsive elements mounted so that light from said source illuminates each via said aperture at different rotational positions of said disc and each produces in response thereto an electrical signal in an order which indicates the direction of rotation of said disc, and wherein said logic flip-flop means having first and second output conditions and means for causing said flip-flop to have said first output condition when said first element produces its signal before said second element produces its signal and to have said second output condition when said second element produces its signal before said first element produces its signal.

100. A station as in claim 99 wherein said transmitting means includes means for receiving a latch load signal and said logic means includes means for producing a clock signal for causing incrementing when said flip-flop means is in said first output condition and decrementing when said flip flop is in said second output condition and means for delaying said clock signal when said latch load signal is being received.

101. A station as in claim 100 including means for resetting said counting means.

102. A station as in claim 101 wherein said flip-flop means is an RS flip-flop and wherein said logic means includes first and second Schmidt trigger circuits connected to said first and second elements for producing a pulse, a logic gate having inputs connected to the outputs to said first and second Schmidt trigger circuits and its output connected to said RS flip-flop for applying a clock input and first and second delay circuits for coupling the outputs of said first and second Schmidt trigger circuits to the set and reset inputs to said RS flip-flop respectively.

103. A data controller for controlling communication between recording means and signal responsive stations comprising:

means for producing address signals one at a time each uniquely identifying one of said signal responsive stations and for transmitting said address signals to said stations, means for receiving from each addressed station following transmission of an address signal identifying that station a status signal indicating the status of the station operative or inoperative, means for storing the status of said station as indicated by said status signal following receipt of said status signal, means for comparing a received status signal with a stored status signal to determine whether the status of the addressed station has changed, and means for producing and transmitting immediately at least a second time the address of a station only when a received status signal from that station indicates that the station is inoperative and the stored status change signal indicates the stored and received status signals differ indicating a change in status.

104. A data controller as in claim 103 further including:

means for receiving information signals from the addressed device as successive characters, register means for storing at a predetermined location therein an information signal indicating whether the addressed device will operate in a first data format in which the character is comprised of a parity bit and first and second information bit groups separated by an unused bit or in a second data format in which the character is comprised of a parity bit and a single group of successive information bits, means for storing said information bits, and logic means connected to said register means, said receiving and transmitting means and said storing means for causing said storing means to store the bits of said first and second groups when said device responds in said first data format and to store said bits of said single group when said device responds in said second data format.

105. A data controller as in claim 104 wherein each said character has 10 bits, wherein in said first data format said first group of bits comprises bits 0–3, said second group of bits comprises bits 5–8, and said parity bit is bit 9 and wherein in said second data format said single group of bits comprises bits 0–7 and said parity bit comprises bit 9.

106. A data controller as in claim 103 further including:

clock pulse generating means for producing clock pulses which control timing within said data controller, means for receiving signals from the addressed signal responsive device, including an acknowledge signal transmitted by the addressed device at a predetermined time following receipt of said address signal by the addressed signal responsive device, means connected to said receiving and transmitting means and to said pulse generating means for determining the dealy time between the time that said clock pulse producing means produces a clock pulse at said predetermined time following transmission of said address signal and the time said data controller receives said acknowledge signal, and means connected to said determining means for delaying said pulses produced by said clock pulse generating means by said delay time so that said clock pulses are synchronized with the signals received from the addressed signal responsive device.

107. A data controller as in claim 103 further including:

means for producing an instruction signal following each address signal after which a data interrupt signal is received from the data station identified by that address signal and for causing said address signals producing means to immediately produce another address signal whenever a data interrupt signal is not received after an address signal, and not produce an instruction signal, and means for communicating information signals with a station following an instruction signal and for transmitting said information signals to said recording means.

108. A data controller as in claim 103 wherein said address signals producing and transmitting means includes:

memory means providing a plurality of addresses each uniquely identifying one of said signal responsive devices and a plurality of instructions, means connected to said memory means for producing address signals each uniquely identifying one of said signal responsive devices and for transmitting said address signals to said devices, including means for deriving an address from said memory means and means for receiving an address from said recording means, means for storing a last source signal indicating the source of the last address signal, means for producing a present source signal indicating the source of the present address signal, and means for comparing said last source signal and said present source signal and deriving the present address from said memory means rather than said recording means if the last source and the present source are both said recording means.

109. A data controller as in claim 103 wherein said recording means is a computer.

110. A data communication system comprising:

recording means, a plurality of data stations, each having a unique address, a data controller connected to said recording means and directly to said data stations including means for producing one at a time address signals each uniquely identifying one of said data stations and for transmitting said address signals directly to said address stations, and means for transmitting received information to said recording means, and a plurality of slave stations connected to one of said data stations and each having a unique slave address and means for producing an information signal in response to receipt of an address signal identifying that slave station, said one data station including means for simultaneously producing and transmitting to said slave stations said slave addresses each uniquely identifying at least one slave station while said data controller is transmitting addresses to said data stations, means for stopping further transmission of slave address signals to said slave stations when an addressed slave station produces an information signal and for transmitting a signal indicating the information of said information signal to said data controller when said one data station receives an address signal uniquely identifying said one station.

111. A system as in claim 110 wherein said recording means includes a digital computer.

112. A system as in claim 110 further including memory means for storing a plurality of addresses and the order of interrogation, means for connecting said memory means to said data controller for supplying a data station address and means responsive to a load signal from said recording means for causing said data controller to derive an address signal from said recording means rather than said memory means.

113. A data system as in claim 110 wherein said one data station further includes:

means for detecting a start of message signal from said data controller, and means responsive to receipt of each said start of message signal for producing an address signal identifying one slave station in each of said groups so as to successively produce address signals identifying each of said slave stations of said plurality of slave stations.

114. A data system as in claim 110 wherein said one station includes means for storing the status of each slave station at the last interrogation, means for comparing the current status of a slave station being interrogated with the last status and for causing said interrupt flip-flop to shift to its first condition if the current status differs from the stored status.

* * * * *